(12) United States Patent
Dupray et al.

(10) Patent No.: US 8,032,153 B2
(45) Date of Patent: Oct. 4, 2011

(54) MULTIPLE LOCATION ESTIMATORS FOR WIRELESS LOCATION

(75) Inventors: Dennis J. Dupray, Golden, CO (US); Charles L. Karr, Tuscaloosa, AL (US)

(73) Assignee: TracBeam LLC, Golden, CO (US)

( * ) Notice: Subject to any disclaimer, the term of this patent is extended or adjusted under 35 U.S.C. 154(b) by 574 days.

(21) Appl. No.: 12/014,092

(22) Filed: Jan. 14, 2008

(65) Prior Publication Data
US 2008/0113672 A1    May 15, 2008

Related U.S. Application Data

(63) Continuation of application No. 09/194,367, filed as application No. PCT/US97/15892 on Sep. 8, 1997, now Pat. No. 7,764,231.

(60) Provisional application No. 60/056,590, filed on Aug. 20, 1997, provisional application No. 60/044,821, filed on Apr. 25, 1997, provisional application No. 60/025,855, filed on Sep. 9, 1996.

(51) Int. Cl.
*H04W 24/00*    (2009.01)
(52) U.S. Cl. .................. 455/456.1; 455/456.5; 455/457; 455/456.3
(58) Field of Classification Search ............ 455/456.1
See application file for complete search history.

(56) References Cited

U.S. PATENT DOCUMENTS

| | | |
|---|---|---|
| 3,646,580 A | 2/1972 | Fuller et al. |
| 3,886,553 A | 5/1975 | Bates |
| 4,023,176 A | 5/1977 | Currie et al. |
| 4,232,313 A | 11/1980 | Fleishman |
| 4,347,618 A | 8/1982 | Kavouras et al. |
| 4,438,439 A | 3/1984 | Shreve |
| 4,475,010 A | 10/1984 | Huensch et al. |
| RE31,962 E | 7/1985 | Brodeur |
| 4,542,744 A | 9/1985 | Barnes et al. |
| 4,630,057 A | 12/1986 | Martin |
| 4,636,795 A | 1/1987 | Dano |
| 4,651,157 A | 3/1987 | Gray et al. |

(Continued)

FOREIGN PATENT DOCUMENTS
EP    0177203    4/1986

(Continued)

OTHER PUBLICATIONS

U.S. Appl. No. 11/739,097, filed Apr. 24, 2007, Dupray.

(Continued)

*Primary Examiner* — Lester Kincaid
*Assistant Examiner* — Isaak R Jama
(74) *Attorney, Agent, or Firm* — Dennis J. Dupray

(57) ABSTRACT

A wireless location system is disclosed that may be configured as a gateway for receiving a plurality of requests for locating mobile stations for, e.g., E911 requests, vehicle location or tracking. For each mobile station (MS) location request, the system: (a) activates one or more location estimators for locating the MS, (b) receives one or more MS location estimates from the estimators, and (c) transmits a resulting location estimate(s) to an identified destination. MS locations are determined using one or more locating technologies based on, e.g.: computed offsets from terrestrial base stations, satellite transmissions, indoor antennas, low range base stations, and/or signal fingerprinting. The system may: adapt with environmental changes, evaluate MS locations using heuristics/constraints, and/or adjust MS estimates for more reliable and accurate estimates. The system is useful for 911 emergencies, tracking, routing (e.g., to desired products/services), people and animal location including applications for confinement to and exclusion from certain areas.

44 Claims, 62 Drawing Sheets

U.S. PATENT DOCUMENTS

| | | | |
|---|---|---|---|
| 4,670,758 A | 6/1987 | Campbell | |
| 4,700,374 A | 10/1987 | Bini | |
| 4,721,958 A | 1/1988 | Jenkin | |
| 4,740,792 A | 4/1988 | Sagey et al. | |
| 4,742,357 A | 5/1988 | Rackley | |
| 4,799,062 A | 1/1989 | Sanderford, Jr. et al. | |
| 4,857,840 A | 8/1989 | Lanchais | |
| 4,860,352 A | 8/1989 | Laurance et al. | |
| 4,864,313 A | 9/1989 | Konneker | |
| 4,870,576 A | 9/1989 | Tornetta | |
| 4,876,550 A | 10/1989 | Kelly | |
| 4,879,713 A | 11/1989 | Ichiyoshi | |
| 4,888,593 A | 12/1989 | Friedman et al. | |
| 4,914,689 A | 4/1990 | Quade et al. | |
| 4,952,772 A | 8/1990 | Zana | |
| 4,990,922 A | 2/1991 | Young et al. | |
| 4,992,796 A | 2/1991 | Apostolos | |
| 5,003,317 A | 3/1991 | Gray et al. | |
| 5,008,679 A | 4/1991 | Effland et al. | |
| 5,017,926 A | 5/1991 | Ames et al. | |
| 5,032,989 A | 7/1991 | Tornetta | |
| 5,034,898 A | 7/1991 | Lu et al. | |
| 5,043,736 A | 8/1991 | Darnell et al. | |
| 5,045,852 A | 9/1991 | Mitchell et al. | |
| 5,045,861 A | 9/1991 | Duffett-Smith | |
| 5,055,851 A | 10/1991 | Sheffer | |
| 5,075,694 A | 12/1991 | Donnangelo et al. | |
| 5,092,343 A | 3/1992 | Spitzer et al. | |
| 5,099,245 A | 3/1992 | Sagey | |
| 5,111,209 A | 5/1992 | Toriyama | |
| 5,119,102 A | 6/1992 | Barnard | |
| 5,119,104 A | 6/1992 | Heller | |
| 5,136,686 A | 8/1992 | Koza | |
| 5,142,590 A | 8/1992 | Carpenter et al. | |
| 5,155,490 A | 10/1992 | Spradley, Jr. et al. | |
| 5,163,004 A | 11/1992 | Rentz | |
| 5,166,694 A | 11/1992 | Russell et al. | |
| 5,177,489 A | 1/1993 | Hatch | |
| 5,184,347 A | 2/1993 | Farwell et al. | |
| 5,191,342 A | 3/1993 | Alsup et al. | |
| 5,193,110 A | 3/1993 | Jones et al. | |
| 5,202,829 A | 4/1993 | Geier | |
| 5,208,756 A | 5/1993 | Song | |
| 5,212,765 A | 5/1993 | Skeirik | |
| 5,212,804 A | 5/1993 | Choate | |
| 5,214,789 A | 5/1993 | George | |
| 5,216,611 A | 6/1993 | McElreath | |
| 5,218,367 A | 6/1993 | Sheffer et al. | |
| 5,218,618 A | 6/1993 | Sagey | |
| 5,218,716 A | 6/1993 | Comroe et al. | |
| 5,223,844 A | 6/1993 | Mansell et al. | |
| 5,225,842 A | 7/1993 | Brown et al. | |
| 5,233,541 A | 8/1993 | Corwin et al. | |
| 5,235,633 A | 8/1993 | Dennison et al. | |
| 5,243,530 A | 9/1993 | Stanifer et al. | |
| 5,251,273 A | 10/1993 | Betts et al. | |
| 5,260,711 A | 11/1993 | Sterzer | |
| 5,278,892 A | 1/1994 | Bolliger et al. | |
| 5,280,295 A | 1/1994 | Kelley et al. | |
| 5,280,472 A | 1/1994 | Gilhousen et al. | |
| 5,282,261 A | 1/1994 | Skeirik | |
| 5,293,642 A | 3/1994 | Lo | |
| 5,293,645 A | 3/1994 | Sood | |
| 5,295,180 A | 3/1994 | Vendetti et al. | |
| 5,311,195 A | 5/1994 | Mathis et al. | |
| 5,317,323 A | 5/1994 | Kennedy et al. | |
| 5,319,374 A | 6/1994 | Desai et al. | |
| 5,325,419 A | 6/1994 | Connolly et al. | |
| 5,327,144 A | 7/1994 | Stilp et al. | |
| 5,331,550 A | 7/1994 | Stafford et al. | |
| 5,343,209 A | 8/1994 | Sennott et al. | |
| 5,349,631 A | 9/1994 | Lee | |
| 5,359,521 A | 10/1994 | Kyrtsos et al. | |
| 5,363,110 A | 11/1994 | Inamiya | |
| 5,365,447 A | 11/1994 | Dennis | |
| 5,365,450 A | 11/1994 | Schuchman et al. | |
| 5,365,516 A | 11/1994 | Jandrell | |
| 5,365,544 A | 11/1994 | Schilling | |
| 5,373,456 A | 12/1994 | Ferkinhoff et al. | |
| 5,379,224 A | 1/1995 | Brown et al. | |
| 5,388,147 A | 2/1995 | Grimes | |
| 5,388,259 A | 2/1995 | Fleischman et al. | |
| 5,389,934 A | 2/1995 | Kass | |
| 5,390,339 A | 2/1995 | Bruckert et al. | |
| 5,392,052 A | 2/1995 | Eberwine | |
| 5,394,158 A | 2/1995 | Chia | |
| 5,394,185 A | 2/1995 | Bernard | |
| 5,394,435 A | 2/1995 | Weerackody | |
| 5,395,366 A | 3/1995 | D'Andrea et al. | |
| 5,398,302 A | 3/1995 | Thrift | |
| 5,402,520 A | 3/1995 | Schnitta | |
| 5,402,524 A | 3/1995 | Bauman et al. | |
| 5,408,586 A | 4/1995 | Skeirik | |
| 5,408,588 A | 4/1995 | Ulug | |
| 5,410,737 A | 4/1995 | Jones | |
| 5,416,712 A | 5/1995 | Geier et al. | |
| 5,420,914 A | 5/1995 | Blumhardt | |
| 5,422,813 A | 6/1995 | Schuchman et al. | |
| 5,426,745 A | 6/1995 | Baji et al. | |
| 5,434,927 A | 7/1995 | Brady et al. | |
| 5,438,644 A | 8/1995 | Fu | |
| 5,438,688 A | 8/1995 | Masaki | |
| 5,444,451 A | 8/1995 | Johnson et al. | |
| 5,448,754 A | 9/1995 | Ho et al. | |
| 5,457,736 A | 10/1995 | Cain et al. | |
| 5,473,602 A | 12/1995 | McKenna et al. | |
| 5,479,397 A | 12/1995 | Lee | |
| 5,479,482 A | 12/1995 | Grimes | |
| 5,485,163 A | 1/1996 | Singer et al. | |
| 5,506,864 A | 4/1996 | Schilling | |
| 5,508,707 A | 4/1996 | LeBlanc et al. | |
| 5,508,708 A | 4/1996 | Ghosh et al. | |
| 5,510,801 A | 4/1996 | Engelbrecht et al. | |
| 5,512,908 A | 4/1996 | Herrick | |
| 5,513,111 A | 4/1996 | Wortham | |
| 5,513,243 A | 4/1996 | Kage | |
| 5,513,246 A | 4/1996 | Jonsson et al. | |
| 5,515,285 A | 5/1996 | Garrett, Sr. et al. | |
| 5,515,378 A | 5/1996 | Roy, III et al. | |
| 5,515,419 A | 5/1996 | Sheffer | |
| 5,517,667 A | 5/1996 | Wang | |
| 5,519,760 A | 5/1996 | Borkowski et al. | |
| 5,526,001 A | 6/1996 | Rose et al. | |
| 5,526,357 A | 6/1996 | Jandrell | |
| 5,526,466 A | 6/1996 | Takizawa | |
| 5,537,460 A | 7/1996 | Holliday, Jr. et al. | |
| 5,546,445 A | 8/1996 | Dennison et al. | |
| 5,555,257 A | 9/1996 | Dent | |
| 5,555,286 A | 9/1996 | Tendler | |
| 5,561,704 A | 10/1996 | Salimando | |
| 5,563,611 A | 10/1996 | McGann et al. | |
| 5,563,931 A | 10/1996 | Bishop et al. | |
| 5,564,079 A | 10/1996 | Olsson | |
| 5,570,412 A | 10/1996 | LeBlanc | |
| 5,572,218 A | 11/1996 | Cohen et al. | |
| 5,574,648 A | 11/1996 | Pilley | |
| 5,577,169 A | 11/1996 | Prezioso | |
| 5,581,490 A | 12/1996 | Ferkinhoff et al. | |
| 5,581,596 A | 12/1996 | Hogan | |
| 5,583,513 A | 12/1996 | Cohen | |
| 5,583,517 A | 12/1996 | Yokev et al. | |
| 5,588,038 A | 12/1996 | Snyder | |
| 5,592,180 A | 1/1997 | Yokev et al. | |
| 5,594,425 A | 1/1997 | Ladner et al. | |
| 5,594,740 A | 1/1997 | LaDue | |
| 5,594,782 A | 1/1997 | Zicker et al. | |
| 5,596,625 A | 1/1997 | LeBlanc | |
| 5,600,705 A | 2/1997 | Maenpaa | |
| 5,600,706 A | 2/1997 | Dunn et al. | |
| 5,602,903 A | 2/1997 | LeBlanc et al. | |
| 5,604,765 A | 2/1997 | Bruno et al. | |
| 5,608,410 A | 3/1997 | Stilp et al. | |
| 5,610,815 A | 3/1997 | Gudat et al. | |
| 5,610,972 A | 3/1997 | Emery et al. | |
| 5,611,704 A | 3/1997 | Kamizono et al. | |
| 5,612,703 A | 3/1997 | Mallinckrodt | |
| 5,613,041 A | 3/1997 | Keeler et al. | |

| Patent | Date | Inventor |
|---|---|---|
| 5,613,205 A | 3/1997 | Dufour |
| 5,614,914 A | 3/1997 | Bolgiano et al. |
| 5,617,565 A | 4/1997 | Augenbraun et al. |
| 5,619,552 A | 4/1997 | Karppanen et al. |
| 5,621,848 A | 4/1997 | Wang |
| 5,625,668 A | 4/1997 | Loomis et al. |
| 5,625,748 A | 4/1997 | McDonough et al. |
| 5,627,547 A | 5/1997 | Ramaswamy et al. |
| 5,629,707 A | 5/1997 | Heuvel et al. |
| 5,631,469 A | 5/1997 | Carrieri et al. |
| 5,634,051 A | 5/1997 | Thomson |
| 5,638,486 A | 6/1997 | Wang et al. |
| 5,640,103 A | 6/1997 | Petsche et al. |
| 5,646,630 A | 7/1997 | Sheynblat et al. |
| 5,649,065 A | 7/1997 | Lo et al. |
| 5,652,570 A | 7/1997 | Lepkofker |
| 5,657,487 A | 8/1997 | Doner |
| 5,663,734 A | 9/1997 | Krasner |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,701,328 A | 12/1997 | Schuchman et al. |
| 5,710,758 A | 1/1998 | Soliman et al. |
| 5,710,918 A | 1/1998 | Lagarde et al. |
| 5,717,406 A | 2/1998 | Sanderford et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A | 3/1998 | Kauser et al. |
| 5,727,057 A | 3/1998 | Emery et al. |
| 5,729,549 A | 3/1998 | Kostreski et al. |
| 5,732,074 A | 3/1998 | Spaur et al. |
| 5,732,354 A | 3/1998 | MacDonald |
| 5,736,964 A | 4/1998 | Ghosh et al. |
| 5,737,431 A | 4/1998 | Brandstein et al. |
| 5,740,048 A | 4/1998 | Abel et al. |
| 5,742,509 A | 4/1998 | Goldberg et al. |
| 5,742,905 A | 4/1998 | Pepe et al. |
| 5,754,955 A | 5/1998 | Ekbatani |
| 5,764,756 A | 6/1998 | Onweller |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,802,454 A | 9/1998 | Goshay et al. |
| 5,802,518 A | 9/1998 | Karaev et al. |
| 5,805,670 A | 9/1998 | Pons et al. |
| 5,809,415 A | 9/1998 | Rossmann |
| 5,815,417 A | 9/1998 | Orr et al. |
| 5,815,538 A | 9/1998 | Grell et al. |
| 5,815,814 A | 9/1998 | Dennison et al. |
| RE35,916 E | 10/1998 | Dennison et al. |
| 5,819,273 A | 10/1998 | Vora et al. |
| 5,819,301 A | 10/1998 | Rowe et al. |
| 5,822,539 A | 10/1998 | van Hoff |
| 5,831,977 A | 11/1998 | Dent |
| 5,832,367 A | 11/1998 | Bamburak et al. |
| 5,835,857 A | 11/1998 | Otten |
| 5,835,907 A | 11/1998 | Newman |
| 5,838,562 A | 11/1998 | Gudat et al. |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,857,181 A | 1/1999 | Augenbraun et al. |
| 5,864,313 A | 1/1999 | Speck et al. |
| 5,864,755 A | 1/1999 | King et al. |
| 5,867,495 A | 2/1999 | Elliott et al. |
| 5,867,799 A | 2/1999 | Lang et al. |
| 5,870,029 A | 2/1999 | Otto et al. |
| 5,872,539 A | 2/1999 | Mullen |
| 5,873,040 A | 2/1999 | Dunn et al. |
| 5,873,076 A | 2/1999 | Barr et al. |
| 5,875,394 A | 2/1999 | Daly et al. |
| 5,875,401 A | 2/1999 | Rochkind |
| 5,883,598 A | 3/1999 | Parl et al. |
| 5,890,068 A | 3/1999 | Fattouche et al. |
| 5,892,441 A | 4/1999 | Woolley et al. |
| 5,893,091 A | 4/1999 | Hunt et al. |
| 5,895,436 A | 4/1999 | Savoie et al. |
| 5,901,358 A | 5/1999 | Petty et al. |
| 5,903,844 A | 5/1999 | Bruckert et al. |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,924,090 A | 7/1999 | Krellenstein |
| 5,926,133 A | 7/1999 | Green, Jr. |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,938,721 A | 8/1999 | Dussell et al. |
| 5,943,014 A | 8/1999 | Gilhousen |
| 5,945,948 A | 8/1999 | Buford et al. |
| 5,949,815 A | 9/1999 | Pon |
| 5,952,969 A | 9/1999 | Hagerman et al. |
| 5,959,568 A | 9/1999 | Woolley |
| 5,963,866 A | 10/1999 | Palamara et al. |
| 5,966,658 A | 10/1999 | Kennedy, III et al. |
| 5,969,673 A | 10/1999 | Bickley |
| 5,973,643 A | 10/1999 | Hawkes et al. |
| 5,977,913 A | 11/1999 | Christ |
| 5,978,840 A | 11/1999 | Nguyen et al. |
| 5,982,324 A | 11/1999 | Watters et al. |
| 5,982,891 A | 11/1999 | Ginter et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 6,009,334 A | 12/1999 | Grubeck et al. |
| 6,014,102 A | 1/2000 | Mitzlaff et al. |
| 6,026,304 A | 2/2000 | Hilsenrath et al. |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,061,064 A | 5/2000 | Reichlen |
| 6,064,339 A | 5/2000 | Wax et al. |
| 6,064,942 A | 5/2000 | Johnson et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Ishizuka et al. |
| 6,108,555 A | 8/2000 | Maloney et al. |
| 6,157,621 A | 12/2000 | Brown et al. |
| 6,167,274 A | 12/2000 | Smith |
| 6,185,427 B1 | 2/2001 | Krasner et al. |
| 6,236,365 B1 | 5/2001 | LeBlanc et al. |
| 6,240,285 B1 | 5/2001 | Blum et al. |
| 6,243,587 B1 | 6/2001 | Dent et al. |
| 6,249,245 B1 | 6/2001 | Watters et al. |
| 6,249,252 B1 | 6/2001 | Dupray |
| 6,301,463 B1 | 10/2001 | Dao et al. |
| 6,308,072 B1 | 10/2001 | Labedz et al. |
| 6,321,092 B1 | 11/2001 | Fitch et al. |
| 6,324,404 B1 | 11/2001 | Dennison et al. |
| 6,330,452 B1 | 12/2001 | Fattouche et al. |
| 6,381,464 B1 | 4/2002 | Vannucci |
| 6,385,541 B1 | 5/2002 | Blumberg et al. |
| 6,438,380 B1 | 8/2002 | Bi et al. |
| 6,519,463 B2 | 2/2003 | Tendler |
| 6,549,130 B1 | 4/2003 | Joao |
| 6,834,195 B2 | 12/2004 | Brandenberg et al. |

| | | | |
|---|---|---|---|
| 6,952,181 | B2 | 10/2005 | Karr et al. |
| 7,274,332 | B1 | 9/2007 | Dupray |
| 2001/0022558 | A1 | 9/2001 | Dupray et al. |
| 2003/0146871 | A1 | 8/2003 | Dupray et al. |
| 2003/0222820 | A1 | 12/2003 | Dupray et al. |
| 2004/0198386 | A1 | 10/2004 | Dupray |
| 2004/0266457 | A1 | 12/2004 | Dupray |

FOREIGN PATENT DOCUMENTS

| | | |
|---|---|---|
| EP | 0546758 | 6/1993 |
| EP | 0689369 | 12/1995 |
| EP | 0811296 | 12/1997 |
| EP | 0870203 | 10/1998 |
| EP | 0923817 | 6/1999 |
| GB | 1605207 | 10/1983 |
| GB | 2155720 | 9/1985 |
| WO | WO 93/04453 | 3/1993 |
| WO | WO 94/01978 | 1/1994 |
| WO | WO 94/11853 | 5/1994 |
| WO | WO 94/15412 | 7/1994 |
| WO | WO 94/27161 | 11/1994 |
| WO | WO 95/03598 | 2/1995 |
| WO | WO 95/34177 | 12/1995 |
| WO | WO 96/14588 | 5/1996 |
| WO | WO 96/20542 | 7/1996 |
| WO | WO 97/01228 | 1/1997 |
| WO | WO 97/22888 | 6/1997 |
| WO | WO 97/24010 | 7/1997 |
| WO | WO 97/26750 | 7/1997 |
| WO | WO 97/38540 | 10/1997 |
| WO | WO 97/41654 | 11/1997 |
| WO | WO 97/50002 | 12/1997 |
| WO | WO 98/00982 | 1/1998 |
| WO | WO 98/10307 | 3/1998 |
| WO | WO 98/14018 | 4/1998 |
| WO | WO 01/44998 | 6/2001 |
| WO | WO 01/95642 | 12/2001 |
| WO | WO 02/065250 | 8/2002 |

OTHER PUBLICATIONS

U.S. Appl. No. 09/194,367, filed Nov. 24, 1998, Dupray.
U.S. Appl. No. 08/246,149, filed May 19, 1994, Lepkofker.
U.S. Appl. No. 08/191,984, filed Feb. 4, 1994, Loomis.
U.S. Appl. No. 08/355,901, filed Dec. 13, 1994, Schoen.
U.S. Appl. No. 60/017,269, filed May 13, 1996, Maloney.
U.S. Appl. No. 60/017,899, filed May 17, 1996, Maloney.
U.S. Appl. No. 60/035,691, filed Jan. 16, 1997, Maloney.
U.S. Appl. No. 60/038,037, filed Feb. 7, 1997, Christ.
"ARGOS: Basic Description of the Argos System"; ARGOS; 7 pgs.
"Location Systems and Technologies", 1994, Wireless Emergency Services JEM Report, Annex A pp. 42-46 and Appendix A pp. 1-2.
"The Measearch Engine Years: Fit the First", 1992, http://www.conman.org/people/spc/refs/search.hpl.html, pp. 1-3.
Baldazo, "Navigating with a Web Compass: Quarterdeck Harnessess Leading-edge "Metasearch" Technology to Create a Smart Agent that Searches the Web and organizes the Results", Mar. 1996, BYTE, pp. 97-98.
Bass, Tim, "Intrusion Detection Systems and Multisensor Data Fusion: Creating Cyberspace Situational Awareness," Communications of the ACM, date unknown.
Beck et al.; "Simulation Results on the Downlink of a Qualcomm-like DS-CDMA-System Over Multipath fading channels"; Sep. 1994 pp. 1-7.
Botafogo, "Cluster Analysis for Hypertext Systems", Jun. 1993, ACM-SIRIG, pp. 116-124.
Caffery et al.; "Overview of Radiolocation in CDMA Cellular Systems"; IEEE Communications Magazine; Apr. 1998; pp. 38-45.
Caffery et al.; "Radio Location in Urban CDMA Microcells"; International Symposium on Personal, Indoor, and Mobil Radio Communications, Sep. 1995; 5 pgs.
Caffery, J. And Stüüber, G. L., "Vehicle Location and Tracking for IVHS in CDMA Microcells," International Symposium on Personal, Indoor, and Mobile Radio Communications, pp. 1227-1231, Sep. 1994.

Callan, James P., et al., "Searching Distributed Collections With Inference Networks," 18th Annual International ACM SIGIR Conference on Research and Development in Information Retrieval, 1995.
Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation", filed Sep. 25, 1996.
Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.
Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.
Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.
Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.
Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.
Before the Federal Communications Commission, in the Matter of Revision of the Commission's Rules to Ensure Compatibility with Enhanced 911 Emergency Calling Systems; ex parte communication from XYPOINT Corporation, Inc. received Jul. 28, 1997 by the Commission.
Chan et al., "Multipath Propagation Effects on a CDMA Cellular System", 1994, IEEE, pp. 848-855.
Communication from U.S. Patent and Trademark Office, Re: U.S. Appl. No. 08/355,901, Advisory Action, Dated: Aug. 11, 1998.
Communication from U.S. Patent and Trademark Office, Re: U.S. Appl. No. 08/355,901, Advisory Action, Dated: Nov. 4, 1998.
Communication from U.S. Patent and Trademark Office, Re: U.S. Appl. No. 08/355,901, Advisory Action, Dated: Oct. 9, 1998.
Communication from U.S. Patent and Trademark Office, Re: U.S. Appl. No. 08/355,901, Advisory Action, Dated: Sep. 9, 1998.
Communication from U.S. Patent and Trademark Office, Re: U.S. Appl. No. 08/355,901, Examiner Interview Summary Record, Dated: Aug. 13, 1996.
Communication from U.S. Patent and Trademark Office, Re: U.S. Appl. No. 08/355,901, Office Action Summary, Dated: Jun. 24, 1998.
Communication from U.S. Patent and Trademark Office, Re: U.S. Appl. No. 08/355,901, Office Action Summary, Dated: Mar. 14, 1997.
Communication from U.S. Patent and Trademark Office, Re: U.S. Appl. No. 08/355,901, Office Action Summary, Dated: Mar. 17, 1998.
Communication from U.S. Patent and Trademark Office, Re: U.S. Appl. No. 08/355,901.
Communication from U.S. Patent and Trademark Office, Re: U.S. Appl. No. 08/355,901, Response from Examiner regarding communication filed on Dec. 26, 1995, Dated Jul. 23, 1996.
Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.
Dailey, D.J., et al., "Its Data Fusion," Final Research Report, Research Project T9903, Task 9, ATIS/ATMS Regional IVHS Demonstration, University of Washington, Apr. 1996.

Dartmouth College, "Soldiers, Agents and Wireless Networks: A Report on a Military Application," PAAM 2000.

Driscoll, "Wireless Caller Location Systems", 1998, GSP World Advanstar Communications, Inc., www.gpsworld.com/1198/1198driscol.html, pp. 1-8.

Dutta et al., "Modified Adaptive Multiuser Detector for DS-CDMA in Multipath Fading", Prior to Dec. 22, 1997, pp. 1-7.

Ergon Proprietary; "Performance Analyses Brief: Microminiature Emergency Locator Systems (MELS)"; May 1996.

Evans, 1998, "New Satellites for Personal Communications," Scientific American, 278(4):70-77.

Fechner et al., A Hybrid Neural Network Architecture for Automatic Object Recognition, 1994, IEEE, pp. 187-194.

From http:/www.uswcorp.com/laby.htm,, Release concerning RadioCamera™, printed Sep. 14, 1998.

Gallant, "Neural Network Learning and Expert Systems", 1994, The MIT Press, pp. 132-137.

Gaspard et al., "Position Assignment in Digital Cellular Mobile Radio Networks (e.g. GSM) derived from Measurements at the Protocol Interface", Prior to Dec. 22, 1997, pp. 1-5.

Goldbsmith et al., "A Measurement-Based Model for Predicting Coverage Areas of Urban Microcells", 1993, IEEE, pp. 1013-1023.

Hills, 1998, Terrestrial Wireless Networks, Scientific American, 278(4):86-91.

Ichitsubo et al., "A Statistical Model for Microcellular Multipath Propagation Environment", Prior to Dec. 22, 1997, Wireless Systems Laboratories, pp. 1-6.

Iwayama et al., "Cluster-Based Text Catagorization: A Comparison of Category Search Strategies", 1995, ACM-SIGIR, pp. 273-279.

Johnson, "Smart Technology Busting Out All Over Web", Jun. 15, 1998, Electronic Engineering Times, 1012 pp. 1-6.

Junius et al., "New Methods for Processing GSM Radio Measurement Data: Applications for Locating, Handover, and Network Management", 1994, Communication Network, Aachen University of Technology, pp. 338-342.

Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.

Kosko, "Fuzzy Systems as Universal Approximators", 1994, IEEE, pp. 1329-1333.

Lawrence et al., "Northern Light Search Engine Leads the Pack-Others Fall Behind", May 1, 1998, Online Newsletter, 19(5)pp. 1-2.

Loran; 1992; "Users Handbook 1992 Edition"; U.S. Coast Guard, Radionavigation Division; 28 pgs.

Low, "Comparison of Urban Propagation Models with CW-Measurements", 1992, IEEE Deutsche Bundespost Telekom, pp. 936-942.

Mardiraju et al., "Neural Networks for Robust Image Feature Classification: A Comparative Study", 1994, IEEE, pp. 423-430.

Meadow, "Text Information Retrieval Systems", 1992, Academic Press, pp. 204-209.

Miller, RT, et al., "Protein fold recognition by sequence threading: tools and assessment techniques," Journal Announcement, Department of Biochemistry and Molecular Biology, University College, London, United Kingdom, Jan. 1996.

Newton; 1981; "The Near-Term Potential of Doppler Location"; John Hopkins APL Technical Digest; pp. 16-31.

Notess, "Internet Search Engine Update", Jul. 1, 1998, Online, vol. v22:nr, pp. 1-3.

Orphanoudakis, C.E., et al., "I2 Cnet: Content-Based Similarity Search in Geographically Distributed Repositories of Medical Images," vol, 20(4), pp. 193-207, Computerized Medical Imaging and Graphics, 1996.

Pelton, 1998, "Telecommunications for the 21st Century," Scientific American, 278(4):80-85.

Pop et al.; "Site Engineering for Indoor Wireless Spread Spectrum Communications"; Jun. 2001; 3 pgs.

Ramanathan et al.; "A Survey of Routing Techniques for Mobile Communications Networks"; Mobile Networks and Applications; Oct. 1996; vol. 1(2); pp. 1-31.

Rizzo et al.; "Integration of Location Services in the Open Distributed Office"; Technical Report 14-94, Computing Laboratory, University of Kent, Cantebury, United Kingdom; Aug. 1994; pp. 1-14.

Salcic;"AGPCS—An Automatic GSM-based Positioning and Communication System" Proceedings of GeoComputation 1997 & SIRC 1997; Aug. 1997; pp. 15-22.

Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.

Sousa et al., "Delay Spread Measurements for the Digital Cellular Channel in Toronto", 1994, IEEE, pp. 837-847.

Striglis et al., "A Multistage RAKE Receiver for Improved Capacity of CDMA Systems", 1994, IEEE Vehicular Technology Conference, pp. 1-5.

Stutzmann et al., 1998, "Moving Beyond Wireless Voice Systems," Scientific American, 278(4):92-93.

Wang Baldonado et al., "SenseMaker: An Information-Exploration Interface Supporting the Contextual Evolution of a User's Interests", 1997, ACM-CHI, pp. 11-18.

Weiss et al., "HyPursuit: A Hierarcical Network Search Engine that Exploits Content-Link Hypertext Clustering", 1996, Hypertext, pp. 180-193.

Wittenben et al., "A Low Cost Noncoherent Receiver with Adaptive Antenna Combining for High Speed Wireless Lans", Prior to Dec. 22, 1997, ASCOM Systec AG, pp. 1-4.

Wolfe et al., "Field Strength Prediction in Indoor Environments with Neural Networks", Prior to Dec. 22, 1997, pp. 1-5.

Wylie et al., "The Non-Line of Sight Problem in Mobile Location Estimation".

Smith, Jr., "Passive Location of Mobile Cellular Telephone Terminals," IEEE, CH3031-2/91/0000-0221, 1991 pp. 221-225.

"After Allowance Amendment under C.F.R. 1.312", filed Jul. 10, 2007, for U.S. Appl. No. 10/262,413, 23 pages.

"Amendment After Allowance, U.S. Appl. No. 09/176,587 Amendments to the Claims", filed Apr. 3, 2007, 33 pages.

"Amendment and Response to Office Action Dated May 5, 2006", filed Nov. 30, 2006, for U.S. Appl. No. 10/262,338, 27 pages.

Mynatt. et al., "Designing Audio Aura", published in CHI '98 Conference Proceedings, publication yr. 1998.

FIG 6(3)

LOCATION CENTER 142

LOCATION ENGINE 139

1320

LOCATION SIGNATURE DATA BASE
1. STORES CDMA SIGNAL CHARACTERISTICS FOR VERIFIED LOCATIONS (E.G., LOCATION SIGNATURES OR LOC SIGS);
2. EACH LOC SIG ALLOWS ACCESS TO: MS LAT-LONG, BS ID, POWER LEVELS (BS AND MS), TIME/DATE STAMP, ENVIRONMENTAL MEASUREMENTS INDICATING; E.G., RF BACKGROUND NOISE, MULTIPATH, DENSE URBAN, URBAN, SUBURBAN, RURAL, MOUNTAIN, WEATHER, TRAFFIC, AND A CONFIDENCE VALUE FOR THE LOC SIG.
3. SUPPORTED RETRIEVALS: BY GEOGRAPHICAL AREA, BY BS ID, BY ENVIRONMENTAL MEASUREMENT CLASSIFICATIONS, BY TIME/DATE RANGE.
4. LOC SIGS INPUT FROM 2 SOURCES: FIXED LOCATION MSS (E.G., LBS'S, 12 LOC SIGS/LBS/DAY FOR A YEAR), OTHER VERIFIED SOURCES PROVIDED BY A MBS 148 OR ANOTHER UNIT HAVING LOCATION VERIFICATION FUNCTIONALITY; E.G., POLICE, AMBULANCES, BUSES, TAXIS.

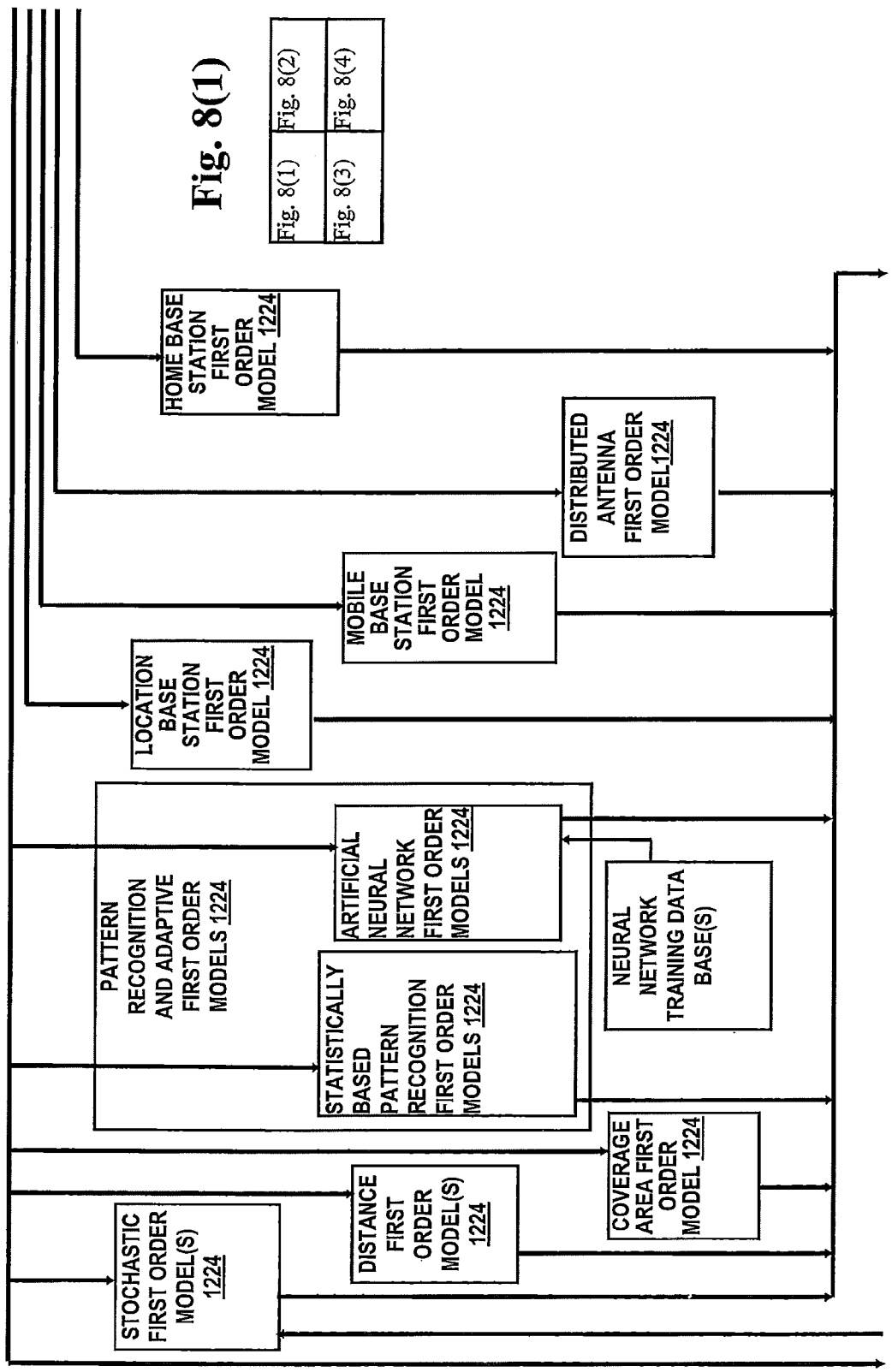

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est*: Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [-1.0, +1.0] indicating a likelihood that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est". If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem.

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster*: Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

Location Signature Data Type

MS_type: The make and model of the target MS 140 associated with a location signature instantiation;

BS_id: An identification of the base station 122 (location base station 152) communicating with the target MS;

verified_flag: TRUE iff a location of MS_loc has been verified, FALSE otherwise. Note, if this field is TRUE (i.e., the loc sig is verified), then the base station identified by BS_id is the current primary base station for the target MS;

MS_loc: If verified_flag is TRUE, then this attribute includes an estimated location of the target MS.

If verified_flag is FALSE, then this attribute has a value indicating "location unknown".

Note this attribute may include the following two subfields: an area within which the target MS is presumed to be, and a point location (e.g., a latitude and longitude pair) where the target MS is presumed to be (in one embodiment this is the centroid of the area);

confidence: a value indicating how consistent this loc sig is with other loc sigs in the location signature data base 1320; the value for this entry is in the range [0, 1] with 0 corresponding to the lowest (i.e., no) confidence and 1 corresponding to the highest confidence;

timestamp: The time and date when the location signature was received by the base station of BS_id;

Fig. 16b signal topography characteristics:

Characteristics of a generated surface(s), the surface(s) being generated by the signal filtering subsystem 1220 using signal measurements between the MS and BS associated with the loc sig, wherein the measurements were accumulated over a particular (relatively short) time interval. For example, the dimensions for the generated surface may be signal strength and time delay. By sampling such signal characteristics and tallying the samples in each of a plurality of mesh cells, a mountainous surface can be obtained. Such a surface, is believed, under most circumstances, to provide a contour that is substantially unique to the location of the target MS 140. The attributes of such a surface(s) retained in the signal topography characteristics here include, for example: for each local maximum (of the surface) above a predetermined noise ceiling threshold, the (signal strength, time delay) coordinates of the cell of the local maximum and the corresponding height of the local maximum. Additionally, certain gradients may also be included for characterizing the "steepness" of the surface mountains. Moreover, in some embodiments, a frequency may also be associated with each local maximum. Thus, the data retained for each selected local maximum can include a quadruple of signal strength, time delay, height and frequency;

quality_obj: This object includes one or more signal quality (or error) measurements (e.g., Eb/No values);

noise_ceiling: Noise ceiling values used in the initial filtering of noise (by the signal filtering subsystem 1220) from the surface(s) used in generating the signal topography characteristics;

power_level: The power levels of the associated BS 122 and MS 140 for the signal data used for this loc sig;

timing_error: An estimated (or maximum) timing error between the associated target MS 140 and the current primary BS 122 for this target MS. Note that if location base station 152) detecting the associated base station (e.g., an infrastructure base station 122 or a the BS 122 associated with the loc sig is the primary base station (e.g., when the loc sig is verified), then the value here will be zero;

Fig. 16c power_level: The power levels of the associated BS 122 and MS 140 for the signal data used for this loc sig;

timing_error: An estimated (or maximum) timing error between the associated base station (e.g., an infrastructure base station 122 or a location base station 152) detecting the associated target MS 140 and the current primary BS 122 for this target MS. Note that if the BS 122 associated with the loc sig is the primary base station (e.g., when the loc sig is verified), then the value here will be zero;

cluster_ptr: A pointer to the location signature cluster to which this loc sig belongs.

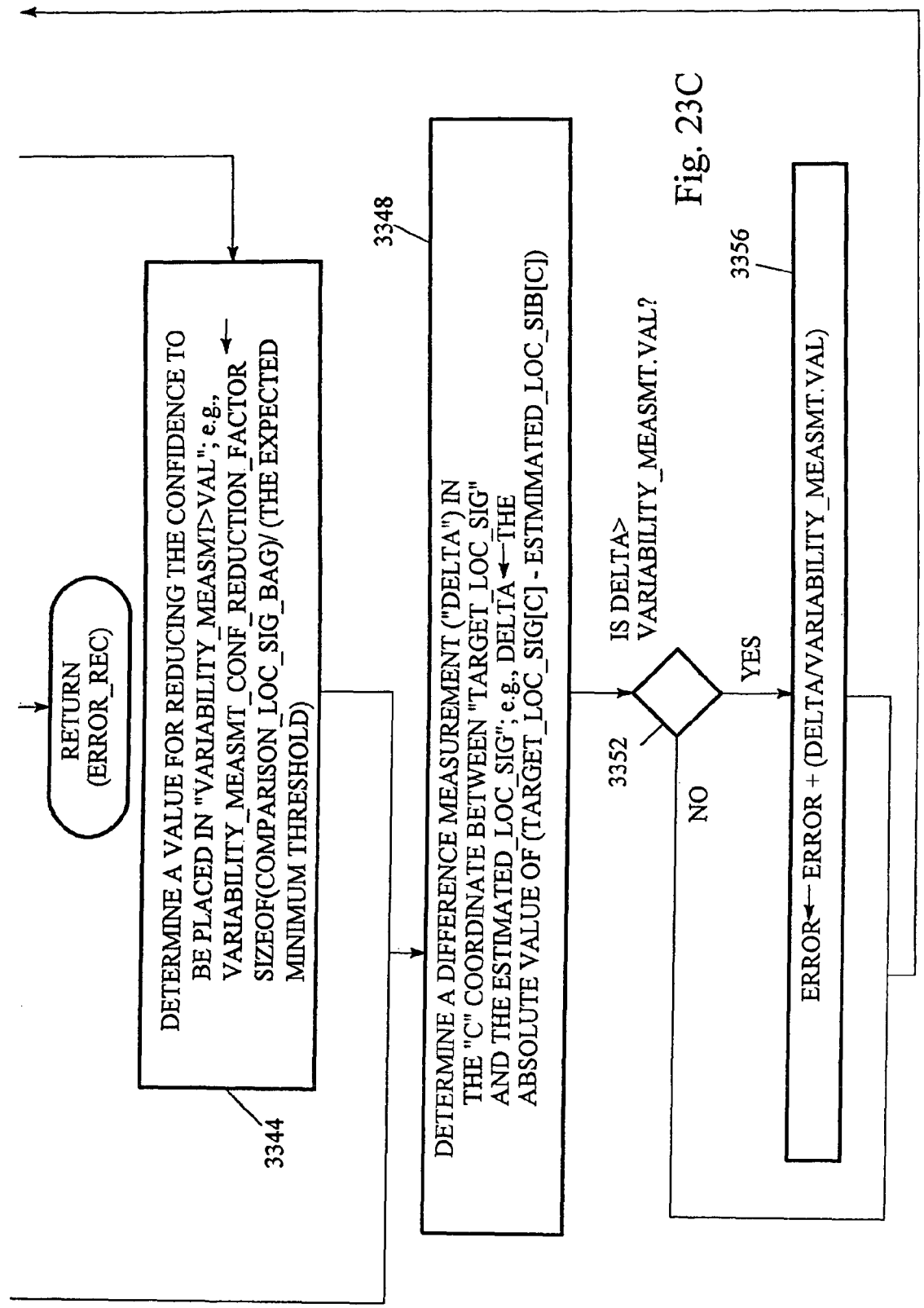

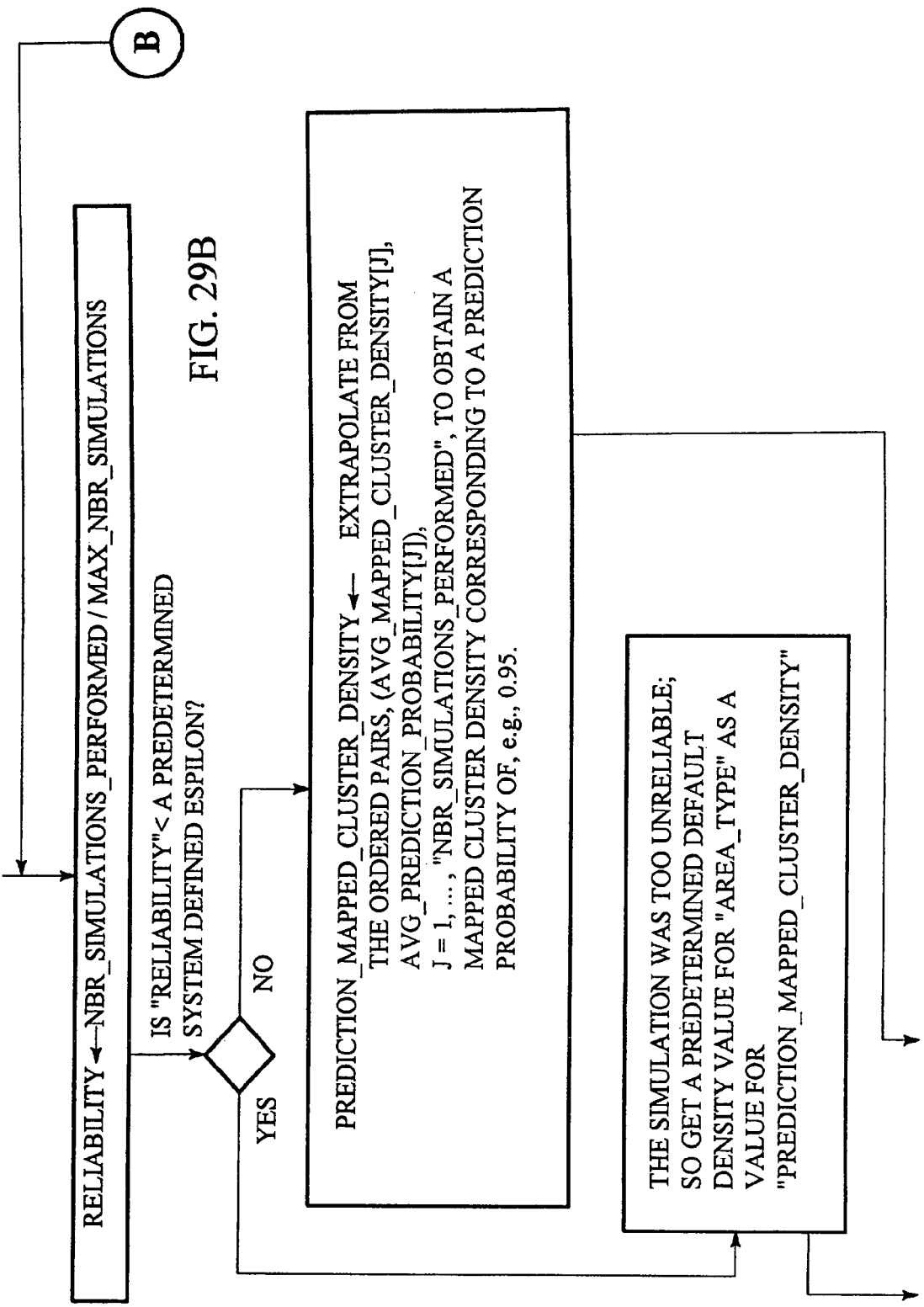

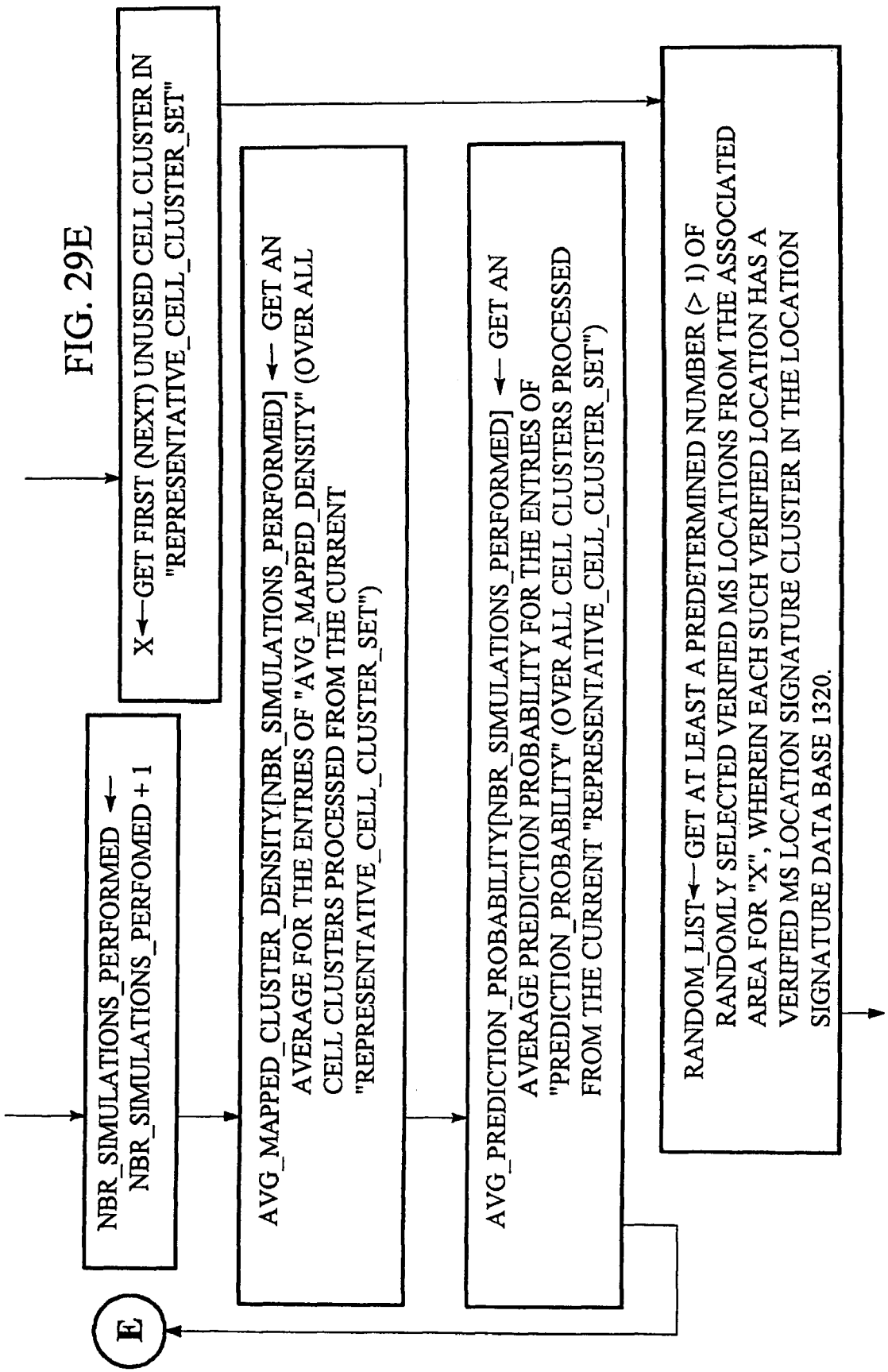

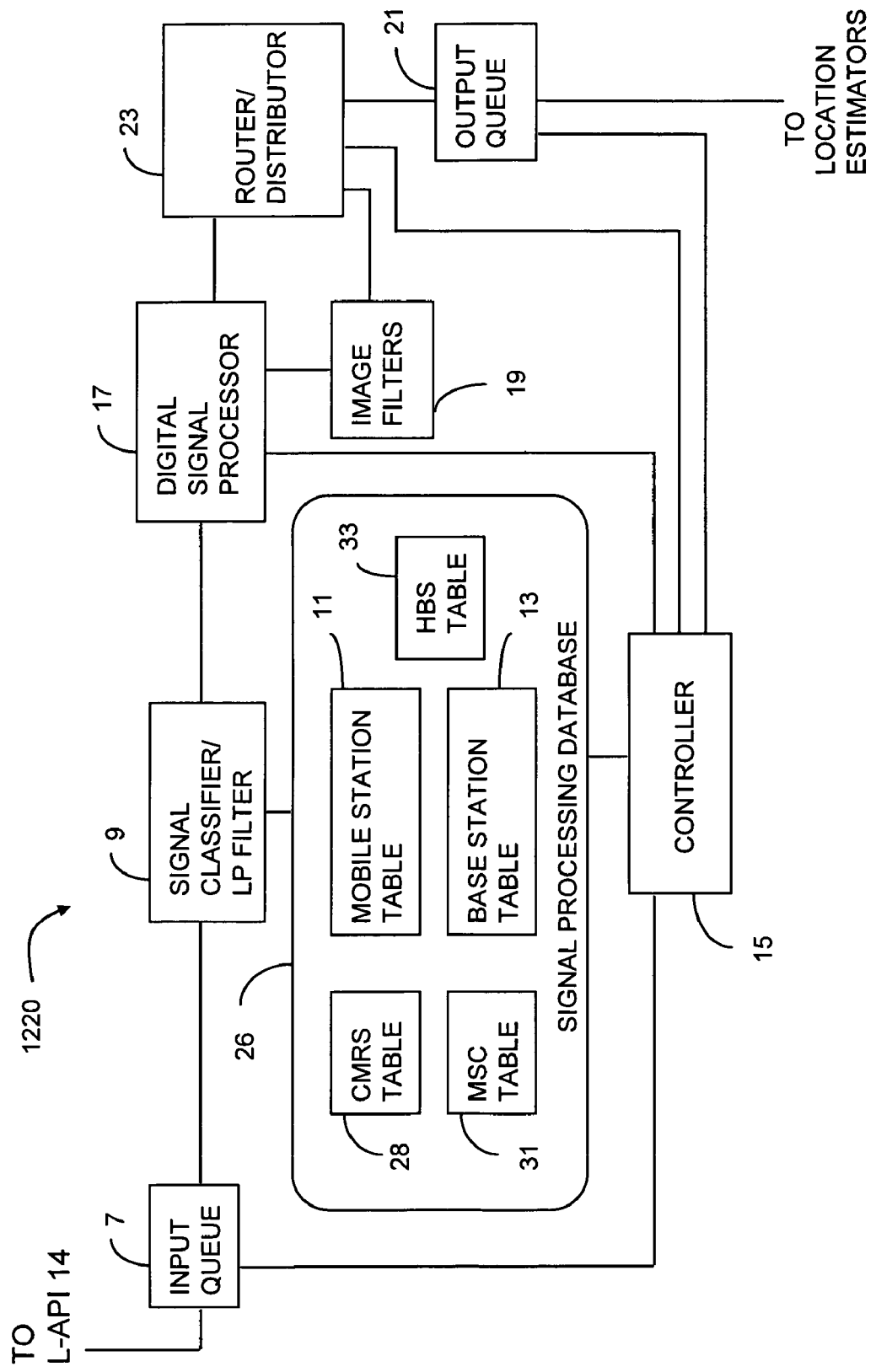
Fig. 30: Signal Processing Subsystem

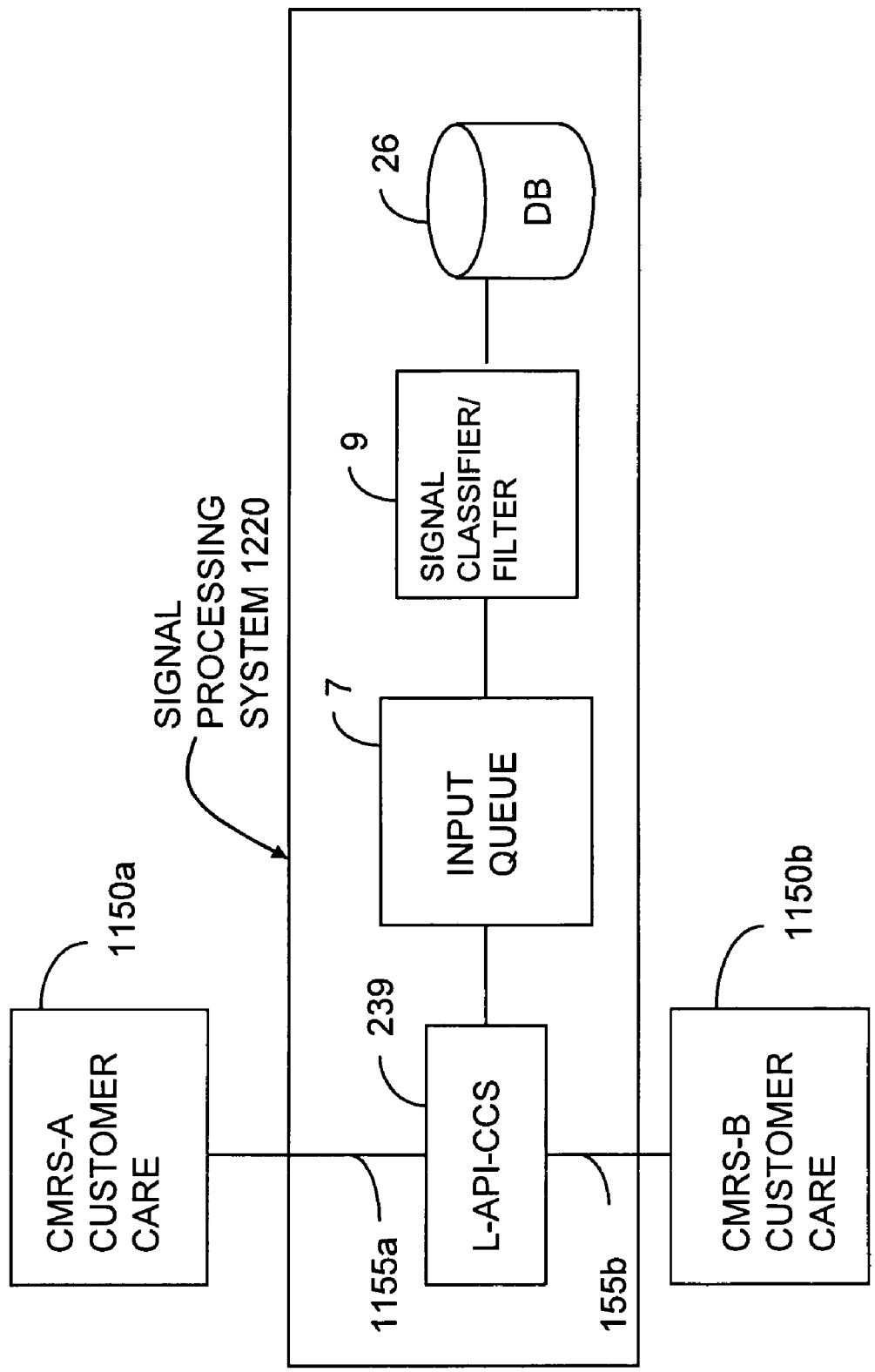
FIG. 31: LOCATION PROVISIONING VIA MULTIPLE CMRS

MULTIPLE LOCATION ESTIMATORS FOR WIRELESS LOCATION

RELATED APPLICATIONS

The present application is a continuation of U.S. application Ser. No. 09/194,367 filed Nov. 24, 1998 which is the National Stage of International Application No. PCT/US97/15892, filed Sep. 8, 1997 which claims the benefit of the following three provisionals: U.S. Provisional Application No. 60/056,590 filed Aug. 20, 1997; U.S. Provisional Application No. 60/044,821 filed Apr. 25, 1997; and U.S. Provisional Application No. 60/025,855 filed Sep. 9, 1996.

FIELD OF THE INVENTION

The present invention is directed generally to a system and method for locating people and/or objects, and in particular, to a network gateway for receiving a plurality of requests for locating mobile stations for, e.g., E911 requests, and vehicle location or tracking, and requesting locations of the mobile stations from one or more of a plurality of mobile station location estimators, wherein such estimators may be based on, e.g., coverage area, GPS, TDOA, and AOA location techniques, and/or signal pattern recognition/matching.

BACKGROUND

Wireless communications systems are becoming increasingly important worldwide. Wireless cellular telecommunications systems are rapidly replacing conventional wire-based telecommunications systems in many applications. Cellular radio telephone networks ("CRT"), and specialized mobile radio and mobile data radio networks are examples. The general principles of wireless cellular telephony have been described variously, for example in U.S. Pat. No. 5,295,180 to Vendetti, et al, which is incorporated herein by reference.

There is great interest in using existing infrastructures for wireless communication systems for locating people and/or objects in a cost effective manner. Such a capability would be invaluable in a variety of situations, especially in emergency or crime situations. Due to the substantial benefits of such a location system, several attempts have been made to design and implement such a system.

Systems have been proposed that rely upon signal strength and trilateralization techniques to permit location include those disclosed in U.S. Pat. Nos. 4,818,998 and 4,908,629 to Apsell et al. ("the Apsell patents") and 4,891,650 to Sheffer ("the Sheffer patent"). However, these systems have drawbacks that include high expense in that special purpose electronics are required. Furthermore, the systems are generally only effective in line-of-sight conditions, such as rural settings. Radio wave surface reflections, refractions and ground clutter cause significant distortion, in determining the location of a signal source in most geographical areas that are more than sparsely populated. Moreover, these drawbacks are particularly exacerbated in dense urban canyon (city) areas, where errors and/or conflicts in location measurements can result in substantial inaccuracies.

Another example of a location system using time of arrival and triangulation for location are satellite-based systems, such as the military and commercial versions of the Global Positioning Satellite system ("GPS"). GPS can provide accurate position determination (i.e., about 100 meters error for the commercial version of GPS) from a time-based signal received simultaneously from at least three satellites. A ground-based GPS receiver at or near the object to be located determines the difference between the time at which each satellite transmits a time signal and the time at which the signal is received and, based on the time differentials, determines the object's location. However, the GPS is impractical in many applications. The signal power levels from the satellites are low and the GPS receiver requires a clear, line-of-sight path to at least three satellites above a horizon of about 60 degrees for effective operation. Accordingly, inclement weather conditions, such as clouds, terrain features, such as hills and trees, and buildings restrict the ability of the GPS receiver to determine its position. Furthermore, the initial GPS signal detection process for a GPS receiver is relatively long (i.e., several minutes) for determining the receiver's position. Such delays are unacceptable in many applications such as, for example, emergency response and vehicle tracking.

Differential GPS, or DGPS systems offer correction schemes to account for time synchronization drift. Such correction schemes include the transmission of correction signals over a two-way radio link or broadcast via FM radio station subcarriers. These systems have been found to be awkward and have met with limited success.

Additionally, GPS-based location systems have been attempted in which the received GPS signals are transmitted to a central data center for performing location calculations. Such systems have also met with limited success. In brief, each of the various GPS embodiments have the same fundamental problems of limited reception of the satellite signals and added expense and complexity of the electronics required for an inexpensive location mobile station or handset for detecting and receiving the GPS signals from the satellites.

Radio Propagation Background

The behavior of a mobile radio signal in the general environment is unique and complicated. Efforts to perform correlations between radio signals and distance between a base station and a mobile station are similarly complex. Repeated attempts to solve this problem in the past have been met with only marginal success. Factors include terrain undulations, fixed and variable clutter, atmospheric conditions, internal radio characteristics of cellular and PCS systems, such as frequencies, antenna configurations, modulation schemes, diversity methods, and the physical geometries of direct, refracted and reflected waves between the base stations and the mobile. Noise, such as man-made externally sources (e.g., auto ignitions) and radio system co-channel and adjacent channel interference also affect radio reception and related performance measurements, such as the analog carrier-to-interference ratio (C/I), or digital energy-per-bit/Noise density ratio ($E_{b/No}$) and are particular to various points in time and space domains.

RF Propagation in Free Space

Before discussing real world correlations between signals and distance, it is useful to review the theoretical premise, that of radio energy path loss across a pure isotropic vacuum propagation channel, and its dependencies within and among various communications channel types. FIG. 1 illustrates a definition of channel types arising in communications:

Over the last forty years various mathematical expressions have been developed to assist the radio mobile cell designer in establishing the proper balance between base station capital investment and the quality of the radio link, typically using radio energy field-strength, usually measured in microvolts/meter, or decibels. First consider Hata's single ray model. A simplified radio channel can be described as:

$$G_i = L_p + F + L_f + L_m + L_b - G_t + G_r \qquad \text{(Equation 1)}$$

where $G_i$=system gain in decibels
$L_p$=free space path loss in dB,
F=fade margin in dB,
$L_f$=transmission line loss from coaxials used to connect radio to antenna, in dB,
$L_m$=miscellaneous losses such as minor antenna misalignment, coaxial corrosion, increase in the receiver noise figure due to aging, in dB,
$L_b$=branching loss due to filter and circulator used to combine or split transmitter and receiver signals in a single antenna
$G_f$=gain of transmitting antenna
$G_r$=gain of receiving antenna Free space path loss $L_p$ as discussed in Mobile Communications Design Fundamentals, William C. Y. Lee, 2nd, Ed across the propagation channel is a function of distance d, frequency f (for f values <1 GHz, such as the 890-950 mHz cellular band):

$$\frac{P_{or}}{P_t} = \frac{1}{(4\pi dfc)^2} \quad \text{(equation 2)}$$

where $P_{or}$=received power in free space
$P_t$=transmitting power
c=speed of light, The difference between two received signal powers in free space, $$\Delta_p = (10)\log\left(\frac{P_{or2}}{P_{or1}}\right) = (20)\log\left(\frac{d_1}{d_2}\right)(dB) \quad \text{(equation 3)}$$

indicates that the free propagation path loss is 20 dB per decade. Frequencies between 1 GHz and 2 GHz experience increased values in the exponent, ranging from 2 to 4, or 20 to 40 dB/decade, which would be predicted for the new PCS 1.8-1.9 GHz band.

This suggests that the free propagation path loss is 20 dB per decade. However, frequencies between 1 GHz and 2 GHz experience increased values in the exponent, ranging from 2 to 4, or 20 to 40 dB/decade, which would be predicted for the new PCS 1.8-1.9 GHz band. One consequence from a location perspective is that the effective range of values for higher exponents is an increased at higher frequencies, thus providing improved granularity of ranging correlation.

Environmental Clutter and RF Propagation Effects

Actual data collected in real-world environments uncovered huge variations with respect to the free space path loss equation, giving rise to the creation of many empirical formulas for radio signal coverage prediction. Clutter, either fixed or stationary in geometric relation to the propagation of the radio signals, causes a shadow effect of blocking that perturbs the free space loss effect. Perhaps the best known model set that characterizes the average path loss is Hata's, "Empirical Formula for Propagation Loss in Land Mobile Radio", M. Hata, IEEE Transactions VT-29, pp. 317-325, August 1980, three pathloss models, based on Okumura's measurements in and around Tokyo, "Field Strength and its Variability in VHF and UHF Land Mobile Service", Y. Okumura, et al, Review of the Electrical Communications laboratory, Vol 16, pp 825-873, September-October 1968.

The typical urban Hata model for $L_p$ was defined as $L_p = L_{hu}$:

$L_{Hu}$=69.55+26.16 log($f$)−13.82 log($h_{BS}$)−$a(h_{MS})$+ ((44.9−6.55 log($H_{BS}$)log($d$)[dB]) (Equation 4)

where $L_{Hu}$=path loss, Hata urban
$h_{BS}$=base station antenna height
$h_{MS}$=mobile station antenna height
d=distance BS-MS in km
$a(h_{MS})$ is a correction factor for small and medium sized cities, found to be:

1 log($f$−0.7)$h_{MS}$−1.56 log($f$−0.8)=$a(h_{MS})$ (Equation 5)

For large cities the correction factor was found to be:

$a(h_{MS})$=3.2 [log 11.75$h_{MS}$]$^2$−4.97 (Equation 6)

assuming f is equal to or greater than 400 mHz.
The typical suburban model correction was found to be:

$$L_{H_{surburban}} = L_{Hu} - 2\left[\log\left(\frac{f}{28}\right)^2\right] - 5.4[dB] \quad \text{(Equation 7)}$$

The typical rural model modified the urban formula differently, as seen below:

$L_{Hrural}=L_{Hu}$−4.78(log $f$)$^2$+18.33 log $f$−40.94 [dB] (Equation 8)

Although the Hata model was found to be useful for generalized RF wave prediction in frequencies under 1 GHz in certain suburban and rural settings, as either the frequency and/or clutter increased, predictability decreased. In current practice, however, field technicians often have to make a guess for dense urban an suburban areas (applying whatever model seems best), then installing a base stations and begin taking manual measurements. Coverage problems can take up to a year to resolve.

Relating Received Signal Strength to Location

Having previously established a relationship between d and $P_{or}$, reference equation 2 above: d represents the distance between the mobile station (MS) and the base station (BS); $P_{or}$ represents the received power in free space) for a given set of unchanging environmental conditions, it may be possible to dynamically measure $P_{or}$ and then determine d.

In 1991, U.S. Pat. No. 5,055,851 to Sheffer taught that if three or more relationships have been established in a triangular space of three or more base stations (BSs) with a location database constructed having data related to possible mobile station (MS) locations, then arculation calculations may be performed, which use three distinct $P_{or}$ measurements to determine an X,Y, two dimensional location, which can then be projected onto an area map. The triangulation calculation is based on the fact that the approximate distance of the mobile station (MS) from any base station (BS) cell can be calculated based on the received signal strength. Sheffer acknowledges that terrain variations affect accuracy, although as noted above, Sheffer's disclosure does not account for a sufficient number of variables, such as fixed and variable location shadow fading, which are typical in dense urban areas with moving traffic.

Most field research before about 1988 has focused on characterizing (with the objective of RF coverage prediction) the RF propagation channel (i.e., electromagnetic radio waves) using a single-ray model, although standard fit errors in regressions proved dismal (e.g., 40-80 dB). Later, multi-ray models were proposed, and much later, certain behaviors were studied with radio and digital channels. In 1981, Vogler proposed that radio waves at higher frequencies could be modeled using optics principles. In 1988 Walfisch and Bertoni applied optical methods to develop a two-ray model, which when compared to certain highly specific, controlled field data, provided extremely good regression fit standard errors of within 1.2 dB.

In the Bertoni two ray model it was assumed that most cities would consist of a core of high-rise buildings surrounded by a much larger area having buildings of uniform height spread over regions comprising many square blocks, with street grids organizing buildings into rows that are nearly parallel. Rays penetrating buildings then emanating outside a building were neglected. FIG. 2 provides a basis for the variables.

After a lengthy analysis it was concluded that path loss was a function of three factors: (1) the path loss between antennas in free space; (2) the reduction of rooftop wave fields due to settling; and (3) the effect of diffraction of the rooftop fields down to ground level. The last two factors were summarily termed $L_{ex}$, given by:

$$L_{ex} = 57.1 + A + \log(f) + R - \left((18\log(H)) - 18\log\left[1 - \frac{R^2}{17H}\right]\right) \quad \text{(Equation 9)}$$

The influence of building geometry is contained in A:

$$A = 5\log\left[\left(\frac{d}{2}\right)^2\right] - 9\log d + 20\log\{\tan[2(h - H_{MS})]^{-1}\} \quad \text{(Equation 10)}$$

However, a substantial difficulty with the two-ray model in practice is that it requires a substantial amount of data regarding building dimensions, geometries, street widths, antenna gain characteristics for every possible ray path, etc. Additionally, it requires an inordinate amount of computational resources and such a model is not easily updated or maintained.

Unfortunately, in practice clutter geometries and building heights are random. Moreover, data of sufficient detail has been extremely difficult to acquire, and regression standard fit errors are poor; i.e., in the general case, these errors were found to be 40-60 dB. Thus the two-ray model approach, although sometimes providing an improvement over single ray techniques, still did not predict RF signal characteristics in the general case to level of accuracy desired (<10 dB).

Work by Greenstein has since developed from the perspective of measurement-based regression models, as opposed to the previous approach of predicting-first, then performing measurement comparisons. Apparently yielding to the fact that low-power, low antenna (e.g., 12-25 feet above ground) height PCS microcell coverage was insufficient in urban buildings, Greenstein, et al, authored "Performance Evaluations for Urban Line-of-sight Microcells Using a Multi-ray Propagation Model", in IEEE Globecom Proceedings, 12/91. This paper proposed the idea of formulating regressions based on field measurements using small PCS microcells in a lineal microcell geometry (i.e., geometries in which there is always a line-of-sight (LOS) path between a subscriber's mobile and its current microsite).

Additionally, Greenstein studied the communication channels variable Bit-Error-Rate (BER) in a spatial domain, which was a departure from previous research that limited field measurements to the RF propagation channel signal strength alone. However, Greenstein based his finding on two suspicious assumptions: 1) he assumed that distance correlation estimates were identical for uplink and downlink transmission paths; and 2) modulation techniques would be transparent in terms of improved distance correlation conclusions. Although some data held very correlations, other data and environments produced poor results. Accordingly, his results appear unreliable for use in general location context.

In 1993 Greenstein, et al, authored "A Measurement-Based Model for Predicting Coverage Areas of Urban Microcells", in the IEEE Journal On Selected Areas in Communications, Vol. 11, No. 7, 9/93. Greenstein reported a generic measurement-based model of RF attenuation in terms of constant-value contours surrounding a given low-power, low antenna microcell environment in a dense, rectilinear neighborhood, such as New York City. However, these contours were for the cellular frequency band. In this case, LOS and non-LOS clutter were considered for a given microcell site. A result of this analysis was that RF propagation losses (or attenuations), when cell antenna heights were relatively low, provided attenuation contours resembling a spline plane curve depicted as an asteroid, aligned with major street grid patterns. Further, Greenstein found that convex diamond-shaped RF propagation loss contours were a common occurrence in field measurements in a rectilinear urban area. The special plane curve asteroid is represented by the formula $x^{2/3}+y^{2/3}=r^{2/3}$. However, these results alone have not been sufficiently robust and general to accurately locate an MS, due to the variable nature of urban clutter spatial arrangements.

At Telesis Technology in 1994 Howard Xia, et al, authored "Microcellular Propagation Characteristics for Personal Communications in Urban and Suburban Environments", in IEEE Transactions of Vehicular Technology, Vol. 43, No. 3, 8/94, which performed measurements specifically in the PCS 1.8 to 1.9 GHz frequency band. Xia found corresponding but more variable outcome results in San Francisco, Oakland (urban) and the Sunset and Mission Districts (suburban).

Summary of Factors Affecting RF Propagation

The physical radio propagation channel perturbs signal strength, frequency (causing rate changes, phase delay, signal to noise ratios (e.g., C/I for the analog case, or $E_{b/No}$, RF energy per bit, over average noise density ratio for the digital case) and Doppler-shift. Signal strength is usually characterized by:

Free Space Path Loss ($L_p$)
Slow fading loss or margin ($L_{slow}$)
Fast fading loss or margin ($L_{fast}$)

Loss due to slow fading includes shadowing due to clutter blockage (sometimes included in Lp). Fast fading is composed of multipath reflections which cause: 1) delay spread; 2) random phase shift or Rayleigh fading; and 3) random frequency modulation due to different Doppler shifts on different paths.

Summing the path loss and the two fading margin loss components from the above yields a total path loss of:

$$L_{total}=L_p+L_{slow}+L_{fast}$$

Referring to FIG. 3, the figure illustrates key components of a typical cellular and PCS power budget design process. The cell designer increases the transmitted power $P_{TX}$ by the shadow fading margin $L_{slow}$ which is usually chosen to be within the 1-2 percentile of the slow fading probability density function (PDF) to minimize the probability of unsatisfactorily low received power level $P_{RX}$ at the receiver. The $P_{RX}$ level must have enough signal to noise energy level (e.g., 10 dB) to overcome the receiver's internal noise level (e.g., −118 dBm in the case of cellular 0.9 GHz), for a minimum voice quality standard. Thus in the example $P_{RX}$ must never be below −108 dBm, in order to maintain the quality standard.

Additionally the short term fast signal fading due to multipath propagation is taken into account by deploying fast fading margin $L_{fast}$, which is typically also chosen to be a few percentiles of the fast fading distribution. The 1 to 2 percentiles compliment other network blockage guidelines. For example the cell base station traffic loading capacity and network transport facilities are usually designed for a 1-2 percentile blockage factor as well. However, in the worst-case scenario both fading margins are simultaneously exceeded, thus causing a fading margin overload.

In Roy, Steele's, text, Mobile Radio Communications, IEEE Press, 1992, estimates for a GSM system operating in the 1.8 GHz band with a transmitter antenna height of 6.4 m and an MS receiver antenna height of 2 m, and assumptions regarding total path loss, transmitter power would be calculated as follows:

TABLE 1

GSM Power Budget Example

| Parameter | dBm value | Will require |
|---|---|---|
| $L_{slow}$ | 14 | |
| $L_{fast}$ | 7 | |
| $L1_{path}$ | 110 | |
| Min. RX pwr required | −104 | |
| | | TXpwr = 27 dBm |

Steele's sample size in a specific urban London area of 80,000 LOS measurements and data reduction found a slow fading variance of $$\sigma = 7 \text{ dB}$$

assuming log normal slow fading PDF and allowing for a 1.4% slow fading margin overload, thus $$L_{slow} = 2\sigma = 14 \text{ dB}$$

The fast fading margin was determined to be:

$$L_{fast} = 7 \text{ dB}$$

In contrast, Xia's measurements in urban and suburban California at 1.8 GHz uncovered flat-land shadow fades on the order of 25-30 dB when the mobile station (MS) receiver was traveling from LOS to non-LOS geometries. In hilly terrain fades of +5 to −50 dB were experienced. Thus it is evident that attempts to correlate signal strength with MS ranging distance suggest that error ranges could not be expected to improve below 14 dB, with a high side of 25 to 50 dB. Based on 20 to 40 dB per decade, Corresponding error ranges for the distance variable would then be on the order of 900 feet to several thousand feet, depending upon the particular environmental topology and the transmitter and receiver geometries.

DESCRIPTION OF TERMS

The following definitions are provided for convenience. In general, the definitions here are also defined elsewhere in this document as well.

(1.1) The term "wireless" herein is, in general, an abbreviation for "digital wireless", and in particular, "wireless" refers to digital radio signaling using one of standard digital protocols such as CDMA, NAMPS, AMPS, TDMA and GSM, as one skilled in the art will understand.

(1.2) As used herein, the term "mobile station" (equivalently, MS) refers to a wireless device that is at least a transmitting device, and in most cases is also a wireless receiving device, such as a portable radio telephony handset. Note that in some contexts herein instead or in addition to MS, the following terms are also used: "personal station" (PS) and "location unit" (LU). In general, these terms may be considered synonymous. However, the later two terms may be used when referring to reduced functionality communication devices in comparison to a typical digital wireless mobile telephone.

(1.3) The term, "infrastructure", denotes the network of telephony communication services, and more particularly, that portion of such a network that receives and processes wireless communications with wireless mobile stations. In particular, this infrastructure includes telephony wireless base stations (BS) such as those for radio mobile communication systems based on CDMA, AMPS, NAMPS, TDMA, and GSM wherein the base stations provide a network of cooperative communication channels with an air interface with the MS, and a conventional telecommunications interface with a Mobile Switch Center (MSC). Thus, an MS user within an area serviced by the base stations may be provided with wireless communication throughout the area by user transparent communication transfers (i.e., "hand-offs") between the user's MS and these base stations in order to maintain effective telephony service. The mobile switch center (MSC) provides communications and control connectivity among base stations and the public telephone network 124.

(1.4) The phrase, "composite wireless signal characteristic values" denotes the result of aggregating and filtering a collection of measurements of wireless signal samples, wherein these samples are obtained from the wireless communication between an MS to be located and the base station infrastructure (e.g., a plurality of networked base stations). However, other phrases are also used herein to denote this collection of derived characteristic values depending on the context and the likely orientation of the reader. For example, when viewing these values from a wireless signal processing perspective of radio engineering, as in the descriptions of the subsequent Detailed Description sections concerned with the aspects of the present invention for receiving MS signal measurements from the base station infrastructure, the phrase typically used is: "RF signal measurements". Alternatively, from a data processing perspective, the phrases: "location signature cluster" and "location signal data" are used to describe signal characteristic values between the MS and the plurality of infrastructure base stations substantially simultaneously detecting MS transmissions. Moreover, since the location communications between an MS and the base station infrastructure typically include simultaneous communications with more than one base station, a related useful notion is that of a "location signature" which is the composite wireless signal characteristic values for signal samples between an MS to be located and a single base station. Also, in some contexts, the phrases: "signal characteristic values" or "signal characteristic data" are used when either or both a location signature(s) and/or a location signature cluster(s) are intended.

SUMMARY

The present disclosure relates to a wireless mobile station location system, and in particular, various subsystems related thereto such as a wireless location gateway, and the combining or hybriding of a plurality of wireless location techniques.

Regarding a wireless location gateway, this term refers to, e.g., a communications network node whereat a plurality of location requests are received for locating various mobile stations from various sources (e.g., for E911 requests, for stolen vehicle location, for tracking of vehicles traveling cross country, etc.), and for each such request and the corresponding mobile station to be located, this node: (a) activates one or more wireless location estimators for locating the mobile station, (b) receives one or more location estimates of the mobile station from the location estimators, and (c) transmits a resulting location estimate(s) to, e.g., an application which made the request. Moreover, such a gateway typically will likely activate location estimators according to the particulars of each individual wireless location request, e.g., the availability of input data needed by particular location estimators. Additionally, such a gateway will typically have sufficiently well defined uniform interfaces so that such location estimators can be added and/or deleted to, e.g., provide different location estimators for performing wireless location different coverage areas.

The present disclosure encompasses such wireless location gateways. Thus, for locating an identified mobile station, the location gateway embodiments of the present disclosure may activate one or more of a plurality of location estimators depending on, e.g., (a) the availability of particular types of wireless location data for locating the mobile station, and (b) the location estimators accessable by the location gateway. Moreover, a plurality of location estimators may be activated for locating the mobile station in a single location, or different ones of such location estimators may be activated to locate the mobile station at different locations. Moreover, the location gateway of the present disclosure may have incorporated therein one or more of the location estimators, and/or may access geographically distributed location estimators via requests through a communications network such as the Internet.

In particular, the location gateway of the present disclosure may access, in various instances of locating mobile stations, various location estimators that utilize one or more of the following wireless location techniques:

(a) A GPS location technique such as, e.g., one of the GPS location techniques as described in the Background section hereinabove;

(b) A technique for computing a mobile station location that is dependent upon geographical offsets of the mobile station from one or more terrestrial transceivers (e.g., base stations of a commercial radio service provider). Such offsets may be determined from signal time delays between such transceivers and the mobile station, such as by time of arrival (TOA) and/or time difference of arrival (TDOA) techniques as is discussed further hereinbelow. Moreover, such offsets may be determined using both the forward and reverse wireless signal timing measurements of transmissions between the mobile station and such terrestrial transceivers. Additionally, such offsets may be directional offsets, wherein a direction is determined from such a transceiver to the mobile station;

(c) Various wireless signal pattern matching, associative, and/or stochastic techniques for performing comparisons and/or using a learned association between:

(i) characteristics of wireless signals communicated between a mobile station to be located and a network of wireless transceivers (e.g., base stations), and (ii) previously obtained sets of characteristics of wireless signals (from each of a plurality of locations), wherein each set was communicated, e.g., between a network of transceivers (e.g., the fixed location base stations of a commercial radio service provider), and, some one of the mobile stations available for communicating with the network;

(d) Indoor location techniques using a distributed antenna system;

(e) Techniques for locating a mobile station, wherein, e.g., wireless coverage areas of individual fixed location transceivers (e.g., fixed location base stations) are utilized for determining the mobile station's location (e.g., intersecting such coverage areas for determining a location);

(f) Location techniques that use communications from low power, low functionality base stations (denoted "location base stations"); and (g) Any other location techniques that may be deemed worthwhile to incorporate into an embodiment of the present disclosure.

Accordingly, some embodiments of the present disclosure may be viewed as platforms for integrating wireless location techniques in that wireless location computational models (denoted "first order models" or "FOMs" hereinbelow) may be added and/or deleted from such embodiments of the disclosure without changing the interface to further downstream processes. That is, one aspect of the disclosure is the specification of a common data interface between such computational models and subsequent location processing such as processes for combining of location estimates, tracking mobile stations, and/or outputting location estimates to location requesting applications.

Moreover, it should be noted that the present disclosure also encompasses various hybrid approaches to wireless location, wherein various combinations of two or more of the location techniques (a) through (g) immediately above may be used in locating a mobile station at substantially a single location. Thus, location information may be obtained from a plurality of the above location techniques for locating a mobile station, and the output from such techniques can be synergistically used for deriving therefrom an enhanced location estimate of the mobile station.

The present disclosure additionally describes a system and method for wireless telecommunication systems for accurately locating people and/or objects in a cost effective manner. Additionally, the present disclosure describes such location capabilities using the measurements from wireless signals communicated between mobile stations and a network of base stations, wherein the same communication standard or protocol is utilized for location as is used by the network of base stations for providing wireless communications with mobile stations for other purposes such as voice communication and/or visual communication (such as text paging, graphical or video communications). The present disclosure describes a system and method that:

(2.1) may be readily incorporated into existing commercial wireless telephony systems with few, if any, modifications of a typical telephony wireless infrastructure;

(2.2) may use the native electronics of typical commercially available, or likely to be available, telephony wireless mobile stations (e.g., handsets) as location devices;

(2.3) may be used for effectively locating people and/or objects wherein there are few (if any) line-of-sight wireless receivers for receiving location signals from a mobile station (herein also denoted MS);

(2.4) may be used not only for decreasing location determining difficulties due to multipath phenomena but in fact uses such multipath for providing more accurate location estimates;

(2.5) may be used for integrating a wide variety of location techniques in a straight-forward manner;

(2.6) may substantially automatically adapt and/or (re)train and/or (re)calibrate itself according to changes in the environment and/or terrain of a geographical area where the present disclosure is utilized;

(2.7) can utilize a plurality of wireless location estimators based on different wireless location technologies (e.g., GPS location techniques, terrestrial base station signal timing techniques for triangulation and/or trilateration, wireless signal angle of arrival location techniques, techniques for determining a wireless location within a building, techniques for determining a mobile station location using wireless location data collected from the wireless coverage area for, e.g., location techniques using base station signal coverage areas, signal pattern matching location techniques and/or stochastic techniques), wherein each such estimator may be activated independently of one another, whenever suitable data is provided thereto and/or certain conditions, e.g., specific to the estimator are met;

(2.8) can provide a common interface module from which a plurality of the location estimators can be activated and/or provided with input;

(2.9) provides resulting mobile station location estimates to location requesting applications (e.g., for 911 emergency, the fire or police departments, taxi services, vehicle location, etc.) via an output gateway, wherein this gateway:

(a) routes the mobile station location estimates to the appropriate location application(s) via a communications network such as a wireless network, a public switched telephone network, a short messaging service (SMS), and the Internet, (b) determines the location granularity and representation desired by each location application requesting a location of a mobile station, and/or (c) enhances the received location estimates by, e.g., performing additional processing such as "snap to street" functions for mobile stations known to reside in a vehicle.

The present disclosure describes a low cost location system and method, adaptable to wireless telephony systems, for using simultaneously a plurality of location techniques for synergistically increasing MS location accuracy and consistency.

The present disclosure contemplates at least some of the following MS location techniques can be utilized by various embodiments of the present disclosure:

(3.1) time-of-arrival wireless signal processing techniques;

(3.2) time-difference-of-arrival wireless signal processing techniques;

(3.3) adaptive wireless signal processing techniques having, for example, learning capabilities and including, for instance, artificial neural net and genetic algorithm processing;

(3.4) signal processing techniques for matching MS location signals with wireless signal characteristics of known areas;

(3.5) conflict resolution techniques for resolving conflicts in hypotheses for MS location estimates;

(3.6) enhancement of MS location estimates through the use of both heuristics and historical data associating MS wireless signal characteristics with known locations and/or environmental conditions.

The present disclosure describes location estimates in terms of time vectors, which can be used to establish motion, speed, and an extrapolated next location in cases where the MS signal subsequently becomes unavailable.

Embodiments of the present disclosure may be used to wirelessly locate a mobile station: (a) from which a 911 emergency call is performed, (b) for tracking a mobile station (e.g., a truck traveling across country), (c) for routing a mobile station, and (d) locating people and/or animals, including applications for confinement to (and/or exclusion from) certain areas.

Embodiments of the present disclosure may be decomposed into: (i) a first low level wireless signal processing subsystem for receiving, organizing and conditioning low level wireless signal measurements from a network of base stations cooperatively linked for providing wireless communications with mobile stations (MSs); and (ii) a second high level signal processing subsystem for performing high level data processing for providing most likelihood location estimates for mobile stations.

Thus, the present disclosure also provides a novel signal processor that includes at least the functionality for the high level signal processing subsystem mentioned hereinabove. Accordingly, assuming an appropriate ensemble of wireless signal measurements characterizing the wireless signal communications between a particular MS and a networked wireless base station infrastructure have been received and appropriately filtered of noise and transitory values (such as by an embodiment of the low level signal processing subsystem disclosed in a copending PCT patent application PCT/US97/15933 titled, "Wireless Location Using A Plurality of Commercial Network Infrastructures," by F. W. LeBlanc et. al., filed Sep. 8, 1997 from which U.S. Pat. No. 6,236,365, filed Jul. 8, 1999 is the U.S. national counterpart, these two references being herein fully incorporated by reference), the present disclosure uses the output from such a low level signal processing system for determining a most likely location estimate of an MS.

That is, once the following steps are appropriately performed (e.g., by the LeBlanc U.S. Pat. No. 6,236,365):

(4.1) receiving signal data measurements corresponding to wireless communications between an MS to be located (herein also denoted the "target MS") and a wireless telephony infrastructure;

(4.2) organizing and processing the signal data measurements received from a given target MS and surrounding BSs so that composite wireless signal characteristic values may be obtained from which target MS location estimates may be subsequently derived. In particular, the signal data measurements are ensembles of samples from the wireless signals received from the target MS by the base station infrastructure, wherein these samples are subsequently filtered using analog and digital spectral filtering, the present disclosure provides the features mentioned above by the following steps:

(4.3) providing the composite signal characteristic values to one or more MS location hypothesizing computational models (also denoted herein as "first order models" and also "location estimating models"), wherein each such model subsequently determines one or more initial estimates of the location of the target MS based on, for example, the signal processing techniques 2.1 through 2.3 above. Moreover, each of the models output MS location estimates having substantially identical data structures (each such data structure denoted a "location hypothesis"). Additionally, each location hypothesis may also include a confidence value indicating the likelihood or probability that the target MS whose location is desired resides in a corresponding location estimate for the target MS;

(4.4) adjusting or modifying location hypotheses output by the models according to, for example, 2.4 through 2.6 above so that the adjusted location hypotheses provide better target MS location estimates. In particular, such adjustments are performed on both the target MS location estimates of the location hypotheses as well as their corresponding confidences; and (4.4) subsequently computing a "most likely" target MS location estimate for outputting to a location requesting application such as 911 emergency, the fire or police departments, taxi services, etc. Note that in computing the most likely target MS location estimate a plurality of location hypotheses may be taken into account. In fact, it is an important aspect of the present disclosure that the most likely MS location estimate is determined by computationally forming a composite MS location estimate utilizing such a plurality of location hypotheses so that, for example, location estimate similarities between location hypotheses can be effectively utilized.

Referring now to (4.3) above, the filtered and aggregated wireless signal characteristic values are provided to a number of location hypothesizing models (denoted First Order Models, or FOMs), each of which yields a location estimate or location hypothesis related to the location of the target MS. In particular, there are location hypotheses for both providing estimates of where the target MS is likely to be and where the target MS is not likely to be. Moreover, it is an aspect of the present disclosure that confidence values of the location hypotheses are provided as a continuous range of real numbers from, e.g., −1 to 1, wherein the most unlikely areas for locating the target MS are given a confidence value of −1, and the most likely areas for locating the target MS are given a confidence value of 1. That is, confidence values that are larger indicate a higher likelihood that the target MS is in the corresponding MS estimated area, wherein −1 indicates that the target MS is absolutely NOT in the estimated area, 0 indicates a substantially neutral or unknown likelihood of the target MS being in the corresponding estimated area, and 1 indicates that the target MS is absolutely within the corresponding estimated area.

Referring to (4.4) above, it is an aspect of the present disclosure to provide location hypothesis enhancing and evaluation techniques that can adjust target MS location estimates according to historical MS location data and/or adjust the confidence values of location hypotheses according to how consistent the corresponding target MS location estimate is: (a) with historical MS signal characteristic values, (b) with various physical constraints, and (c) with various heuristics. In particular, the following capabilities are provided by the present disclosure:

(5.1) a capability for enhancing the accuracy of an initial location hypothesis, H, generated by a first order model, $FOM_H$, by using H as, essentially, a query or index into an historical data base (denoted herein as the location signature data base), wherein this data base includes: (a) a plurality of previously obtained location signature clusters (i.e., composite wireless signal characteristic values) such that for each such cluster there is an associated actual or verified MS locations where an MS communicated with the base station infrastructure for locating the MS, and (b) previous MS location hypothesis estimates from $FOM_H$ derived from each of the location signature clusters stored according to (a);

(5.2) a capability for analyzing composite signal characteristic values of wireless communications between the target MS and the base station infrastructure, wherein such values are compared with composite signal characteristics values of known MS locations (these latter values being archived in the location signature data base). In one instance, the composite signal characteristic values used to generate various location hypotheses for the target MS are compared against wireless signal data of known MS locations stored in the location signature data base for determining the reliability of the location hypothesizing models for particular geographic areas and/or environmental conditions;

(5.3) a capability for reasoning about the likeliness of a location hypothesis wherein this reasoning capability uses heuristics and constraints based on physics and physical properties of the location geography;

(5.4) an hypothesis generating capability for generating new location hypotheses from previous hypotheses.

As also mentioned above in (3.3), the present disclosure utilizes adaptive signal processing techniques. One particularly important utilization of such techniques includes the automatic tuning so that, e.g., such tuning can be applied to adjusting the values of location processing system parameters that affect the processing performed by embodiments of the present disclosure. For example, such system parameters as those used for determining the size of a geographical area to be specified when retrieving location signal data of known MS locations from the historical (location signature) data base can substantially affect the location processing. In particular, a system parameter specifying a minimum size for such a geographical area may, if too large, cause unnecessary inaccuracies in locating an MS. Accordingly, to accomplish a tuning of such system parameters, an adaptation engine is included in at least one embodiment of the present disclosure for automatically adjusting or tuning parameters used. Note that in one embodiment, the adaptation engine is based on genetic algorithm techniques.

A novel aspect of the present disclosure relies on the discovery that in many areas where MS location services are desired, the wireless signal measurements obtained from communications between the target MS and the base station infrastructure are extensive enough to provide sufficiently unique or peculiar values so that the pattern of values alone may identify the location of the target MS. Further, assuming a sufficient amount of such location identifying pattern information is captured in the composite wireless signal characteristic values for a target MS, and that there is a technique for matching such wireless signal patterns to geographical locations, then a wireless location computational model or estimator (referred to herein as a "first order model" or FOM) based on this technique may generate a reasonably accurate target MS location estimate. Moreover, if an embodiment of the present disclosure (e.g., the location signature data base described hereinbelow) has captured sufficient wireless signal data from location communications between MSs and the base station infrastructure wherein the locations of the MSs are also verified and captured, then this captured data (e.g., location signatures) can be used to train or calibrate such models to associate the location of a target MS with the distinctive signal characteristics between the target MS and one or more base stations. Accordingly, at least one embodiment of the present disclosure includes one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, at least one embodiment of the present disclosure includes the capability for training (calibrating) and retraining (recalibrating) such classification FOMs to automatically maintain the accuracy of these models even though substantial changes to the radio coverage area may occur, such as the construction of a new high rise building or seasonal variations (due to, for example, foliage variations).

Note that such classification FOMs that are trained or calibrated to identify target MS locations by the wireless signal patterns produced constitute a particularly novel aspect of the present disclosure. It is well known in the wireless telephony art that the phenomenon of signal multipath and shadow fading renders most analytical location computational techniques such as time-of-arrival (TOA) or time-difference-of-arrival (TDOA) substantially useless in urban areas and particularly in dense urban areas. However, this same multipath phenomenon also may produce substantially distinct or peculiar signal measurement patterns, wherein such a pattern coincides with a relatively small geographical area. Thus, embodiments of the present disclosure utilizes multipath as an advantage for increasing accuracy where for previous location systems multipath has been a source of substantial inaccuracies. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured by an embodiment of the present disclosure for training or calibrating such classification FOMs and for progressively improving the MS location accuracy of such models. Moreover, since it is also a related aspect of an embodiment of the present disclosure to include a plurality stationary, low cost, low power "location detection base stations" (LBS), each having both restricted range MS detection capabilities and a built-in MS, a grid of such LBSs can be utilized for providing location signal data (from the built-in MS) for (re)training or (re)calibrating such classification FOMs.

In one embodiment of the present disclosure, one or more classification FOMs may each include a learning module such as an artificial neural network (ANN) for associating target MS location signal data with a target MS location estimate. Additionally, one or more classification FOMs may be statistical prediction models based on such statistical techniques as, for example, principle decomposition, partial least squares, or other regression techniques.

It is a further aspect of the present disclosure that the personal communication system (PCS) infrastructures currently being developed by telecommunication providers offer an appropriate localized infrastructure base upon which to build various personal location systems (PLS) employing an embodiment of the present disclosure and/or utilizing the techniques disclosed herein. In particular, an embodiment of the present disclosure is especially suitable for the location of people and/or objects using code division multiple access (CDMA) wireless infrastructures, although other wireless infrastructures, such as, time division multiple access (TDMA) infrastructures and GSM are also contemplated. Note that CDMA personal communications systems are described in the Telephone Industries Association standard IS-95, for frequencies below 1 GHz, and in the Wideband Spread-Spectrum Digital Cellular System Dual-Mode Mobile Station-Base Station Compatibility Standard, for frequencies in the 1.8-1.9 GHz frequency bands, both of which are incorporated herein by reference. Furthermore, CDMA general principles have also been described, for example, in U.S. Pat. No. 5,109,390, to Gilhousen, et al, filed Nov. 7, 1989, and CDMA Network Engineering Handbook by Qualcomm, Inc., each of which is also incorporated herein by reference.

Notwithstanding the above mentioned CDMA references, a brief introduction of CDMA is given here. Briefly, CDMA is an electromagnetic signal modulation and multiple access scheme based on spread spectrum communication. Each CDMA signal corresponds to an unambiguous pseudorandom binary sequence for modulating the carrier signal throughout a predetermined spectrum of bandwidth frequencies. Transmissions of individual CDMA signals are selected by correlation processing of a pseudonoise waveform. In particular, the CDMA signals are separately detected in a receiver by using a correlator, which accepts only signal energy from the selected binary sequence and despreads its spectrum. Thus, when a first CDMA signal is transmitted, the transmissions of unrelated CDMA signals correspond to pseudorandom sequences that do not match the first signal. Therefore, these other signals contribute only to the noise and represent a self-interference generated by the personal communications system.

As mentioned in the discussion of classification FOMs above, an embodiment of the present disclosure can substantially automatically retrain and/or recalibrate itself to compensate for variations in wireless signal characteristics (e.g., multipath) due to environmental and/or topographic changes to a geographic area serviced by such an embodiment. For example, an embodiment of the present disclosure optionally includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, an embodiment of the present disclosure can substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(6.1) assuming that the co-located base station capabilities and the stationary transceiver of an LBS are such that the base station capabilities and the stationary transceiver communicate with one another, the stationary transceiver can be signaled by another component(s) of an embodiment of the present disclosure to activate or deactivate its associated base station capability, thereby conserving power for the LBS that operate on a restricted power such as solar electrical power;

(6.2) the stationary transceiver of an LBS can be used for transferring target MS location information obtained by the LBS to a conventional telephony base station;

(6.3) since the location of each LBS is known and can be used in location processing, an embodiment of the present disclosure is able to (re)train and/or (re)calibrate itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training and/or calibrating various of the location processing modules of an embodiment of the present disclosure such as the classification FOMs discussed above. In particular, such training and/or calibrating may include:

(i) (re)training and/or (re)calibrating FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

It is also an aspect of embodiments of the present disclosure to automatically (re)calibrate as in (6.3) above with signal characteristics from other known or verified locations. In one embodiment of the present disclosure, portable location verifying electronics are provided so that when such electronics are sufficiently near a located target MS, the electronics: (i) detect the proximity of the target MS; (ii) determine a highly reliable measurement of the location of the target MS; (iii) provide this measurement to other location determining components of an embodiment of the present disclosure so that the location measurement can be associated and archived with related signal characteristic data received from the target MS at the location where the location measurement is performed. Thus, the use of such portable location verifying electronics allows an embodiment of the present disclosure to capture and utilize signal characteristic data from verified, substantially random locations for location system calibration as in (6.3) above. Moreover, it is important to note that such location verifying electronics can verify locations automatically wherein it is unnecessary for manual activation of a location verifying process.

One embodiment of the present disclosure includes the location verifying electronics as a "mobile (location) base station" (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(7.1) a mobile station (MS) for both communicating with other components of an embodiment of the present disclosure (such as a location processing center included in an embodiment of the present disclosure);

(7.2) a GPS receiver for determining a location of the mobile location base station;

(7.3) a gyroscope and other dead reckoning devices; and (7.4) devices for operator manual entry of a mobile location base station location.

Furthermore, a mobile location base station includes modules for integrating or reconciling distinct mobile location base station location estimates that, for example, can be obtained using the components and devices of (7.1) through (7.4) above. That is, location estimates for the mobile location base station may be obtained from: GPS satellite data, mobile location base station data provided by the location processing center, deadreckoning data obtained from the mobile location base station vehicle deadreckoning devices, and location data manually input by an operator of the mobile location base station.

The location estimating system of the present disclosure offers many advantages over existing location systems. The system of the present disclosure, for example, is readily adaptable to existing wireless communication systems and can accurately locate people and/or objects in a cost effective manner. In particular, the present disclosure requires few, if any, modifications to commercial wireless communication systems for implementation. Thus, existing personal communication system infrastructure base stations and other components of, for example, commercial CDMA infrastructures are readily adapted to an embodiment of the present disclosure. An embodiment of the present disclosure can be used to locate people and/or objects that are not in the line-of-sight of a wireless receiver or transmitter, can reduce the detrimental effects of multipath on the accuracy of the location estimate, can potentially locate people and/or objects located indoors as well as outdoors, and uses a number of wireless stationary transceivers for location. An embodiment of the present disclosure employs a number of distinctly different location computational models for location which provides a greater degree of accuracy, robustness and versatility than is possible with existing systems. For instance, the location models provided include not only the radius-radius/TOA and TDOA techniques but also adaptive artificial neural net techniques. Further, an embodiment of the present disclosure is able to adapt to the topography of an area in which location service is desired. An embodiment of the present disclosure is also able to adapt to environmental changes substantially as frequently as desired. Thus, an embodiment of the present disclosure is able to take into account changes in the location topography over time without extensive manual data manipulation. Moreover, an embodiment of the present disclosure can be utilized with varying amounts of signal measurement inputs. Thus, if a location estimate is desired in a very short time interval (e.g., less than approximately one to two seconds), then the present location estimating system can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Moreover, there are numerous additional advantages of the system of the present disclosure when applied in CDMA communication systems. The location system of the present disclosure readily benefits from the distinct advantages of the CDMA spread spectrum scheme, namely, these advantages include the exploitation of radio frequency spectral efficiency and isolation by (a) monitoring voice activity, (b) management of two-way power control, (c) provisioning of advanced variable-rate modems and error correcting signal encoding, (d) inherent resistance to fading, (e) enhanced privacy, and (f) multiple "rake" digital data receivers and searcher receivers for correlation of signal multipaths.

At a more general level, it is an aspect of the present disclosure to demonstrate the utilization of various novel computational paradigms such as:

(8.1) providing a multiple hypothesis computational architecture (as illustrated best in FIG. 8 and/or FIG. 13) wherein the hypotheses are:
  (8.1.1) generated by modular independent hypothesizing computational models;
  (8.1.2) the models are embedded in the computational architecture in a manner wherein the architecture allows for substantial amounts of application specific processing common or generic to a plurality of the models to be straightforwardly incorporated into the computational architecture;
  (8.1.3) the computational architecture enhances the hypotheses generated by the models both according to past performance of the models and according to application specific constraints and heuristics without requiring feedback loops for adjusting the models;
  (8.1.4) the models are relatively easily integrated into, modified and extracted from the computational architecture;
(8.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

Note that the multiple hypothesis architecture provided herein is useful in implementing solutions in a wide range of applications. For example, the following additional applications are within the scope of the present disclosure:

(9.1) document scanning applications for transforming physical documents in to electronic forms of the documents. Note that in many cases the scanning of certain documents (books, publications, etc.) may have a 20% character recognition error rate. Thus, the novel computation architecture of the present disclosure can be utilized by (I) providing a plurality of document scanning models as the first order models, (ii) building a character recognition data base for archiving a correspondence between characteristics of actual printed character variations and the intended characters (according to, for example, font types), and additionally archiving a correspondence of performance of each of the models on previously encountered actual printed character variations (note, this is analogous to the Signature Data Base of the MS location application described herein), and (iii) determining any generic constraints and/or heuristics that are desirable to be satisfied by a plurality of the models. Accordingly, by comparing outputs from the first order document scanning models, a determination can be made as to whether further processing is desirable due to, for example, discrepancies between the output of the models. If further processing is desirable, then an embodiment of the multiple hypothesis architecture provided herein may be utilized to correct such discrepancies. Note that in comparing outputs from the first order document scanning models, these outputs may be compared at various granularities; e.g., character, sentence, paragraph or page;

(9.2) diagnosis and monitoring applications such as medical diagnosis/monitoring, communication network diagnosis/monitoring;

(9.3) robotics applications such as scene and/or object recognition;

(9.4) seismic and/or geologic signal processing applications such as for locating oil and gas deposits;

(9.5) Additionally, note that this architecture need not have all modules co-located. In particular, it is an additional aspect of an embodiment of the present disclosure that various modules can be remotely located from one another and communicate with one another via telecommunication transmissions such as telephony technologies and/or the Internet. Accordingly, such an embodiment of the present discloure is particularly adaptable to such distributed computing environments. For example, some number of the first order models may reside in remote locations and communicate their generated hypotheses via the Internet.

For instance, in weather prediction applications it is not uncommon for computational models to require large amounts of computational resources. Thus, such models running at various remote computational facilities can transfer weather prediction hypotheses (e.g., the likely path of a hurricane) to a site that performs hypothesis adjustments according to: (i) past performance of the each model; (ii) particular constraints and/or heuristics, and subsequently outputs a most likely estimate for a particular weather condition.

In an alternative embodiment of the present disclosure, the processing following the generation of location hypotheses (each having an initial location estimate) by the first order models may be such that this processing can be provided on Internet user nodes and the first order models may reside at Internet server sites. In this configuration, an Internet user may request hypotheses from such remote first order models and perform the remaining processing at his/her node.

In other embodiments of the present disclosure, a fast, albeit less accurate location estimate may be initially performed for very time critical location applications where approximate location information may be required. For example, less than 1 second response for a mobile station location embodiment of the present disclosure may be desired for 911 emergency response location requests. Subsequently, once a relatively coarse location estimate has been provided, a more accurate most likely location estimate can be performed by repeating the location estimation processing a second time with, e.g., additional with measurements of wireless signals transmitted between a mobile station to be located and a network of base stations with which the mobile station is communicating, thus providing a second, more accurate location estimate of the mobile station.

Additionally, note that it is within the scope of the present disclosure to provide one or more central location development sites that may be networked to, for example, geographically dispersed location centers providing location services according to the present disclosure, wherein the FOMs may be accessed, substituted, enhanced or removed dynamically via network connections (via, e.g., the Internet) with a central location development site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that in some embodiments of the present disclosure, since there is a lack of sequencing between the FOMs and subsequent processing of location hypotheses, the FOMs can be incorporated into an expert system, if desired. For example, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

Of course, other software architectures may also to used in implementing the processing of the location center without departing from scope of the present disclosure. In particular, object-oriented architectures are also within the scope of the present disclosure. For example, the FOMs may be object methods on an MS location estimator object, wherein the estimator object receives substantially all target MS location signal data output by the signal filtering subsystem. Alternatively, software bus architectures are contemplated by the present disclosure, as one skilled in the art will understand, wherein the software architecture may be modular and facilitate parallel processing.

Further features and advantages of the present disclosure are provided by the accompanying figures, together with the detailed description, and the appendices provided hereinbelow.

BRIEF DESCRIPTION OF THE DRAWINGS

FIGS. 9A and 9B is a high level data structure diagram describing the fields of a location hypothesis object generated by the first order models 1224 of the location center.

FIGS. 16a through 16c present a table providing a brief description of the attributes of the location signature data type stored in the location signature data base 1320.

for updating location signatures in the location signature data base 1320; note, this flowchart corresponds to the description of this function in APPENDIX C.

Figure 22A:
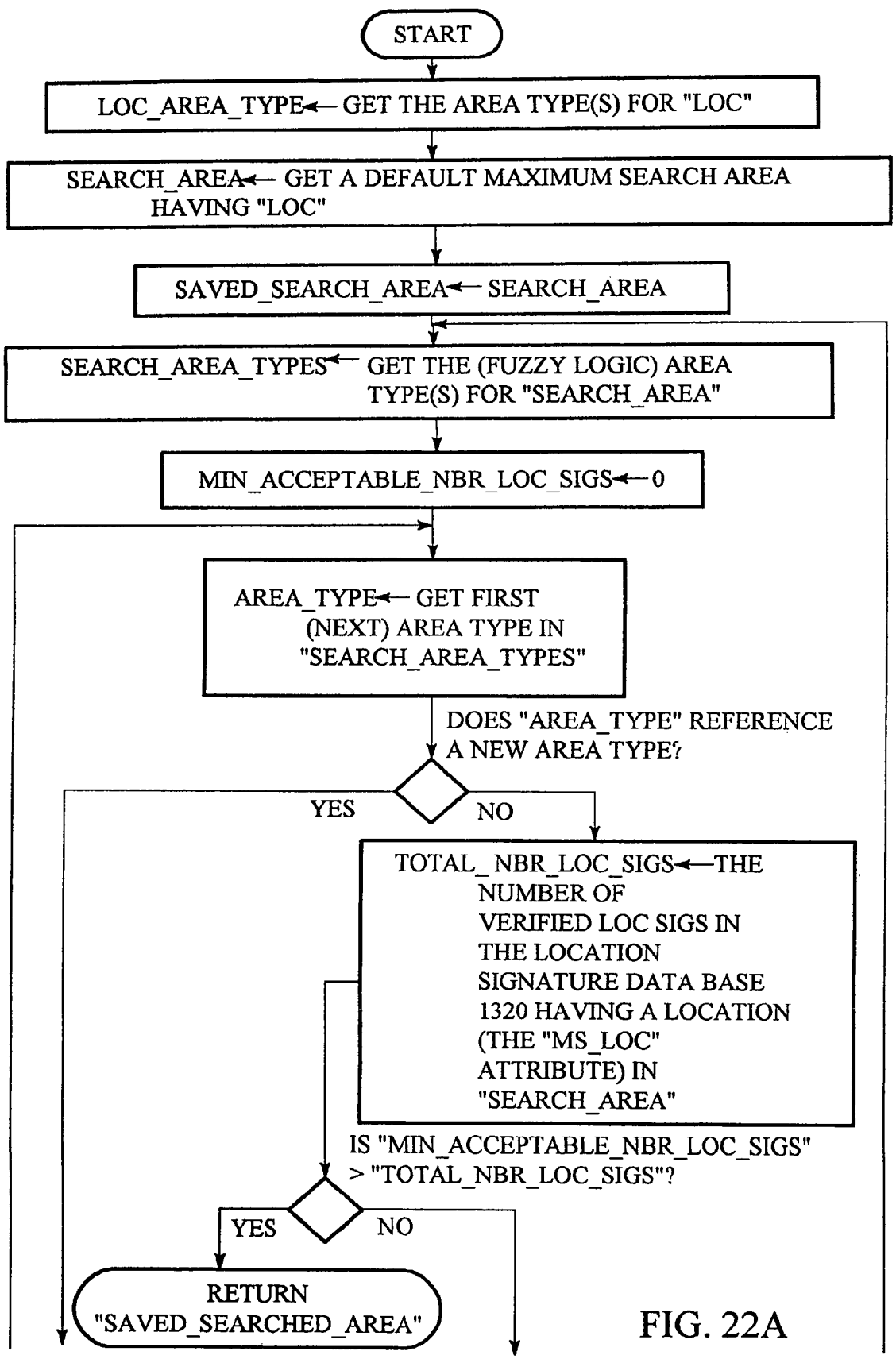
Figure 22B:
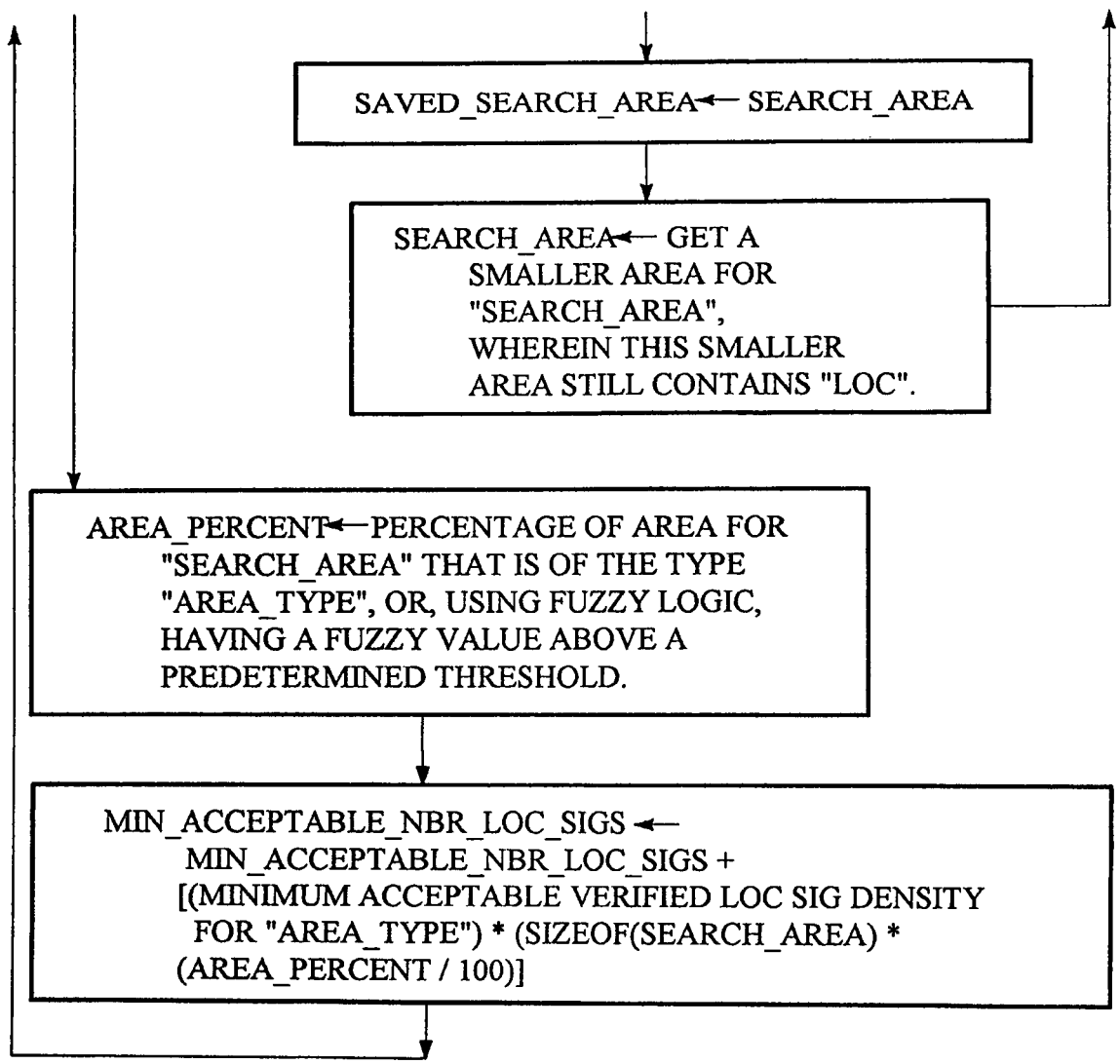

FIGS. 22*a* through 22*b* present a high level flowchart of the steps performed by function, "GET_AREA_TO_SEARCH," for updating location signatures in the location signature data base 1320; note, this flowchart corresponds to the description of this function in APPENDIX C.

Figure 23A:
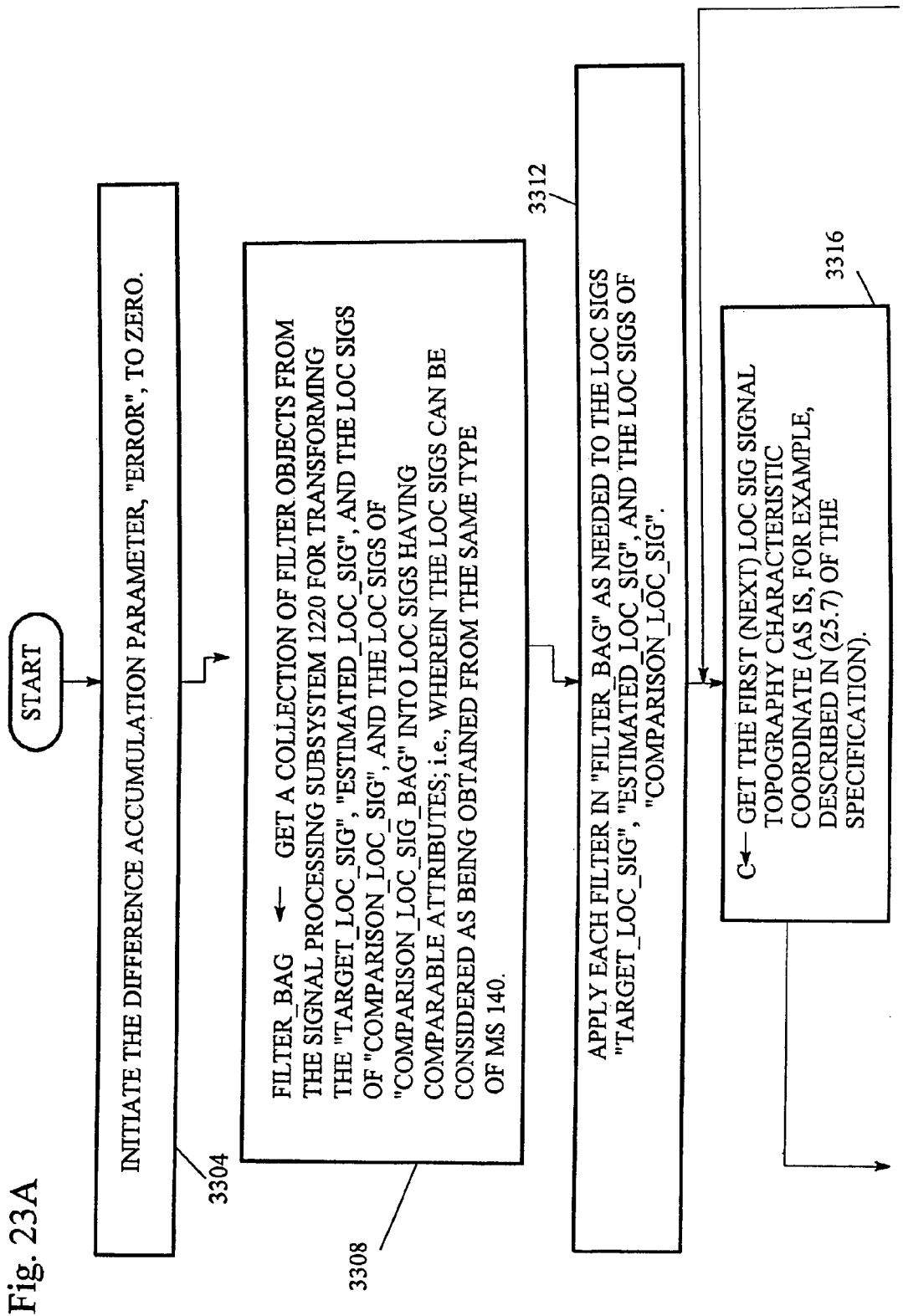
Figure 23B:
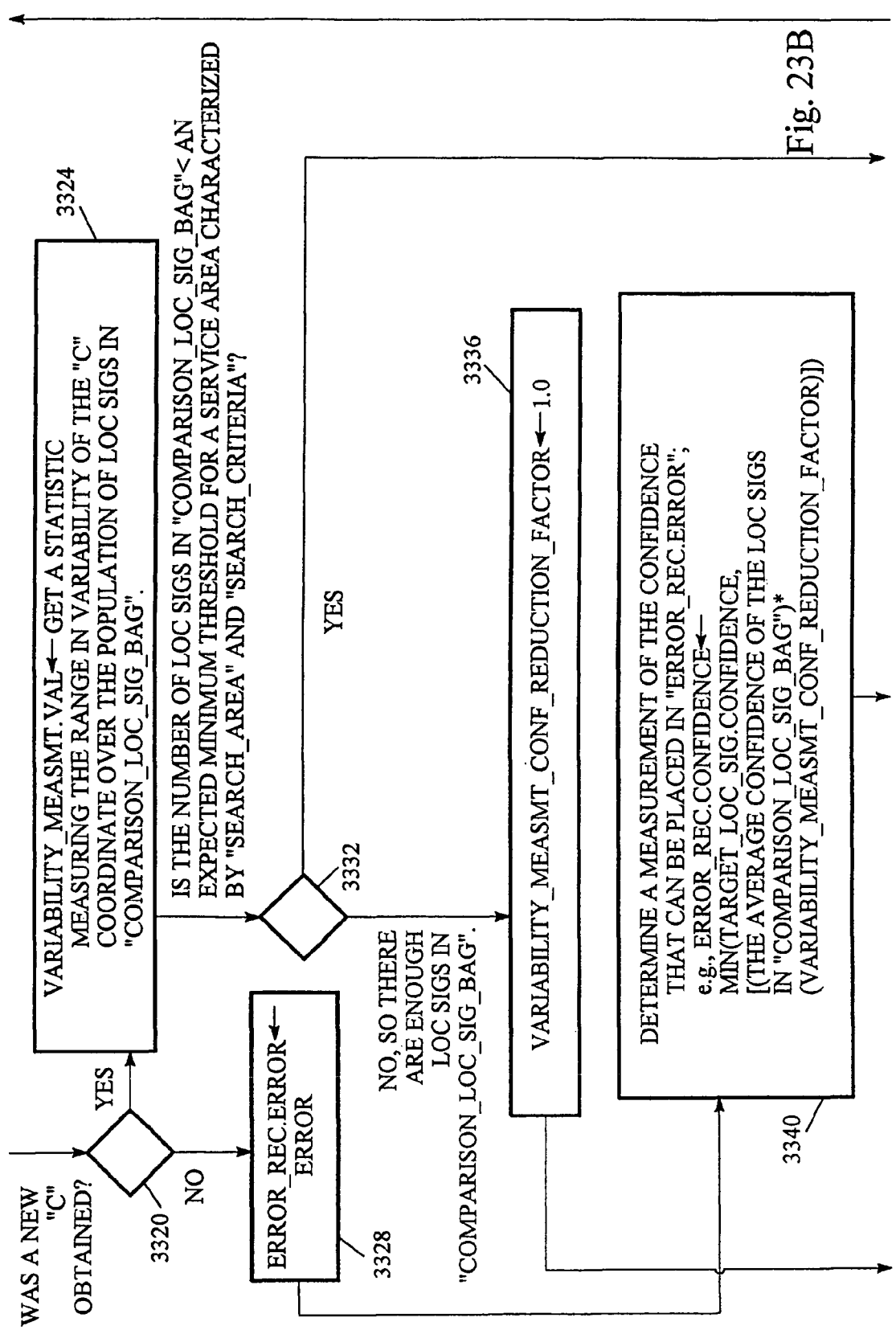

FIGS. 23*a* through 23*c* present a high level flowchart of the steps performed by function, "GET_DIFFERENCE_MEASUREMENT," for updating location signatures in the location signature data base 1320; note, this flowchart corresponds to the description of this function in APPENDIX C.

Figure 24:
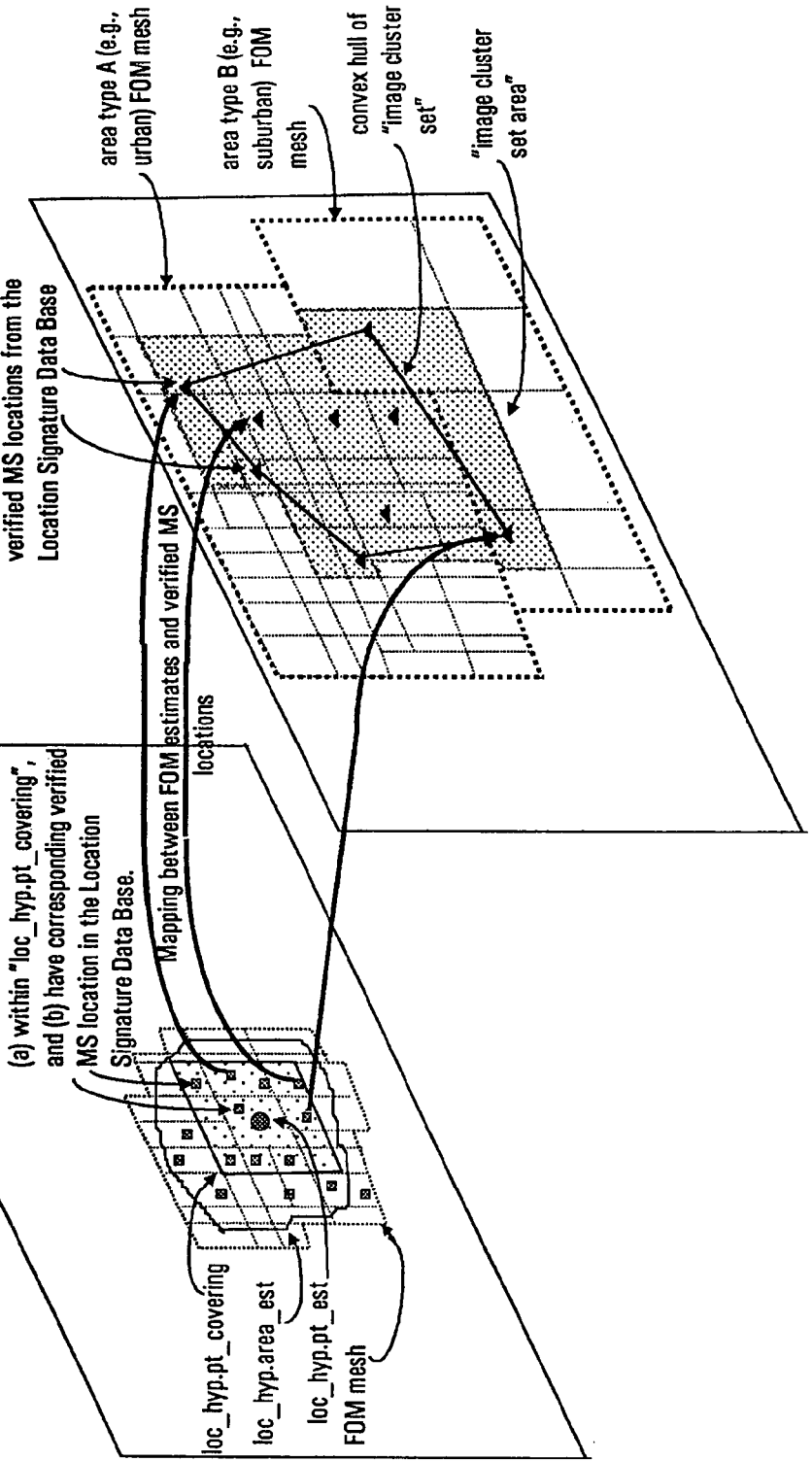
Figure 25A:
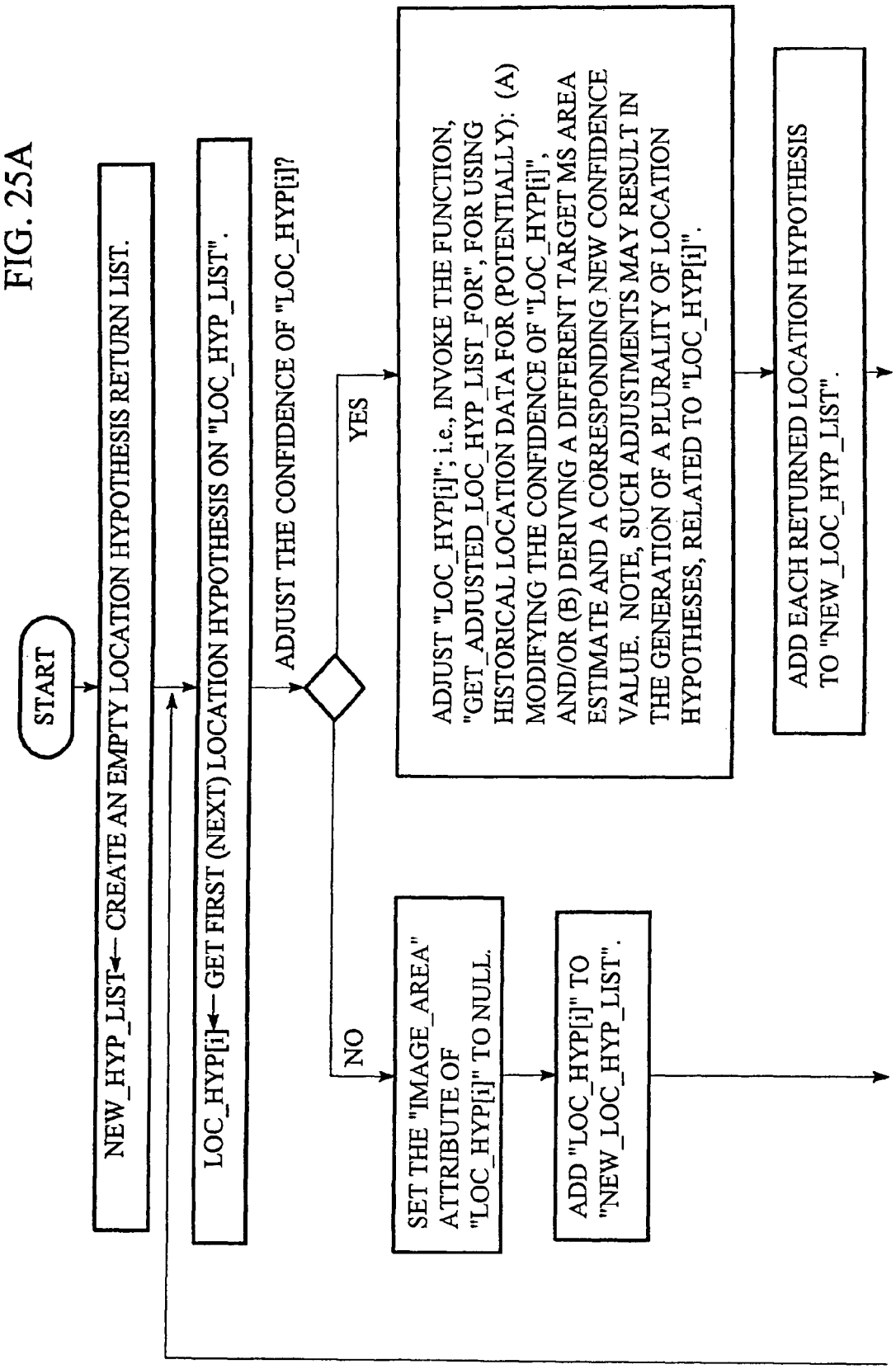
Figure 25B:
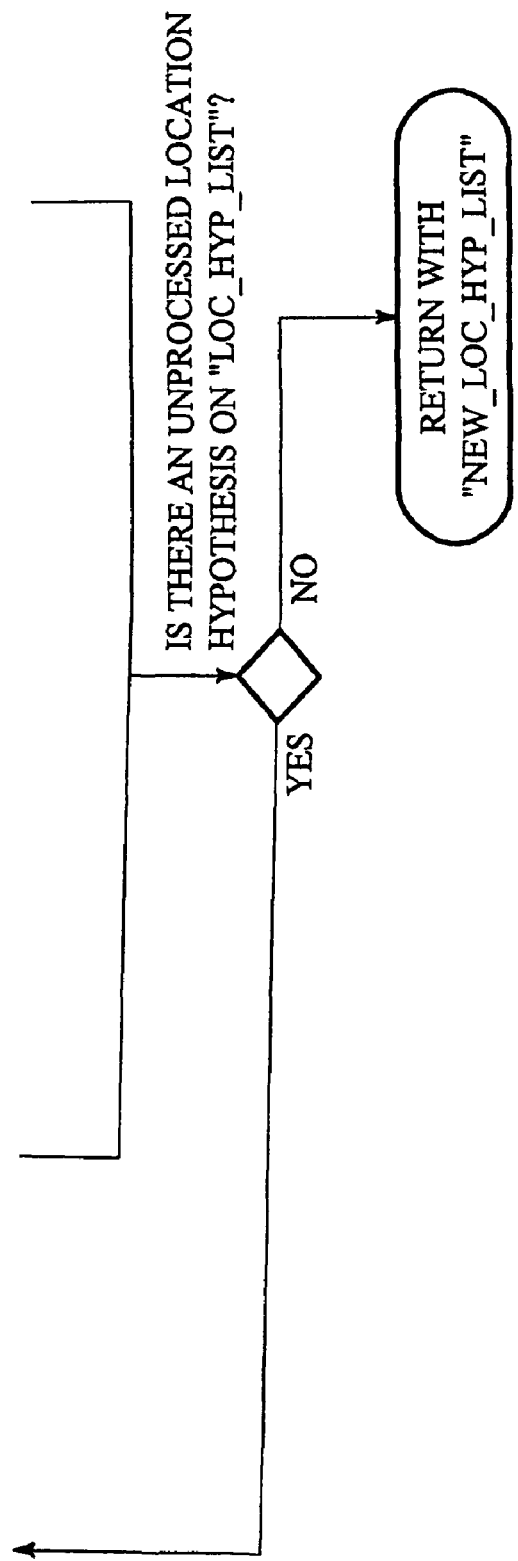

FIG. 24 is a high level illustration of context adjuster data structures and their relationship to the radio coverage area for the present invention;

FIGS. 25*a* through 25*b* present a high level flowchart of the steps performed by the function, "CONTEXT_ADJUSTER," used in the context adjuster 1326 for adjusting mobile station estimates provided by the first order models 1224; this flowchart corresponds to the description of this function in APPENDIX D.

Figure 26A:
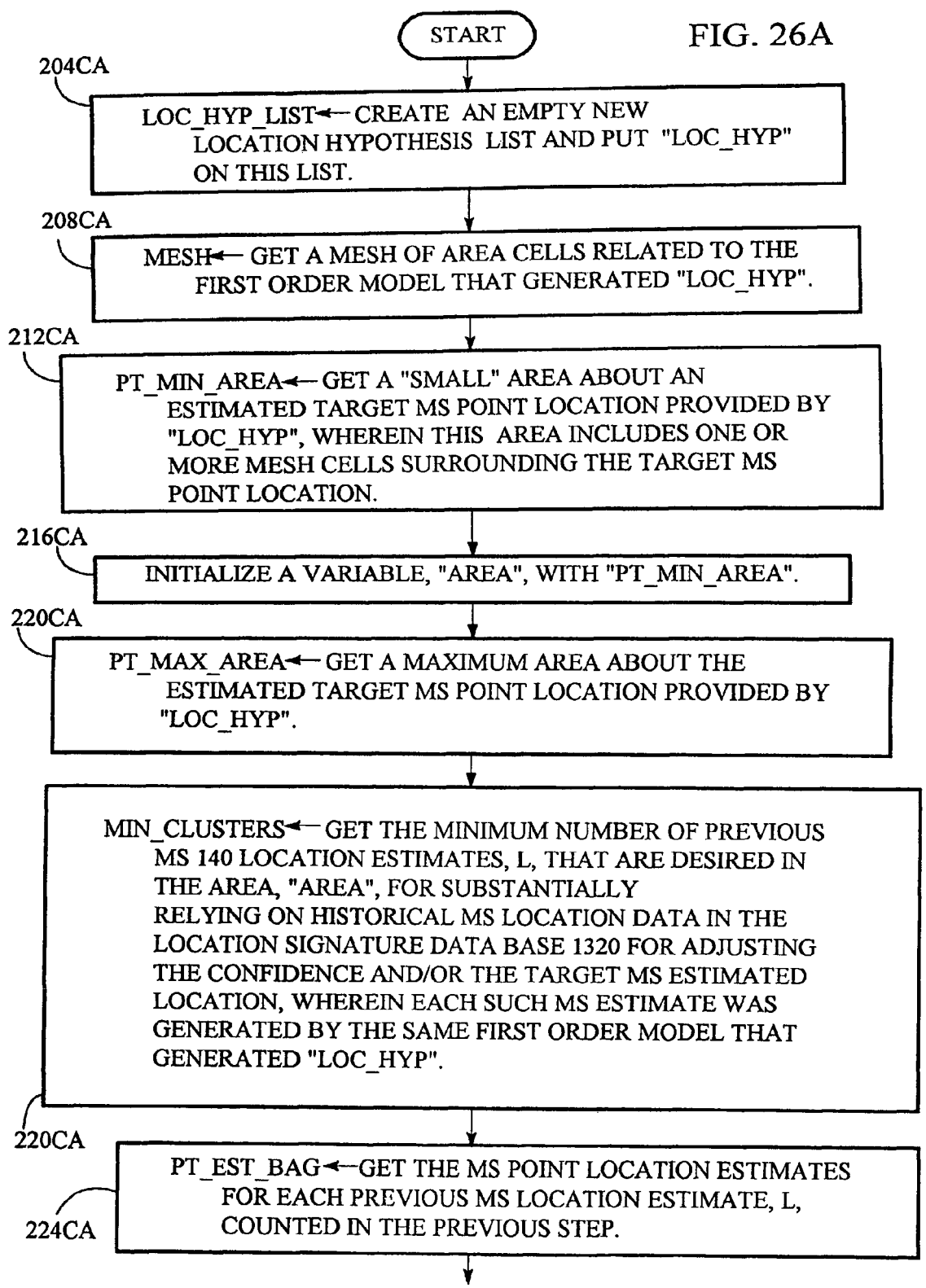
Figure 26B:
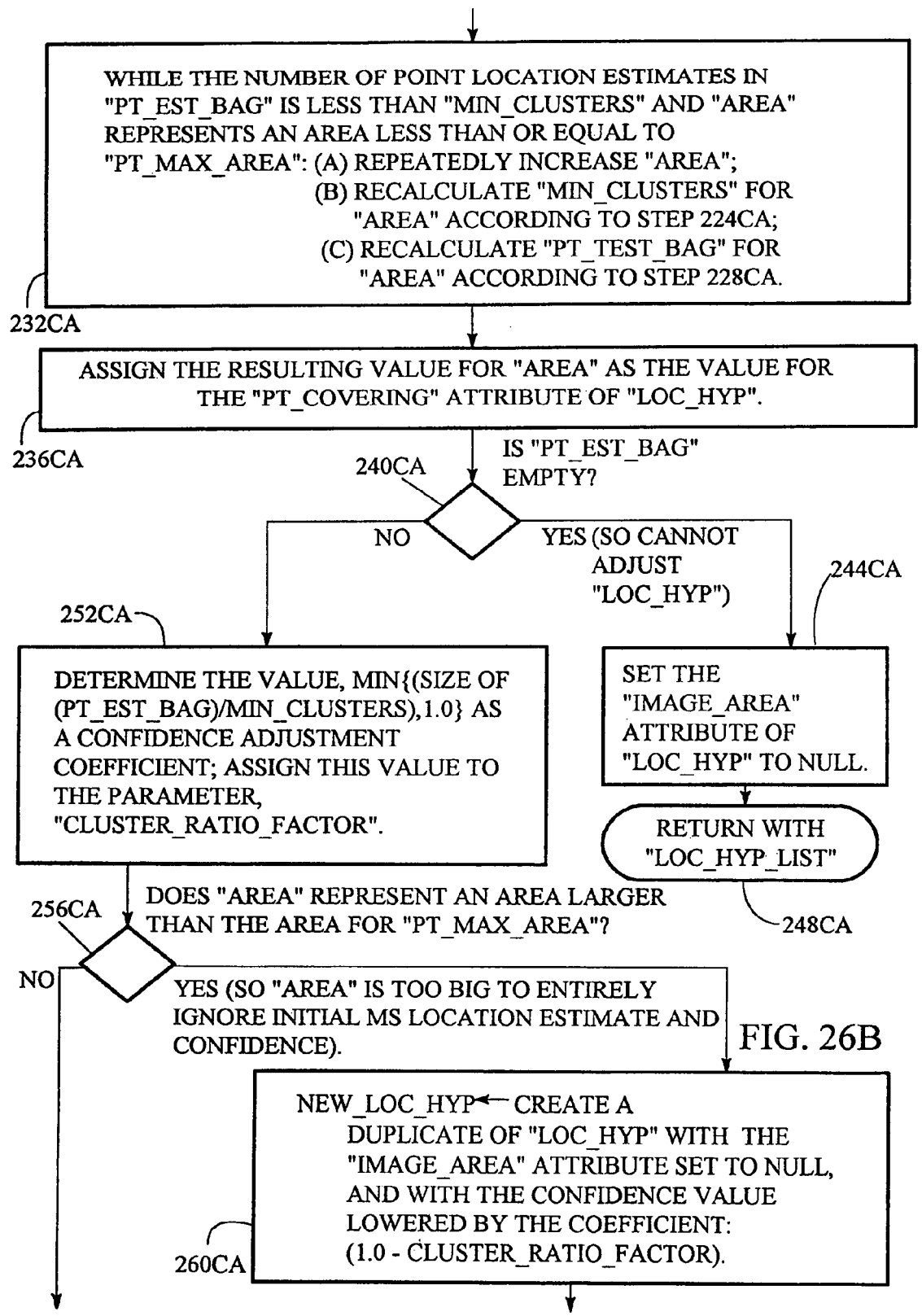
Figure 26C:
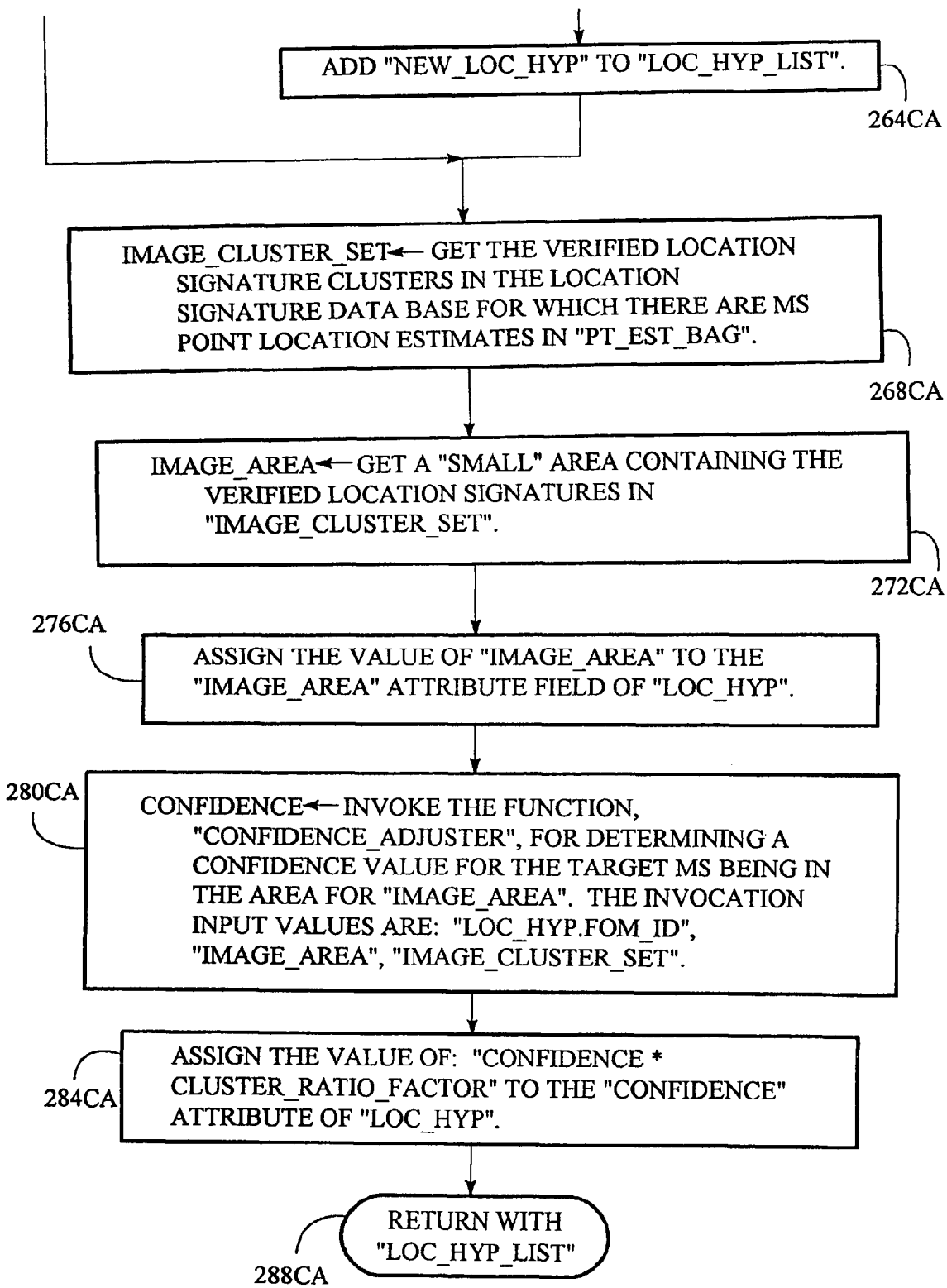

FIGS. 26*a* through 26*c* present a high level flowchart of the steps performed by the function, "GET_ADJUSTED_LOC_HYP_LIST_FOR," used in the context adjuster 1326 for adjusting mobile station estimates provided by the first order models 1224; this flowchart corresponds to the description of this function in APPENDIX D.

Figure 27A:
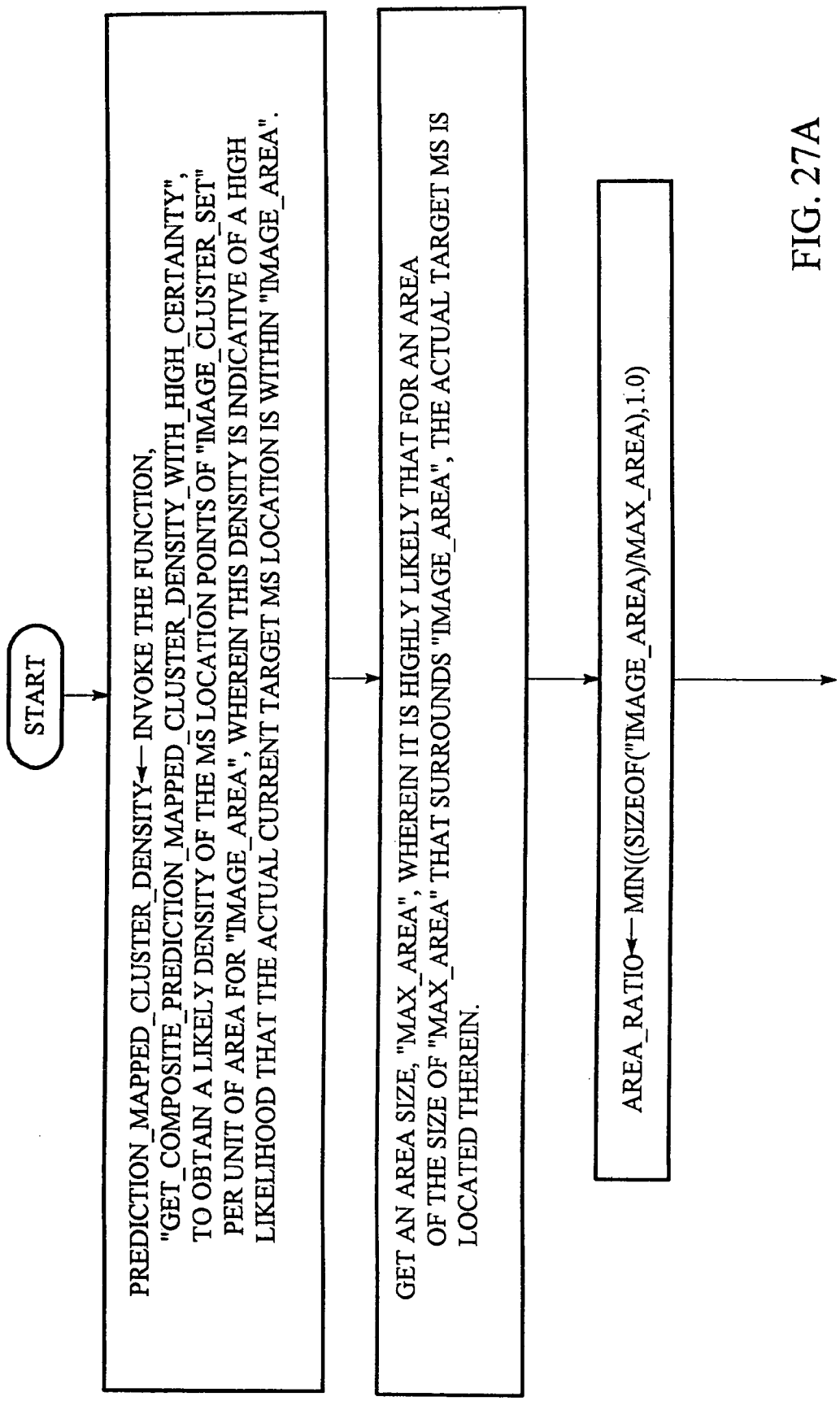
Figure 27B:
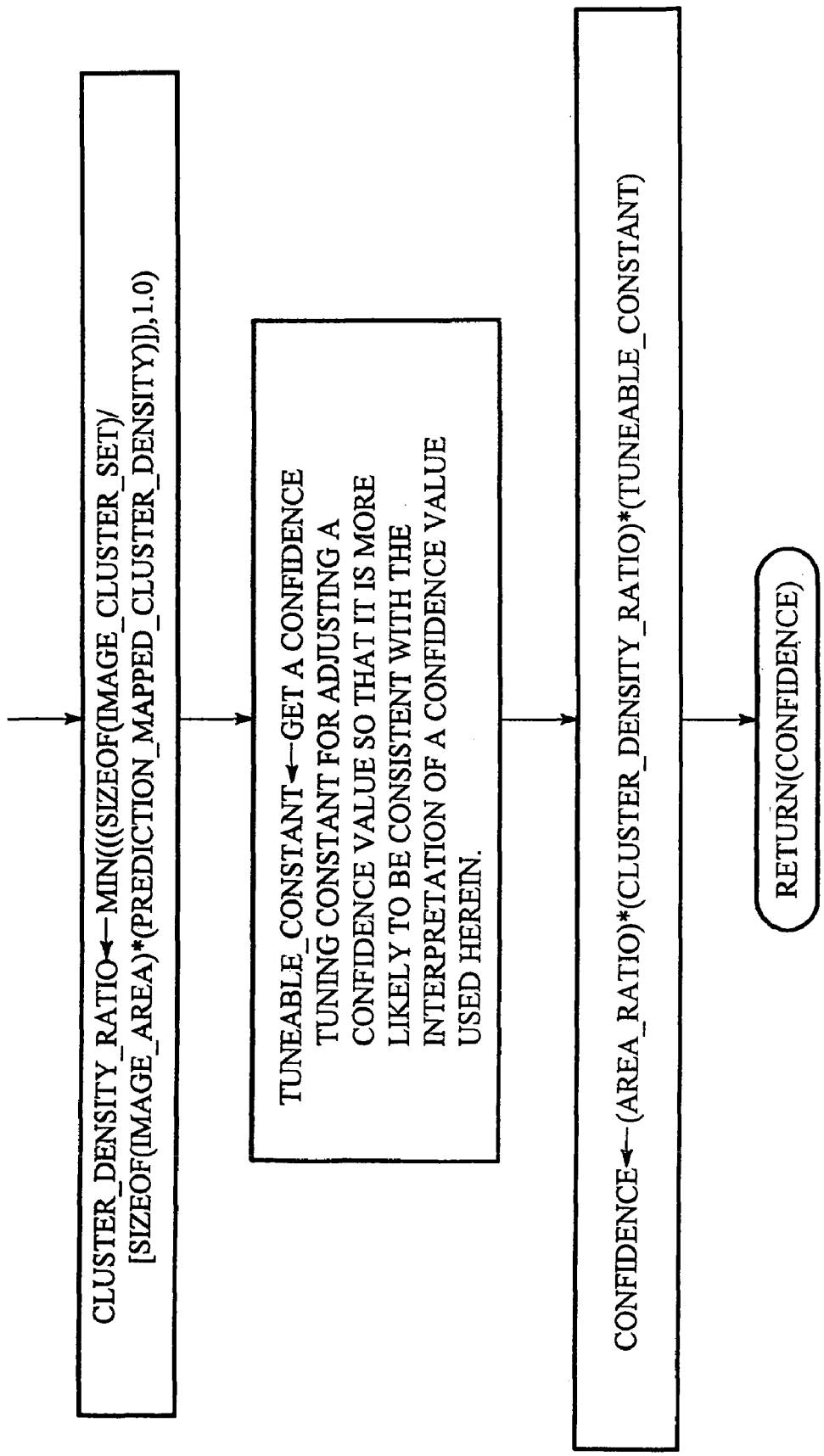

FIGS. 27*a* through 27*b* present a high level flowchart of the steps performed by the function, "CONFIDENCE_ADJUSTER," used in the context adjuster 1326 for adjusting mobile station estimates provided by the first order models 1224; this flowchart corresponds to the description of this function in APPENDIX D.

Figure 28A:
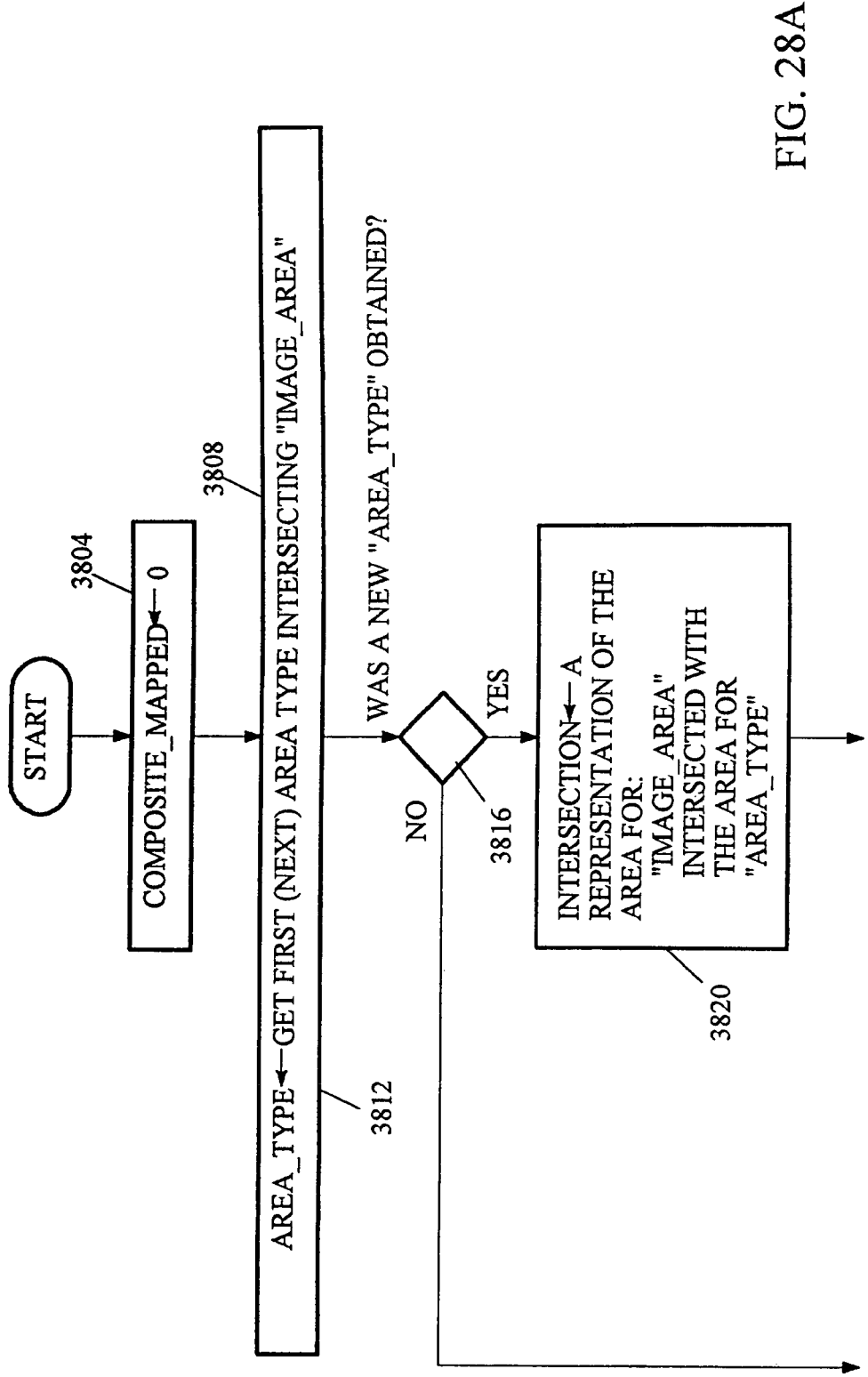
Figure 28B:
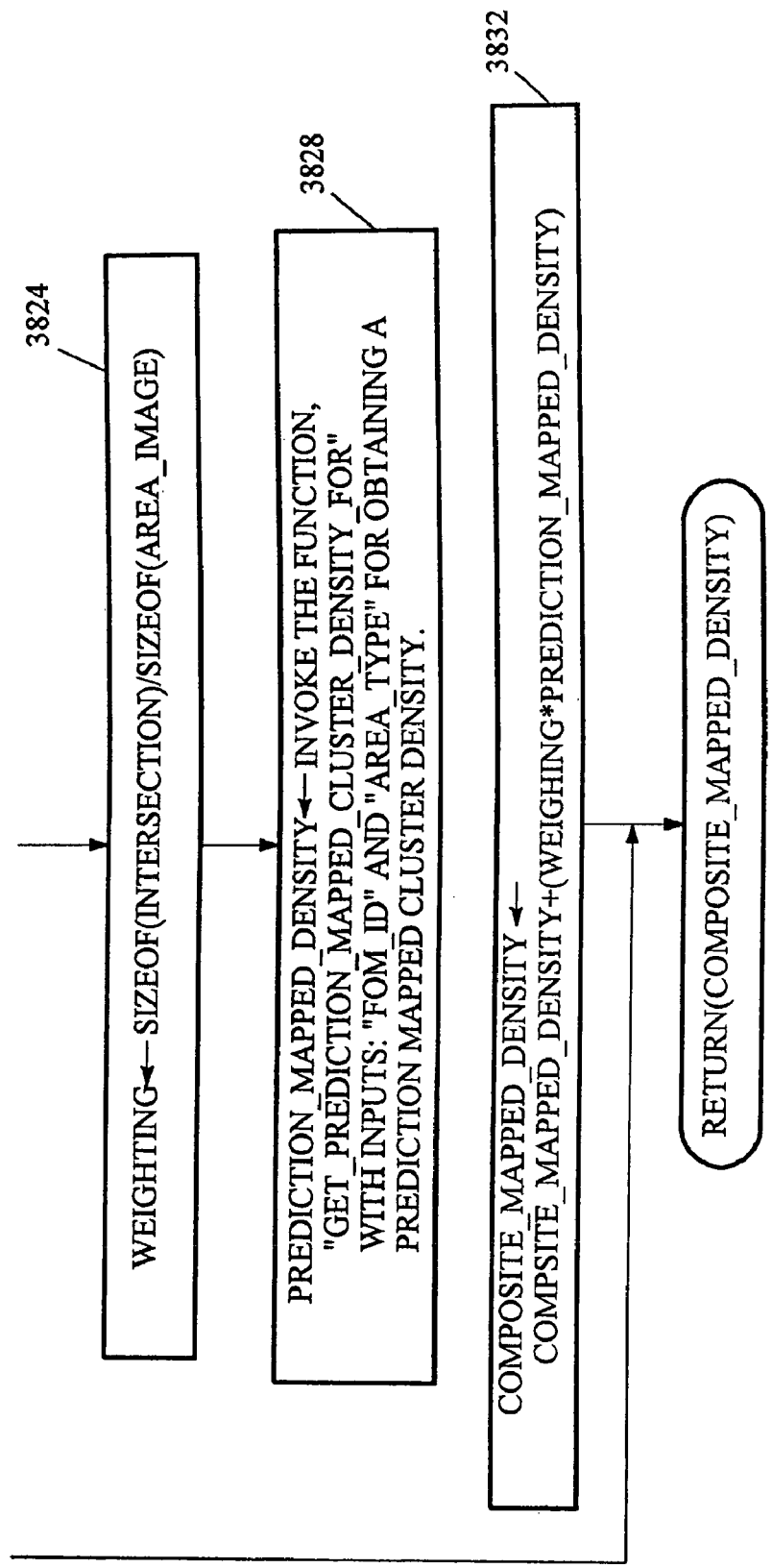
Figure 29A:
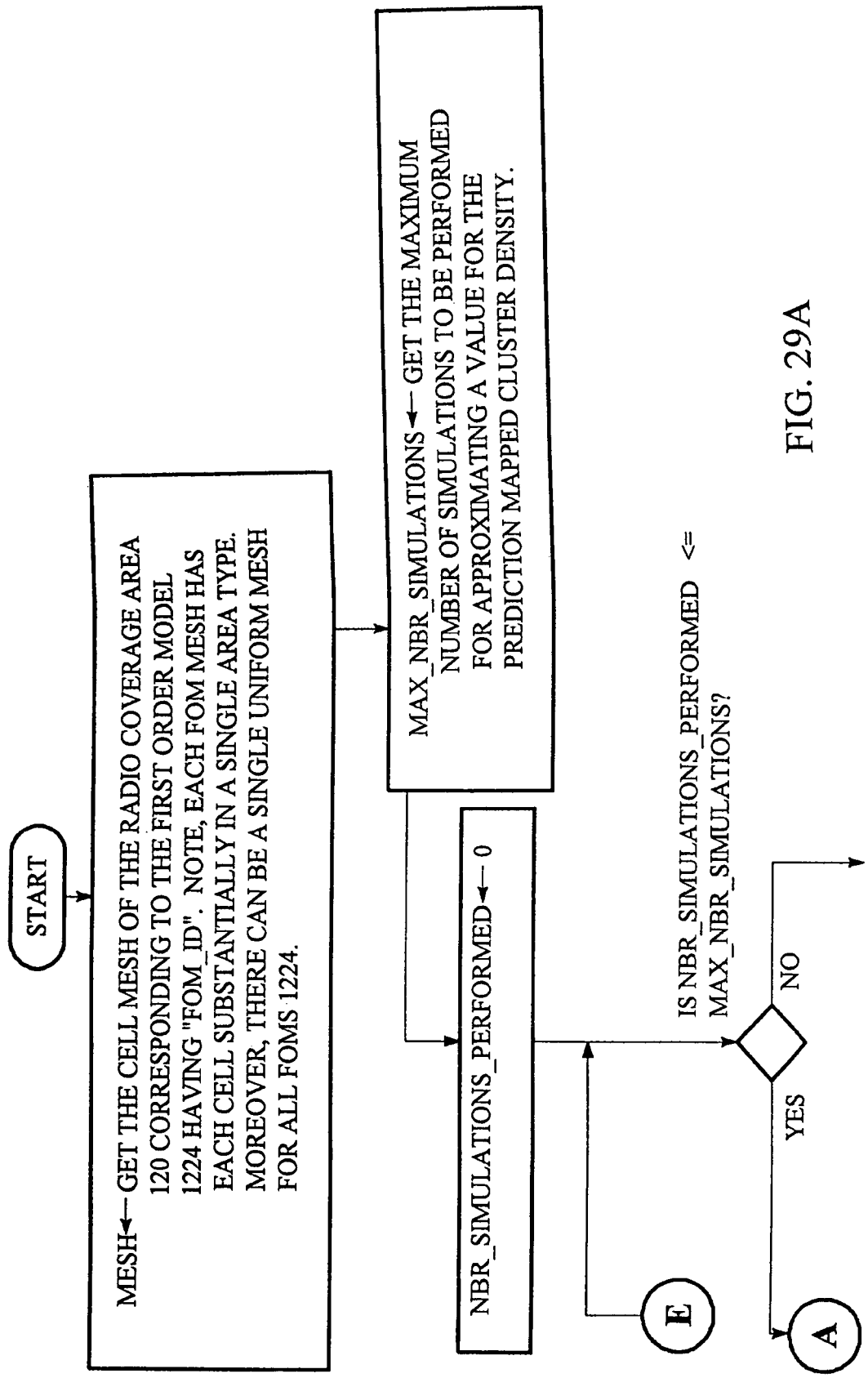
Figure 29C:
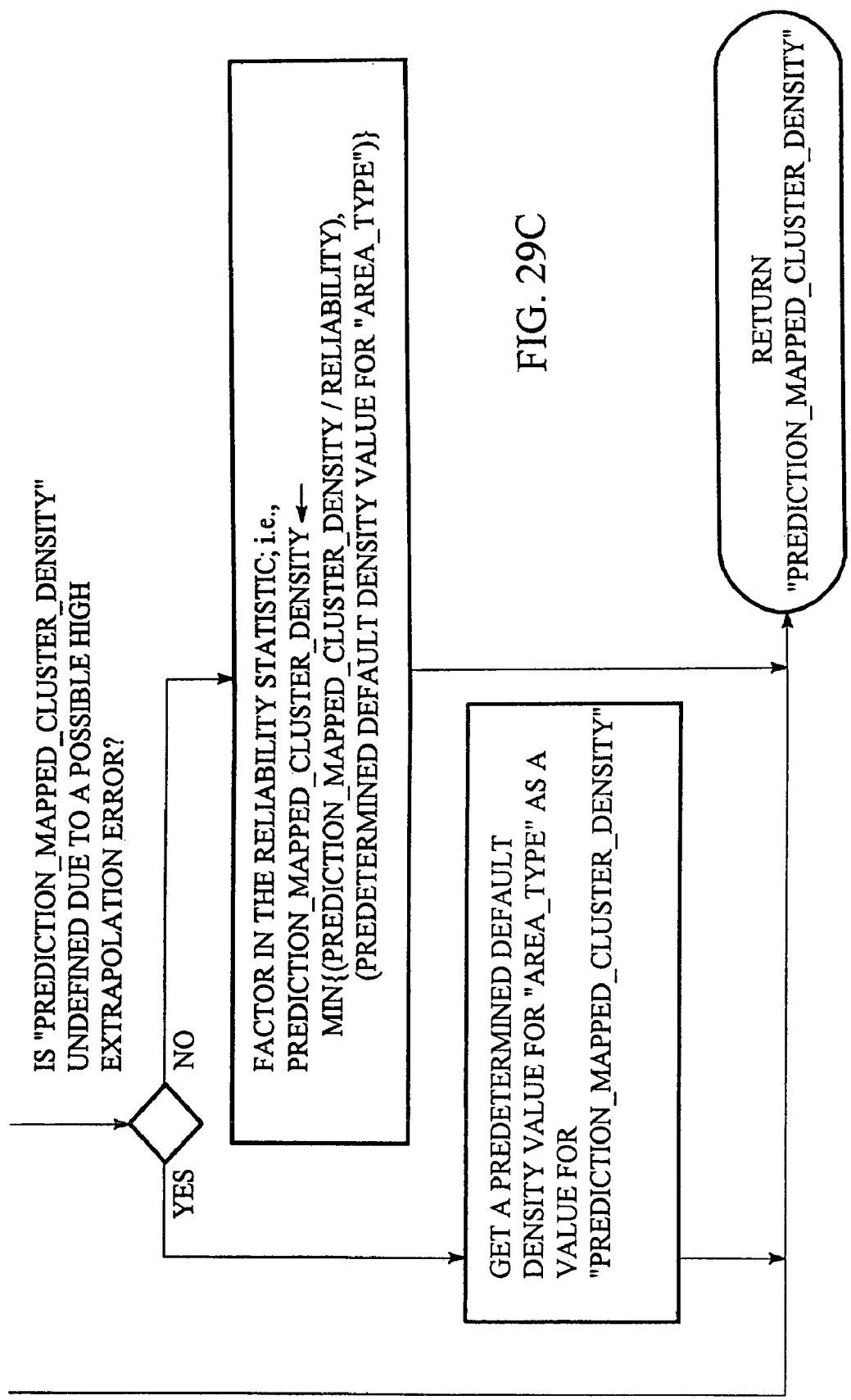
Figure 29D:
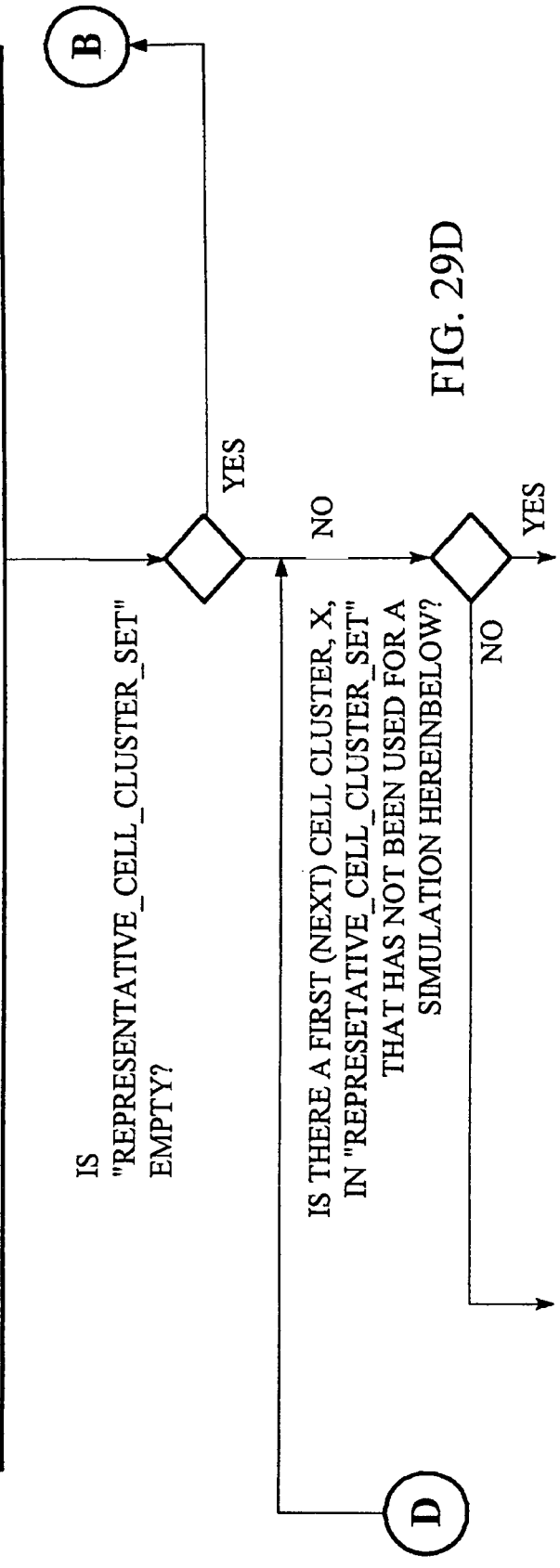
Figure 29F:
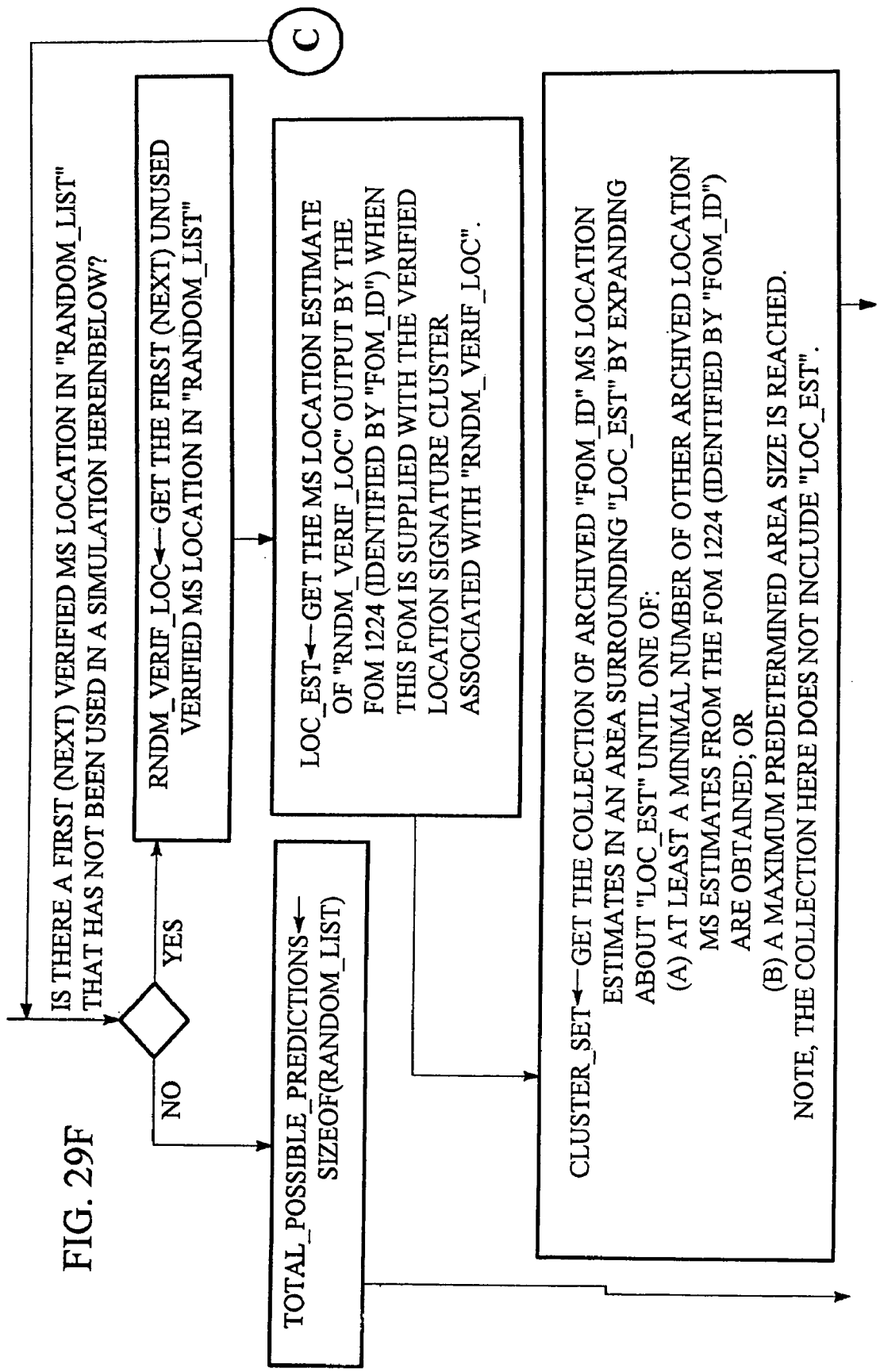
Figure 29G:
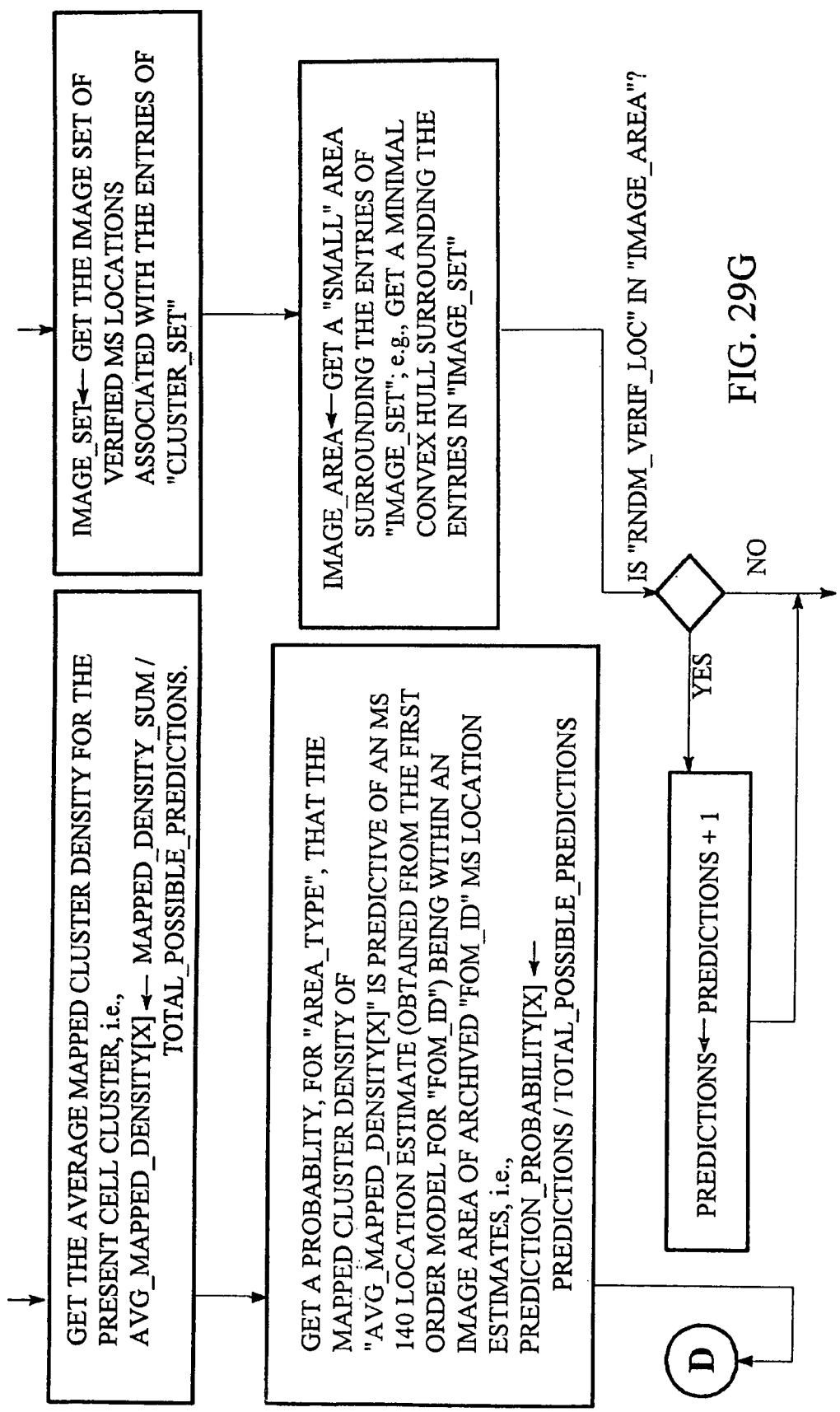
Figure 29H:
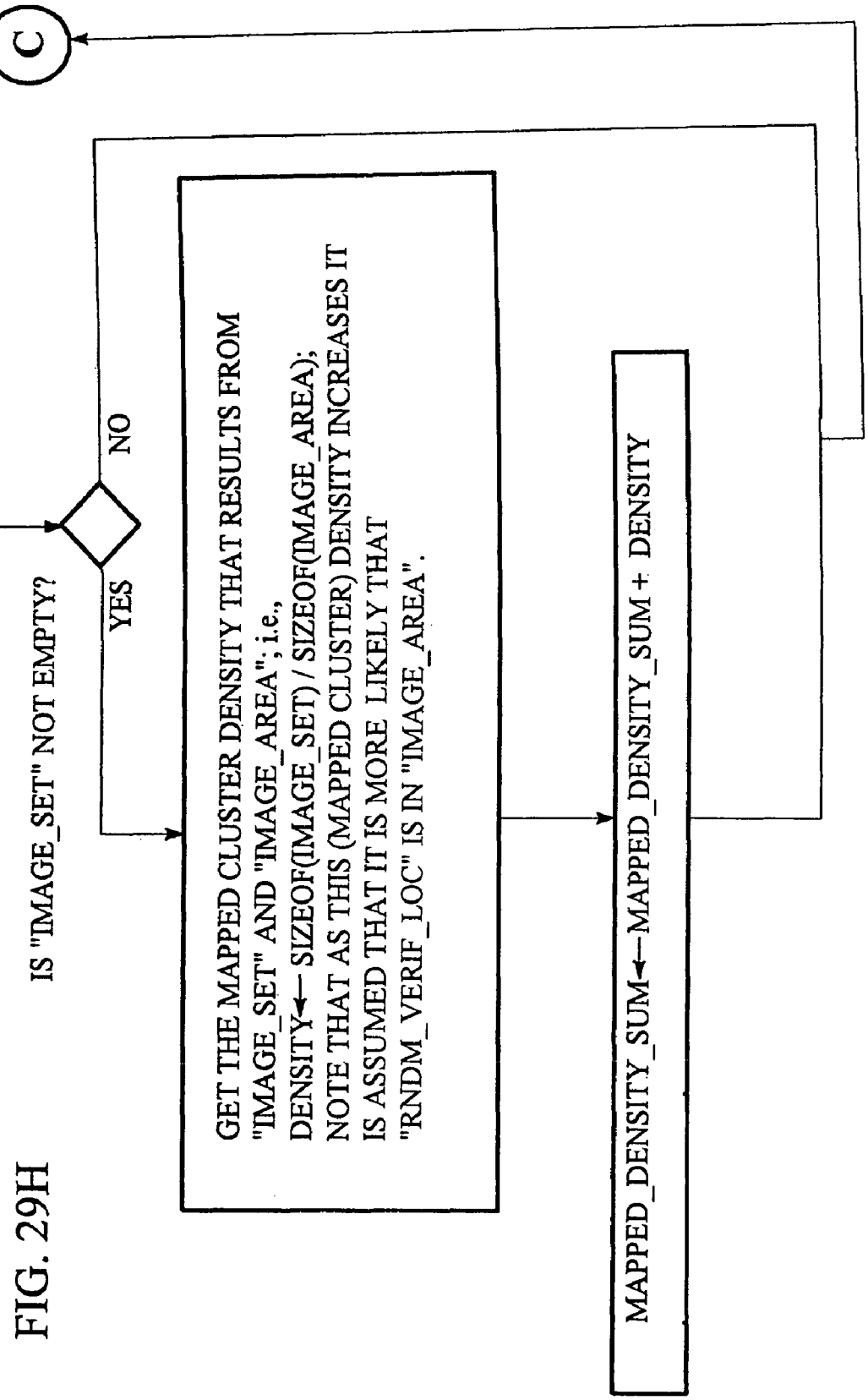

FIGS. 28*a* and 28*b* presents a high level flowchart of the steps performed by the function, "GET_COMPOSITE_PREDICTION_MAPPED_CLUSTER_DENSITY," used in the context adjuster 1326 for adjusting mobile station estimates provided by the first order models 1224; this flowchart corresponds to the description of this function in APPENDIX D.

FIGS. 29*a* through 29*h* present a high level flowchart of the steps performed by the function, "GET_PREDICTION_MAPPED_CLUSTER_DENSITY_FOR," used in the context adjuster 1326 for adjusting mobile station estimates provided by the first order models 1224; this flowchart corresponds to the description of this function in APPENDIX D.

FIG. 30 illustrates the primary components of the signal processing subsystem.

FIG. 31 illustrates how automatic provisioning of mobile station information from multiple CMRS occurs.

DETAILED DESCRIPTION (A) Detailed Description Introduction

Various digital wireless communication standards have been introduced such as Advanced Mobile Phone Service (AMPS), Narrowband Advanced Mobile Phone Service (NAMPS), code division multiple access (CDMA) and Time Division Multiple Access (TDMA) (e.g., Global Systems Mobile (GSM). These standards provide numerous enhancements for advancing the quality and communication capacity for wireless applications. Referring to CDMA, this standard is described in the Telephone Industries Association standard IS-95, for frequencies below 1 GHz, and in J-STD-008, the Wideband Spread-Spectrum Digital Cellular System Dual-Mode Mobile Station-Base station Compatibility Standard, for frequencies in the 1.8-1.9 GHz frequency bands. Additionally, CDMA general principles have been described, for example, in U.S. Pat. No. 5,109,390, Diversity Receiver in a CDMA Cellular Telephone System by Gilhousen. There are numerous advantages of such digital wireless technologies such as CDMA radio technology. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft or softer hand-off capability. When coupled with a location center as described herein, substantial improvements in radio location can be achieved. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft hand-off capability. Moreover, this same advanced radio communication infrastructure can also be used for enhanced radio location. As a further example, the capabilities of IS-41 and AIN already provide a broad-granularity of wireless location, as is necessary to, for example, properly direct a terminating call to an MS. Such information, originally intended for call processing usage, can be re-used in conjunction with the location center described herein to provide wireless location in the large (i.e., to determine which country, state and city a particular MS is located) and wireless location in the small (i.e., which location, plus or minus a few hundred feet within one or more base stations a given MS is located).

Figure 4:
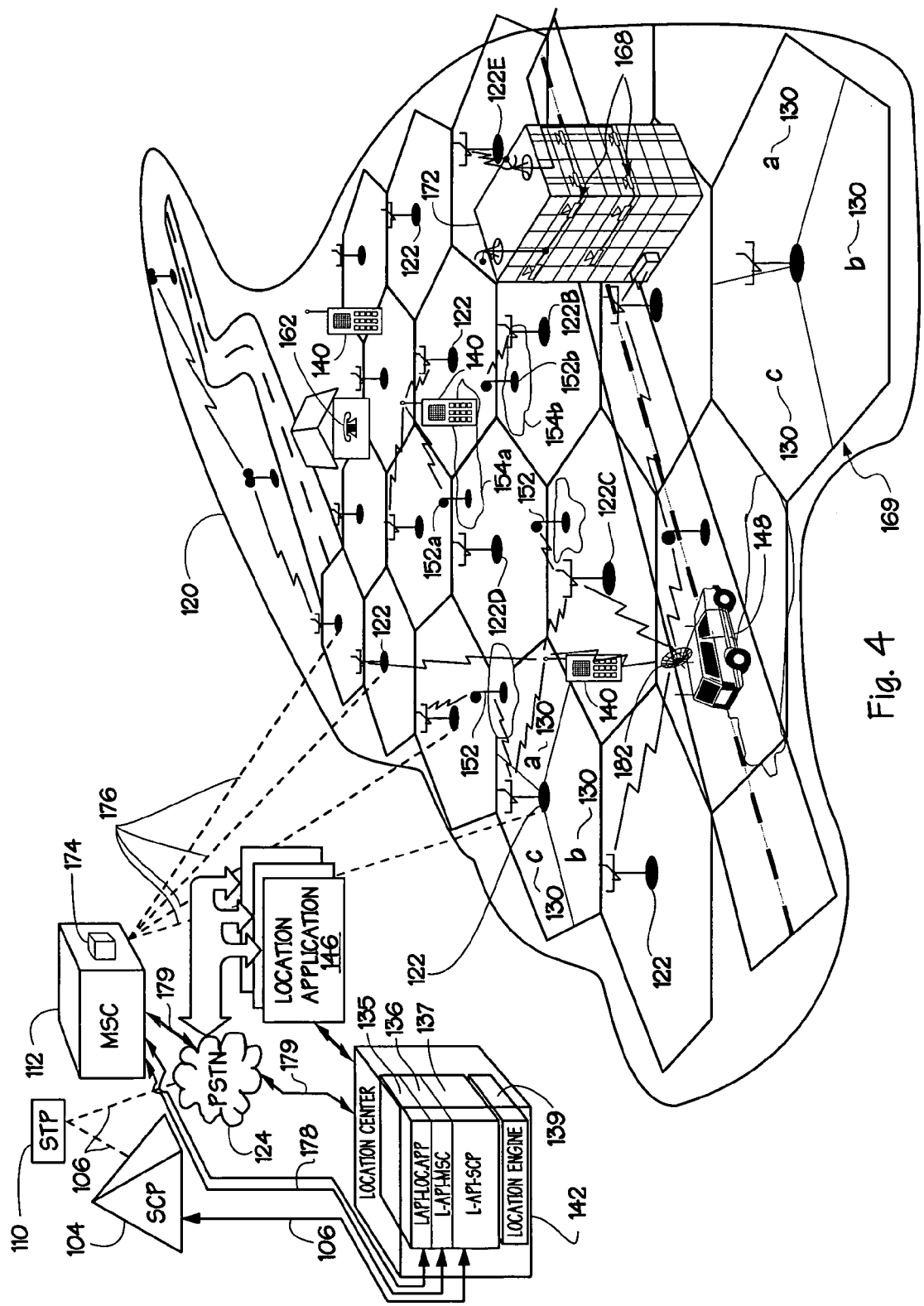
FIG. 4 illustrates an overall view of a wireless radio location network architecture, based on AIN principles.

FIG. 4 is a high level diagram of a wireless radiolocation intelligent network architecture for an embodiment of the present disclosure. Accordingly, this figure illustrates the interconnections between the components, for example, of a wireless cellular communication network, such as, a typical PCS network configuration and various components that are specific to an embodiment of the present disclosure. In particular, as one skilled in the art will understand, a typical wireless (PCS) network includes:

(a) a (large) plurality of wireless mobile stations (MSs) 140 for at least one of voice related communication, visual (e.g., text such as is provided by a short message service) related communication, and according to present invention, location related communication;

(b) a mobile switching center (MSC) 112;

(c) a plurality of wireless cell sites in a radio coverage area 120, wherein each cell site includes an infrastructure base station such as those labeled 122 (or variations thereof such as 122A-122D). In particular, the base stations 122 denote the standard high traffic, fixed location base stations used for voice and data communication with a plurality of MSs 140, and, according to the present disclosure, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as "location base station(s) 152" or simply LBS(s) 152;

(d) a public switched telephone network (PSTN) 124 (which may include signaling system links 106 having network control components such as: a service control point (SCP) 104, one or more signaling transfer points (STPs) 110.

Added to this wireless network, the present invention provides the following additional components:

(10.1) a location center 142 which is required for determining a location of a target MS 140 using signal characteristic values for this target MS;

(10.2) one or more mobile base stations 148 (MBS) which are optional, for physically traveling toward the target MS 140 or tracking the target MS;

(10.3) a plurality of location base stations 152 (LBS) which are optional, distributed within the radio coverage areas 120, each LBS 152 having a relatively small MS 140 detection area 154;

Since location base stations 152 can be located on, e.g., each floor of a multi-story building, the wireless location technology described herein can be used to perform location in terms of height as well as by latitude and longitude.

In operation, an MS 140 may utilize one or more of the wireless technologies, CDMA, TDMA, AMPS, NAMPS or GSM for wireless communication with: (a) one or more infrastructure base stations 122, (b) mobile base station(s) 148, or (c) an LBS 152.

Referring to FIG. 4 again, additional detail is provided of typical base station coverage areas, sectorization, and high level components within a radio coverage area 120, including the MSC 112. Although base stations may be placed in any configuration, a typical deployment configuration is approximately in a cellular honeycomb pattern, although many practical tradeoffs exist, such as site availability, versus the requirement for maximal terrain coverage area. To illustrate, three such exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communicating location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links.

When an MS 140 (such as a CDMA, AMPS, NAMPS mobile telephone) is powered on and in the idle state, it constantly monitors the pilot signal transmissions from each of the base stations 122 located at nearby cell sites. Since base station/sector coverage areas may often overlap, such overlapping enables an MS 140 to detect, and, in the case of certain wireless technologies, communicate simultaneously along both the forward and reverse paths, with multiple base stations 122 and/or sectors 130. In FIG. 4 the constantly radiating pilot signals from base station sectors 130, such as sectors a, b and c of BS 122A, are detectable by MSs 140 within the coverage area 169 for BS 122A. That is, such a mobile station 140 can scan for pilot channels, corresponding to given base station/sector identifiers (IDs), for determining which coverage area 169 (i.e., cell) the mobile station is contained. This is performed by comparing signal strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except, e.g., in the case of a 911 call, wherein no registration process is required). Once any required registration is complete, calls may be originated from the mobile station 140 or calls or short message service messages can be received from the network. Note that the MSC 112 communicates as appropriate, with a class 4/5 wireline telephony circuit switch or other central offices, connected to the PSTN 124 network. Such central offices connect to wireline terminals, such as telephones, or any communication device compatible with a wireline. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Still referring to FIG. 4, the location center/gateway (LC) 142 interfaces with the MSC 112 either via dedicated transport facilities 178, using, e.g., any number of LAN/WAN technologies, such as Ethernet, fast Ethernet, frame relay, virtual private networks, etc., or via the PSTN 124. The LC 142 may receive autonomous (e.g., unsolicited) command/response messages regarding, for example: (a) the state of the wireless network of each service provider utilizing the LC 142 for wireless location services, (b) MS 140 and BS 122 radio frequency (RF) measurements, (c) communications with any MBSs 148, and (d) location applications requesting MS locations using the location center/gateway 142. Conversely, the LC 142 may provide data and control information to each of the above components in (a)-(d). Additionally, the LC 142 may provide location information to an MS 140, via a BS 122. Moreover, in the case of the use of a mobile base station (MBS) 148, several communications paths may exist with the LC 142.

The MBS 148 may act as a low cost, partially-functional, moving base station, and is, in one embodiment, situated in a vehicle where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station 140 for data communication with the LC 142, via a BS 122. In particular, such data communication includes telemetering at least the geographic position (or estimates thereof) of the MBS 148, as well as various RF measurements related to signals received from the target MS 140, and in some embodiments, MBS 148 estimates of the location of the target MS 140. In some embodiments, the MBS 148 may utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a global positioning system (GPS), distance sensors, deadreckoning electronics, as well as an on-board computing system and display devices for locating both the MBS 148 itself as well as tracking and locating the target MS 140. The computing and display provides a means for communicating the position of the target MS 140 on a map display to an operator of the MBS 148.

Each location base station (LBS) 152 is a low cost location device. Each such LBS 152 communicates with one or more of the infrastructure base stations 122 using one or more wireless technology interface standards. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., and wherein the location of the LBS may be determined as accurately as, for example, the accuracy of the locations of the infrastructure BSs 122. Assuming the wireless technology CDMA is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, nor would it interfere with neighboring LBSs 152. However, as one skilled in the art will understand, time offsets, in CDMA chip sizes, may be re-used within a PCS system, thus providing efficient use of pilot time offset chips, thereby achieving spectrum efficiency. Each LBS 152 may also contain multiple wireless receivers in order to monitor transmissions from a target MS 140. Additionally, each LBS 152 contains mobile station 140 electronics, thereby allowing the LBS to both be controlled by the LC 142, and to transmit information to the LC 142, via at least one neighboring BS 122.

As mentioned above, when the location of a particular target MS 140 is desired, the LC 142 can request location information about the target MS 140 from, for instance, one or more activated LBSs 152 in a geographical area of interest. Accordingly, whenever the target MS 140 is in such an area, or is suspected of being in the area, either upon command from the LC 142, or in a substantially continuous fashion, the LBS's pilot channel appears to the target MS 140 as a potential neighboring base station channel, and consequently, is placed, for example, in the CDMA neighboring set, or the CDMA remaining set, of the target MS 140 (as one familiar with the CDMA standards will understand).

During the normal CDMA pilot search sequence of the mobile station initialization state (in the target MS), the target MS 140 will, if within range of such an activated LBS 152, detect the LBS pilot presence during the CDMA pilot channel acquisition substrate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 will telemeter back to the LC 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions would dictate preference here. Note that GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBSs. Further, no expensive terrestrial transport link is typically required since two-way communication is provided by an included MS 140 (or an electronic variation thereof) within each LBS. Thus, LBSs 152 may be placed in numerous locations, such as:

(a) in dense urban canyon areas (e.g., where signal reception may be poor and/or very noisy);
(b) in remote areas (e.g., hiking, camping and skiing areas);
(c) along highways (e.g., for emergency as well as monitoring traffic flow), and their rest stations; or
(d) in general, wherever more location precision is required than is obtainable using other wireless infrastructure network components.

(B) Location Center—Network Elements API Description

A location application programming interface or L-API 14 (see FIG. 30, and including L-API-Loc_APP 135, L-API-MSC 136, and L-API-SCP 137 shown in FIG. 4), may be provided between the location center/gateway 142 (LC) and the mobile switch center (MSC) network element type, in order to send and receive various control, signals and data messages. The L-API 14 should be implemented using a preferably high-capacity physical layer communications interface, such as IEEE standard 802.3 (10 baseT Ethernet), although other physical layer interfaces could be used, such as fiber optic ATM, frame relay, etc. At least two forms of L-API implementation are possible. In a first case, the signal control and data messages are provided using the MSC 112 vendor's native operations messages inherent in the product offering, without any special modifications. In a second case the L-API includes a full suite of commands and messaging content specifically optimized for wireless location purposes, which may require some, although minor development on the part of an MSC vendor.

(C) Signal Processor Description

Referring to FIG. 30, the signal processing subsystem 1220, such a signal processing subsystem may: (a) receive control messages and signal measurements from one or more wireless service provider networks, and (b) transmit appropriate control messages to such wireless networks via the location applications programming interface 14 referenced earlier, for wireless location purposes. The signal processing subsystem 1220 additionally provides various signal identification, conditioning and pre-processing functions, including buffering, signal type classification, signal filtering, message control and routing functions to the location estimating modules or FOMs.

There can be several combinations of Delay Spread/Signal Strength sets of measurements made available to the signal processing subsystem 1220. In some cases a mobile station 140 (FIG. 4) may be able to detect up to three or four pilot channels representing three to four base stations, or as few as one pilot channel, depending upon the environment and wireless network configuration. Similarly, possibly more than one BS 122 can detect a mobile station 140 transmitter signal, as evidenced by the provision of cell diversity or soft hand-off in the CDMA standards, and the fact that multiple CMRS' base station equipment commonly will overlap coverage areas.

For each mobile station 140 or BS 122 transmitted signal detected by a receiver group at a station, multiple delayed signals, or "fingers" may be detected and tracked resulting from multipath radio propagation conditions, from a given transmitter.

In typical spread spectrum diversity CDMA receiver design, the "first" finger represents the most direct, or least delayed multipath signal. Second or possibly third or fourth fingers may also be detected and tracked, assuming the mobile station contains a sufficient number of data receivers. Although traditional TOA and TDOA methods would discard subsequent fingers related to the same transmitted finger, collection and use of these additional values can prove useful to reduce location ambiguity, and are thus collected by the Signal Processing subsystem in the Location Center 142.

From the mobile receiver's perspective, a number of combinations of measurements could be made available to the Location Center. Due to the disperse and near-random nature of CDMA radio signals and propagation characteristics, traditional TOA/TDOA location methods have failed in the past, because the number of signals received in different locations are different. In a particularly small urban area, of say less than 500 square feet, the number of RF signals and their multipath components may vary by over 100 percent.

Due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimate. This consequence requires a family of location estimate location modules, each firing whenever suitable data has been presented to a model, thus providing a location estimate to a backend subsystem which resolves ambiguities.

In one embodiment of this invention using backend hypothesis resolution, by utilizing existing knowledge concerning base station coverage area boundaries (such as via the compilation a RF coverage database—either via RF coverage area simulations or field tests), the location error space is decreased. Negative logic Venn diagrams can be generated which deductively rule out certain location estimate hypotheses.

Although the forward link mobile station's received relative signal strength ($RRSS_{BS}$) of detected nearby base station transmitter signals can be used directly by the location estimate modules, the CDMA base station's reverse link received relative signal strength ($RRSS_{MS}$) of the detected mobile station transmitter signal must be modified prior to location estimate model use, since the mobile station transmitter power level changes nearly continuously, and would thus render relative signal strength useless for location purposes.

One adjustment variable and one factor value are required by the signal processing subsystem in the CDMA air interface case: (1) instantaneous relative power level in dBm (IRPL) of the mobile station transmitter, and (2) the mobile station Power Class. By adding the IRPL to the $RRSS_{MS}$, a synthetic relative signal strength ($SRSS_{MS}$) of the mobile station 140 signal detected at the BS 122 is derived, which can be used by location estimate model analysis, as shown below:

$$SRSS_{MS} = RRSS_{MS} + IRPL \text{ (in dBm)}.$$

Accordingly, $SRSS_{MS}$ is a corrected indication of the effective path loss in the reverse direction (mobile station to BS), and therefore is now comparable with $RRSS_{BS}$ and can be used to provide a correlation with either distance or shadow fading because it now accounts for the change of the mobile station transmitter's power level. Note that the two signal measurements $RRSS_{BS}$ and $SRSS_{MS}$ can now be processed in a variety of ways to achieve a more robust correlation with distance or shadow fading.

Although Rayleigh fading appears as a generally random noise generator, essentially destroying the correlation value of either $RRSS_{BS}$ or $SRSS_{MS}$ measurements with distance individually, several mathematical operations or signal processing functions can be performed on each measurement to derive a more robust relative signal strength value, overcoming the adverse Rayleigh fading effects. Examples include averaging, taking the strongest value and weighting the strongest value with a greater coefficient than the weaker value, then averaging the results. This signal processing technique takes advantage of the fact that although a Rayleigh fade may often exist in either the forward or reverse path, it is much less probable that a Rayleigh fade also exists in the reverse or forward path, respectively. A shadow fade however, similarly affects the signal strength in both paths.

Figure 2:
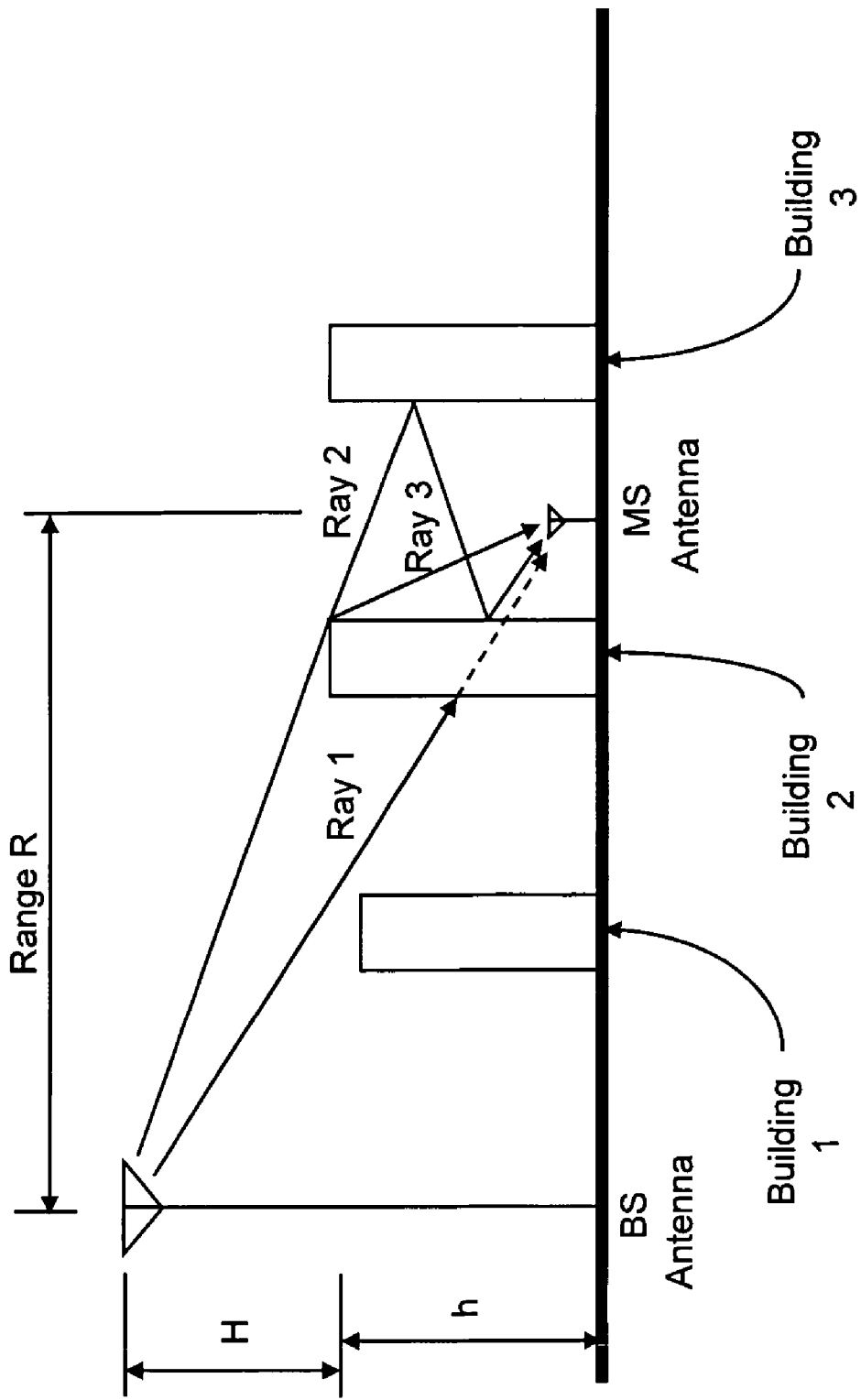
FIG. 2 shows aspects of the two-ray radio propagation model and the effects of urban clutter.
Figure 3:
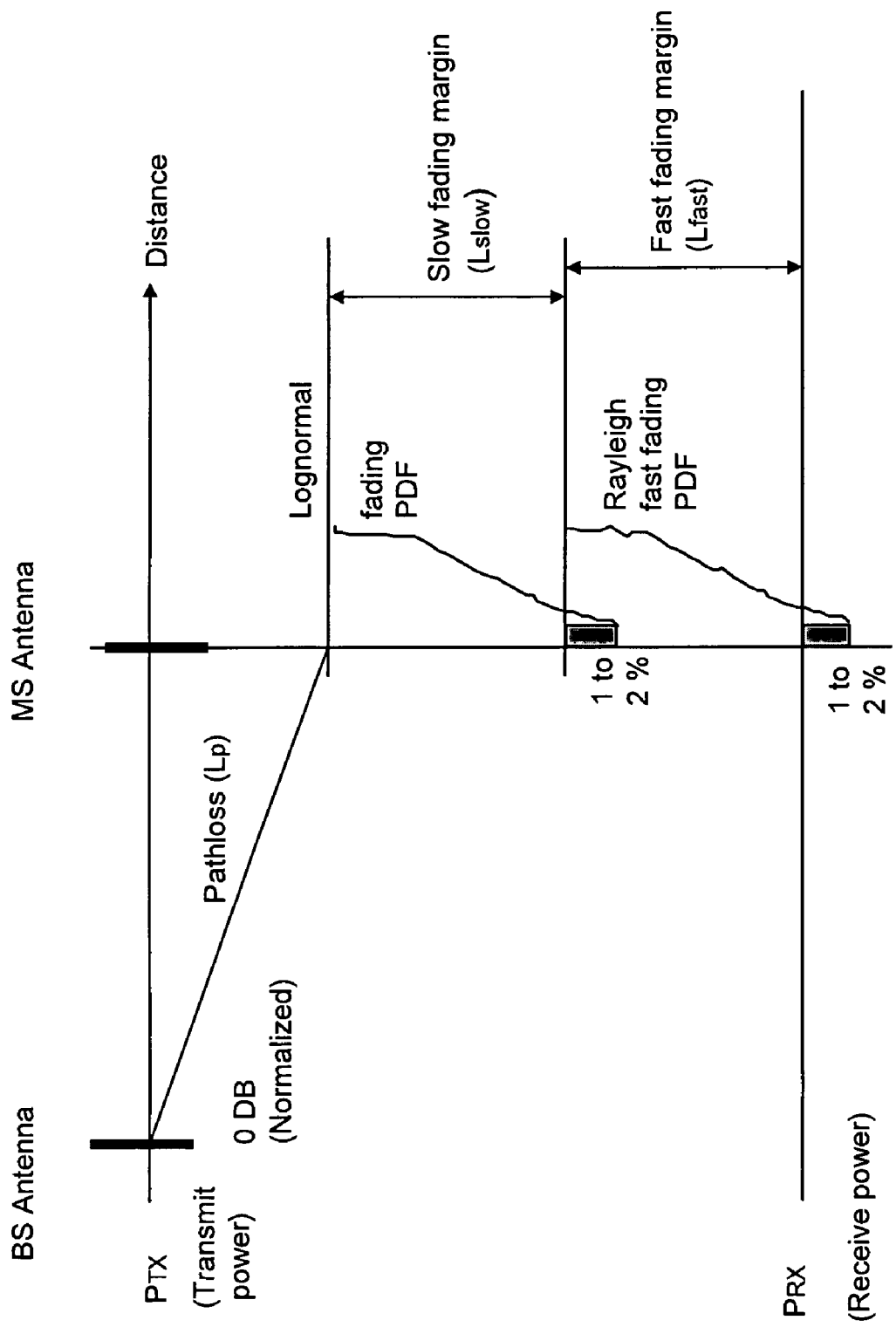
FIG. 3 provides a typical example of how the statistical power budget is calculated in design of a Commercial Mobile Radio Service Provider (CMRS) network.

At this point a CDMA radio signal direction independent of "net relative signal strength measurement" can be derived which can be used to establish a correlation with either distance or shadow fading, or both. Although the ambiguity of either shadow fading or distance cannot be determined, other means can be used in conjunction, such as the fingers of the CDMA delay spread measurement, and any other TOA/TDOA calculations from other geographical points. In the case of a mobile station with a certain amount of shadow fading between its BS 122 (FIG. 2), the first finger of a CDMA delay spread signal is most likely to be a relatively shorter duration than the case where the mobile station 140 and BS 122 are separated by a greater distance, since shadow fading does not materially affect the arrival time delay of the radio signal.

Figure 1:
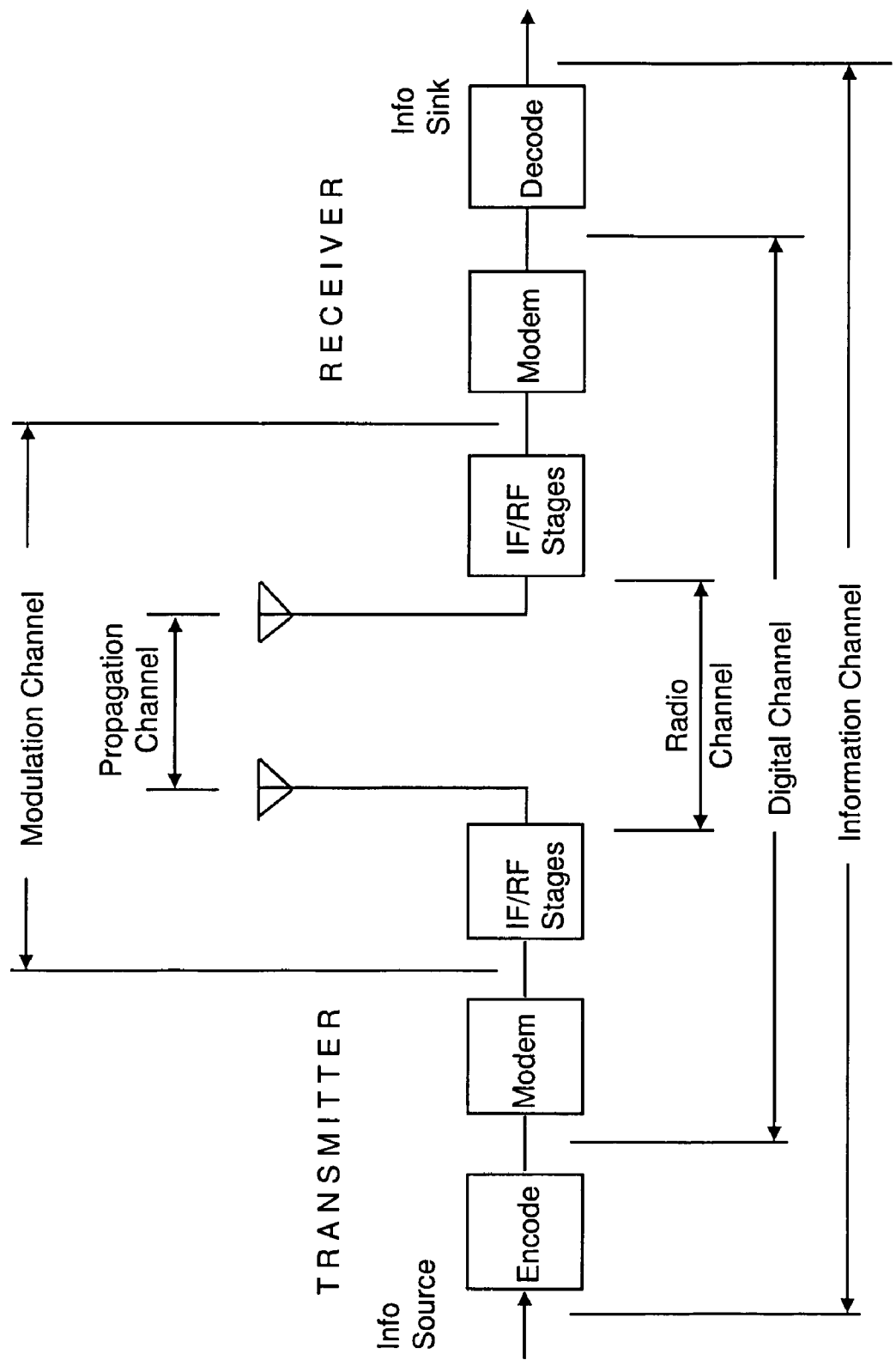
FIG. 1 illustrates various perspectives of radio propagation opportunities which may be considered in addressing correlation with mobile to base station ranging.

By performing a small modification in the control electronics of the CDMA base station and mobile station receiver circuitry, it is possible to provide the signal processing subsystem 1220 (reference FIG. 30) within the location center 142 (FIG. 1) with data that exceed the one-to-one CDMA delay-spread fingers to data receiver correspondence. Such additional information, in the form of additional CDMA fingers (additional multipath) and all associated detectable pilot channels, provides new information which is used to enhance the accuracy of the location center's location estimate location estimate modules.

This enhanced capability is provided via a control message, sent from the location center 142 to the mobile switch center 12, and then to the base station(s) in communication with, or in close proximity with, mobile stations 140 to be located. Two types of location measurement request control messages are needed: one to instruct a target mobile station 140 (i.e., the mobile station to be located) to telemeter its BS pilot channel measurements back to the primary BS 122 and from there to the mobile switch center 112 and then to the location system 42. The second control message is sent from the location system 42 to the mobile switch center 112, then to first the primary BS, instructing the primary BS's searcher receiver to output (i.e., return to the initiating request message source) the detected target mobile station 140 transmitter CDMA pilot channel offset signal and their corresponding delay spread finger (peak) values and related relative signal strengths.

The control messages are implemented in standard mobile station 140 and BS 122 CDMA receivers such that all data results from the search receiver and multiplexed results from the associated data receivers are available for transmission back to the location center 142. Appropriate value ranges are required regarding mobile station 140 parameters $T\_ADD_S$, $T\_DROP_S$, and the ranges and values for the Active, Neighboring and Remaining Pilot sets registers, held within the mobile station 140 memory. Further mobile station 140 receiver details have been discussed above.

In the normal case without any specific multiplexing means to provide location measurements, exactly how many CDMA pilot channels and delay spread fingers can or should be measured vary according to the number of data receivers contained in each mobile station 140. As a guide, it is preferred that whenever RF characteristics permit, at least three pilot channels and the strongest first three fingers, are collected and processed. From the BS 122 perspective, it is preferred that the strongest first four CDMA delay spread fingers and the mobile station power level be collected and sent to the location system 42, for each of preferably three BSs 122 which can detect the mobile station 140. A much larger combination of measurements is potentially feasible using the extended data collection capability of the CDMA receivers.

Figure 5:
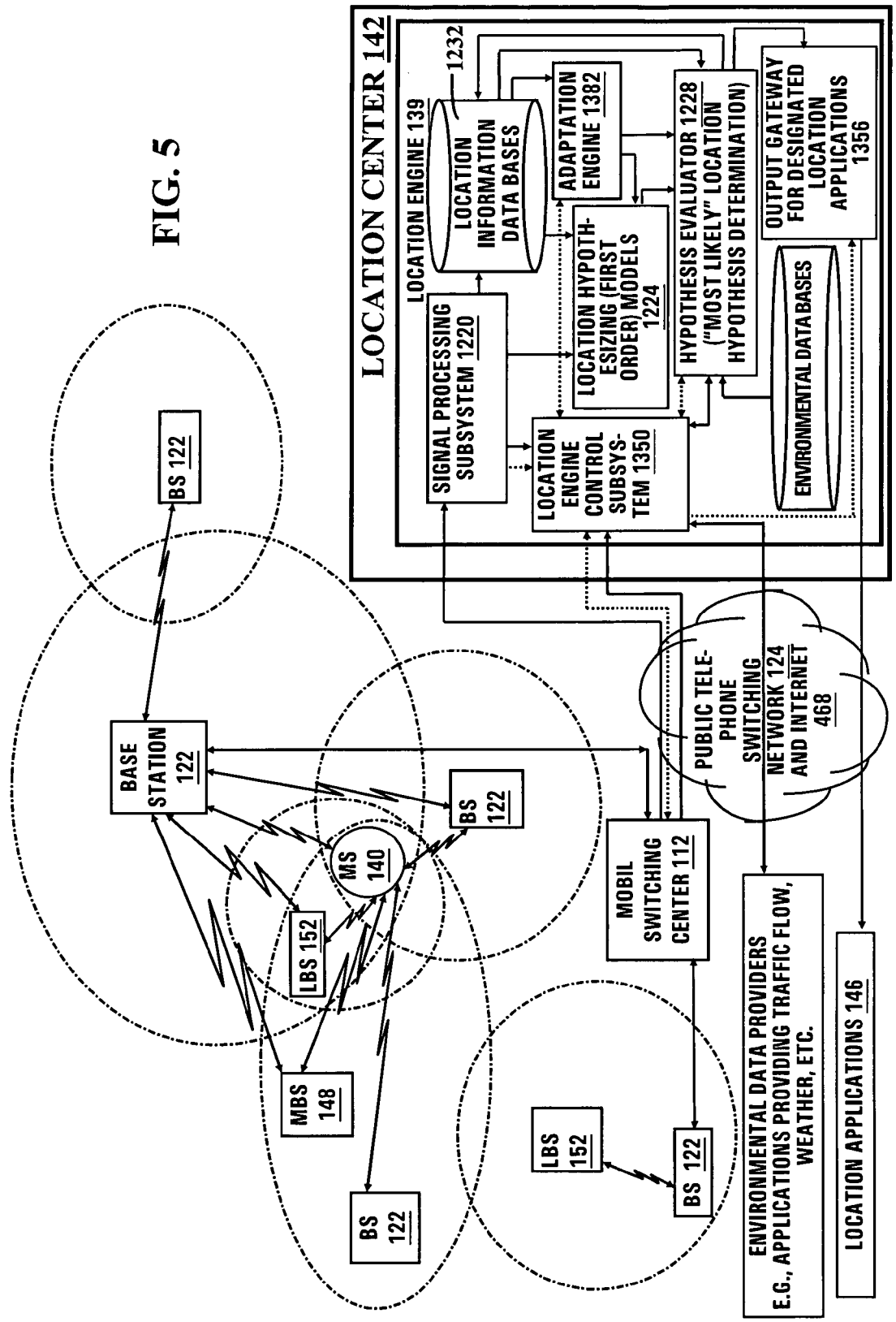
FIG. 5 is a high level block diagram of an embodiment of the present disclosure for locating a mobile station (MS) within a radio coverage area for the embodiment.
Figure 6:
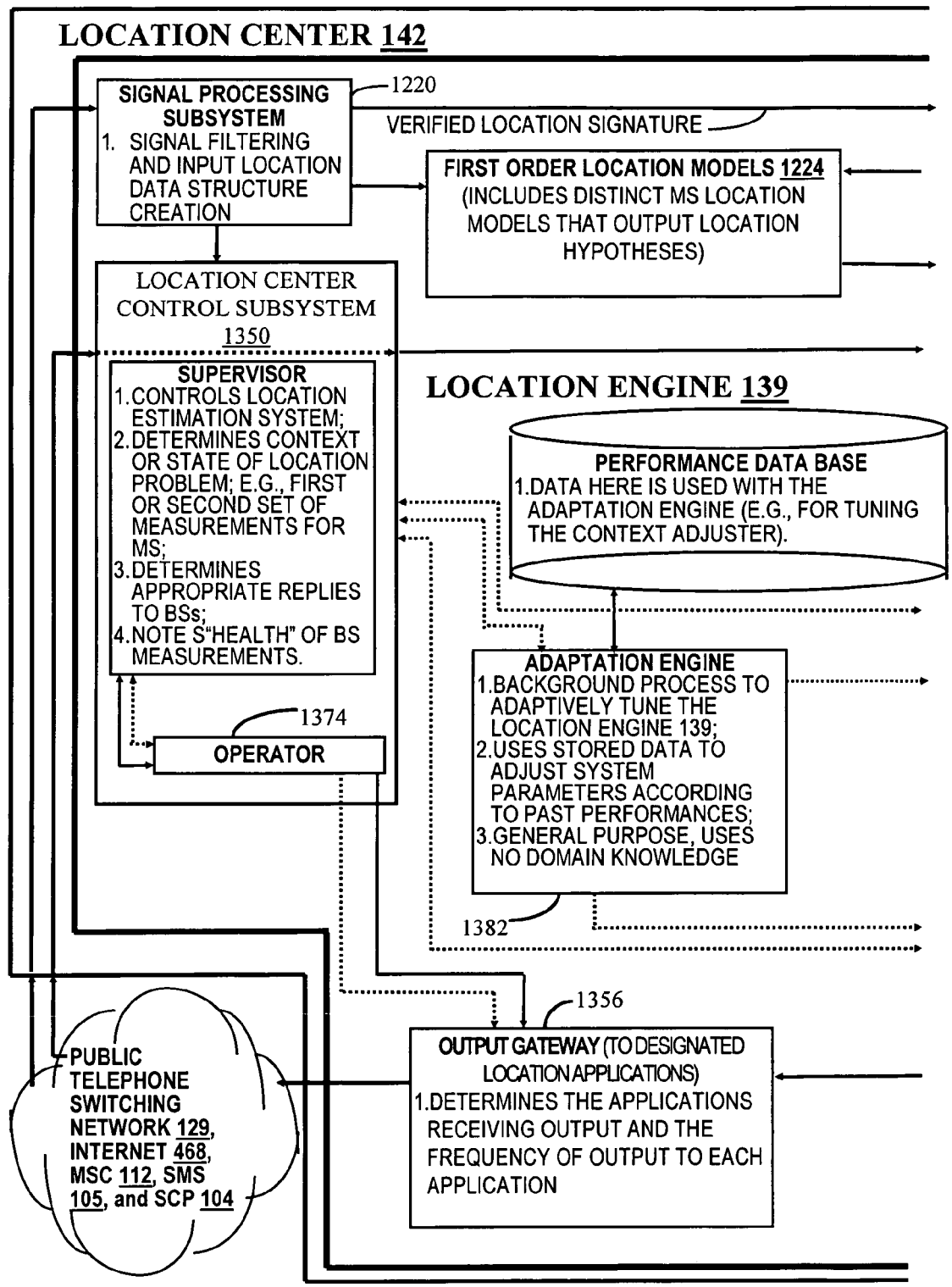
FIG. 6 is a high level block diagram of the location center 142.
Figure 6:
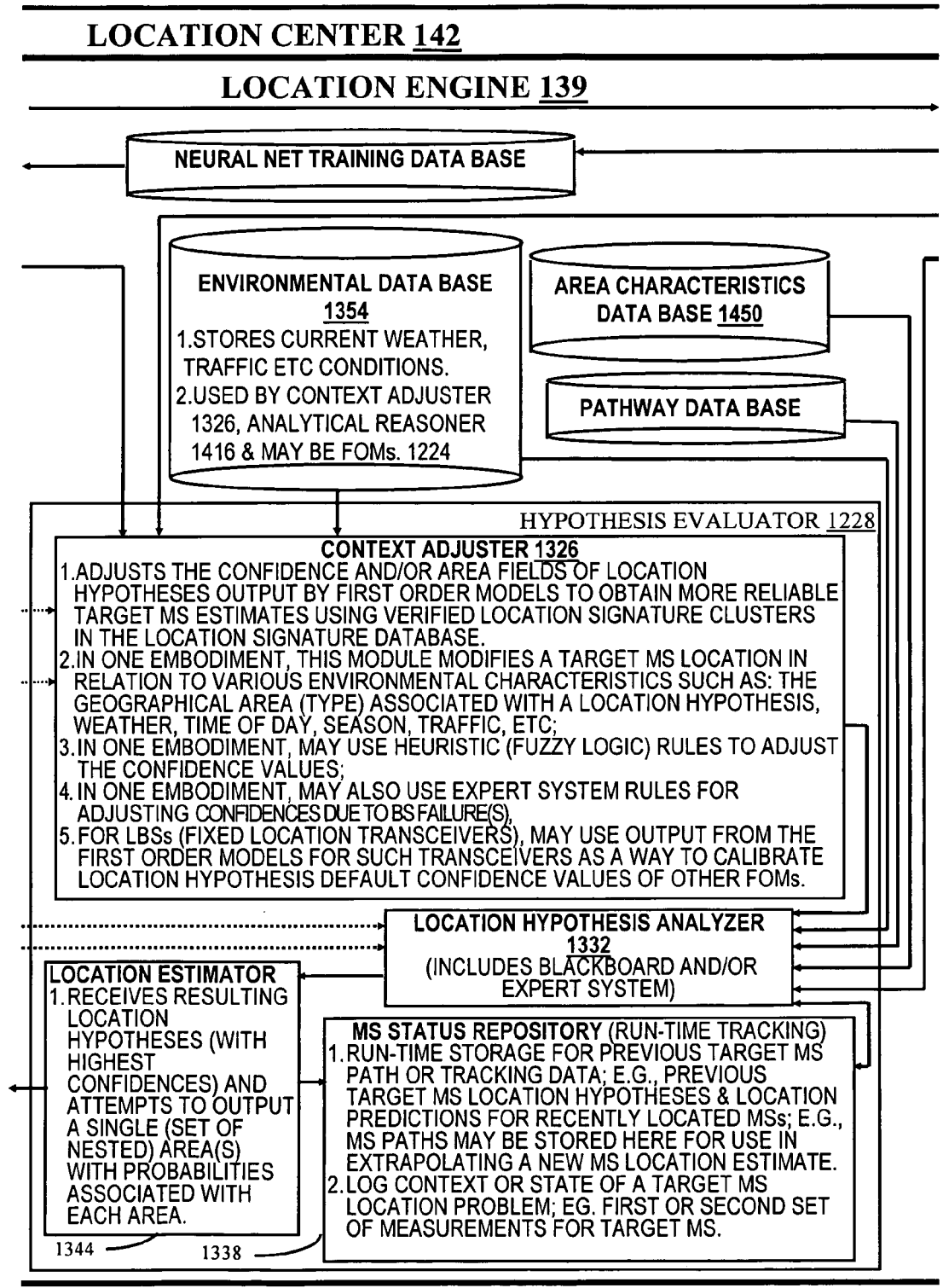
Figure 8:
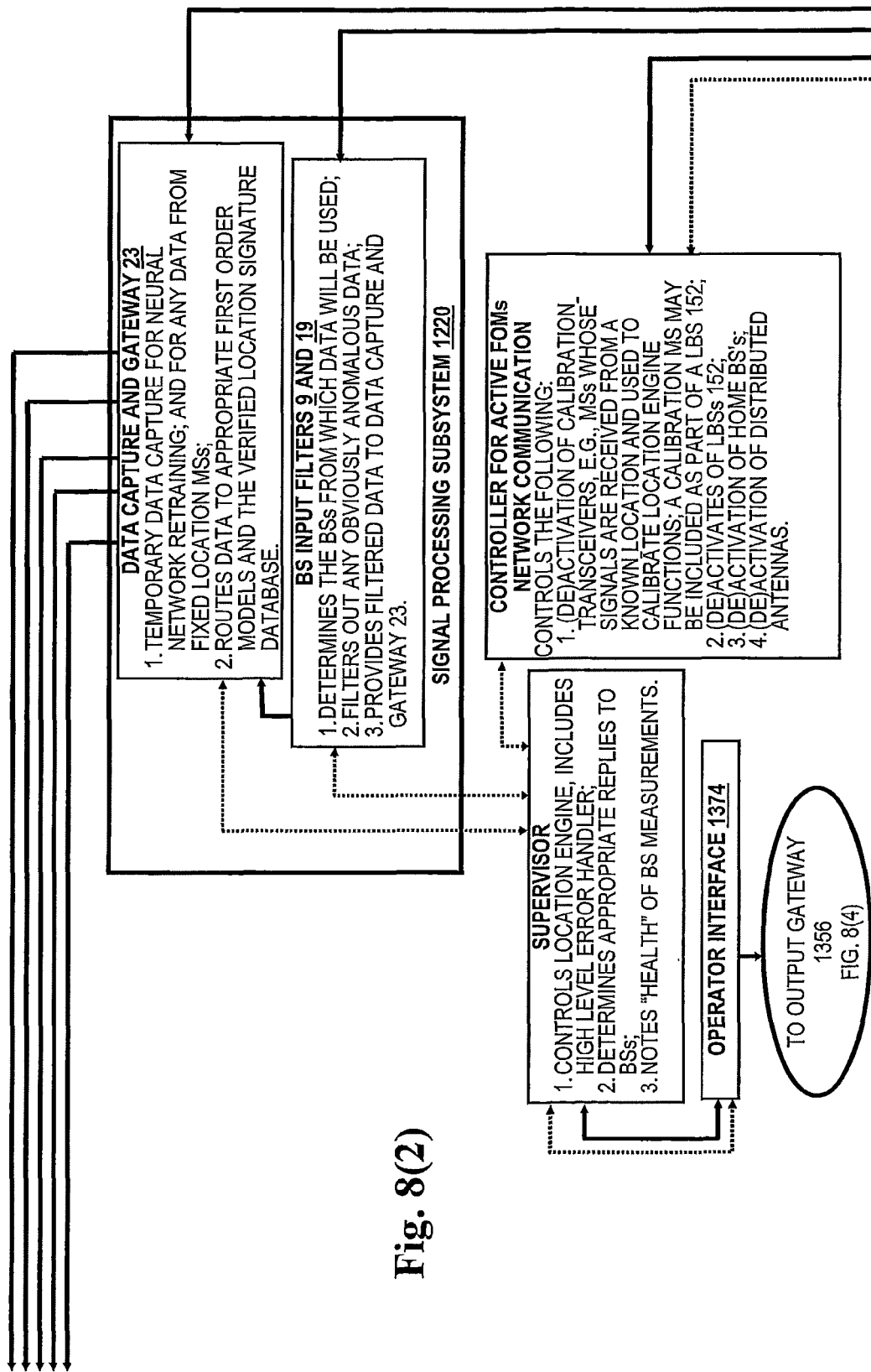
FIG. 8 is a substantially comprehensive high level block diagram illustrating data and control flows between the components of the location center, as well the functionality of the components.
Figure 8:
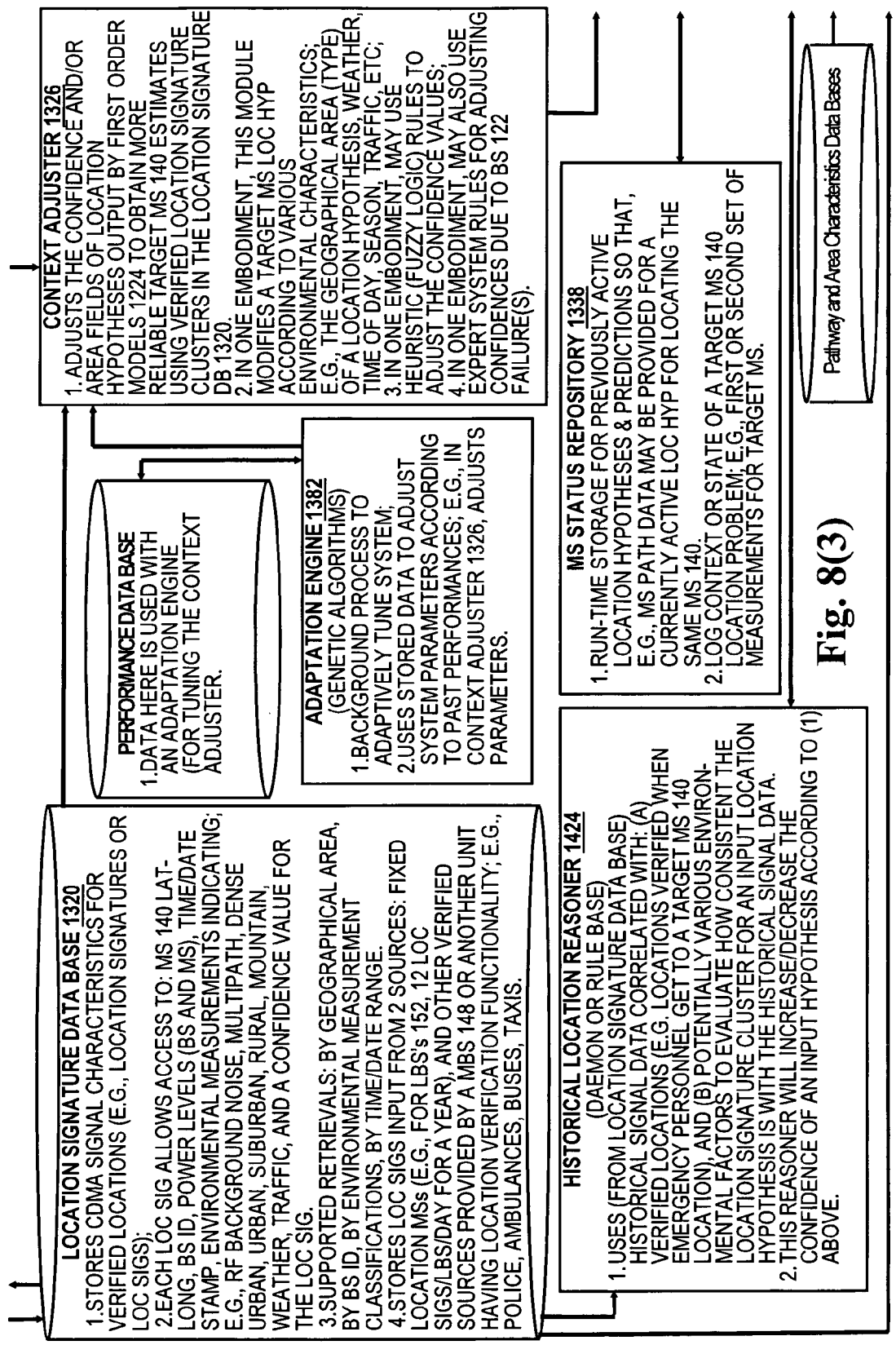
Figure 8:
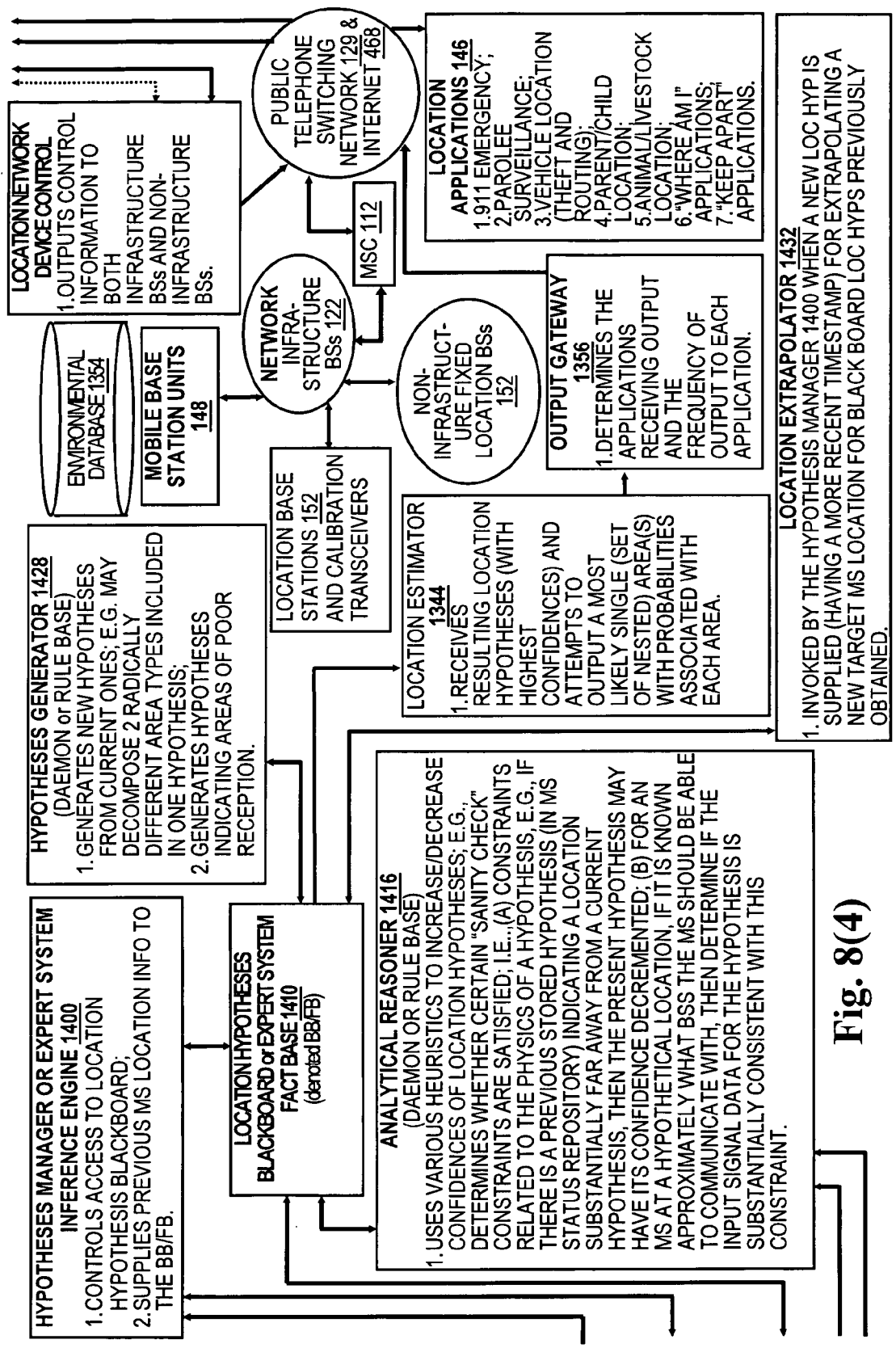

FIG. 30 illustrates the components of the Signal Processing Subsystem 1220 (also shown in FIGS. 5, 6 and 8). The main components consist of the input queue(s) 7, signal classifier/filter 9, digital signaling processor 17, imaging filters 19, output queue(s) 21, router/distributor 23 (also denoted as the "Data Capture And Gateway" in FIG. 8(2)), a signal processor database 26 and a signal processing controller 15.

Input queues 7 are required in order to stage the rapid acceptance of a significant amount of RF signal measurement data, used for either location estimate purposes or to accept autonomous location data. Each location request using fixed base stations may, in one embodiment, contain from 1 to 128 radio frequency measurements from the mobile station, which translates to approximately 61.44 kilobytes of signal measurement data to be collected within 10 seconds and 128 measurements from each of possibly four base stations, or 245.76 kilobytes for all base stations, for a total of approximately 640 signal measurements from the five sources, or 307.2 kilobytes to arrive per mobile station location request in 10 seconds. An input queue storage space is assigned at the moment a location request begins, in order to establish a formatted data structure in persistent store. Depending upon the urgency of the time required to render a location estimate, fewer or more signal measurement samples can be taken and stored in the input queue(s) 7 accordingly.

The signal processing subsystem 1220 supports a variety of wireless network signaling measurement capabilities by detecting the capabilities of the mobile and base station through messaging structures provided by the location application programming interface (L-API 14, FIG. 30). Detection is accomplished in the signal classifier 9 (FIG. 30) by referencing a mobile station database table within the signal processor database 26, which provides, given a mobile station identification number, mobile station revision code, other mobile station characteristics. Similarly, a mobile switch center table 31 provides MSC characteristics and identifications to the signal classifier/filter 9. The signal classifier/filter adds additional message header information that further classifies the measurement data which allows the digital signal processor and image filter components to select the proper internal processing subcomponents to perform operations on the signal measurement data, for use by the location estimate modules.

Regarding service control point messages (of L-API-SCP interface 137, FIG. 4) autonomously received from the input queue 7 (FIGS. 30 and 31), the signal classifier/filter 9 determines, via a signal processing database 26 query, whether such a message is to be associated with a home base station module. Thus appropriate header information is added to the message, thus enabling the message to pass through the digital signal processor 17 unaffected to the output queue 21, and then to the router/distributor 23. The router/distributor 23 then routes the message to the HBS first order model. Those skilled in the art will understand that associating location requests from Home Base Station configurations require substantially less data: the mobile identification number and the associated wireline telephone number transmission from the home location register are on the order of less than 32 bytes. Consequentially the home base station message type could be routed without any digital signal processing.

Output queue(s) 21 (FIG. 30) are required for similar reasons as input queues 7: relatively large amounts of data must be held in a specific format for further location processing by the location estimate modules 1224.

The router and distributor component 23 (FIG. 30) is responsible for directing specific signal measurement data types and structures to their appropriate modules. For example, the HBS FOM has no use for digital filtering structures, whereas the TDOA module would not be able to process an HBS response message.

The controller 15 (FIG. 30) is responsible for staging the movement of data among the signal processing subsystem 1220 components input queue 7, digital signal processor 17, router/distributor 23 and the output queue 21, and to initiate signal measurements within the wireless network, in response from an Internet 468 location request message in FIG. 5, via the location application programming interface.

In addition the controller 15 receives autonomous messages from the MSC, via the location applications programming interface or L-API 14 (FIG. 30) and the input queue 7, whenever a 9-1-1 wireless call is originated. The mobile switch center provides this autonomous notification to the location system as follows: by specifying the appropriate mobile switch center operations and maintenance commands to surveil calls based on certain digits dialed such as 9-1-1, the location applications programming interface 14, in communications with the MSCs, receives an autonomous notification whenever a mobile station user dials 9-1-1. Specifically, a bi-directional authorized communications port is configured, usually at the operations and maintenance subsystem of the MSCs, or with their associated network element manager system(s), with a data circuit, such as a DS-1, with the location applications programming interface 14. Next, the "call trace" capability of the mobile switch center is activated for the respective communications port. The exact implementation of the vendor-specific man-machine or Open Systems Interface (OSI) command(s) and their associated data structures generally vary among MSC vendors, however the trace function is generally available in various forms, and is required in order to comply with Federal Bureau of Investigation authorities for wire tap purposes. After the appropriate surveillance commands are established on the MSC, such 9-1-1 call notifications messages containing the mobile station identification number (MIN) and, in U.S. FCC phase 1 E9-1-1 implementations, a pseudo-automatic number identification (a.k.a. pANI) which provides an association with the primary base station in which the 9-1-1 caller is in communication. In cases where the pANI is known from the onset, the signal processing subsystem 1220 avoids querying the MSC in question to determine the primary base station identification associated with the 9-1-1 mobile station caller.

After the signal processing controller 15 receives the first message type, the autonomous notification message from the mobile switch center 112 to the location system 142, containing the mobile identification number and optionally the primary base station identification, the controller 15 queries the base station table 13 (FIG. 30) in the signal processor database 26 to determine the status and availability of any neighboring base stations, including those base stations of other CMRS in the area. The definition of neighboring base stations include not only those within a provisionable "hop" based on the cell design reuse factor, but also includes, in the case of CDMA, results from remaining set information autonomously queried to mobile stations, with results stored in the base station table. Remaining set information indicates that mobile stations can detect other base station (sector) pilot channels which may exceed the "hop" distance, yet are nevertheless candidate base stations (or sectors) for wireless location purposes. Although cellular and digital cell design may vary, "hop" distance is usually one or two cell coverage areas away from the primary base station's cell coverage area.

Having determined a likely set of base stations which may both detect the mobile station's transmitter signal, as well as to determine the set of likely pilot channels (i.e., base stations and their associated physical antenna sectors) detectable by the mobile station in the area surrounding the primary base station (sector), the controller 15 initiates messages to both the mobile station and appropriate base stations (sectors) to perform signal measurements and to return the results of such measurements to the signal processing system regarding the mobile station to be located. This step may be accomplished via several interface means. In a first case the controller 15 utilizes, for a given MSC, predetermined storage information in the MSC table 31 to determine which type of commands, such as man-machine or OSI commands are needed to request such signal measurements for a given MSC. The controller generates the mobile and base station signal measurement commands appropriate for the MSC and passes the commands via the input queue 7 and the locations application programming interface 14 in FIG. 30, to the appropriate MSC, using the authorized communications port mentioned earlier. In a second case, the controller 15 communicates directly with base stations within having to interface directly with the MSC for signal measurement extraction.

Upon receipt of the signal measurements, the signal classifier 9 in FIG. 30 examines location application programming interface-provided message header information from the source of the location measurement (for example, from a fixed BS 122, a mobile station 140, a distributed antenna system 168 in FIG. 4 or message location data related to a home base station), provided by the location applications programming interface (L-API 14) via the input queue 7 in FIG. 30 and determines whether or not device filters 17 or image filters 19 are needed, and assesses a relative priority in processing, such as an emergency versus a background location task, in terms of grouping like data associated with a given location request. In the case where multiple signal measurement requests are outstanding for various base stations, some of which may be associated with a different CMRS network, and additional signal classifier function includes sorting and associating the appropriate incoming signal measurements together such that the digital signal processor 17 processes related measurements in order to build ensemble data sets. Such ensembles allow for a variety of functions such as averaging, outlier removal over a time period, and related filtering functions, and further prevent association errors from occurring in location estimate processing.

Another function of the signal classifier/low pass filter component 9 is to filter information that is not useable, or information that could introduce noise or the effect of noise in the location estimate modules. Consequently low pass matching filters are used to match the in-common signal processing components to the characteristics of the incoming signals. Low pass filters match: Mobile Station, base station, CMRS and MSC characteristics, as well as to classify Home Base Station messages.

The signal processing subsystem 1220 contains a base station database table 13 (FIG. 30) which captures the maximum number of CDMA delay spread fingers for a given base station.

The base station identification code, or CLLI or common language level identification code is useful in identifying or relating a human-labeled name descriptor to the Base Station. Latitude, Longitude and elevation values are used by other subsystems in the location system for calibration and estimation purposes. As base stations and/or receiver characteristics are added, deleted, or changed with respect to the network used for location purposes, this database table must be modified to reflect the current network configuration.

Just as an upgraded base station may detect additional CDMA delay spread signals, newer or modified mobile stations may detect additional pilot channels or CDMA delay spread fingers. Additionally different makes and models of mobile stations may acquire improved receiver sensitivities, suggesting a greater coverage capability. A table may establish the relationships among various mobile station equipment suppliers and certain technical data relevant to this location invention.

Although not strictly necessary, the MIN can be populated in this table from the PCS Service Provider's Customer Care system during subscriber activation and fulfillment, and could be changed at deactivation, or anytime the end-user changes mobile stations. Alternatively, since the MIN, manufacturer, model number, and software revision level information is available during a telephone call, this information could extracted during the call, and the remaining fields populated dynamically, based on manufacturer's' specifications information previously stored in the signal processing subsystem 1220. Default values are used in cases where the MIN is not found, or where certain information must be estimated.

A low pass mobile station filter, contained within the signal classifier/low pass filter 9 of the signal processing subsystem 1220, uses the above table data to perform the following functions: 1) act as a low pass filter to adjust the nominal assumptions related to the maximum number of CDMA fingers, pilots detectable; and 2) to determine the transmit power class and the receiver thermal noise floor. Given the detected reverse path signal strength, the required value of $SRSS_{MS}$, a corrected indication of the effective path loss in the reverse direction (mobile station to BS), can be calculated based on data contained within the mobile station table 11, stored in the signal processing database 26.

The effects of the maximum number of CDMA fingers allowed and the maximum number of pilot channels allowed essentially form a low pass filter effect, wherein the least common denominator of characteristics are used to filter the incoming RF signal measurements such that a one for one matching occurs. The effect of the transmit power class and receiver thermal noise floor values is to normalize the characteristics of the incoming RF signals with respect to those RF signals used.

The signal classifier/filter 9 (FIG. 30) is in communication with both the input queue 7 and the signal processing database 26. In the early stage of a location request the signal processing subsystem 1220 shown in, e.g., FIGS. 5, 30 and 31, will receive the initiating location request from either an autonomous 911 notification message from a given MSC, or from a location application, for which mobile station characteristics about the target mobile station 140 (FIG. 4) is required. Referring to FIG. 30, a query is made from the signal processing controller 15 to the signal processing database 26, specifically the mobile station table 11, to determine if the mobile station characteristics associated with the MIN to be located is available in table 11. If the data exists then there is no need for the controller 15 to query the wireless network in order to determine the mobile station characteristics, thus avoiding additional real-time processing which would otherwise be required across the air interface, in order to determine the mobile station MIN characteristics. The resulting mobile station information my be provided either via the signal processing database 26 or alternatively a query may be performed directly from the signal processing subsystem 1220 to the MSC in order to determine the mobile station characteristics.

Referring now to FIG. 31, another location application programming interface, L-API-CCS 239 to the appropriate CMRS customer care system provides the mechanism to populate and update the mobile station table 11 within the database 26. The L-API-CCS 239 contains its own set of separate input and output queues or similar implementations and security controls to ensure that provisioning data is not sent to the incorrect CMRS, and that a given CMRS cannot access any other CMRS' data. The interface 1155a to the customer care system for CMRS-A 1150a provides an autonomous or periodic notification and response application layer protocol type, consisting of add, delete, change and verify message functions in order to update the mobile station table 11 within the signal processing database 26, via the controller 15. A similar interface 155b is used to enable provisioning updates to be received from CMRS-B customer care system 1150b.

Although the L-API-CCS application message set may be any protocol type which supports the autonomous notification message with positive acknowledgment type, the T1M1.5 group within the American National Standards Institute has defined a good starting point in which the L-API-CCS 239 could be implemented, using the robust OSI TMN X-interface at the service management layer. The object model defined in Standards proposal number T1M1.5/96-22R9, Operations Administration, Maintenance, and Provisioning (OAM&P)—Model for Interface Across Jurisdictional Boundaries to Support Electronic Access Service Ordering: Inquiry Function, can be extended to support the L-API-CCS information elements as required and further discussed below. Other choices in which the L-API-CCS application message set may be implemented include ASCII, binary, or any encrypted message set encoding using the Internet protocols, such as TCP/IP, simple network management protocol, http, https, and email protocols.

Referring to the digital signal processor (DSP) 17, in communication with the signal classifier/LP filter 9, the DSP 17 provides a time series expansion method to convert non-HBS data from a format of an signal measure data ensemble of time-series based radio frequency data measurements, collected as discrete time-slice samples, to a three dimensional matrix location data value image representation. Other techniques further filter the resultant image in order to furnish a less noisy training and actual data sample to the location estimate modules.

After 128 samples (in one embodiment) of data are collected of the delay spread-relative signal strength RF data measurement sample, mobile station RX for BS-1 are grouped into a quantization matrix, where rows constitute relative signal strength intervals and columns define delay intervals. Each measurement row, column pair (which could be represented as a complex number or Cartesian point pair) is added to their respective values to generate a Z direction of frequency of recurring measurement value pairs or a density recurrence function. By next applying a grid function to each x, y, and z value, a three-dimensional surface grid is generated, which represents a location data value or unique print of that 128-sample measurement.

In the general case where a mobile station is located in an environment with varied clutter patterns, such as terrain undulations, unique man-made structure geometries (thus creating varied multipath signal behaviors), such as a city or suburb, although the first CDMA delay spread finger may be the same value for a fixed distance between the mobile station and BS antennas, as the mobile station moves across such an area, different finger-data are measured. In the right image for the defined BS antenna sector, location classes, or squares numbered one through seven, are shown across a particular range of line of position (LOP).

A traditional TOA/TDOA ranging method between a given BS and mobile station only provides a range along an arc, thus introducing ambiguity error. However a unique three dimensional image can be used in this method to specifically identify, with recurring probability, a particular unique location class along the same Line Of Position, as long as the multipath is unique by position but generally repeatable, thus establishing a method of not only ranging, but also of complete latitude, longitude location estimation in a Cartesian space. In other words, the unique shape of the "mountain image" enables a correspondence to a given unique location class along a line of position, thereby eliminating traditional ambiguity error.

Although man-made external sources of interference, Rayleigh fades, adjacent and co-channel interference, and variable clutter, such as moving traffic introduce unpredictability (thus no "mountain image" would ever be exactly alike), three basic types of filtering methods can be used to reduce matching/comparison error from a training case to a location request case: (1) select only the strongest signals from the forward path (BS to mobile station) and reverse path (mobile station to BS), (2) convolute the forward path 128 sample image with the reverse path 128 sample image, and (3) process all image samples through various digital image filters to discard noise components.

In one embodiment, convolution of forward and reverse images is performed to drive out noise. This is one embodiment that essentially nulls noise completely, even if strong and recurring, as long as that same noise characteristic does not occur in the opposite path.

The third embodiment or technique of processing CDMA delay spread profile images through various digital image filters, provides a resultant "image enhancement" in the sense of providing a more stable pattern recognition paradigm to the neural net location estimate model. For example, image histogram equalization can be used to rearrange the images' intensity values, or density recurrence values, so that the image's cumulative histogram is approximately linear.

Other methods which can be used to compensate for a concentrated histogram include: (1) Input Cropping, (2) Output Cropping and (3) Gamma Correction. Equalization and input cropping can provide particularly striking benefits to a CDMA delay spread profile image. Input cropping removes a large percentage of random signal characteristics that are non-recurring.

Other filters and/or filter combinations can be used to help distinguish between stationary and variable clutter affecting multipath signals. For example, it is desirable to reject multipath fingers associated with variable clutter, since over a period of a few minutes such fingers would not likely recur. Further filtering can be used to remove recurring (at least during the sample period), and possibly strong but narrow "pencils" of RF energy. A narrow pencil image component could be represented by a near perfect reflective surface, such as a nearby metal panel truck stopped at a traffic light.

On the other hand, stationary clutter objects, such as concrete and glass building surfaces, adsorb some radiation before continuing with a reflected ray at some delay. Such stationary clutter-affected CDMA fingers are more likely to pass a 4×4 neighbor Median filter as well as a 40 to 50 percent Input Crop filter, and are thus more suited to neural net pattern recognition. However when subjected to a 4×4 neighbor Median filter and 40 percent clipping, pencil-shaped fingers are deleted. Other combinations include, for example, a 50 percent cropping and 4×4 neighbor median filtering. Other filtering methods include custom linear filtering, adaptive (Weiner) filtering, and custom nonlinear filtering.

The DSP 17 may provide data ensemble results, such as extracting the shortest time delay with a detectable relative signal strength, to the router/distributor 23, or alternatively results may be processed via one or more image filters 19, with subsequent transmission to the router/distributor 23. The router/distributor 23 examines the processed message data from the DSP 17 and stores routing and distribution information in the message header. The router/distributor 23 then forwards the data messages to the output queue 21, for subsequent queuing then transmission to the appropriate location estimator FOMs.

(D) Location Center High Level Functionality

At a very high level the location center 142 computes location estimates for a wireless Mobile Station 140 (denoted the "target MS" or "MS") by performing the following steps:
(23.1) receiving signal transmission characteristics of communications communicated between the target MS 140 and one or more wireless infrastructure base stations 122;
(23.2) filtering the received signal transmission characteristics (by a signal processing subsystem 1220 illustrated in FIG. 5) as needed so that target MS location data can be generated that is uniform and consistent with location data generated from other target MSs 140. In particular, such uniformity and consistency is both in terms of data structures and interpretation of signal characteristic values provided by the MS location data;
(23.3) inputting the generated target MS location data to one or more MS location estimating models (denoted First order models or FOMs, and labeled collectively as 1224 in FIG. 5), so that each such model may use the input target MS location data for generating a "location hypothesis" providing an estimate of the location of the target MS 140;
(23.4) providing the generated location hypotheses to an hypothesis evaluation module (denoted the hypothesis evaluator 1228 in FIG. 5):
  (a) for adjusting at least one of the target MS location estimates of the generated location hypotheses and related confidence values indicating the confidence given to each location estimate, wherein such adjusting uses archival information related to the accuracy of previously generated location hypotheses,
  (b) for evaluating the location hypotheses according to various heuristics related to, for example, the radio coverage area 120 terrain, the laws of physics, characteristics of likely movement of the target MS 140; and
  (c) for determining a most likely location area for the target MS 140, wherein the measurement of confidence associated with each input MS location area estimate is used for determining a "most likely location area"; and
(23.5) outputting a most likely target MS location estimate to one or more applications 146 (FIG. 5) requesting an estimate of the location of the target MS 140.

(E) Location Hypothesis Data Representation

In order to describe how the steps (23.1) through (23.5) are performed in the sections below, some introductory remarks related to the data denoted above as location hypotheses will be helpful. Additionally, it will also be helpful to provide introductory remarks related to historical location data and the data base management programs associated therewith.

For each target MS location estimate generated and utilized by the present invention, the location estimate is provided in a data structure (or object class) denoted as a "location hypothesis" (illustrated in Table LH-1). Although brief descriptions of the data fields for a location hypothesis is provided in the Table LH-1, many fields require additional explanation. Accordingly, location hypothesis data fields are further described as noted below.

TABLE LH-1

| | |
|---|---|
| FOM_ID | First order model ID (providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |

TABLE LH-1-continued

| | |
|---|---|
| valid_area | Boolean indicating the validity of "area est" (one of "pt_est" and "area_est" must be valid). |
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |
| extrapolation_area | Reference to (if non-NULL) an extrapolated MS target estimate area provided by the location extrapolator submodule 1432 of the hypothesis analyzer 1332 (FIGS. 6(2) and 7) . . . That is, this field, if non-NULL, is an extrapolation of the "image_area" field if it exists, otherwise this field is an extrapolation of the "area_est" field. Note other extrapolation fields may also be provided depending on the embodiment of the present disclosure, such as an extrapolation of the "pt_covering". |
| confidence | A real value in the range [−1.0, +1.0] indicating a likelihood that the target MS 140 is in (or out) of a particular area. If positive: if "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". If negative, then "area_est" must be valid and this is a measure of the likelihood that the target MS 140 is NOT in the area represented by "area_est". If it is zero (near zero), then the likelihood is unknown. |
| Original_Timestamp | Date and time that the location signature cluster (defined hereinbelow) for this location hypothesis was received by the signal processing subsystem 1220. |
| Active_Timestamp | Run-time field providing the time to which this location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the first order models by the signal processing subsystem 1220; i.e., access to the "loc sigs" (received at "timestamp" regarding the location of the target MS) |
| descriptor | Original descriptor (from the First order model indicating why/how the Location Area Estimate and Confidence Value were determined). |

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since such confidence values are an important aspect of the present disclosure, much of the description and use of such confidence values are described below; however, a brief description is provided here. Each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 may be interpreted to mean that the target MS 140 is NOT in such a corresponding MS area estimate of the location hypothesis area, (b) 0 may be interpreted to mean that it is unknown as to the likelihood of whether the MS 140 in the corresponding MS area estimate, and (c) +1.0 may be interpreted to mean that the MS 140 is perceived to positively be in the corresponding MS area estimate.

Additionally, note that it is within the scope of the present disclosure that the location hypothesis data structure may also include other related "perception" measurements related to a likelihood of the target MS 140 being in a particular MS location area estimate. For example, it is within the scope of the present disclosure to also utilize measurements such as, (a) "sufficiency factors" for indicating the likelihood that an MS location estimate of a location hypothesis is sufficient for locating the target MS 140; (b) "necessity factors" for indicating the necessity that the target MS be in an particular area estimate. However, to more easily describe the present disclosure, a single confidence field is used.

Additionally, in utilizing location hypotheses in, for example, the location evaluator 1228 as in (23.4) above, it is important to keep in mind that each location hypothesis confidence value is a relative measurement. That is, for confidences, $cf_1$ and $cf_2$, if $cf_1 <= cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, $CS_A$, can be assigned to A, wherein the confidence score for such an area is a function of the confidences (both positive and negative) for all the location hypotheses whose (most pertinent) target MS location estimates contain A. That is, in order to determine a most likely target MS location area estimate for outputting from the location center 142, a confidence score is determined for areas within the location center service area.

More particularly, if a function, "$f$", is a function of the confidence(s) of location hypotheses, and $f$ is a monotonic function in its parameters and $f(cf_1, cf_2, cf_3, \ldots, cf_N) = CS_A$ for confidences $cf_i$ of location hypotheses $H_i$, $i=1, 2, \ldots, N$, with $CS_A$ contained in the area estimate for $H_i$, then "$f$" is denoted a confidence score function. Accordingly, there are many embodiments for a confidence score function $f$ that may be utilized in computing confidence scores with an embodiment of the present disclosure; e.g., $$f(cf_1, cf_2, \ldots, cf_N) = \Sigma cf_i = CS_A; \quad (a)$$

$$f(cf_1, cf_2, \ldots, cf_N) = \Sigma cf_i^n = CS_A, n=1, 3, 5, \ldots; \quad (b)$$

$$f(cf_1, cf_2, \ldots, cf_N) = \Sigma(K_i * cf_i) = CS_A, \quad (c)$$

wherein $K_i$, $i=1, 2, \ldots$ are positive system (tunable) constants (possibly dependent on environmental characteristics such as topography, time, date, traffic, weather, and/or the type of base station(s) 122 from which location signatures with the target MS 140 are being generated, etc.).

For the present description of the invention, the function $f$ as defined in (c) immediately above is utilized. However, for obtaining a general understanding of the present disclosure, the simpler confidence score function of (a) may be more useful. It is important to note, though, that it is within the scope of the present disclosure to use other functions for the confidence score function.

(F) Coverage Area: Area Types And Their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the present disclosure to have a more operational definition of area types that is more closely associated with wireless signal transmission behaviors.

To describe embodiments of the an area type scheme used in an embodiment of the present disclosure, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infrastructure in the area; e.g., the arrangement and signal communication characteristics of the base stations 122 in the area. Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signaling characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The present disclosure provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the present disclosure is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning for radio coverage area into subareas, wherein each subarea is an estimate of an area having included MS 140 locations that are likely to have is at least a minimal amount of similarity in their wireless signaling characteristics. To obtain the partition $P_0$ of the radio coverage area 120, the following steps are performed:

(23.8.4.1) Partition the radio coverage area 120 into subareas, wherein in each subarea is: (a) connected, (b) variations in the lengths of chords sectioning the subarea through the centroid of the subarea are below a predetermined threshold, (c) the subarea has an area below a predetermined value, and (d) for most locations (e.g., within a first or second standard deviation) within the subarea whose wireless signaling characteristics have been verified, it is likely (e.g., within a first or second standard deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or remaining sets of base stations 122 detected by "most" MSs 140 in the subarea. Additionally (or alternatively), a second such collection may be the base stations 122 that are expected to detect MSs 140 at locations within the subarea. Of course, the union or intersection of the first and second collections is also within the scope of the present disclosure for partitioning the radio coverage area 120 according to (d)

above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite imaging. For example, EarthWatch Inc. of Longmont, Colo. can provide geographic with 3 meter resolution from satellite imaging data. Denote the resulting partition here as $P_2$.

(23.8.4.3) Overlay both of the above partitions, $P_1$ and $P_2$, of the radio coverage area 120 to obtain new subareas that are intersections of the subareas from each of the above partitions. This new partition is $P_0$ (i.e., $P_0 = P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(d) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) within A, there are 2 base stations that are expected to be detected by a target MS 140 in A but these base stations can not detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of the present disclosure that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastructure configuration in the radio coverage area 120.

(23.8.4.7) For each $P_0$ subarea, A, of $P_0$ perform the following step(s):

(a) Determine a centroid, C(A), for A;

(b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the present disclosure, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.

(c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are known or expected to generate substantial multipath.

(d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, $P_3$, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Accordingly, in one embodiment of the present invention, whenever the term "area type" is used hereinbelow, transmission area types as described hereinabove are intended.

(G) Location Information Data Bases And Data (G.1) Location Data Bases Introduction It is an aspect of the present disclosure that MS location processing performed by the location center 142 should become increasingly better at locating a target MS 140 both by (a) building an increasingly more detailed model of the signal characteristics of locations in the service area for an embodiment of the present disclosure, and also (b) by providing capabilities for the location center processing to adapt to environmental changes.

One way these aspects of the present disclosure are realized is by providing one or more data base management systems and data bases for:

(a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristics affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location of the MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of the present disclosure to utilize such historical MS signal location data for enhancing the correctness and/or confidence of certain location hypotheses as will be described in detail in other sections below.

(G.2) Data Representations for the Location Signature Data Base

There are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between a target MS 140 at a (possibly verified) presumed substantially stationary location and each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating first order models 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2-5 second interval in one embodiment of the present disclosure), during communication with the MS 140 for obtaining a single instance of loc sig data, although the MS location may or may not be known. Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

(G.2.1) Loc Sig Description

In particular, for each (verified) loc sig includes the following:

(25.1) MS_type: the make and model of the target MS 140 associated with a location signature instantiation; note that the type of MS 140 can also be derived from this entry; e.g., whether MS 140 is a handset MS, car-set MS, or an MS for location only. Note as an aside, for at least CDMA, the type of MS 140 provides information as to the number of fingers that may be measured by the MS, as one skilled in the will appreciate.

(25.2) BS_id: an identification of the base station 122 (or, location base station 152) communicating with the target MS;

(25.3) MS_loc: a representation of a geographic location (e.g., latitude-longitude) or area representing a verified/known MS location where signal characteristics between the associated (location) base station and MS 140 were received. That is, if the "verified_flag" attribute (discussed below) is TRUE, then this attribute includes an estimated location of the target MS. If verified_flag is FALSE, then this attribute has a value indicating "location unknown".

Note "MS_loc" may include the following two subfields: an area within which the target MS is presumed to be, and a point location (e.g., a latitude and longitude pair) where the target MS is presumed to be (in one embodiment this is the centroid of the area);

(25.4) verified_flag: a flag for determining whether the loc sig has been verified; i.e., the value here is TRUE iff a location of MS_loc has been verified, FALSE otherwise. Note, if this field is TRUE (i.e., the loc sig is verified), then the base station identified by BS_id is the current primary base station for the target MS;

(25.5) confidence: a value indicating how consistent this loc sig is with other loc sigs in the location signature data base 1320; the value for this entry is in the range [0, 1] with 0 corresponding to the lowest (i.e., no) confidence and 1 corresponding to the highest confidence. That is, the confidence factor is used for determining how consistent the loc sig is with other "similar" verified loc sigs in the location signature data base 1320, wherein the greater the confidence value, the better the consistency with other loc sigs in the data base. Note that similarity in this context may be operationalized by at least designating a geographic proximity of a loc sig in which to determine if it is similar to other loc sigs in this designated geographic proximity and/or area type (e.g., transmission area type as elsewhere herein). Thus, environmental characteristics may also be used in determining similarities such as: similar time of occurrence (e.g., of day, and/or of month), similar weather (e.g., snowing, raining, etc.). Note, these latter characteristics are different from the notion of geographic proximity since proximity may be only a distance measurement about a location. Note also that a loc sig having a confidence factor value below a predetermined threshold may not be used in evaluating MS location hypotheses generated by the FOMs 1224.

(25.6) timestamp: the time and date the loc sig was received by the associated base station of BS_id;

(25.7) signal topography characteristics: In one embodiment, the signal topography characteristics retained can be represented as characteristics of at least a two-dimensional generated surface. That is, such a surface is generated by the signal processing subsystem 1220 from signal characteristics accumulated over (a relatively short) time interval. For example, in the two-dimensional surface case, the dimensions for the generated surface may be, for example, signal strength and time delay. That is, the accumulations over a brief time interval of signal characteristic measurements between the BS 122 and the MS 140 (associated with the loc sig) may be classified according to the two signal characteristic dimensions (e.g., signal strength and corresponding time delay). That is, by sampling the signal characteristics and classifying the samples according to a mesh of discrete cells or bins, wherein each cell corresponds to a different range of signal strengths and time delays a tally of the number of samples falling in the range of each cell can be maintained. Accordingly, for each cell, its corresponding tally may be interpreted as height of the cell, so that when the heights of all cells are considered, an undulating or mountainous surface is provided. In particular, for a cell mesh of appropriate fineness, the "mountainous surface", is believed to, under most circumstances, provide a contour that is substantially unique to the location of the target MS 140. Note that in one embodiment, the signal samples are typically obtained throughout a predetermined signal sampling time interval of 2-5 seconds as is discussed elsewhere in this specification. In particular, the signal topography characteristics retained for a loc sig include certain topographical characteristics of such a generated mountainous surface. For example, each loc sig may include: for each local maximum (of the loc sig surface) above a predetermined noise_ceiling threshold, the (signal strength, time delay) coordinates of the cell of the local maximum and the corresponding height of the local maximum. Additionally, certain gradients may also be included for characterizing the "steepness" of the surface mountains. Moreover, note that in some embodiments, a frequency may also be associated with each local maximum. Thus, the data retained for each selected local maximum can include a quadruple of signal strength, time delay, height and frequency. Further note that the data types here may vary. However, for simplicity, in parts of the description of loc sig processing related to the signal characteristics here, it is assumed that the signal characteristic topography data structure here is a vector;

(25.8) quality_obj: signal quality (or error) measurements, e.g., Eb/No values, as one skilled in the art will understand;

(25.9) noise_ceiling: noise ceiling values used in the initial filtering of noise from the signal topography characteristics as provided by the signal processing subsystem 1220;

(25.10) power_level: power levels of the base station (e.g., 122 or 152) and MS 140 for the signal measurements;

(25.11) timing_error: an estimated (or maximum) timing error between the present (associated) BS (e.g., an infrastructure base station 122 or a location base station 152) detecting the target MS 140 and the current primary BS 122 for the target MS 140. Note that if the BS 122 associated with the loc sig is the primary base station, then the value here will be zero;

(25.12) cluster_ptr: a pointer to the location signature composite entity to which this loc sig belongs.

(25.13) repeatable: TRUE iff the loc sig is "repeatable" (as described hereinafter), FALSE otherwise. Note that each verified loc sig is designated as either "repeatable" or "random". A loc sig is repeatable if the (verified/known) location associated with the loc sig is such that signal characteristic measurements between the associated BS 122 and this MS can be either replaced at periodic time intervals, or updated substantially on demand by most recent signal characteristic measurements between the associated base station and the associated MS 140 (or a comparable MS) at the verified/known location. Repeatable loc sigs may be, for example, provided by stationary or fixed location MSs 140 (e.g., fixed location transceivers) distributed within certain areas of a geographical region serviced by the location center 142 for providing MS location estimates. That is, it is an aspect of the present disclosure that each such stationary MS 140 can be contacted by the location center 142 (via the base stations of the wireless infrastructure) at substantially any time for providing a new collection (i.e., cluster) of wireless signal characteristics to be associated with the verified location for the transceiver. Alternatively, repeatable loc sigs may be obtained by, for example, obtaining location signal measurements manually from workers who regularly traverse a predetermined route through some portion of the radio coverage area; i.e., postal workers.

A loc sig is random if the loc sig is not repeatable. Random loc sigs are obtained, for example, from verifying a previously unknown target MS location once the MS 140 has been located. Such verifications may be accomplished by, for example, a vehicle having one or more location verifying devices such as a GPS receiver and/or a manual location input capability becoming sufficiently close to the located target MS 140 so that the location of the vehicle may be associated with the wireless signal characteristics of the MS 140. Vehicles having such location detection devices may include: (a) vehicles that travel to locations that are primarily for another purpose than to verify loc sigs, e.g., police cars, ambulances, fire trucks, rescue units, courier services and taxis; and/or (b) vehicles whose primary purpose is to verify loc sigs; e.g., location signal calibration vehicles. Additionally, vehicles having both wireless transceivers and location verifying devices may provide the location center 142 with random loc sigs. Note, a repeatable loc sig may become a random loc sig if an MS 140 at the location associated with the loc sig becomes undetectable such as, for example, when the MS 140 is removed from its verified location and therefore the loc sig for the location can not be readily updated.

Additionally, note that at least in one embodiment of the signal topography characteristics (25.7) above, such a first surface may be generated for the (forward) signals from the base station 122 to the target MS 140 and a second such surface may be generated for (or alternatively, the first surface may be enhanced by increasing its dimensionality with) the signals from the MS 140 to the base station 122 (denoted the reverse signals).

Additionally, in some embodiments the location hypothesis may include an estimated error as a measurement of perceived accuracy in addition to or as a substitute for the confidence field discussed hereinabove. Moreover, location hypotheses may also include a text field for providing a reason for the values of one or more of the location hypothesis fields. For example, this text field may provide a reason as to why the confidence value is low, or provide an indication that the wireless signal measurements used had a low signal to noise ratio.

Loc sigs have the following functions or object methods associated therewith:

(26.1) A "normalization" method for normalizing loc sig data according to the associated MS 140 and/or BS 122 signal processing and generating characteristics. That is, the signal processing subsystem 1220, one embodiment being described in the PCT patent application PCT/US97/15933, titled, "Wireless Location Using A Plurality of Commercial Network Infrastructures," by F. W. LeBlanc and the present inventors, filed Sep. 8, 1997 (which has a U.S. national filing that is now U.S. Pat. No. 6,236,365, filed Jul. 8, 1999, note, both PCT/US97/15933 and U.S. Pat. No. 6,236,365 are incorporated fully by reference herein) provides (methods for loc sig objects) for "normalizing" each loc sig so that variations in signal characteristics resulting from variations in (for example) MS signal processing and generating characteristics of different types of MS's may be deduced In particular, since wireless network designers are typically designing networks for effective use of hand set MS's 140 having a substantially common minimum set of performance characteristics, the normalization methods provided here transform the loc sig data so that it appears as though the loc sig was provided by a common hand set MS 140. However, other methods may also be provided to "normalize" a loc sig so that it may be compared with loc sigs obtained from other types of MS's as well. Note that such normalization techniques include, for example, interpolating and extrapolating according to power levels so that loc sigs may be normalized to the same power level for, e.g., comparison purposes.

Normalization for the BS 122 associated with a loc sig is similar to the normalization for MS signal processing and generating characteristics. Just as with the MS normalization, the signal processing subsystem 1220 provides a loc sig method for "normalizing" loc sigs according to base station signal processing and generating characteristics.

Note, however, loc sigs stored in the location signature data base 1320 are NOT "normalized" according to either MS or BS signal processing and generating characteristics. That is, "raw" values of the wireless signal characteristics are stored with each loc sig in the location signature data base 1320.

(26.2) A method for determining the "area type" corresponding to the signal transmission characteristics of the area(s) between the associated BS 122 and the associated MS 140 location for the loc sig. Note, such an area type may be designated by, for example, the techniques for determining transmission area types as described hereinabove.

(26.3) Other methods are contemplated for determining additional environmental characteristics of the geographical area between the associated BS 122 and the associated MS 140 location for the loc sig; e.g., a noise value indicating the amount of noise likely in such an area.

Referring now to the composite location objects and verified location signature clusters of (24.3) and (24.2) respectively, the following information is contained in these aggregation objects:

(27.1.1) an identification of the BS 122 designated as the primary base station for communicating with the target MS 140;

(27.1.2) a reference to each loc sig in the location signature data base 1320 that is for the same MS location at substantially the same time with the primary BS as identified in (27.1);

(27.1.3) an identification of each base station (e.g., 122 and 152) that can be detected by the MS 140 at the time the location signal measurements are obtained. Note that in one embodiment, each composite location object includes a bit string having a corresponding bit for each base station, wherein a "1" for such a bit indicates that the corresponding base station was identified by the MS, and a "0" indicates that the base station was not identified. In an alternative embodiment, additional location signal measurements may also be included from other non-primary base stations. For example, the target MS 140 may communicate with other base stations than it's primary base station. However, since the timing for the MS 140 is typically derived from it's primary base station and since timing synchronization between base stations is not exact (e.g., in the case of CDMA, timing variations may be plus or minus 1 microsecond) at least some of the location signal measurements may be less reliable that the measurements from the primary base station, unless a forced hand-off technique is used to eliminate system timing errors among relevant base stations;

(27.1.4) a completeness designation that indicates whether any loc sigs for the composite location object have been removed from (or invalidated in) the location signature data base 1320.

Note, a verified composite location object is designated as "incomplete" if a loc sig initially referenced by the verified composite location object is deleted from the location signature data base 1320 (e.g., because of a confidence that is too low). Further note that if all loc sigs for a composite location object are deleted, then the composite object is also deleted from the location signature data base 1320. Also note that common fields between loc sigs referenced by the same composite location object may be provided in the composite location object only (e.g., timestamp, etc.).

Accordingly, a composite location object that is complete (i.e., not incomplete) is a verified location signature cluster as described in (24.2).

(H) Location Center Architecture (H.1) Overview of Location Center/Gateway Functional Components FIG. 5 presents a high level diagram of the location center 142 and the location engine 139 in the context of the infrastructure for the entire location system of the present invention.

It is important to note that the architecture for the location center 142 and the location engine 139 provided by the present disclosure is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

(H.2) Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein. One embodiment of such a subsystem is described in the PCT patent application titled, "Wireless Location Using A Plurality of Commercial Network Infrastructures," by F. W. LeBlanc, Dupray and Karr filed Jan. 22, 1999 and having application Ser. No. 09/230, 109 (now U.S. Pat. No. 6,236,365) which is fully incorporated herein by reference.

(H.3) Initial Location Estimators: First Order Models

A second functional group of location engine 139 modules is for generating various target MS 140 location initial estimates, as described in step (23.3). Accordingly, the modules here use input provided by the signal processing subsystem 1220. This second functional group includes one or more signal analysis modules or models, each hereinafter denoted as a first order model 1224 (FOM), for generating location hypotheses for a target MS 140 to be located. Note that it is intended that each such FOM 1224 use a different technique for determining a location area estimate for the target MS 140. A brief description of some types of first order models is provided immediately below. Note that FIG. 8 illustrates another, more detailed view of the location system for the present invention. In particular, this figure illustrates some of the FOMs 1224 contemplated by the present invention, and additionally illustrates the primary communications with other modules of the location system for the present invention. However, it is important to note that the present invention is not limited to the FOMs 1224 shown and discussed herein. That is, it is a primary aspect of the present invention to easily incorporate FOMs using other signal processing and/or computational location estimating techniques than those presented herein. Further, note that each FOM type may have a plurality of its models incorporated into an embodiment of the present invention.

(H.3.1) TDOA, TOA, AOA FOMs

For example, (as will be described in further detail below), one such type of model or FOM 1224 (hereinafter models of this type are referred to as "distance models") may be based on a range or distance computation and/or on a base station signal reception angle determination between the target MS 140 from each of one or more base stations. Basically, such distance models 1224 determine a location estimate of the target MS 140 by determining a distance offset from each of one or more base stations 122, possibly in a particular direction from each (some of) the base stations, so that an intersection of each area locus defined by the base station offsets may provide an estimate of the location of the target MS. Distance model FOMs 1224 may compute such offsets based on:

(a) signal timing measurements between the target mobile station 140 and one or more base stations 122; e.g., timing measurements such as time difference of arrival (TDOA), or time of arrival (TOA). Note that both forward and reverse signal path timing measurements may be utilized;

(b) signal strength measurements (e.g., relative to power control settings of the MS 140 and/or one or more BS 122); and/or (c) signal angle of arrival measurements, or ranges thereof, at one or more base stations 122 (such angles and/or angular ranges provided by, e.g., base station antenna sectors having angular ranges of 120° or 60°, or, so called "SMART antennas" with variable angular transmission ranges of 2° to 120°).

Accordingly, a distance model may utilize triangulation or trilateration to compute a location hypothesis having either an area location or a point location for an estimate of the target MS 140. Additionally, in some embodiments location hypothesis may include an estimated error.

In one embodiment, such a distance model may perform the following steps:

(a) Determines a minimum distance between the target MS and each BS using TOA, TDOA, signal strength on both forward and reverse paths;

(b) Generates an estimated error;

(c) Outputs a location hypothesis for estimating a location of a MS: each such hypothesis having: (a) one or more (nested) location area estimates for the MS, each location estimate having a confidence value (e.g., provided using the estimated error) indicating a perceived accuracy, and (b) a reason for both the location estimate (e.g., substantial multipath, etc) and the confidence.

(H.3.2) Statistically Based First Order Model

Another type of FOM 1224 is a statistically based first order model 1224, wherein a statistical technique, such as regression techniques (e.g., least squares, partial least squares, principle decomposition), or e.g., Bollenger Bands (e.g., for computing minimum and maximum base station offsets). In general, models of this type output location hypotheses that are determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model."

In one embodiment, such a stochastic signal model may output location hypotheses determined by one or more statistical comparisons with loc sigs in the Location Signature database 1320 (e.g., comparing MS location signals with verified signal characteristics for predetermined geographical areas).

(H.3.3) Adaptive and/or Learning First Order Model

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location. Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

In one embodiment, an adaptive learning model such as a model based on an artificial neural network may determine an MS 140 location estimate using base station IDs, data on signal-to-noise, other signal data (e.g., a number of signal characteristics including, e.g., all CDMA fingers). Moreover, the output from such a model may include: a latitude and longitude for a center of a circle having radius R (R may be an input to such an artificial neural network), and is in the output format of the distance model(s).

(H.3.4) Location Base Station (LBS) First Order Model

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastructure coverage for providing a desired level of MS 140 location accuracy. For example, it may uneconomical to provide high traffic wireless voice coverage of a typical wireless base station 122 in a nature preserve or at a fair ground that is only populated a few days out of the year. However, if such low cost location base stations 152 can be directed to activate and deactivate via the direction of a FOM 1224 of the present type, then these location base stations can be used to both locate a target MS 140 and also provide indications of where the target MS is not. For example, if there are location base stations 152 populating an area where the target MS 140 is presumed to be, then by activating these location base stations 152, evidence may be obtained as to whether or not the target MS is actually in the area; e.g., if the target MS 140 is detected by a location base station 152, then a corresponding location hypothesis having a location estimate corresponding to the coverage area of the location base station may have a very high confidence value. Alternatively, if the target MS 140 is not detected by a location base station 152, then a corresponding location hypothesis having a location estimate corresponding to the coverage area of the location base station may have a very low confidence value. Models of this type are referred to hereinafter as "location base station models."

In one embodiment, such a location base station model may perform the following steps:
  (a) If an input is received then the target MS 140 is detected by a location base station 152 (i.e., a LBS being a unit having a reduced power BS and a MS).
  (b) If an input is obtained, then the output is a hypothesis data structure having a small area of the highest confidence.
  (c) If no input is received from a LBS then a hypothesis having an area with highest negative confidence is output.

(H.3.5) Mobile Base Station First Order Model

Yet another type of FOM 1224 can be based on input from a mobile base station 148, wherein location hypotheses may be generated from target MS 140 location data received from the mobile base station 148. In one embodiment, such a mobile base station model may provide output similar to the distance FOM 1224 described hereinabove.

(H.3.6) Signal Pattern Recognition First Order Model

Still other types of FOM 1224 can be based on various techniques for recognizing wireless signal measurement patterns and associating particular patterns with locations in the coverage area 120. For example, artificial neural networks or other learning models can be used as the basis for various FOMs.

Note that the FOM types mentioned here as well as other FOM types are discussed in detail hereinbelow. Moreover, it is important to keep in mind that a novel aspect of the present invention is the simultaneous use or activation of a potentially large number of such first order models 1224, wherein such FOMs are not limited to those described herein. Thus, the present invention provides a framework for incorporating MS location estimators to be subsequently provided as new FOMs in a straightforward manner. For example, a FOM 1224 based on wireless signal time delay measurements from a distributed antenna system 168 for wireless communication may be incorporated into the present invention for locating a target MS 140 in an enclosed area serviced by the distributed antenna system (such a FOM is more fully described in the U.S. Pat. No. 6,236,365 filed Jul. 8, 1999 which is incorporated fully by reference herein). Accordingly, by using such a distributed antenna FOM 1224 (FIG. 8(1)), an embodiment of the present disclosure may determine the floor of a multi-story building from which a target MS is transmitting. Thus, MSs 140 can be located in three dimensions using such a distributed antenna FOM 1224.

In one embodiment, such a distributed antenna model may perform the following steps:
  (a) Receives input only from a distributed antenna system.
  (b) If an input is received, then the output is a lat-long and height of highest confidence.

Additionally, FOMs 1224 for detecting certain registration changes within, for example, a public switched telephone network 124 can also be used for locating a target MS 140. For example, for some MSs 140 there may be an associated or dedicated device for each such MS that allows the MS to function as a cordless phone to a line based telephone network when the device detects that the MS is within signaling range. In one use of such a device (also denoted herein as a "home base station"), the device registers with a home location register of the public switched telephone network 124 when there is a status change such as from not detecting the corresponding MS to detecting the MS, or visa versa, as one skilled in the art will understand. Accordingly, by providing a FOM 1224 (denoted the "Home Base Station First Order Model" in FIG. 8(1)) that accesses the MS status in the home location register, the location engine 139 can determine whether the MS is within signaling range of the home base station or not, and generate location hypotheses accordingly.

In one embodiment, such a home base station model may perform the following steps:
  (a) Receives an input only from the Public Telephone Switching Network.
  (b) If an input is received then the target MS 140 is detected by a home base station associated with the target MS.
  (c) If an input is obtained, then the output is a hypothesis data structure having a small area of the highest confidence.
  (d) If no input and there is a home base station then a hypothesis having a negative area is of highest confidence is output.

Moreover, other FOMs based on, for example, chaos theory and/or fractal theory are also within the scope of the present invention.

It is important to note the following aspects of the present invention relating to FOMs 1224:

(28.1) Each such first order model 1224 may be relatively easily incorporated into and/or removed from an embodiment of the present disclosure. For example, assuming that the signal processing subsystem 1220 provides uniform input interface to the FOMs, and there is a uniform FOM output interface (e.g., an API), it is believed that a large majority (if not substantially all) viable MS location estimation strategies may be accommodated. Thus, it is straightforward to add or delete such FOMs 1224.

(28.2) First order models 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, embodiments of the present disclosure may be modular and extensible such that, for example, (and importantly) different first order models 1224 may be utilized depending on the signal transmission characteristics of the geographic region serviced by an embodiment of the present disclosure. Thus, a simple configuration of an embodiment of the present disclosure may have (or access) a small number of FOMs 1224 for a simple wireless signal environment (e.g., flat terrain, no urban canyons and low population density). Alternatively, for complex wireless signal environments such as in cities like San Francisco, Tokyo or New York, a large number of FOMs 1224 may be simultaneously utilized for generating MS location hypotheses.

(H.4) An Introduction to an Evaluator for Location Hypotheses: Hypothesis Evaluator A third functional group of location engine 139 modules evaluates location hypotheses output by the first order models 1224 and thereby provides a "most likely" target MS location estimate. The modules for this functional group are collectively denoted the hypothesis evaluator 1228.

(H.4.1) Hypothesis Evaluator Introduction

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the present disclosure. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty; i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis can be increased (decreased), and/or (ii) the MS location area estimate can be decreased (increased).

In a first class of embodiments, the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Accordingly, the MS location area estimates are not substantially modified. Alternatively, in a second class of embodiments for the hypothesis evaluator 1228, MS location area estimates can be adjusted while confidence values remain substantially fixed. Of course, hybrids between the first two embodiments can also be provided. Note that the present embodiment provided herein adjusts both the areas and the confidence values.

More particularly, the hypothesis evaluator 1228 may perform any or most of the following tasks:

(30.1) it utilizes environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.2) it enhances the accuracy of an initial location hypothesis generated by a FOM by using the initial location hypothesis as, essentially, a query or index into the location signature data base 1320 for obtaining a corresponding enhanced location hypothesis, wherein the enhanced location hypothesis has both an adjusted target MS location area estimate and an adjusted confidence based on past performance of the FOM in the location service surrounding the target MS location estimate of the initial location hypothesis;

(30.3) it determines how well the associated signal characteristics used for locating a target MS compare with particular verified loc sigs stored in the location signature data base 1320 (see the location signature data base section for further discussion regarding this aspect of the invention). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 determines if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:
(a2) moving at an appropriate velocity for the area being traversed, or
(b2) moving along an established path (e.g., a freeway), then the confidence in the current location hypothesis may be increased.

(30.5) the hypothesis evaluator 1228 determines consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different wireless signaling area types. Additionally, this module may generate location hypotheses indicating areas of poor reception; and (30.7) the hypothesis evaluator 1228 determines and outputs a most likely location hypothesis for a target MS.

Note that the hypothesis evaluator may accomplish the above tasks, (30.1)-(30.7), by employing various data processing tools including, but not limited to, fuzzy mathematics, genetic algorithms, neural networks, expert systems and/or blackboard systems.

Figure 7:
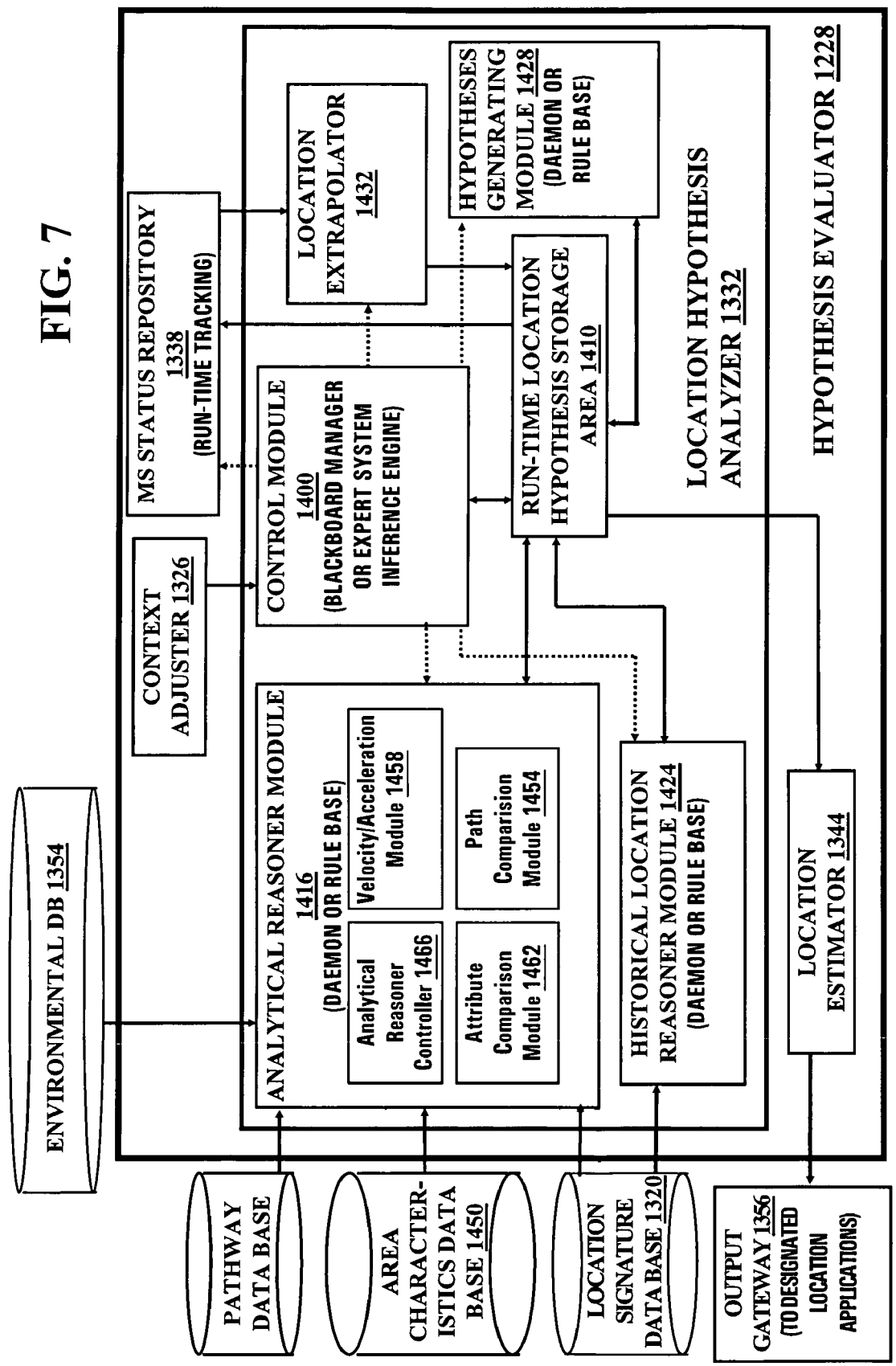
FIG. 7 is a high level block diagram of the hypothesis evaluator for the location center.

Additionally note that, as can be seen in FIGS. 6 and 7, the hypothesis evaluator 1228 includes the following four high level modules for processing output location hypotheses from the first order models 1224: a context adjuster 1326, a hypothesis analyzer 1332, an MS status repository 1338 and a most likelihood estimator 1334. These four modules are briefly described hereinbelow.

(H.4.1.1) Context Adjuster Introduction.

The context adjuster 1326 module enhances both the comparability and predictability of the location hypotheses output by the first order models 1224. In particular, this module modifies location hypotheses received from the FOMs 1224 so that the resulting location hypotheses output by the context adjuster 1326 may be further processed uniformly and substantially without concern as to differences in accuracy between the first order models from which location hypotheses originate. In providing this capability, the context adjuster 1326 may adjust or modify various fields of the input location hypotheses. In particular, fields giving target MS 140 location estimates and/or confidence values for such estimates may be modified by the context adjuster 1326. Further, this module may determine those factors that are perceived to impact the perceived accuracy (e.g., confidence) of the location hypotheses: (a) differently between FOMs, and/or (b) with substantial effect. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.). A detailed description of one embodiment of this module is provided in APPENDIX D hereinbelow. Note that, the embodiment described herein is simplified for illustration purposes such that only the geographical area categorizations are utilized in adjusting (i.e., modifying) location hypotheses. But, it is an important aspect of the present disclosure that various categorizations, such as those mentioned immediately above, may be used for adjusting the location hypotheses. That is, categories such as, for example:
(a) urban, hilly, high traffic at 5 pm, or
(b) rural, flat, heavy tree foliage density in summer may be utilized as one skilled in the art will understand from the descriptions contained hereinbelow.

Accordingly, the present disclosure is not limited to the factors explicitly mentioned here. That is, it is an aspect of the present disclosure to be extensible so that other environmental factors of the coverage area 120 affecting the accuracy of location hypotheses may also be incorporated into the context adjuster 1326.

It is also an aspect of the context adjuster 1326 that the methods for adjusting location hypotheses provided in this module may be generalized and thereby also utilized with multiple hypothesis computational architectures related to various applications wherein a terrain, surface, volume or other "geometric" interpretation (e.g., a metric space of statistical samples) may be placed on a large body of stored application data for relating hypothesized data to verified data. Moreover, it is important to note that various techniques for "visualizing data" may provide such a geometric interpretation. Thus, the methods herein may be utilized in applications such as: sonar, radar, x-ray or infrared identification of objects such as occurs in robotic navigation, medical image analysis, geological, and radar imaging.

More generally, the novel computational paradigm of the context adjuster 1326 may be utilized in a number of applications wherein there is a large body of archived information providing verified or actual application process data related to the past performance of the application process.

It is worth mentioning that the computational paradigm used in the context adjuster 1326 is a hybrid of a hypothesis adjuster and a data base query mechanism. For example, the context adjuster 1326 uses an input (location) hypothesis both as an hypothesis and as a data base query or index into the location signature data base 1320 for constructing a related but more accurate location hypothesis. Accordingly, substantial advantages are provided by this hybrid architecture, such as the following two advantages.

As a first advantage, the context adjuster 1326 reduces the likelihood that a feedback mechanism is necessary to the initial hypothesis generators (i.e., FOMs 1224) for periodically adjusting default evaluations of the goodness or confidence in the hypotheses generated. That is, since each hypothesis generated is, in effect, an index into a data base or archive of verified application (e.g., location) data, the context adjuster 1326, in turn, generates new corresponding hypotheses based on the actual or verified data retrieved from an archival data base. Thus, as a result, this architecture tends to separate the computations of the initial hypothesis generators (e.g., the FOMs 1224 in the present MS location application) from any further processing and thereby provide a more modular, maintainable and flexible computational system.

As a second advantage, the context adjuster 1326 tends to create hypotheses that are more accurate than the hypotheses generated by the initial hypotheses generators. That is, for each hypothesis, H, provided by one of the initial hypothesis generators, G (e.g., a FOM 1224), a corresponding enhanced hypothesis, provided by the context adjuster 1326, is generated by mapping the past performance of G into the archived verified application data (as will be discussed in detail hereinbelow). In particular, the context adjuster hypothesis generation is based on the archived verified (or known) performance application data that is related to both G and H. For example, in the present wireless location application, if a FOM 1224, G, substantially consistently generates, in a particular geographical area, location hypotheses that are biased approximately 1000 feet north of the actual verified MS 140 location, then the context adjuster 1326 can generate corresponding hypotheses without this bias. Thus, the context adjuster 1326 tends to filter out inaccuracies in the initially generated hypotheses.

Therefore in a multiple hypothesis architecture where typically the generated hypotheses may be evaluated and/or combined for providing a "most likely" result, it is believed that a plurality of relatively simple (and possibly inexact) initial hypothesis generators may be used in conjunction with the hybrid computational paradigm represented by the context adjuster 1326 for providing enhanced hypotheses with substantially greater accuracy.

Additionally, note that this hybrid paradigm applies to other domains that are not geographically based. For instance, this hybrid paradigm applies to many prediction and/or diagnostic applications for which:

(a) the application data and the application are dependent on a number of parameters whose values characterize the range of outputs for the application. That is, there is a set of parameters, $p_1, p_2, p_3, \ldots, p_N$ from which a parameter space $p_1 \times p_2 \times p_3 \times \ldots \times p_N$ is derived whose points characterize the actual and estimated (or predicted) outcomes. As examples, in the MS location system, $p_1$=latitude and $p_2$=longitude;

(b) there is historical data from which points for the parameter space, $p_1 \times p_2 \times p_3 \times \ldots \times p_N$ can be obtained, wherein this data relates to (or indicates) the performance of the application, and the points obtained from this data are relatively dense in the space (at least around the likely future actual outcomes that the application is expected to predict or diagnose). For example, such historical data may associate the predicted outcomes of the application with corresponding actual outcomes;

(c) there is a metric or distance-like evaluation function that can be applied to the parameter space for indicating relative closeness or accuracy of points in the parameter space, wherein the evaluation function provides a measurement of closeness that is related to the actual performance of the application.

Note that there are numerous applications for which the above criteria are applicable. For instance, computer aided control of chemical processing plants are likely to satisfy the above criteria. Certain robotic applications may also satisfy this criteria. In fact, it is believed that a wide range of signal processing applications satisfy this criteria.

(H.4.1.2) MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous location engine 139 activations to determine, for example, a movement of the target MS 140 between evaluations of the target MS location.

(H.4.1.3) Location Hypothesis Analyzer Introduction.

The location hypothesis analyzer 1332, adjusts confidence values of the location hypotheses, according to:

(a) heuristics and/or statistical methods related to how well the signal characteristics for the generated target MS location hypothesis matches with previously obtained signal characteristics for verified MS locations.

(b) heuristics related to how consistent the location hypothesis is with physical laws, and/or highly probable reasonableness conditions relating to the location of the target MS and its movement characteristics. For example, such heuristics may utilize knowledge of the geographical terrain in which the MS is estimated to be, and/or, for instance, the MS velocity, acceleration or extrapolation of an MS position, velocity, or acceleration.

(c) generation of additional location hypotheses whose MS locations are consistent with, for example, previous estimated locations for the target MS.

As shown in FIGS. 6 and 7, the hypothesis analyzer 1332 module receives (potentially) modified location hypotheses from the context adjuster 1326 and performs additional location hypothesis processing that is likely to be common and generic in analyzing most location hypotheses. More specifically, the hypothesis analyzer 1332 may adjust either or both of the target MS 140 estimated location and/or the confidence of a location hypothesis. In brief, the hypothesis analyzer 1332 receives target MS 140 location hypotheses from the context analyzer 1336, and depending on the time stamps of newly received location hypotheses and any previous (i.e., older) target MS location hypotheses that may still be currently available to the hypothesis analyzer 1332, the hypothesis analyzer may:

(a) update some of the older hypotheses by an extrapolation module, (b) utilize some of the old hypotheses as previous target MS estimates for use in tracking the target MS 140, and/or (c) if sufficiently old, then delete the older location hypotheses.

Note that both the newly received location hypotheses and the previous location hypotheses that are updated (i.e., extrapolated) and still remain in the hypothesis analyzer 1332 will be denoted as "current location hypotheses" or "currently active location hypotheses".

The modules within the location hypothesis analyzer 1332 use various types of application specific knowledge likely substantially independent from the computations by the FOMs 1224 when providing the corresponding original location hypotheses. That is, since it is an aspect of at least one embodiment of the present disclosure that the FOMs 1224 be relatively straightforward so that they may be easily to modified as well as added or deleted, the processing, for example, in the hypothesis analyzer 1332 (as with the context adjuster 1326) is intended to compensate, when necessary, for this straightforwardness by providing substantially generic MS location processing capabilities that can require a greater breadth of application understanding related to wireless signal characteristics of the coverage area 120.

Accordingly, the hypothesis analyzer 1332 may apply various heuristics that, for example, change the confidence in a location hypothesis depending on how well the location hypothesis (and/or a series of location hypotheses from e.g., the same FOM 1224): (a) conforms with the laws of physics, (b) conforms with known characteristics of location signature clusters in an area of the location hypothesis MS 140 estimate, and (c) conforms with highly likely heuristic constraint knowledge. In particular, as illustrated best in FIG. 7, the location hypothesis analyzer 1332 may utilize at least one of a blackboard system and/or an expert system for applying various application specific heuristics to the location hypotheses output by the context adjuster 1326. More precisely, the location hypothesis analyzer 1332 includes, in one embodiment, a blackboard manager for managing processes and data of a blackboard system. Additionally, note that in a second embodiment, where an expert system is utilized instead of a blackboard system, the location hypothesis analyzer provides an expert system inference engine for the expert system. Note that additional detail on these aspects of the invention are provided hereinbelow.

Additionally, note that the hypothesis analyzer 1332 may activate one or more extrapolation procedures to extrapolate target MS 140 location hypotheses already processed. Thus, when one or more new location hypotheses are supplied (by the context adjuster 1224) having a substantially more recent timestamp, the hypothesis analyzer may invoke an extrapolation module (i.e., location extrapolator 1432, FIG. 7) for adjusting any previous location hypotheses for the same target MS 140 that are still being used by the location hypothesis analyzer so that all target MS location hypotheses (for the same target MS) being concurrently analyzed are presumed to be for substantially the same time. Accordingly, such a previous location hypothesis that is, for example, 15 seconds older than a newly supplied location hypothesis (from perhaps a different FOM 1224) may have both: (a) an MS location estimate changed (e.g., to account for a movement of the target MS), and (b) its confidence changed (e.g., to reflect a reduced confidence in the accuracy of the location hypothesis).

It is important to note that the architecture of the present disclosure is such that the hypothesis analyzer 1332 has an extensible architecture. That is, additional location hypothesis analysis modules may be easily integrated into the hypothesis analyzer 1332 as further understanding regarding the behavior of wireless signals within the service area 120 becomes available. Conversely, some analysis modules may not be required in areas having relatively predictable signal patterns. Thus, in such service areas, such unnecessary modules may be easily removed or not even developed.

(H.4.1.4) Most Likelihood Estimator Introduction

The most likelihood estimator 1344 is a module for determining a "most likely" location estimate for a target MS being located by the location engine 139. The most likelihood estimator 1344 receives a collection of active or relevant location hypotheses from the hypothesis analyzer 1332 and uses these location hypotheses to determine one or more most likely estimates for the target MS 140.

Still referring to the hypothesis evaluator 1228, it is important to note that not all the above mentioned modules are required in all embodiments of the present disclosure. In particular, for some coverage areas 120, the hypothesis analyzer 1332 may be unnecessary. Accordingly, in such an embodiment, the enhanced location hypotheses output by the context adjuster 1326 are provided directly to the most likelihood estimator 1344.

(H.5) Control and Output Gating Modules

A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

(a) controls and monitors location estimating processing for each target MS 140. Note that this includes high level exception or error handling functions;

(b) receives and routes external information as necessary. For instance, this subsystem may receive (via, e.g., the public telephone switching network 124 and Internet 468) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet 468);

(d) performs accounting and billing procedures;

(e) interacts with location center operators by, for example, receiving operator commands and providing output indicative of processing resources being utilized and malfunctions;

(f) provides access to output requirements for various applications requesting location estimates. For example, an Internet 468 location request from a trucking company in Los Angeles to a location center 142 in Denver may only want to know if a particular truck or driver is within the Denver area. Alternatively, a local medical rescue unit is likely to request as precise a location estimate as possible.

Note that in FIG. 6, (a)-(f) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided according to a particular protocol.

(H.6) System Tuning and Adaptation: The Adaptation Engine

A fifth functional group of location engine 139 modules provides the ability to enhance the MS locating reliability and/or accuracy by providing it with the capability to adapt to particular operating configurations, operating conditions and wireless signaling environments without performing intensive manual analysis of the performance of various embodiments of the location engine 139. That is, this functional group automatically enhances the performance of the location engine for locating MSs 140 within a particular coverage area 120 using at least one wireless network infrastructure therein. More precisely, this functional group allows embodiments of the present disclosure to adapt by tuning or optimizing certain system parameters according to location engine 139 location estimate accuracy and reliability.

There are a number location engine 139 system parameters whose values affect location estimation, and it is an aspect of the present disclosure that the MS location processing performed should become increasingly better at locating a target MS 140 not only through building an increasingly more detailed model of the signal characteristics of location in the coverage area 120 such as discussed above regarding the location signature data base 1320, but also by providing automated capabilities for the location center processing to adapt by adjusting or "tuning" the values of such location center system parameters.

Accordingly, the present disclosure includes a module, denoted herein as an "adaptation engine" 1382, that performs an optimization procedure on the location center 142 system parameters either periodically or concurrently with the operation of the location center in estimating MS locations. That is, the adaptation engine 1382 directs the modifications of the system parameters so that the location engine 139 increases in overall accuracy in locating target MSs 140. In one embodiment, the adaptation engine 1382 includes an embodiment of a genetic algorithm as the mechanism for modifying the system parameters. Genetic algorithms are basically search algorithms based on the mechanics of natural genetics. The genetic algorithm utilized herein is included in the form of pseudo code in APPENDIX B. Note that to apply this genetic algorithm in the context of the location engine 139 architecture only a "coding scheme" and a "fitness function" are required as one skilled in the art will appreciate. Moreover, it is also within the scope of the present disclosure to use modified or different adaptive and/or tuning mechanisms. For further information regarding such adaptive mechanisms, the following references are incorporated herein by reference: Goldberg, D. E. (1989), "Genetic algorithms for search, optimization, and machine learning", Reading, Mass.: Addison-Wesley Publishing Company; and Holland, J. H. (1975) "Adaptation in natural and artificial systems", Ann Arbor, Mich.: The University of Michigan Press.

(I) Implementations of First Order Models

Further descriptions of various first order models 1224 are provided in this section.

(I.1) Distance First Order Models (e.g., TOA/TDOA/AOA)

As discussed in the Location Center Architecture Overview section herein above, distance models determine a presumed direction and/or distance that a target MS 140 is from one or more base stations 122. In some embodiments of distance models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA),
(b) signal strength measurements, and/or
(c) signal angle of arrival measurements.

Furthermore, such signal analysis techniques are likely predicated on certain very general assumptions that can not fully account for signal attenuation and multipath due to a particular radio coverage area topography.

Taking a CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristic measurements (e.g., TOA and/or TDOA measurements) between the target MS 140 and the base stations in one or more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration or the time difference multilateration algorithms along with the known positions of the corresponding base stations 122 to thereby obtain one or more location estimates of the target MS 140. For example, if there are four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates for the location of the target MS 140. Further, since such measurements and BS 122 positions can be sent either to the network or the target MS 140, location can be determined in either entity.

Since many of the signal measurements utilized by embodiments of distance models are subject to signal attenuation and multipath due to a particular area topography. Many of the sets of base stations from which target MS location estimates are desired may result in either no location estimate, or an inaccurate location estimate.

Accordingly, some embodiments of distance FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying by filtering can be performed by, for example, an expert system residing in the distance FOM.

A second approach for mitigating such ambiguity or conflicting MS location estimates is particularly novel in that each of the target MS location estimates is used to generate a location hypothesis regardless of its apparent accuracy. Accordingly, these location hypotheses are input to an alternative embodiment of the context adjuster 1326 that is substantially (but not identical to) the context adjuster as described in detail in APPENDIX D so that each location hypothesis may be adjusted to enhance its accuracy. In contradistinction to the embodiment of the context adjuster 1326 of APPENDIX D, where each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypotheses generated by a distance first order model according to a past performance of the model as applied to signal characteristic measurements from the same set of base stations 122 as were used in generating the location hypothesis. That is, instead of only using only an identification of the distance model (i.e., its FOM_ID) to, for example, retrieve archived location estimates generated by the model in an area of the location hypothesis' estimate (when determining the model's past performance), the retrieval retrieves only the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

(I.2) Coverage Area First Order Model

Figure 15:
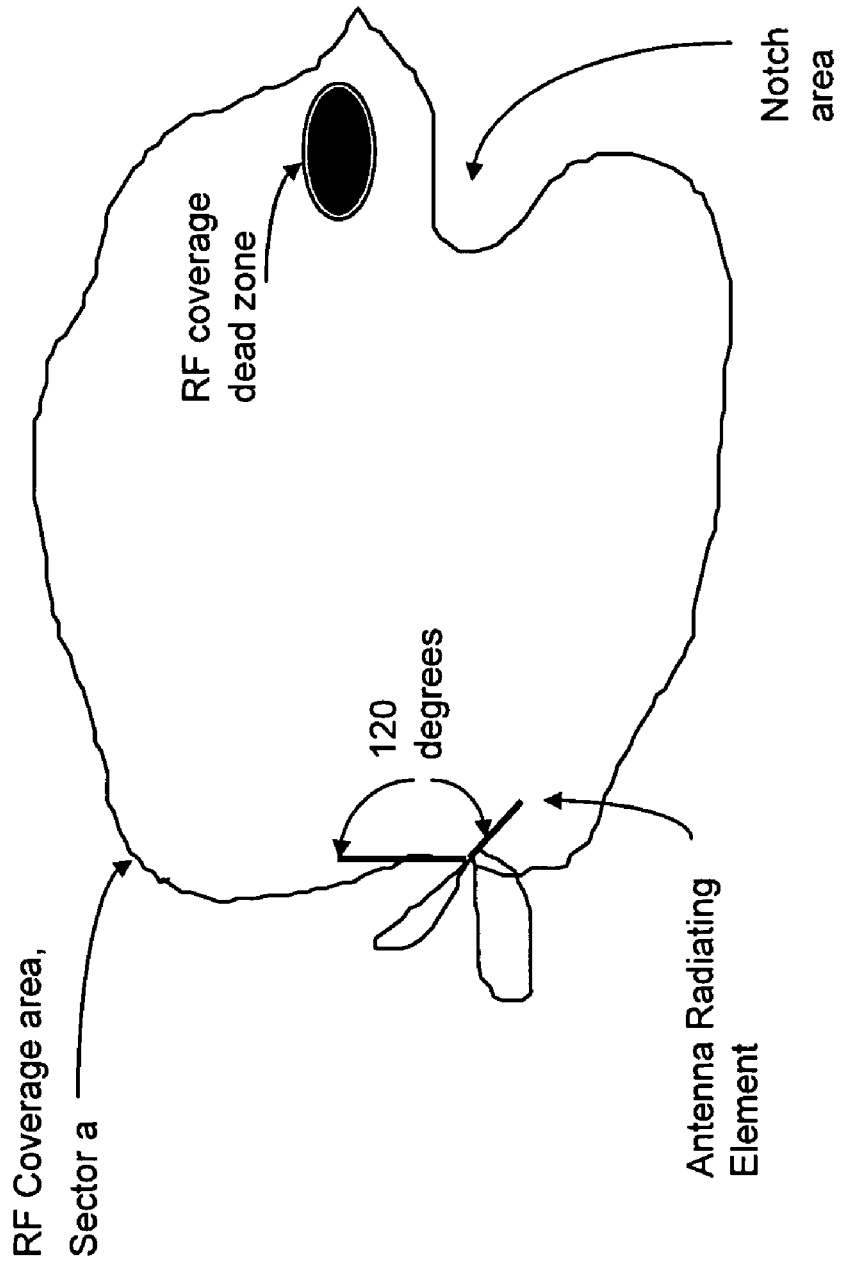
FIG. 15 illustrates the nature of RF "Dead Zones", notch area, and the importance of including location data signatures from the back side of radiating elements.

Radio coverage area of individual base stations 122 may be used to generate location estimates of the target MS 140. Although a first order model 1224 based on this notion may be less accurate than other techniques, if a reasonably accurate RF coverage area is known for each (or most) of the base stations 122, then such a FOM (denoted hereinafter as a "coverage area first order model" or simply "coverage area model") may be very reliable. To determine approximate maximum radio frequency (RF) location coverage areas, with respect to BSs 122, antennas and/or sector coverage areas, for a given class (or classes) of (e.g., CDMA or TDMA) mobile station(s) 140, location coverage should be based on an MS's ability to adequately detect the pilot channel, as opposed to adequate signal quality for purposes of carrying user-acceptable traffic in the voice channel. Note that more energy is necessary for traffic channel activity (typically on the order of at least −94 to −104 dBm received signal strength) to support voice, than energy needed to simply detect a pilot channel's presence for location purposes (typically a maximum weakest signal strength range of between −104 to −110 dBm), thus the "Location Coverage Area" will generally be a larger area than that of a typical "Voice Coverage Area", although industry studies have found some occurrences of "no-coverage" areas within a larger covered area. An example of a coverage area including both a "dead zone", i.e., area of no coverage, and a "notch" (of also no coverage) is shown in FIG. 15.

The approximate maximum RF coverage area for a given sector of (more generally angular range about) a base station 122 may be represented as a set of points representing a polygonal area (potentially with, e.g., holes therein to account for dead zones and/or notches). Note that if such polygonal RF coverage area representations can be reliably determined and maintained over time (for one or more BS signal power level settings), then such representations can be used in providing a set theoretic or Venn diagram approach to estimating the location of a target MS 140. Coverage area first order models utilize such an approach.

In one embodiment, a coverage area model utilizes both the detection and non-detection of base stations 122 by the target MS 140 (conversely, of the MS by one or more base stations 122) to define an area where the target MS 140 may likely be. A relatively straightforward application of this technique is to:
- (a) find all areas of intersection for base station RF coverage area representations, wherein: (i) the corresponding base stations are on-line for communicating with MSs 140; (ii) the RF coverage area representations are deemed reliable for the power levels of the on-line base stations; (iii) the on-line base stations having reliable coverage area representations can be detected by the target MS; and (iv) each intersection must include a predetermined number of the reliable RF coverage area representations (e.g., 2 or 3); and
- (b) obtain new location estimates by subtracting from each of the areas of intersection any of the reliable RF coverage area representations for base stations 122 that can not be detected by the target MS.

Accordingly, the new areas may be used to generate location hypotheses.

(I.5) Location Base Station First Order Model

In the location base station (LBS) model (FOM 1224), a database is accessed which contains electrical, radio propagation and coverage area characteristics of each of the location base stations in the radio coverage area. The LBS model is an active model, in that it can probe or excite one or more particular LBSs 152 in an area for which the target MS 140 to be located is suspected to be placed. Accordingly, the LBS model may receive as input a most likely target MS 140 location estimate previously output by the location engine 139 of the present disclosure, and use this location estimate to determine which (if any) LBSs 152 to activate and/or deactivate for enhancing a subsequent location estimate of the target MS. Moreover, the feedback from the activated LBSs 152 may be provided to other FOMs 1224, as appropriate, as well as to the LBS model. However, it is an important aspect of the LBS model that when it receives such feedback, it may output location hypotheses having relatively small target MS 140 location area estimates about the active LBSs 152 and each such location hypothesis also has a high confidence value indicative of the target MS 140 positively being in the corresponding location area estimate (e.g., a confidence value of 0.9 to +1), or having a high confidence value indicative of the target MS 140 not being in the corresponding location area estimate (i.e., a confidence value of −0.9 to −1). Note that in some embodiments of the LBS model, these embodiments may have functionality similar to that of the coverage area first order model described above. Further note that for LBSs within a neighborhood of the target MS wherein there is a reasonable chance that with movement of the target MS may be detected by these LBSs, such LBSs may be requested to periodically activate. (Note, that it is not assumed that such LBSs have an on-line external power source; e.g., some may be solar powered). Moreover, in the case where an LBS 152 includes sufficient electronics to carry voice communication with the target MS 140 and is the primary BS for the target MS (or alternatively, in the active or candidate set), then the LBS model will not deactivate this particular LBS during its procedure of activating and deactivating various LBSs 152.

(I.6) Stochastic First Order Model

The stochastic first order models may use statistical prediction techniques such as principle decomposition, partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature data base 1320.

(I.7) Pattern Recognition and Adaptive First Order Models

It is a particularly important aspect of the present disclosure to provide:
- (a) one or more FOMs 1224 that generate target MS 140 location estimates by using pattern recognition or associativity techniques, and/or
- (b) one or more FOMs 1224 that are adaptive or trainable so that such FOMs may generate increasingly more accurate target MS location estimates from additional training.

(I.7.1) Statistically Based Pattern Recognition First Order Models

Regarding FOMs 1224 using pattern recognition or associativity techniques, there are many such techniques available. For example, there are statistically based systems such as "CART" (an acronym for Classification and Regression Trees) by ANGOSS Software International Limited of Toronto, Canada that may be used for automatically detecting or recognizing patterns in data that were unprovided (and likely previously unknown). Accordingly, by imposing a relatively fine mesh or grid of cells on the radio coverage area, wherein each cell is entirely within a particular area type categorization such as the transmission area types (discussed in the section, "Coverage Area: Area Types And Their Determination" above), the verified location signature clusters within the cells of each area type may be analyzed for signal characteristic patterns. Accordingly, if such characteristic pattern is found, then it can be used to identify at least a likely area type in which a target MS is likely to be located. That is, one or more location hypotheses may be generated having target MS 140 location estimates that cover an area having the likely area type wherein the target MS 140 is located. Further note that such statistically based pattern recognition systems as "CART" include software code generators for generating expert system software embodiments for recognizing the patterns detected within a training set (e.g., the verified location signature clusters).

Accordingly, although an embodiment of a FOM as described here may not be exceedingly accurate, it may be very reliable. Thus, since a fundamental aspect of the present disclosure is to use a plurality MS location techniques for generating location estimates and to analyze the generated estimates (likely after being adjusted) to detect patterns of convergence or clustering among the estimates, even large MS location area estimates are useful. For example, it can be the case that four different and relatively large MS location estimates, each having very high reliability, have an area of intersection that is acceptably precise and inherits the very high reliability from each of the large MS location estimates from which the intersection area was derived.

A similar statistically based FOM 1224 to the one above may be provided wherein the radio coverage area is decomposed substantially as above, but in addition to using the signal characteristics for detecting useful signal patterns, the specific identifications of the base station 122 providing the signal characteristics may also be used. Thus, assuming there is a sufficient density of verified location signature clusters in some of the mesh cells so that the statistical pattern recognizer can detect patterns in the signal characteristic measurements, an expert system may be generated that outputs a target MS 140 location estimate that may provide both a reliable and accurate location estimate of a target MS 140.

(I.7.2) Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive" by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the present disclosure to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

(I.7.3) Artificial Neural Networks For MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the present disclosure that the training of such artificial neural net based FOMs (ANN FOMs) is provided without manual intervention as will be discussed hereinbelow.

(I.7.3.1) Artificial Neural Networks That Converge on Near Optimal Solutions

It is as an aspect of the present disclosure to use an adaptive neural network architecture which has the ability to explore the parameter or matrix weight space corresponding to a ANN for determining new configurations of weights that reduce an objective or error function indicating the error in the output of the ANN over some aggregate set of input data ensembles. Accordingly, in one embodiment, a genetic algorithm is used to provide such an adaptation capability. However, it is also within the scope of the present disclosure to use other adaptive techniques such as, for example, simulated annealing, cascade correlation with multistarts, gradient descent with multistarts, and truncated Newton's method with multistarts, as one skilled in the art of neural network computing will understand.

(I.7.3.2) Artificial Neural Networks as MS Location Estimators for First Order Models Although there have been substantial advances in artificial neural net computing in both hardware and software, it can be difficult to choose a particular ANN architecture and appropriate training data for yielding high quality results. In choosing a ANN architecture at least the following three criteria are chosen (either implicitly or explicitly):
 (a) a learning paradigm: i.e., does the ANN require supervised training (i.e., being provided with indications of correct and incorrect performance), unsupervised training, or a hybrid of both (sometimes referred to as reinforcement);
 (b) a collection of learning rules for indicating how to update the ANN;
 (c) a learning algorithm for using the learning rules for adjusting the ANN weights.

Furthermore, there are other implementation issues such as:
 (d) how many layers a artificial neural net should have to effectively capture the patterns embedded within the training data. For example, the benefits of using small ANN are many. less costly to implement, faster, and tend to generalize better because they avoid overfitting weights to training patterns. That is, in general, more unknown parameters (weights) induce more local and global minima in the error surface or space. However, the error surface of smaller nets can be very rugged and have few good solutions, making it difficult for a local minimization algorithm to find a good solution from a random starting point as one skilled in the art will understand;
 (e) how many units or neurons to provide per layer;
 (f) how large should the training set be presented to provide effective generalization to non-training data
 (g) what type of transfer functions should be used.

However, the architecture of the present disclosure allows substantial flexibility in the implementation of ANN for FOMs 1224. In particular, there is no need to choose only one artificial neural net architecture and/or implementation in that a plurality of ANNs may be accommodated by the architecture of the location engine 139. Furthermore, it is important to keep in mind that it may not be necessary to train an ANN for a FOM as rigorously as is done in typical ANN applications since the accuracy and reliability in estimating the location of a target MS 140 with an embodiment of the present disclosure may come from synergistically utilizing a plurality of different MS location estimators, each of which may be undesirable in terms of accuracy and/or reliability in some areas, but when their estimates are synergistically used as in the location engine 139, accurate and reliable location estimates can be attained. Accordingly, one embodiment of the present disclosure may have a plurality of moderately well trained ANNs having different neural net architectures such as: multilayer perceptrons, adaptive resonance theory models, and radial basis function networks.

Additionally, many of the above mentioned ANN architecture and implementation decisions can be addressed substantially automatically by various commercial artificial neural net development systems such as:

"NEUROGENETIC OPTIMIZER" by BioComp Systems Inc., 4018 148th Ave. NE, Redmond, Wash. 98052, USA wherein genetic algorithms are used to optimize and configure ANNs, and artificial neural network hardware and software products by Accurate Automation Corporation of Chattanooga, Tenn., such as "ACCURATE AUTOMATION NEURAL NETWORK TOOLS.

(I.7.3.3) Artificial Neural Network Input and Output

Figure 14:
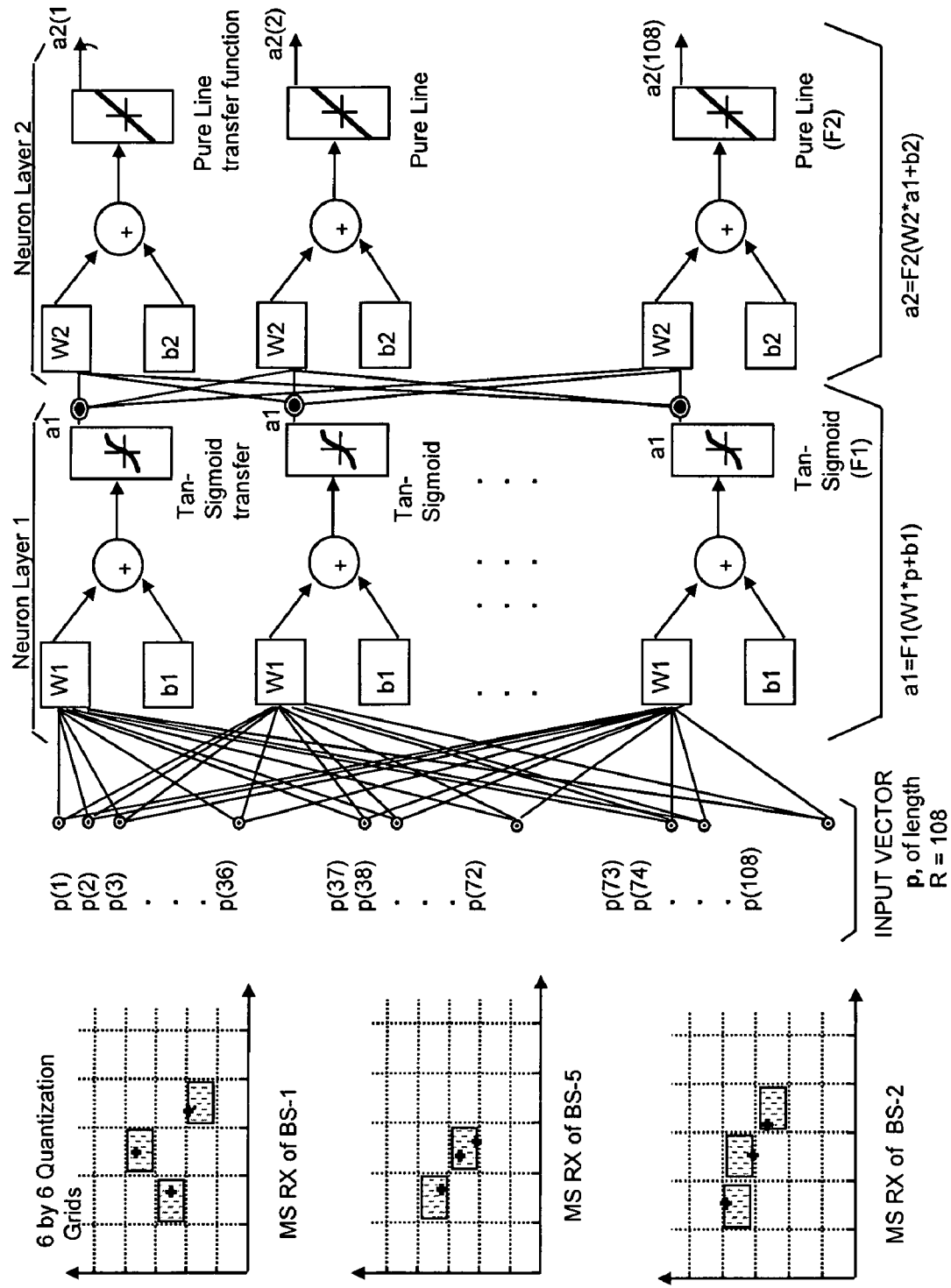
FIG. 14 shows one method of modeling CDMA delay spread measurement ensembles and interfacing such signals to a typical artificial neural network based FOM.

It is worthwhile to discuss the data representations for the inputs and outputs of a ANN used for generating MS location estimates. Regarding ANN input representations, recall that the signal processing subsystem 1220 may provide various RF signal measurements as input to an ANN (such as the RF signal measurements derived from verified location signatures in the location signature data base 1320). For example, a representation of a histogram of the frequency of occurrence of CDMA fingers in a time delay versus signal strength 2-dimensional domain may be provided as input to such an ANN. In particular, a 2-dimensional grid of signal strength versus time delay bins may be provided so that received signal measurements are slotted into an appropriate bin of the grid. In one embodiment, such a grid is a six by six array of bins such as illustrated in the left portion of FIG. 14. That is, each of the signal strength and time delay axes are partitioned into six ranges so that both the signal strength and the time delay of RF signal measurements can be slotted into an appropriate range, thus determining the bin.

Note that RF signal measurement data (i.e., location signatures) slotted into a grid of bins provides a convenient mechanism for classifying RF measurements received over time so that when each new RF measurement data is assigned to its bin, a counter for the bin can be incremented. Thus in one embodiment, the RF measurements for each bin can be represented pictorially as a histogram. In any case, once the RF measurements have been slotted into a grid, various filters may be applied for filtering outliers and noise prior to inputting bin values to an ANN. Further, various amounts of data from such a grid may be provided to an ANN. In one embodiment, the tally from each bin is provided to an ANN. Thus, as many as 108 values could be input to the ANN (two values defining each bin, and a tally for the bin). However, other representations are also possible. For instance, by ordering the bin tallies linearly, only 36 need be provided as ANN input. Alternatively, only representations of bins having the highest tallies may be provided as ANN input. Thus, for example, if the highest 10 bins and their tallies were provided as ANN input, then only 20 inputs need be provided (i.e., 10 input pairs, each having a single bin identifier and a corresponding tally).

In addition, note that the signal processing subsystem 1220 may also obtain the identifications of other base stations 122 (152) for which their pilot channels can be detected by the target MS 140 (i.e., the forward path), or for which the base stations can detect a signal from the target MS (i.e., the reverse path). Thus, in order to effectively utilize substantially all pertinent location RF signal measurements (i.e., from location signature data derived from communications between the target MS 140 and the base station infrastructure), a technique is provided wherein a plurality of ANNs may be activated using various portions of an ensemble of location signature data obtained. However, before describing this technique, it is worthwhile to note that a naive strategy of providing input to a single ANN for locating target MSs throughout an area having a large number of base stations (e.g., 300) is likely to be undesirable. That is, given that each base station (antenna sector) nearby the target MS is potentially able to provide the ANN with location signature data, the ANN would have to be extremely large and therefore may require inordinate training and retraining. For example, since there may be approximately 30 to 60 ANN inputs per location signature, an ANN for an area having even twenty base stations 122 can require at least 600 input neurons, and potentially as many as 1,420 (i.e., 20 base stations with 70 inputs per base station and one input for every one of possibly 20 additional surrounding base stations in the radio coverage area 120 that might be able to detect, or be detected by, a target MS 140 in the area corresponding to the ANN).

(I.7.3.3.1) ANN Input

Accordingly, the technique described herein limits the number of input neurons in each ANN constructed and generates a larger number of these smaller ANNs. That is, each ANN is trained on location signature data (or, more precisely, portions of location signature clusters) in an area $A_{ANN}$ (hereinafter also denoted the "net area"), wherein each input neuron receives a unique input from one of:

(A1) location signature data (e.g., signal strength/time delay bin tallies) corresponding to transmissions between an MS 140 and a relatively small number of base stations 122 in the area $A_{ANN}$. For instance, location signature data obtained from, for example, a collection B of four base stations 122 (or antenna sectors) in the area $A_{ANN}$. Note, each location signature data cluster includes fields describing the wireless communication devices used; e.g., (i) the make and model of the target MS; (ii) the current and maximum transmission power; (iii) the MS battery power (instantaneous or current); (iv) the base station (sector) current power level; (v) the base station make and model and revision level; (vi) the air interface type and revision level (of, e.g., CDMA, TDMA or AMPS).

(A2) a discrete input corresponding to each base station 122 (or antenna sector 130) in a larger area containing $A_{ANN}$, wherein each such input here indicates whether the corresponding base station (sector):

(i) is on-line (i.e., capable of wireless communication with MSs) and at least its pilot channel signal is detected by the target MS 140, but the base station (sector) does not detect the target MS;

(ii) is on-line and the base station (sector) detects a wireless transmission from the target MS, but the target MS does not detect the base station (sector) pilot channel signal;

(iii) is on-line and the base station (sector) detects the target MS and the base station (sector) is detected by the target MS;

(iv) is on-line and the base station (sector) does not detect the target MS, the base station is not detected by the target MS; or (v) is off-line (i.e., incapable of wireless communication with one or more MSs).

Note that (i)-(v) are hereinafter referred to as the "detection states."

Thus, by generating an ANN for each of a plurality of net areas (potentially overlapping), a local environmental change in the wireless signal characteristics of one net area is unlikely to affect more than a small number of adjacent or overlapping net areas. Accordingly, such local environmental changes can be reflected in that only the ANNs having net areas affected by the local change need to be retrained. Additionally, note that in cases where RF measurements from a target MS 140 are received across multiple net areas, multiple ANNs may be activated, thus providing multiple MS location estimates. Further, multiple ANNs may be activated when a location signature cluster is received for a target MS 140 and location signature cluster includes location signature data corresponding to wireless transmissions between the MS and, e.g., more base stations (antenna sectors) than needed for the collection B described in the previous section. That is, if each collection B identifies four base stations 122 (antenna sectors), and a received location signature cluster includes location signature data corresponding to five base stations (antenna sectors), then there may be up to five ANNs activated to each generate a location estimate.

Moreover, for each of the smaller ANNs, it is likely that the number of input neurons is on the order of 330; (i.e., 70 inputs per each of four location signatures (i.e., 35 inputs for the forward wireless communications and 35 for the reverse wireless communications), plus 40 additional discrete inputs for an appropriate area surrounding $A_{ANN}$, plus 10 inputs related to: the type of MS, power levels, etc. However, it is important to note that the number of base stations (or antenna sectors 130) having corresponding location signature data to be provided to such an ANN may vary. Thus, in some subareas of the coverage area 120, location signature data from five or more base stations (antenna sectors) may be used, whereas in other subareas three (or less) may be used.

Regarding the output from ANNs used in generating MS location estimates, there are also numerous options. In one embodiment, two values corresponding to the latitude and longitude of the target MS are estimated. Alternatively, by applying a mesh to the coverage area 120, such ANN output may be in the form of a row value and a column value of a particular mesh cell (and its corresponding area) where the target MS is estimated to be. Note that the cell sizes of the mesh need not be of a particular shape nor of uniform size. However, simple non-oblong shapes are desirable. Moreover, such cells should be sized so that each cell has an area approximately the size of the maximum degree of location precision desired. Thus, assuming square mesh cells, 250 to 350 feet per cell side in an urban/suburban area, and 500 to 700 feet per cell side in a rural area may be desirable.

(I.7.3.4) Artificial Neural Network Training

The following are steps provide one embodiment for training a location estimating ANN according to the present disclosure.

(a) Determine a collection, C, of clusters of RF signal measurements (i.e., location signatures) such that each cluster is for RF transmissions between an MS 140 and a common set, B, of base stations 122 (or antenna sectors 130) such measurements are as described in (A1) above. In one embodiment, the collection C is determined by interrogating the location signature data base 1320 for verified location signature clusters stored therein having such a common set B of base stations (antenna sectors). Alternatively in another embodiment, note that the collection C may be determined from (i) the existing engineering and planning data from service providers who are planning wireless cell sites, or (ii) service provider test data obtained using mobile test sets, access probes or other RF field measuring devices. Note that such a collection B of base stations (antenna sectors) should only be created when the set C of verified location signature clusters is of a sufficient size so that it is expected that the ANN can be effectively trained.

(b) Determine a collection of base stations (or antenna sectors 130), B', from the common set B, wherein B' is small (e.g., four or five).

(c) Determine the area, $A_{ANN}$, to be associated with collection B' of base stations (antenna sectors). In one embodiment, this area is selected by determining an area containing the set L of locations of all verified location signature clusters determined in step (a) having location signature data from each of the base stations (antenna sectors) in the collection B'. More precisely, the area, $A_{ANN}$, may be determined by providing a covering of the locations of L, such as, e.g., by cells of a mesh of appropriately fine mesh size so that each cell is of a size not substantially larger than the maximum MS location accuracy desired.

(d) Determine an additional collection, b, of base stations that have been previously detected (and/or are likely to be detected) by at least one MS in the area $A_{ANN}$.

(e) Train the ANN on input data related to: (i) signal characteristic measurements of signal transmissions between MSs 140 at verified locations in $A_{ANN}$, and the base stations (antenna sectors) in the collection B', and (ii) discrete inputs of detection states from the base stations represented in the collection b. For example, train the ANN on input including: (i) data from verified location signatures from each of the base stations (antenna sectors) in the collection B', wherein each location signature is part of a cluster in the collection C; (ii) a collection of discrete values corresponding to other base stations (antenna sectors) in the area b containing the area, $A_{ANN}$.

Regarding (d) immediately above, less accuracy may be required in training an ANN used for generating a location hypothesis (in a FOM 1224) for the present invention than in most applications of ANNs (or other trainable/adaptive components) since, in most circumstances, when signal measurements are provided for locating a target MS 140, the location engine 139 will activate a plurality location hypothesis generating modules (corresponding to one or more FOMs 1224) for substantially simultaneously generating a plurality of different location estimates (i.e., hypotheses). Thus, instead of training each ANN so that it is expected to be, e.g., 92% or higher in accuracy, it is believed that synergies with MS location estimates from other location hypothesis generating components will effectively compensate for any reduced accuracy in such a ANN (or any other location hypothesis generating component). Accordingly, it is believed that training time for such ANNs may be reduced without substantially impacting the MS locating performance of the location engine 139.

(I.7.3.5) Finding Near-Optimal Location Estimating Artificial Neural Networks

In one traditional artificial neural network training process, a relatively tedious set of trial and error steps may be performed for configuring an ANN so that training produces effective learning. In particular, an ANN may require configuring parameters related to, for example, input data scaling, test/training set classification, detecting and removing unnecessary input variable selection. However, an embodiment of the present disclosure reduces this tedium. That is, an embodiment of the present disclosure uses mechanisms such as genetic algorithms or other mechanisms for avoiding non-optimal but locally appealing (i.e., local minimum) solutions, and locating near-optimal solutions instead. In particular, such mechanism may be used to adjust the matrix of weights for the ANNs so that very good, near optimal ANN configurations may be found efficiently. Furthermore, since the signal processing system 1220 uses various types of signal processing filters for filtering the RF measurements received from transmissions between an MS 140 and one or more base stations (antenna sectors 130), such mechanisms for finding near-optimal solutions may be applied to selecting appropriate filters as well. Accordingly, in one embodiment of the present disclosure, such filters are paired with particular ANNs so that the location signature data supplied to each ANN is filtered according to a corresponding "filter description" for the ANN, wherein the filter description specifies the filters to be used on location signature data prior to inputting this data to the ANN. In particular, the filter description can define a pipeline of filters having a sequence of filters wherein for each two consecutive filters, $f_1$ and $f_2$ ($f_1$ preceding $f_2$), in a filter description, the output of $f_1$ flows as input to $f_2$. Accordingly, by encoding such a filter description together with its corresponding ANN so that the encoding can be provided to a near optimal solution finding mechanism such as a genetic algorithm, it is believed that enhanced ANN locating performance can be obtained. That is, the combined genetic codes of the filter description and the ANN are manipulated by the genetic algorithm in a search for a satisfactory solution (i.e., location error estimates within a desired range). This process and system provides a mechanism for optimizing not only the artificial neural network architecture, but also identifying a near optimal match between the ANN and one or more signal processing filters. Accordingly, the following filters may be used in a filter pipeline of a filter description: Sobel, median, mean, histogram normalization, input cropping, neighbor, Gaussian, Weiner filters.

One embodiment for implementing the genetic evolving of filter description and ANN pairs is provided by the following steps that may automatically performed without substantial manual effort:

(Step 1) Create an initial population of concatenated genotypes, or genetic representations for each pair of an artificial neural networks and corresponding filter description pair. Also, provide seed parameters which guide the scope and characterization of the artificial neural network architectures, filter selection and parameters, genetic parameters and system control parameters.

(Step 2) Prepare the input or training data, including, for example, any scaling and normalization of the data.

(Step 3) Build phenotypes, or artificial neural network/filter description combinations based on the genotypes.

(Step 4) Train and test the artificial neural network/filter description phenotype combinations to determine fitness; e.g., determine an aggregate location error measurement for each network/filter description phenotype.

(Step 5) Compare the fitnesses and/or errors, and retain the best network/filter description phenotypes.

(Step 6) Select the best networks/filter descriptions in the phenotype population (i.e., the combinations with small errors).

(Step 7) Repopulate the population of genotypes for the artificial neural networks and the filter descriptions back to a predetermined size using the selected phenotypes.

(Step 8) Combine the artificial neural network genotypes and filter description genotypes thereby obtaining artificial neural network/filter combination genotypes.

(Step 9) Mate the combination genotypes by exchanging genes or characteristics/features of the network/filter combinations.

(Step 10) If system parameter stopping criteria is not satisfied, return to step 3.

Note that artificial neural network genotypes may be formed by selecting various types of artificial neural network architectures suited to function approximation, such as fast back propagation, as well as characterizing several varieties of candidate transfer/activation functions, such as Tan h, logistic, linear, sigmoid and radial basis. Furthermore, ANNs having complex inputs may be selected (as determined by a filter type in the signal processing subsystem 1220) for the genotypes.

Examples of genetic parameters include: (a) maximum population size (typical default: 300), (b) generation limit (typical default: 50), (c) selection criteria, such as a certain percentage to survive (typical default: 0.5) or roulette wheel, (d) population refilling, such as random or cloning (default), (e) mating criteria, such as tail swapping (default) or two cut swapping, (f) rate for a choice of mutation criterion, such as random exchange (default: 0.25) or section reversal, (g) population size of the concatenated artificial neural network/filter combinations, (h) use of statistical seeding on the initial population to bias the random initialization toward stronger first order relating variables, and (i) neural node influence factors, e.g., input nodes and hidden nodes. Such parameters can be used as weighting factors that influences the degree the system optimizes for accuracy versus network compactness. For example, an input node factor greater than 0 provides a means to reward artificial neural networks constructed that use fewer input variables (nodes). A reasonable default value is 0.1 for both input and hidden node factors.

Examples of neural net/filter description system control parameters include: (a) accuracy of modeling parameters, such as relative accuracy, R-squared, mean squared error, root mean squared error or average absolute error (default), and (b) stopping criteria parameters, such as generations run, elapsed time, best accuracy found and population convergence.

(I.7.3.6) Locating a Mobile Station Using Artificial Neural Networks

When using an artificial neural network for estimating a location of an MS 140, it is important that the artificial neural network be provided with as much accurate RF signal measurement data regarding signal transmissions between the target MS 140 and the base station infrastructure as possible. In particular, assuming ANN inputs as described hereinabove, it is desirable to obtain the detection states of as many surrounding base stations as possible. Thus, whenever the location engine 139 is requested to locate a target MS 140 (and in particular in an emergency context such as an emergency 911 call), the location center 140 automatically transmits a request to the wireless infrastructure to which the target MS is assigned for instructing the MS to raise its transmission power to full power for a short period of time (e.g., 100 milliseconds in a base station infrastructure configuration an optimized for such requests to 2 seconds in a non-optimized configuration). Note that the request for a change in the transmission power level of the target MS has a further advantage for location requests such as emergency 911 that are initiated from the MS itself in that a first ensemble of RF signal measurements can be provided to the location engine 139 at the initial 911 calling power level and then a second ensemble of RF signal measurements can be provided at a second higher transmission power level. Thus, in one embodiment of the present disclosure, an artificial neural network can be trained not only on the location signature cluster derived from either the initial wireless 911 transmissions or the full power transmissions, but also on the differences between these two transmissions. In particular, the difference in the detection states of the discrete ANN inputs between the two transmission power levels may provide useful additional information for more accurately estimating a location of a target MS.

It is important to note that when gathering RF signal measurements from a wireless base station network for locating MSs, the network should not be overburdened with location related traffic. Accordingly, note that network location data requests for data particularly useful for ANN based FOMs is generally confined to the requests to the base stations in the immediate area of a target MS 140 whose location is desired.

For instance, both collections of base stations B' and b discussed in the context of training an ANN are also the same collections of base stations from which MS location data would be requested. Thus, the wireless network MS location data requests are data driven in that the base stations to queried for location data (i.e., the collections B' and b) are determined by previous RF signal measurement characteristics recorded. Accordingly, the selection of the collections B' and b are adaptable to changes in the wireless environmental characteristics of the coverage area 120.

(J) Location Signature Data Base

Before proceeding with a description of other levels of the present disclosure as described in (24.1) through (24.3) above, in this section further detail is provided regarding the location signature data base 1320. Note that a brief description of the location signature data base was provided above indicating that this data base stores MS location data from verified and/or known locations (optionally with additional known environmental characteristic values) for use in enhancing current target MS location hypotheses and for comparing archived location data with location signal data obtained from a current target MS. However, the data base management system functionality incorporated into the location signature data base 1320 is an important aspect of the present disclosure, and is therefore described in this section. In particular, the data base management functionality described herein addresses a number of difficulties encountered in maintaining a large archive of signal processing data such as MS signal location data. Some of these difficulties can be described as follows:

(a) in many signal processing contexts, in order to effectively utilize archived signal processing data for enhancing the performance of a related signal processing application, there must be an large amount of signal related data in the archives and this data must be adequately maintained so that as archived signal data becomes less useful to the corresponding signal processing application (i.e., the data becomes "inapplicable") its impact on the application should be correspondingly reduced. Moreover, as archive data becomes substantially inapplicable, it should be filtered from the archive altogether. However, the size of the data in the archive makes it prohibitive for such a process to be performed manually, and there may be no simple or straightforward techniques for automating such impact reduction or filtering processes for inapplicable signal data;

(b) it is sometimes difficult to determine the archived data to use in comparing with newly obtained signal processing application data; and (c) it is sometimes difficult to determine a useful technique for comparing archived data with newly obtained signal processing application data.

It is an aspect of the present disclosure that the data base management functionality of the location signature data base 1320 addresses each of the difficulties mentioned immediately above. For example, regarding (a), the location signature data base is "self cleaning" in that by associating a confidence value with each loc sig in the data base and by reducing or increasing the confidences of archived verified loc sigs according to how well their signal characteristic data compares with newly received verified location signature data, the location signature data base 1320 maintains a consistency with newly verified loc sigs.

The following data base management functional descriptions describe some of the more noteworthy functions of the location signature data base 1320. Note that there are various ways that these functions may be embodied. So as to not overburden the reader here, the details for one embodiment is provided in APPENDIX C. FIGS. 16*a* through 16*c* present a table providing a brief description of the attributes of the location signature data type stored in the location signature data base 1320.

(J.1) Location Signature Program Descriptions

The following program updates the random loc sigs in the location signature data base 1320. In one embodiment, this program is invoked primarily by the Signal Processing Subsystem.

(J.1.1) Update Location Signature Database Program

Update_Loc_Sig_DB(new_loc_obj, selection_criteria, loc_sig_Pop)

/* This program updates loc sigs in the location signature data base 1320. That is, this program updates, for example, at least the location information for verified random loc sigs residing in this data base. The general strategy here is to use information (i.e., "new_loc_obj") received from a newly verified location (that may not yet be entered into the location signature data base) to assist in determining if the previously stored random verified loc sigs are still reasonably valid to use for:

(29.1) estimating a location for a given collection (i.e., "bag") of wireless (e.g., CDMA) location related signal characteristics received from an MS, (29.2) training (for example) adaptive location estimators (and location hypothesizing models), and (29.3) comparing with wireless signal characteristics used in generating an MS location hypothesis by one of the MS location hypothesizing models (denoted First Order Models, or, FOMs).

More precisely, since it is assumed that it is more likely that the new_est location information obtained is more indicative of the wireless (CDMA) signal characteristics within some area surrounding a newly verified location than the verified loc sigs (location signatures) previously entered into the Location Signature data base, such verified loc sigs are compared for signal characteristic consistency with the newly verified location information (object) input here for determining whether some of these "older" data base verified loc sigs still appropriately characterize their associated location.

In particular, comparisons are iteratively made here between each (target) loc sig "near" "new_loc_obj" and a population of loc sigs in the location signature data base 1320 (such population typically including the loc sig for "new_loc_obj") for:

(29.4) adjusting a confidence factor of the target loc sig. Note that each such confidence factor is in the range [0, 1] with 0 being the lowest and 1 being the highest. Further note that a confidence factor here can be raised as well as lowered depending on how well the target loc sig matches or is consistent with the population of loc sigs to which it is compared. Thus, the confidence in any particular verified loc sig, LS, can fluctuate with successive invocations of this program if the input to the successive invocations are with location information geographically "near" LS.

(29.5) remove older verified loc sigs from use whose confidence value is below a predetermined threshold. Note, it is intended that such predetermined thresholds be substantially automatically adjustable by periodically testing various confidence factor thresholds in a specified geographic area to determine how well the eligible data base loc sigs (for different thresholds) perform in agreeing with a number of verified loc sigs in a "loc sig test-bed", wherein the test bed may be composed of, for example, repeatable loc sigs and recent random verified loc sigs.

Note that this program may be invoked with a (verified/known) random and/or repeatable loc sig as input. Furthermore, the target loc sigs to be updated may be selected from a particular group of loc sigs such as the random loc sigs or the repeatable loc sigs, such selection being determined according to the input parameter, "selection_criteria" while the comparison population may be designated with the input parameter, "loc_sig_pop". For example, to update confidence factors of certain random loc sigs near "new_loc_obj", "selection_criteria" may be given a value indicating, "USE_RANDOM_LOC_SIGS", and "loc_sig_pop" may be given a value indicating, "USE_REPEATABLE_LOC_SIGS". Thus, if in a given geographic area, the repeatable loc sigs (from, e.g., stationary transceivers) in the area have recently been updated, then by successively providing "new_loc_obj" with a loc sig for each of these repeatable loc sigs, the stored random loc sigs can have their confidences adjusted.

Alternatively, in one embodiment of the present disclosure, the present function may be used for determining when it is desirable to update repeatable loc sigs in a particular area (instead of automatically and periodically updating such repeatable loc sigs). For example, by adjusting the confidence factors on repeatable loc sigs here provides a method for determining when repeatable loc sigs for a given area should be updated. That is, for example, when the area's average confidence factor for the repeatable loc sigs drops below a given (potentially high) threshold, then the MSs that provide the repeatable loc sigs can be requested to respond with new loc sigs for updating the data base. Note, however, that the approach presented in this function assumes that the repeatable location information in the location signature data base 1320 is maintained with high confidence by, for example, frequent data base updating. Thus, the random location signature data base verified location information may be effectively compared against the repeatable loc sigs in an area.

Input:
new_loc_obj: a data representation at least including a loc sig for an associated location about which Location Signature loc sigs are to have their confidences updated.
selection_criteria: a data representation designating the loc sigs to be selected to have their confidences updated (may be defaulted). The following groups of loc sigs may be selected: "USE_RANDOM_LOC_SIGS" (this is the default), USE_REPEATABLE_LOC_SIGS", "USE_ALL_LOC_SIGS". Note that each of these selections has values for the following values associated with it (although the values may be defaulted):
(a) a confidence_reduction factor for reducing loc sig confidences,
(b) a big_error threshold for determining the errors above which are considered too big to ignore,
(c) a confidence_increase_factor for increasing loc sig confidences,
(d) a small_error_threshold for determining the errors below which are considered too small (i.e., good) to ignore.
(e) a recent_time for specifying a time period for indicating the loc sigs here considered to be "recent".

loc_sig_pop: a data representation of the type of loc sig population to which the loc sigs to be updated are compared. The following values may be provided:
(a) "USE ALL LOC SIGS IN DB",
(b) "USE ONLY REPEATABLE LOC SIGS" (this is the default),
(c) "USE ONLY LOC SIGS WITH SIMILAR TIME OF DAY"
However, environmental characteristics such as: weather, traffic, season are also contemplated.

(J.1.2) Confidence Aging Program

The following program reduces the confidence of verified loc sigs in the location signature data base 1320 that are likely to be no longer accurate (i.e., in agreement with comparable loc sigs in the data base). If the confidence is reduced low enough, then such loc sigs are removed from the data base. Further, if for a location signature data base verified location composite entity (i.e., a collection of loc sigs for the same location and time), this entity no longer references any valid loc sigs, then it is also removed from the data base. Note that this program is invoked by "Update_Loc_Sig_DB".

reduce_bad_DB_loc_sigs(loc_sig_bag, error_rec_set, big_error_threshold confidence_reduction_factor, recent_time)

Inputs:
loc_sig bag: A collection or "bag" of loc sigs to be tested for determining if their confidences should be lowered and/or any of these loc sigs removed.
error_rec_set: A set of error records (objects), denoted "error_recs", providing information as to how much each loc sig in "loc_sig_bag" disagrees with comparable loc sigs in the data base. That is, there is a "error_rec" here for each loc sig in "loc_sig_bag".
big_error_threshold: The error threshold above which the errors are considered too big to ignore.
confidence_reduction_factor: The factor by which to reduce the confidence of loc sigs.
recent_time: Time period beyond which loc sigs are no longer considered recent. Note that "recent" loc sigs (i.e., more recent than "recent_time") are not subject to the confidence reduction and filtering of this actions of this function.

(J.1.3) Confidence Enhancement Program

The following program increases the confidence of verified Location Signature loc sigs that are (seemingly) of higher accuracy (i.e., in agreement with comparable loc sigs in the location signature data base 1320). Note that this program is invoked by "Update_Loc_Sig_DB".

increase_confidence_of_good_DB_loc_sigs(nearby_loc_sig_bag, error_rec_set, small_error_threshold, confidence_increase_factor, recent_time);

Inputs:
loc_sig_bag: A collection or "bag" of to be tested for determining if their confidences should be increased.
error_rec_set: A set of error records (objects), denoted "error_recs", providing information as to how much each loc sig in "loc_sig_bag" disagrees with comparable loc sigs in the location signature data base. That is, there is a "error_rec" here for each loc sig in "loc_sig_bag".
small_error_threshold: The error threshold below which the errors are considered too small to ignore.
confidence_increase_factor: The factor by which to increase the confidence of loc sigs.
recent_time: Time period beyond which loc sigs are no longer considered recent. Note that "recent" loc sigs (i.e., more recent than "recent_time") are not subject to the confidence reduction and filtering of this actions of this function.

(J.1.4) Location Hypotheses Consistency Program

The following program determines the consistency of location hypotheses with verified location information in the location signature data base 1320. Note that in the one embodiment of the present disclosure, this program is invoked primarily by a module denoted the historical location reasoner 1424 described sections hereinbelow. Moreover, the detailed description for this program is provided with the description of the historical location reasoner hereinbelow for completeness.

DB_Loc_Sig_Error_Fit(hypothesis, measured_loc_sig_bag, search_criteria)

/* This function determines how well the collection of loc sigs in "measured_loc_sig_bag" fit with the loc sigs in the location signature data base 1320 wherein the data base loc sigs must satisfy the criteria of the input parameter "search_criteria" and are relatively close to the MS location estimate of the location hypothesis, "hypothesis".

Input: hypothesis: MS location hypothesis;
  measured_loc_sig_bag: A collection of measured location signatures ("loc sigs" for short) obtained from the MS (the data structure here is an aggregation such as an array or list). Note, it is assumed that there is at most one loc sig here per Base Station in this collection. Additionally, note that the input data structure here may be a location signature cluster such as the "loc_sig_cluster" field of a location hypothesis (cf. FIGS. 9A and B). Note that variations in input data structures may be accepted here by utilization of flag or tag bits as one skilled in the art will appreciate;
  search_criteria: The criteria for searching the verified location signature data base for various categories of loc sigs. The only limitation on the types of categories that may be provided here is that, to be useful, each category should have meaningful number of loc sigs in the location signature data base. The following categories included here are illustrative, but others are contemplated:
    (a) "USE ALL LOC SIGS IN DB" (the default),
    (b) "USE ONLY REPEATABLE LOC SIGS",
    (c) "USE ONLY LOC SIGS WITH SIMILAR TIME OF DAY".
  Further categories of loc sigs close to the MS estimate of "hypothesis" contemplated are: all loc sigs for the same season and same time of day, all loc sigs during a specific weather condition (e.g., snowing) and at the same time of day, as well as other limitations for other environmental conditions such as traffic patterns. Note, if this parameter is NIL, then (a) is assumed.

Returns: An error object (data type: "error_object") having: (a) an "error" field with a measurement of the error in the fit of the location signatures from the MS with verified location signatures in the location signature data base 1320; and (b) a "confidence" field with a value indicating the perceived confidence that is to be given to the "error" value. */

(J.1.5) Location Signature Comparison Program

The following program compares: (a1) loc sigs that are contained in (or derived from) the loc sigs in "target_loc_sig_bag" with (b1) loc sigs computed from verified loc sigs in the location signature data base 1320. That is, each loc sig from (a1) is compared with a corresponding loc sig from (b1) to obtain a measurement of the discrepancy between the two loc sigs. In particular, assuming each of the loc sigs for "target_loc_sig_bag" correspond to the same target MS location, wherein this location is "target_loc", this program determines how well the loc sigs in "target_loc_sig_bag" fit with a computed or estimated loc sig for the location, "target_loc" that is derived from the verified loc sigs in the location signature data base 1320. Thus, this program may be used: (a2) for determining how well the loc sigs in the location signature cluster for a target MS ("target_loc_sig_bag") compares with loc sigs derived from verified location signatures in the location signature data base, and (b2) for determining how consistent a given collection of loc sigs ("target_loc_sig_bag") from the location signature data base is with other loc sigs in the location signature data base. Note that in (b2) each of the one or more loc sigs in "target_loc_sig_bag" have an error computed here that can be used in determining if the loc sig is becoming inapplicable for predicting target MS locations.

Determine_Location_Signature_Fit Errors(target_loc, target_loc_sig_bag, search_area, search_criteria, output_criteria)

/* Input: target_loc: An MS location or a location hypothesis for an MS. Note, this can be any of the following:
  (a) An MS location hypothesis, in which case, if the hypothesis is inaccurate, then the loc sigs in "target_loc_sig_bag" are the location signature cluster from which this location hypothesis was derived. Note that if this location is inaccurate, then "target_loc_sig_bag" is unlikely to be similar to the comparable loc sigs derived from the loc sigs of the location signature data base close "target_loc"; or
  (b) A previously verified MS location, in which case, the loc sigs of "target_loc_sig_bag" were the loc sigs measurements at the time they were verified. However, these loc sigs may or may not be accurate now.

target_loc_sig_bag: Measured location signatures ("loc sigs" for short) obtained from the MS (the data structure here, bag, is an aggregation such as array or list). It is assumed that there is at least one loc sig in the bag. Further, it is assumed that there is at most one loc sig per Base Station;

search_area: The representation of the geographic area surrounding "target_loc". This parameter is used for searching the Location Signature data base for verified loc sigs that correspond geographically to the location of an MS in "search_area;

search_criteria: The criteria used in searching the location signature data base. The criteria may include the following:
  (a) "USE ALL LOC SIGS IN DB",
  (b) "USE ONLY REPEATABLE LOC SIGS",
  (c) "USE ONLY LOC SIGS WITH SIMILAR TIME OF DAY".
  However, environmental characteristics such as: weather, traffic, season are also contemplated.

output_criteria: The criteria used in determining the error records to output in "error_rec_bag". The criteria here may include one of:
  (a) "OUTPUT ALL POSSIBLE ERROR_RECS";
  (b) "OUTPUT ERROR_RECS FOR INPUT LOC SIGS ONLY".

Returns: error_rec_bag: A bag of error records or objects providing an indication of the similarity between each loc sig in "target_loc_sig_bag" and an estimated loc sig computed for "target_loc" from stored loc sigs in a surrounding area of "target_loc". Thus, each error record/ object in "error_rec_bag" provides a measurement of how well a loc sig (i.e., wireless signal characteristics) in "target_loc_sig_bag" (for an associated BS and the MS at "target_loc") correlates with an estimated loc sig between this BS and MS. Note that the estimated loc sigs are determined using verified location signatures in the Location Signature data base. Note, each error record in "error_rec_bag" includes: (a) a BS ID indicating the base station to which the error record corresponds; and (b) a error measurement (>=0), and (c) a confidence value (in [0, 1]) indicating the confidence to be placed in the error measurement.

(J.1.6) Computed Location Signature Program

The following program receives a collection of loc sigs and computes a loc sig that is representative of the loc sigs in the collection. That is, given a collection of loc sigs, "loc_sig_bag", wherein each loc sig is associated with the same predetermined Base Station, this program uses these loc sigs to compute a representative or estimated loc sig associated with the predetermined Base Station and associated with a predetermined MS location, "loc_for_estimation". Thus, if the loc sigs in "loc_sig_bag" are from the verified loc sigs of the location signature data base such that each of these loc sigs also has its associated MS location relatively close to "loc_for_estimation", then this program can compute and return a reasonable approximation of what a measured loc sig between an MS at "loc_for_estimation" and the predetermined Base Station ought to be. This program is invoked by "Determine_Location_Signature_Fit_Errors".

estimate_loc_sig_from_DB(loc_for_estimation, loc_sig_bag)

(J.1.7) Geographic Area Representation Program

The following program determines and returns a representation of a geographic area about a location, "loc", wherein: (a) the geographic area has associated MS locations for an acceptable number (i.e., at least a determined minimal number) of verified loc sigs from the location signature data base, and (b) the geographical area is not too big. However, if there are not enough loc sigs in even a largest acceptable search area about "loc", then this largest search area is returned. "DB_Loc_Sig_Error Fit"

get_area_to_search(loc)

(J.1.8) Location Signature Comparison Program

This program compares two location signatures, "target_loc_sig" and "comparison_loc_sig", both associated with the same predetermined Base Station and the same predetermined MS location (or hypothesized location). This program determines a measure of the difference or error between the two loc sigs relative to the variability of the verified location signatures in a collection of loc sigs denoted the "comparison_loc_sig_bag" obtained from the location signature data base. It is assumed that "target_loc_sig", "comparison_loc_sig" and the loc sigs in "comparison_loc_sig_bag" are all associated with the same base station. This program returns an error record (object), "error_rec", having an error or difference value and a confidence value for the error value. Note, the signal characteristics of "target_loc_sig" and those of "comparison_loc_sig" are not assumed to be similarly normalized (e.g., via filters as per the filters of the Signal Processing Subsystem) prior to entering this function. It is further assumed that typically the input loc sigs satisfy the "search_criteria". This program is invoked by: the program, "Determine_Location_Signature_Fit_Errors", described above.

get_difference_measurement(target_loc_sig, comparison_loc_sig, comparison_loc_sig_bag, search_area, search_criteria)

Input:
target_loc_sig: The loc sig to which the "error_rec" determined here is to be associated.

comparison_loc_sig: The loc sig to compare with the "target_loc_sig". Note, if "comparison_loc_sig" is NIL, then this parameter has a value that corresponds to a noise level of "target_loc_sig".

comparison_loc_sig_bag: The universe of loc sigs to use in determining an error measurement between "target_loc_sig" and "comparison_loc_sig". Note, the loc sigs in this aggregation include all loc sigs for the associated BS that are in the "search_area".

search_area: A representation of the geographical area surrounding the location for all input loc sigs. This input is used for determining extra information about the search area in problematic circumstances.

search_criteria: The criteria used in searching the location signature data base. The criteria may include the following:
(a) "USE ALL LOC SIGS IN DB",
(b) "USE ONLY REPEATABLE LOC SIGS",
(c) "USE ONLY LOC SIGS WITH SIMILAR TIME OF DAY
However, environmental characteristics such as: weather, traffic, season are also contemplated.

(K) Detailed Description of the Hypothesis Evaluator Modules (K.1) Context Adjuster Embodiments The context adjuster 1326 performs the first set of potentially many adjustments to at least the confidences of location hypotheses, and in some important embodiments, both the confidences and the target MS location estimates provided by FOMs 1224 may be adjusted according to previous performances of the FOMs. More particularly, as mentioned above, the context adjuster adjusts confidences so that, assuming there is a sufficient density verified location signature clusters captured in the location signature data base 1320, the resulting location hypotheses output by the context adjuster 1326 may be further processed uniformly and substantially without concern as to differences in accuracy between the first order models from which location hypotheses originate. Accordingly, the context adjuster adjusts location hypotheses both to environmental factors (e.g., terrain, traffic, time of day, etc., as described in 30.1 above), and to how predictable or consistent each first order model (FOM) has been at locating previous target MS's whose locations were subsequently verified.

Of particular importance is the novel computational paradigm utilized herein. That is, if there is a sufficient density of previous verified MS location data stored in the location signature data base 1320, then the FOM location hypotheses are used as an "index" into this data base (i.e., the location signature data base) for constructing new target MS 140 location estimates. A more detailed discussion of this aspect of the present disclosure is given hereinbelow. Accordingly, only a brief overview is provided here. Thus, since the location signature data base 1320 stores previously captured MS location data including:

(a) clusters of MS location signature signals (see the location signature data base section for a discussion of these signals) and (b) a corresponding verified MS location, for each such cluster, from where the MS signals originated, the context adjuster 1326 uses newly created target MS location hypotheses output by the FOM's as indexes or pointers into the location signature data base for identifying other geographical areas where the target MS 140 is likely to be located based on the verified MS location data in the location signature data base.

In particular, at least the following two criteria are addressed by the context adjuster 1326:

(32.1) Confidence values for location hypotheses are to be comparable regardless of first order models from which the location hypotheses originate. That is, the context adjuster moderates or dampens confidence value assignment distinctions or variations between first order models so that the higher the confidence of a location hypothesis, the more likely (or unlikely, if the location hypothesis indicates an area estimate where the target MS is NOT) the target MS is perceived to be in the estimated area of the location hypothesis regardless of the First Order Model from which the location hypothesis was output;

(32.2) Confidence values for location hypotheses may be adjusted to account for current environmental characteristics such as month, day (weekday or weekend), time of day, area type (urban, rural, etc.), traffic and/or weather when comparing how accurate the first order models have previously been in determining an MS location according to such environmental characteristics. For example, in one embodiment of the present disclosure, such environmental characteristics are accounted for by utilizing a transmission area type scheme (as discussed in section 5.9 above) when adjusting confidence values of location hypotheses. Details regarding the use of area types for adjusting the confidences of location hypotheses and provided hereinbelow, and in particular, in APPENDIX D.

Note that in satisfying the above two criteria, the context adjuster 1326, at least in one embodiment, may use heuristic (fuzzy logic) rules to adjust the confidence values of location hypotheses from the first order models. Additionally, the context adjuster may also satisfy the following criteria:

(33.1) The context adjuster may adjust location hypothesis confidences due to BS failure(s), (33.2) Additionally in one embodiment, the context adjuster may have a calibration mode for at least one of:
 (a) calibrating the confidence values assigned by first order models to their location hypotheses outputs;
 (b) calibrating itself.

A first embodiment of the context adjuster is discussed immediately hereinbelow and in APPENDIX D. However, the present disclosure also includes other embodiments of the context adjuster. A second embodiment is also described in Appendix D so as to not overburden the reader and thereby chance losing perspective of the overall invention.

A description of the high level functions in an embodiment of the context adjuster 1326 follows. Details regarding the implementation of these functions are provided in APPENDIX D. Also, many of the terms used hereinbelow are defined in APPENDIX D. Accordingly, the program descriptions in this section provide the reader with an overview of this first embodiment of the context adjuster 1326.

Context_adjuster(loc_hyp_list)

This function adjusts the location hypotheses on the list, "loc_hyp_list", so that the confidences of the location hypotheses are determined more by empirical data than default values from the First Order Models 1224. That is, for each input location hypothesis, its confidence (and an MS location area estimate) may be exclusively determined here if there are enough verified location signatures available within and/or surrounding the location hypothesis estimate.

This function creates a new list of location hypotheses from the input list, "loc_hyp_list", wherein the location hypotheses on the new list are modified versions of those on the input list. For each location hypothesis on the input list, one or more corresponding location hypotheses will be on the output list. Such corresponding output location hypotheses will differ from their associated input location hypothesis by one or more of the following: (a) the "image_area" field (see FIGS. 9A and 9B) may be assigned an area indicative of where the target MS is estimated to be, (b) if "image_area" is assigned, then the "confidence" field will be the confidence that the target MS is located in the area for "image_area", (c) if there are not sufficient "nearby" verified location signature clusters in the location signature data base 1320 to entirely rely on a computed confidence using such verified location signature clusters, then two location hypotheses (having reduced confidences) will be returned, one having a reduced computed confidence (for "image_area") using the verified clusters in the Location Signature data base, and one being substantially the same as the associated input location hypothesis except that the confidence (for the field "area_est") is reduced to reflect the confidence in its paired location hypothesis having a computed confidence for "image_area". Note also, in some cases, the location hypotheses on the input list, may have no change to its confidence or the area to which the confidence applies.

Get_adjusted_loc_hyp_list_for(loc_hyp)

This function returns a list (or more generally, an aggregation object) of one or more location hypotheses related to the input location hypothesis, "loc_hyp". In particular, the returned location hypotheses on the list are "adjusted" versions of "loc_hyp" in that both their target MS 140 location estimates, and confidence placed in such estimates may be adjusted according to archival MS location information in the location signature data base 1320. Note that the steps herein are also provided in flowchart form in FIGS. 26*a* through 26*c*.

RETURNS: loc_hyp_list This is a list of one or more location hypotheses related to the input "loc_hyp". Each location hypothesis on "loc_hyp_list" will typically be substantially the same as the input "loc_hyp" except that there may now be a new target MS estimate in the field, "image_area", and/or the confidence value may be changed to reflect information of verified location signature clusters in the location signature data base.

The function, "get_adjusted_loc_hyp_list_for," and functions called by this function presuppose a framework or paradigm that requires some discussion as well as the defining of some terms. Note that some of the terms defined hereinbelow are illustrated in FIG. 24.

Define the term the "the cluster set" to be the set of all MS location point estimates (e.g., the values of the "pt_est" field of the location hypothesis data type), for the present FOM, such that:

(a) these estimates are within a predetermined corresponding area (e.g., the "loc_hyp.pt_covering" being such a predetermined corresponding area, or more generally, this predetermined corresponding area is determined as a function of the distance from an initial location estimate, e.g., "loc_hyp.pt_est", from the FOM), and (b) these point estimates have verified location signature clusters in the location signature data base.

Note that the predetermined corresponding area above will be denoted as the "cluster set area".

Define the term "image cluster set" (for a given First Order Model identified by "loc_hyp.FOM_ID") to mean the set of verified location signature clusters whose MS location point estimates are in "the cluster set".

Note that an area containing the "image cluster set" will be denoted as the "image cluster set area" or simply the "image area" in some contexts. Further note that the "image cluster set area" will be a "small" area encompassing the "image cluster set". In one embodiment, the image cluster set area will be the smallest covering of cells from the mesh for the present FOM that covers the convex hull of the image cluster set. Note that preferably, each cell of each mesh for each FOM is substantially contained within a single (transmission) area type.

Thus, the present FOM provides the correspondences or mapping between elements of the cluster set and elements of the image cluster set.

confidence_adjuster(FOM_ID, image_area, image_cluster_set)

This function returns a confidence value indicative of the target MS 140 being in the area for "image_area". Note that the steps for this function are provided in flowchart form in FIGS. 27a and 27b.

RETURNS: A confidence value. This is a value indicative of the target MS being located in the area represented by "image_area" (when it is assumed that for the related "loc_hyp," the "cluster set area" is the "loc_hyp.pt_covering" and "loc_hyp.FOM_ID" is "FOM_ID").

The function, "confidence_adjuster," (and functions called by this function) presuppose a framework or paradigm that requires some discussion as well as the defining of terms.

Define the term "mapped cluster density" to be the number of the verified location signature clusters in an "image cluster set" per unit of area in the "image cluster set area".

It is believed that the higher the "mapped cluster density", the greater the confidence can be had that a target MS actually resides in the "image cluster set area" when an estimate for the target MS (by the present FOM) is in the corresponding "the cluster set".

Thus, the mapped cluster density becomes an important factor in determining a confidence value for an estimated area of a target MS such as, for example, the area represented by "image_area". However, the mapped cluster density value requires modification before it can be utilized in the confidence calculation. In particular, confidence values must be in the range [−1, 1] and a mapped cluster density does not have this constraint. Thus, a "relativized mapped cluster density" for an estimated MS area is desired, wherein this relativized measurement is in the range [−1, +1], and in particular, for positive confidences in the range [0, 1]. Accordingly, to alleviate this difficulty, for the FOM define the term "prediction mapped cluster density" as a mapped cluster density value, MCD, for the FOM and image cluster set area wherein:

(i) MCD is sufficiently high so that it correlates (at least at a predetermined likelihood threshold level) with the actual target MS location being in the "image cluster set area" when a FOM target MS location estimate is in the corresponding "cluster set area".

That is, for a cluster set area (e.g., "loc_hyp.pt_covering") for the present FOM, if the image cluster set area: has a mapped cluster density greater than the "prediction mapped cluster density", then there is a high likelihood of the target MS being in the image cluster set area.

It is believed that the prediction mapped cluster density will typically be dependent on one or more area types. In particular, it is assumed that for each area type, there is a likely range of prediction mapped cluster density values that is substantially uniform across the area type. Accordingly, as discussed in detail hereinbelow, to calculate a prediction mapped cluster density for a particular area type, an estimate is made of the correlation between the mapped cluster densities of image areas (from cluster set areas) and the likelihood that if a verified MS location: (a) has a corresponding FOM MS estimate in the cluster set, and (b) is also in the particular area type, then the verified MS location is also in the image area.

Thus, if an area is within a single area type, then such a "relativized mapped cluster density" measurement for the area may be obtained by dividing the mapped cluster density by the prediction mapped cluster density and taking the smaller of: the resulting ratio and 1.0 as the value for the relativized mapped cluster density.

In some (perhaps most) cases, however, an area (e.g., an image cluster set area) may have portions in a number of area types. Accordingly, a "composite prediction mapped cluster density" may be computed, wherein, a weighted sum is computed of the prediction mapped cluster densities for the portions of the area that is in each of the area types. That is, the weighting, for each of the single area type prediction mapped cluster densities, is the fraction of the total area that this area type is. Thus, a "relativized composite mapped cluster density" for the area here may also be computed by dividing the mapped cluster density by the composite prediction mapped cluster density and taking the smaller of: the resulting ratio and 1.0 as the value for the relativized composite mapped cluster density.

Accordingly, note that as such a relativized (composite) mapped cluster density for an image cluster set area increases/decreases, it is assumed that the confidence of the target MS being in the image cluster set area should increase/decrease, respectively.

get_composite_prediction_mapped_cluster_density_for_high_certainty(FOM_ID, image_area);

The present function determines a composite prediction mapped cluster density by determining a composite prediction mapped cluster density for the area represented by "image_area" and for the First Order Model identified by "FOM_ID".

OUTPUT: composite mapped density This is a record for the composite prediction mapped cluster density. In particular, there are with two fields:
(i) a "value" field giving an approximation to the prediction mapped cluster density for the First Order Model having id, FOM_ID;
(ii) a "reliability" field giving an indication as to the reliability of the "value" field. The reliability field is in the range [0, 1] with 0 indicating that the "value" field is worthless and the larger the value the more assurance can be put in "value" with maximal assurance indicated when "reliability" is 1.

get_prediction_mapped_cluster_density_for(FOM_ID, area_type)

The present function determines an approximation to a prediction mapped cluster density, D, for an area type such that if an image cluster set area has a mapped cluster density >= D, then there is a high expectation that the target MS 140 is in the image cluster set area. Note that there are a number of embodiments that may be utilized for this function. The steps herein are also provided in flowchart form in FIGS. 29a through 29h.

OUTPUT: prediction mapped cluster density This is a value giving an approximation to the prediction mapped cluster density for the First Order Model having identity, "FOM_ID", and for the area type represented by "area_type"*/

It is important to note that the computation here for the prediction mapped cluster density may be more intense than some other computations but the cluster densities computed here need not be performed in real time target MS location processing. That is, the steps of this function may be performed only periodically (e.g., once a week), for each FOM and each area type thereby precomputing the output for this function. Accordingly, the values obtained here may be stored in a table that is accessed during real time target MS location processing. However, for simplicity, only the periodically performed steps are presented here. However, one skilled in the art will understand that with sufficiently fast computational devices, some related variations of this function may be performed in real-time. In particular, instead of supplying area type as an input to this function, a particular area, A, may be provided such as the image area for a cluster set area, or, the portion of such an image area in a particular area type. Accordingly, wherever "area_type" is used in a statement of the embodiment of this function below, a comparable statement with "A" can be provided.

(K.2) Location Hypothesis Analyzer Embodiment

Referring now to FIG. 7, an embodiment of the Hypothesis Analyzer is illustrated. The control component is denoted the control module 1400. Thus, this control module manages or controls access to the run time location hypothesis storage area 1410. The control module 1400 and the run time location hypothesis storage area 1410 may be implemented as a blackboard system and/or an expert system. Accordingly, in the blackboard embodiment, and the control module 1400 determines when new location hypotheses may be entered onto the blackboard from other processes such as the context adjuster 1326 as well as when location hypotheses may be output to the most likelihood estimator 1344.

The following is a brief description of each submodule included in the location hypothesis analyzer 1332.

(35.1) A control module 1400 for managing or controlling further processing of location hypotheses received from the context adjuster. This module controls all location hypothesis processing within the location hypothesis analyzer as well as providing the input interface with the context adjuster. There are numerous embodiments that may be utilized for this module, including, but not limited to, expert systems and blackboard managers.

(35.2) A run-time location hypothesis storage area 1410 for retaining location hypotheses during their processing by the location hypotheses analyzer. This can be, for example, an expert system fact base or a blackboard. Note that in some of the discussion hereinbelow, for simplicity, this module is referred to as a "blackboard". However, it is not intended that such notation be a limitation on the present disclosure; i.e., the term "blackboard" hereinafter will denote a run-time data repository for a data processing paradigm wherein the flow of control is substantially data-driven.

(35.3) An analytical reasoner module 1416 for determining if (or how well) location hypotheses are consistent with well known physical or heuristic constraints as, e.g., mentioned in (30.4) above. Note that this module may be a daemon or expert system rule base.

(35.4) An historical location reasoner module 1424 for adjusting location hypotheses' confidences according to how well the location signature characteristics (i.e., loc sigs) associated with a location hypothesis compare with "nearby" loc sigs in the location signature data base as indicated in (30.3) above. Note that this module may also be a daemon or expert system rule base.

(35.5) A location extrapolator module 1432 for use in updating previous location estimates for a target MS when a more recent location hypothesis is provided to the location hypothesis analyzer 1332. That is, assume that the control module 1400 receives a new location hypothesis for a target MS for which there are also one or more previous location hypotheses that either have been recently processed (i.e., they reside in the MS status repository 1338, as shown best in FIG. 6), or are currently being processed (i.e., they reside in the run-time location hypothesis storage area 1410). Accordingly, if the active timestamp (see FIGS. 9A and 9B regarding location hypothesis data fields) of the newly received location hypothesis is sufficiently more recent than the active timestamp of one of these previous location hypotheses, then an extrapolation may be performed by the location extrapolator module 1432 on such previous location hypotheses so that all target MS location hypotheses being concurrently analyzed are presumed to include target MS location estimates for substantially the same point in time. Thus, initial location estimates generated by the FOMs using different wireless signal measurements, from different signal transmission time intervals, may have their corresponding dependent location hypotheses utilized simultaneously for determining a most likely target MS location estimate. Note that this module may also be daemon or expert system rule base.

(35.6) hypothesis generating module 1428 for generating additional location hypotheses according to, for example, MS location information not adequately utilized or modeled. Note, location hypotheses may also be decomposed here if, for example it is determined that a location hypothesis includes an MS area estimate that has subareas with radically different characteristics such as an MS area estimate that includes an uninhabited area and a densely populated area. Additionally, the hypothesis generating module 1428 may generate "poor reception" location hypotheses that specify MS location areas of known poor reception that are "near" or intersect currently active location hypotheses. Note, that these poor reception location hypotheses may be specially tagged (e.g., with a distinctive FOM_ID value or specific tag field) so that regardless of substantially any other location hypothesis confidence value overlapping such a poor reception area, such an area will maintain a confidence value of "unknown" (i.e., zero). Note that substantially the only exception to this constraint is location hypotheses generated from mobile base stations 148. Note that this module may also be daemon or expert system rule base.

In the blackboard system embodiment of the location hypothesis analyzer, a blackboard system is the mechanism by which the last adjustments are performed on location hypotheses and by which additional location hypotheses may be generated. Briefly, a blackboard system can be described as a particular class of software that typically includes at least three basic components. That is:

(36.1) a data base called the "blackboard," whose stored information is commonly available to a collection of programming elements known as "daemons", wherein, in the present disclosure, the blackboard includes information concerning the current status of the location hypotheses being evaluated to determine a "most likely" MS location estimate. Note that this data base is provided by the run time location hypothesis storage area 1410;

(36.2) one or more active (and typically opportunistic) knowledge sources, denoted conventionally as "daemons," that create and modify the contents of the blackboard. The blackboard system employed requires only that the daemons have application knowledge specific to the MS location problem addressed by the present disclosure. As shown in FIG. 7, the knowledge sources or daemons in the hypothesis analyzer include the analytical reasoner module 1416, the hypothesis generating module 1428, and the historical location reasoner module 1416;

(36.3) a control module that enables the realization of the behavior in a serial computing environment. The control element orchestrates the flow of control between the various daemons. This control module is provided by the control module 1400.

Note that this blackboard system may be commercial, however, the knowledge sources, i.e., daemons, have been developed specifically for an embodiment of the present disclosure. For further information regarding such blackboard systems, the following references are incorporated herein by reference: (a) Jagannathan, V., Dodhiawala, R., & Baum, L. S. (1989). Blackboard architectures and applications. Boston, Mass.: Harcourt Brace Jovanovich Publishers; (b) Engelmore, R., & Morgan, T. (1988). Blackboard systems. Reading, Mass.: Addison-Wesley Publishing Company.

Alternatively, the control module 1400 and the run-time location hypothesis storage area 1410 may be implemented as an expert system or as a fuzzy rule inferencing system, wherein the control module 1400 activates or "fires" rules related to the knowledge domain (in the present case, rules relating to the accuracy of MS location hypothesis estimates), and wherein the rules provide a computational embodiment of, for example, constraints and heuristics related to the accuracy of MS location estimates. Thus, the control module 1400 for the present embodiment is also used for orchestrating, coordinating and controlling the activity of the individual rule bases of the location hypothesis analyzer (e.g. as shown in FIG. 7, the analytical reasoner module 1416, the hypothesis generating module 1428, the historical location reasoner module 1424, and the location extrapolator module 1432). For further information regarding such expert systems, the following reference is incorporated herein by reference: Waterman, D. A. (1970). A guide to expert systems. Reading, Mass.: Addison-Wesley Publishing Company.

(K.3) MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location (K.4) Most Likelihood Estimator Embodiment The most likelihood estimator 1344 is a module for determining a "most likely" location estimate for a target MS 140 being located (e.g., as in (30.7) above). In one embodiment, the most likelihood estimator performs an integration or summing of all location hypothesis confidence values for any geographic region(s) of interest having at least one location hypothesis that has been provided to the most likelihood estimator, and wherein the location hypothesis has a relatively (or sufficiently) high confidence. That is, the most likelihood estimator 1344 determines the area(s) within each such region having high confidences (or confidences above a threshold) as the most likely target MS 140 location estimates.

In one embodiment of the most likelihood estimator 1344, this module utilizes an area mesh, M, over which to integrate, wherein the mesh cells of M are preferably smaller than the greatest location accuracy desired. That is, each cell, c, of M is assigned a confidence value indicating a likelihood that the target MS 140 is located in c, wherein the confidence value for c is determined by the confidence values of the target MS location estimates provided to the most likelihood estimator 1344. Thus, to obtain the most likely location determination(s) the following steps are performed:

(a) For each of the active location hypotheses output by, e.g., the hypothesis analyzer 1332 (alternatively, the context adjuster 1326), each corresponding MS location area estimate, LAE, is provided with a smallest covering, $C_{LAE}$, of cells c from M.

(b) Subsequently, each of the cells of $C_{LAE}$ have their confidence values adjusted by adding to it the confidence value for LAE. Accordingly, if the confidence of LAE is positive, then the cells of $C_{LAE}$ have their confidences increased. Alternatively, if the confidence of LAE is negative, then the cells of $C_{LAE}$ have their confidences decreased.

(c) Given that the interval [−1.0, +1.0] represents the range in confidence values, and that this range has been partitioned into intervals, Int, having lengths of, e.g., 0.05, for each interval, Int, perform a cluster analysis function for clustering cells with confidences that are in Int. Thus, a topographical-type map may be constructed from the resulting cell clusters, wherein higher confidence areas are analogous to representations of areas having higher elevations.

(d) Output a representation of the resulting clusters for each Int to the output gateway 1356 for determining the location granularity and representation desired by each location application 146 requesting the location of the target MS 140.

Of course, variations in the above algorithm are also within the scope of the present disclosure. For example, some embodiments of the most likelihood estimator 1344 may:

(e) Perform special processing for areas designated as "poor reception" areas. For example, the most likelihood estimator 1344 may be able to impose a confidence value of zero (i.e., meaning it is unknown as to whether the target MS is in the area) on each such poor reception area regardless of the location estimate confidence values unless there is a location hypothesis from a reliable and unanticipated source. That is, the mesh cells of a poor reception area may have their confidences set to zero unless, e.g., there is a location hypothesis derived from target MS location data provided by a mobile base station 148 that: (a) is near the poor reception area, (b) able to detect that the target MS 140 is in the poor reception area, and (c) can relay target MS location data to the location center 142. In such a case, the confidence of the target MS location estimate from the MBS location hypothesis may take precedence. Thus, as disclosed, e.g., in the Summary section hereinabove as well as the mobile station descriptions hereinbelow, such a target MS location estimate from a MBS 148 can be dependent on the GPS location of the MBS 148.

Figure 10:
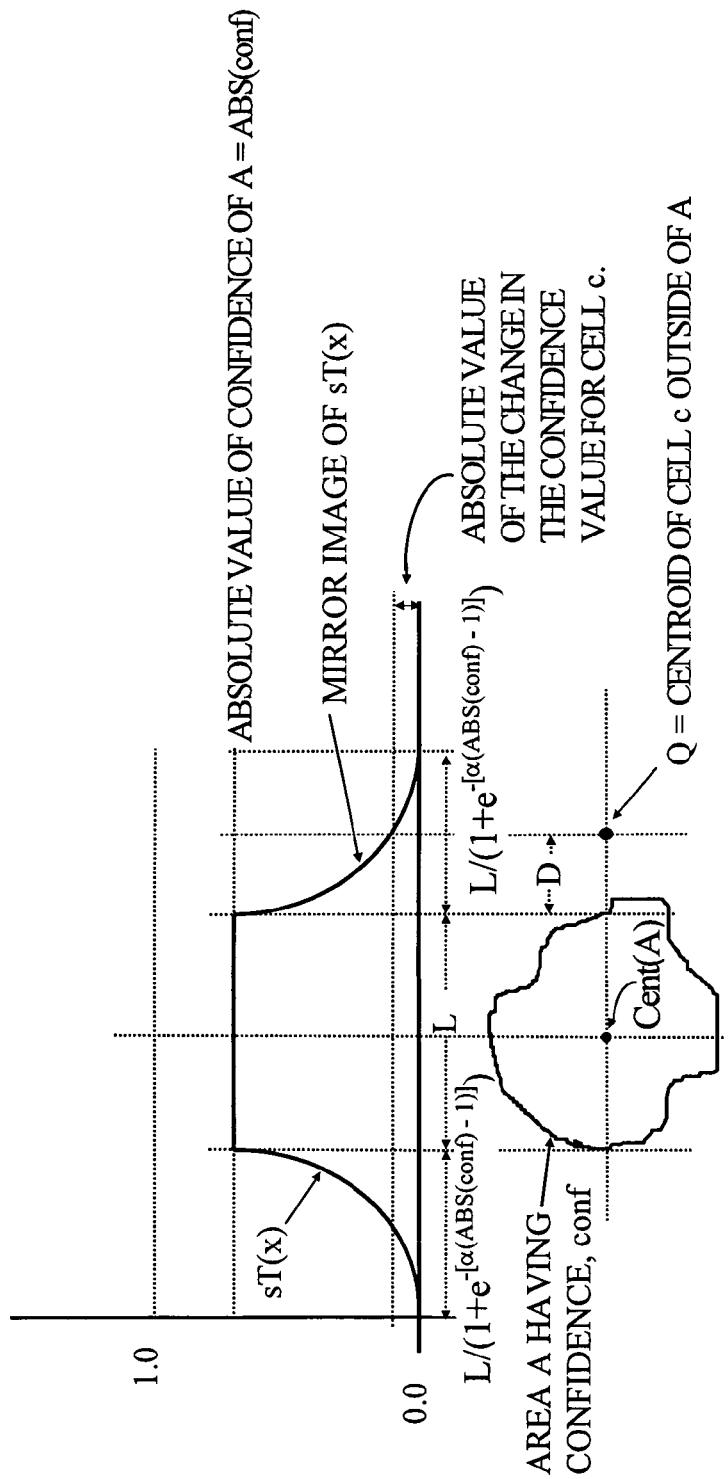
FIG. 10 is a graphical illustration of the computation performed by the most likelihood estimator 1344 of the hypothesis evaluator.

(f) Additionally, in some embodiments of the most likelihood estimator 1344, cells c of M that are "near" or adjacent to a covering $C_{LAE}$ may also have their confidences adjusted according to how near the cells c are to the covering. That is, the assigning of confidences to cell meshes may be "fuzzified" in the terms of fuzzy logic so that the confidence value of each location hypothesis utilized by the most likelihood estimator 1344 is provided with a weighting factor depending on its proximity to the target MS location estimate of the location hypothesis. More precisely, it is believed that "nearness," in the present context, should be monotonic with the "wideness" of the covering; i.e., as the extent of the covering increases (decreases) in a particular direction, the cells c affected beyond the covering also increases (decreases). Furthermore, in some embodiments of the most likelihood estimator 1344, the greater (lesser) the confidence in the LAE, the more (fewer) cells c beyond the covering have their confidences affected. To describe this technique in further detail, reference is made to FIG. 10, wherein an area A is assumed to be a covering $C_{LAE}$ having a confidence denoted "conf". Accordingly, to determine a confidence adjustment to add to a cell c not in A (and additionally, the centroid of A not being substantially identical with the centroid of c which could occur if A were donut shaped), the following steps may be performed:

(i) Determine the centroid of A, denoted Cent(A).
(ii) Determine the centroid of the cell c, denoted Q.
(iii) Determine the extent of A along the line between Cent(A) and Q, denoted L.
(iv) For a given type of probability density function, P(x), such as a Gaussian function, let T be the beginning portion of the function that lives on the x-axis interval [0, t], wherein P(t)=ABS(conf)=the absolute value of the confidence of $C_{LAE}$.
(v) Stretch T along the x-axis so that the stretched function, denoted sT(x), has an x-axis support of $[0, L/(1+e^{-[a(ABS(conf)-1)]})]$, where a is in range of 3.0 to 10.0; e.g., 5.0. Note that sT(x) is the function, $P(x*(1+e^{-[a(ABS(conf)-1)]})/L)$, on this stretched extent. Further note that for confidences of +1 and −1, the support of sT(x) is [0, L] and for confidences at (or near) zero this support. Further, the term, $$L/(1+e^{-[a(ABS(conf)-1)]})$$

is monotonically increasing with L and ABS(conf).
(vi) Determine D=the minimum distance that Q is outside of A along the line between Cent(A) and Q.
(vii) Determine the absolute value of the change in the confidence of c as sT(D).
(viii) Provide the value sT(D) with the same sign as conf, and provide the potentially sign changed value sT(D) as the confidence of the cell c.

Additionally, in some embodiments, the most likelihood estimator 1344, upon receiving one or more location hypotheses from the hypothesis analyzer 1332, also performs some or all of the following tasks:

(37.1) Filters out location hypotheses having confidence values near zero whenever such location hypotheses are deemed too unreliable to be utilized in determining a target MS location estimate. For example, location hypotheses having confidence values in the range [−0.02, 0.02] may be filtered here;

(37.2) Determines the area of interest over which to perform the integration. In one embodiment, this area is a convex hull including each of the MS area estimates from the received location hypotheses (wherein such location hypotheses have not been removed from consideration by the filtering process of (37.1));

(37.3) Determines, once the integration is performed, one or more collections of contiguous area mesh cells that may be deemed a "most likely" MS location estimate, wherein each such collection includes one or more area mesh cells having a high confidence value.

(K.5) Detailed Description of the Location Hypothesis Analyzer 1332 Submodules (K.5.1) Analytical Reasoner Module 1416

The analytical reasoner applies constraint or "sanity" checks to the target MS estimates of the location hypotheses residing in the Run-time Location Hypothesis Storage Area for adjusting the associated confidence values accordingly. In one embodiment, these sanity checks involve "path" information. That is, this module determines if (or how well) location hypotheses are consistent with well known physical constraints such as the laws of physics, in an area in which the MS (associated with the location hypothesis) is estimated to be located. For example, if the difference between a previous (most likely) location estimate of a target MS and an estimate by a current location hypothesis requires the MS to:

(a) move at an unreasonably high rate of speed (e.g., 200 mph), or
(b) move at an unreasonably high rate of speed for an area (e.g., 80 mph in a corn patch), or
(c) make unreasonably sharp velocity changes (e.g., from 60 mph in one direction to 60 mph in the opposite direction in 4 sec), then the confidence in the current hypothesis is reduced. Such path information may be derived for each time series of location hypotheses resulting from the FOMs by maintaining a window of previous location hypotheses in the MS status repository 1338. Moreover, by additionally retaining the "most likely" target MS location estimates (output by the most likelihood estimator 1344), current location hypotheses may be compared against such most likely MS location estimates.

The following path sanity checks are incorporated into the computations of this module. That is:

(1) do the predicted MS paths generally follow a known transportation pathway (e.g., in the case of a calculated speed of greater than 50 miles per hour are the target MS location estimates within, for example, 0.2 miles of a pathway where such speed may be sustained); if so (not), then increase (decrease) the confidence of the location hypotheses not satisfying this criterion;

(2) are the speeds, velocities and accelerations, determined from the current and past target MS location estimates, reasonable for the region (e.g., speeds should be less than 60 miles per hour in a dense urban area at 9 am); if so (not), then increase (decrease) the confidence of those that are (un)reasonable;

(3) are the locations, speeds, velocities and/or accelerations similar between target MS tracks produced by different FOMs similar; decrease the confidence of the currently active location hypotheses that are indicated as "outliers" by this criterion;

(4) are the currently active location hypothesis target MS estimates consistent with previous predictions of where the target MS is predicted to be from a previous (most likely) target MS estimate; if not, then decrease the confidence of at least those location hypothesis estimates that are substantially different from the corresponding predictions. Note, however, that in some cases this may be over ruled. For example, if the prediction is for an area for which there is Location Base Station coverage, and no Location Base Station covering the area subsequently reports communicating with the target MS, then the predictions are incorrect and any current location hypothesis from the same FOM should not be decreased here if it is outside of this Location Base Station coverage area.

Notice from FIG. 7 that the analytical reasoner can access location hypotheses currently posted on the Run-time Location Hypothesis Storage Area. Additionally, it interacts with the Pathway Database which contains information concerning the location of natural transportation pathways in the region (highways, rivers, etc.) and the Area Characteristics Database which contains information concerning, for example, reasonable velocities that can be expected in various regions (for instance, speeds of 80 mph would not be reasonably expected in dense urban areas). Note that both speed and direction can be important constraints; e.g., even though a speed might be appropriate for an area, such as 20 mph in a dense urban area, if the direction indicated by a time series of related location hypotheses is directly through an extensive building complex having no through traffic routes, then a reduction in the confidence of one or more of the location hypotheses may be appropriate.

One embodiment of the Analytical Reasoner illustrating how such constraints may be implemented is provided in the following section. Note, however, that this embodiment analyzes only location hypotheses having a non-negative confidence value.

Modules of an embodiment of the analytical reasoner module 1416 are provided hereinbelow.

(K.5.1.1) Path Comparison Module

The path comparison module 1454 implements the following strategy: the confidence of a particular location hypothesis is to be increased (decreased) if it is (not) predicting a path that lies along a known transportation pathway (and the speed of the target MS is sufficiently high). For instance, if a time series of target MS location hypotheses for a given FOM is predicting a path of the target MS that lies along an interstate highway, the confidence of the currently active location hypothesis for this FOM should, in general, be increased. Thus, at a high level the following steps may be performed:

(a) For each FOM having a currently active location hypothesis in the Run-time Location Hypothesis Storage Area (also denoted "blackboard"), determine a recent "path" obtained from a time series of location hypotheses for the FOM. This computation for the "path" is performed by stringing together successive "center of area" (COA) or centroid values determined from the most pertinent target MS location estimate in each location hypothesis (recall that each location hypothesis may have a plurality of target MS area estimates with one being the most pertinent). The information is stored in, for example, a matrix of values wherein one dimension of the matrix identifies the FOM and the a second dimension of the matrix represents a series of COA path values. Of course, some entries in the matrix may be undefined.

(b) Compare each path obtained in (a) against known transportation pathways in an area containing the path. A value, path_match(i), representing to what extent the path matches any known transportation pathway is computed. Such values are used later in a computation for adjusting the confidence of each corresponding currently active location hypothesis.

(K.5.1.2) Velocity/Acceleration Calculation Module

The velocity/acceleration calculation module 1458 (FIG. 7) computes velocity and/or acceleration estimates for the target MS 140 using currently active location hypotheses and previous location hypothesis estimates of the target MS. In one embodiment, for each FOM 1224 having a currently active location hypothesis (with positive confidences) and a sufficient number of previous (reasonably recent) target MS location hypotheses, a velocity and/or acceleration may be calculated. In an alternative embodiment, such a velocity and/or acceleration may be calculated using the currently active location hypotheses and one or more recent "most likely" locations of the target MS output by the location engine 139. If the estimated velocity and/or acceleration corresponding to a currently active location hypothesis is reasonable for the region, then its confidence value may be incremented; if not, then its confidence may be decremented. The algorithm may be summarized as follows:

(a) Approximate speed and/or acceleration estimates for currently active target MS location hypotheses may be provided using path information related to the currently active location hypotheses and previous target MS location estimates in a manner similar to the description of the path comparison module 1454. Accordingly, a single confidence adjustment value may be determined for each currently active location hypothesis for indicating the extent to which its corresponding velocity and/or acceleration calculations are reasonable for its particular target MS location estimate. This calculation is performed by retrieving information from the area characteristics data base 1450 (e.g., FIGS. 6 and 7). Since each location hypothesis includes timestamp data indicating when the MS location signals were received from the target MS, the velocity and/or acceleration associated with a path for a currently active location hypothesis can be straightforwardly approximated. Accordingly, a confidence adjustment value, vel_ok(i), indicating a likelihood that the velocity calculated for the $i^{th}$ currently active location hypothesis (having adequate corresponding path information) may be appropriate is calculated using for the environmental characteristics of the location hypothesis' target MS location estimate. For example, the area characteristics data base 1450 may include expected maximum velocities and/or accelerations for each area type and/or cell of a cell mesh of the coverage area 120. Thus, velocities and/or accelerations above such maximum values may be indicative of anomalies in the MS location estimating process. Accordingly, in one embodiment, the most recent location hypotheses yielding such extreme velocities and/or accelerations may have their confidence values decreased. For example, if the target MS location estimate includes a portion of an interstate highway, then an appropriate velocity might correspond to a speed of up to 100 miles per hour, whereas if the target MS location estimate includes only rural dirt roads and tomato patches, then a likely speed might be no more than 30 miles per hour with an maximum speed of 60 miles per hour (assuming favorable environmental characteristics such as weather). Note that a list of such environmental characteristics may include such factors as: area type, time of day, season. Further note that more unpredictable environmental characteristics such as traffic flow patterns, weather (e.g., clear, raining, snowing, etc.) may also be included, values for these latter characteristics coming from the environmental data base 1354 which receives and maintains information on such unpredictable characteristics (e.g., FIGS. 6 and 7). Also note that a similar confidence adjustment value, acc_ok(i), may be provided for currently active location hypotheses, wherein the confidence adjustment is related to the appropriateness of the acceleration estimate of the target MS.

(K.5.1.3) Attribute Comparison Module

The attribute comparison module 1462 (FIG. 7) compares attribute values for location hypotheses generated from different FOMs, and determines if the confidence of certain of the currently active location hypotheses should be increased due to a similarity in related values for the attribute. That is, for an attribute A, an attribute value for A derived from a set $S_{FOM[1]}$ of one or more location hypotheses generated by one FOM, FOM[1], is compared with another attribute value for A derived from a set $S_{FOM2}$ of one or more location hypotheses generated by a different FOM, FOM[2] for determining if these attribute values cluster (i.e., are sufficiently close to one another) so that a currently active location hypothesis in $S_{FOM[1]}$ and a currently active location hypothesis in $S_{FOM[2]}$ should have their confidences increased. For example, the attribute may be a "target MS path data" attribute, wherein a value for the attribute is an estimated target MS path derived from location hypotheses generated by a fixed FOM over some (recent) time period. Alternatively, the attribute might be, for example, one of a velocity and/or acceleration, wherein a value for the attribute is a velocity and/or acceleration derived from location hypotheses generated by a fixed FOM over some (recent) time period.

In a general context, the attribute comparison module 1462 operates according to the following premise:

(38.1) for each of two or more currently active location hypotheses (with, e.g., positive confidences) if:
  (a) each of these currently active location hypotheses, H, was initially generated by a corresponding different $FOM_H$;
  (b) for a given MS estimate attribute and each such currently active location hypothesis, H, there is a corresponding value for the attribute (e.g., the attribute value might be an MS path estimate, or alternatively an MS estimated velocity, or an MS estimated acceleration), wherein the attribute value is derived without using a FOM different from $FOM_H$, and;
  (c) the derived attribute values cluster sufficiently well, then each of these currently active location hypotheses, H, will have their corresponding confidences increased. That is, these confidences will be increased by a confidence adjustment value or delta.

Note that the phrase "cluster sufficiently well" above may have a number of technical embodiments, including performing various cluster analysis techniques wherein any clusters (according to some statistic) must satisfy a system set threshold for the members of the cluster being close enough to one another. Further, upon determining the (any) location hypotheses satisfying (38.1), there are various techniques that may be used in determining a change or delta in confidences to be applied. For example, in one embodiment, an initial default confidence delta that may be utilized is: if "cf" denotes the confidence of such a currently active location hypothesis satisfying (38.1), then an increased confidence that still remains in the interval [0, 1.0] may be: $cf+[(1-cf)/(1+cf)]^2$, or, $cf*[1.0+cf^n]$, n.=>2, or, cf*[a constant having a system tuned parameter as a factor]. That is, the confidence deltas for these examples are: $[(1-cf)/(1+cf)]^2$ (an additive delta), and, $[1.0+cf^n]$ (a multiplicative delta), and a constant. Additionally, note that it is within the scope of the present disclosure to also provide such confidence deltas (additive deltas or multiplicative deltas) with factors related to the number of such location hypotheses in the cluster.

Moreover, note that it is an aspect of the present disclosure to provide an adaptive mechanism (i.e., the adaptation engine 1382 shown in FIGS. 5, 6 and 8) for automatically determining performance enhancing changes in confidence adjustment values such as the confidence deltas for the present module. That is, such changes are determined by applying an adaptive mechanism, such as a genetic algorithm, to a collection of "system parameters" (including parameters specifying confidence adjustment values as well as system parameters of, for example, the context adjuster 1326) in order to enhance performance of an embodiment of the present disclosure. More particularly, such an adaptive mechanism may repeatedly perform the following steps:

(a) modify such system parameters;
  (b) consequently activate an instantiation of the location engine 139 (having the modified system parameters) to process, as input, a series of MS signal location data that has been archived together with data corresponding to a verified MS location from which signal location data was transmitted (e.g., such data as is stored in the location signature data base 1320); and
  (c) then determine if the modifications to the system parameters enhanced location engine 139 performance in comparison to previous performances.

Assuming this module adjusts confidences of currently active location hypotheses according to one or more of the attributes: target MS path data, target MS velocity, and target MS acceleration, the computation for this module may be summarized in the following steps:

(a) Determine if any of the currently active location hypotheses satisfy the premise (38.1) for the attribute. Note that in making this determination, average distances and average standard deviations for the paths (velocities and/or accelerations) corresponding to currently active location hypotheses may be computed.
  (b) For each currently active location hypothesis (wherein "i" uniquely identifies the location hypothesis) selected to have its confidence increased, a confidence adjustment value, path_similar(i) (alternatively, velocity_similar(i) and/or acceleration_similar(i)), is computed indicating the extent to which the attribute value matches another attribute value being predicted by another FOM.

Note that such confidence adjustment values are used later in the calculation of an aggregate confidence adjustment to particular currently active location hypotheses.

(K.5.1.4) Analytical Reasoner Controller

Given one or more currently active location hypotheses for the same target MS input to the analytical reasoner controller 1466 (FIG. 7), this controller activates, for each such input location hypothesis, the other submodules of the analytical reasoner module 1416 (denoted hereinafter as "adjustment submodules") with this location hypothesis. Subsequently, the analytical reasoner controller 1466 receives an output confidence adjustment value computed by each adjustment submodule for adjusting the confidence of this location hypothesis. Note that each adjustment submodule determines:

(a) whether the adjustment submodule may appropriately compute a confidence adjustment value for the location hypothesis supplied by the controller. (For example, in some cases there may not be a sufficient number of location hypotheses in a time series from a fixed FOM);

(b) if appropriate, then the adjustment submodule computes a non-zero confidence adjustment value that is returned to the analytical reasoner controller.

Subsequently, the controller uses the output from the adjustment submodules to compute an aggregate confidence adjustment for the corresponding location hypothesis. In one particular embodiment of the present disclosure, values for the eight types of confidence adjustment values (described in sections above) are output to the present controller for computing an aggregate confidence adjustment value for adjusting the confidence of the currently active location hypothesis presently being analyzed by the analytical reasoner module 1416. As an example of how such confidence adjustment values may be utilized, assuming a currently active location hypothesis is identified by "i", the outputs from the above described adjustment submodules may be more fully described as:

path_match(i) 1 if there are sufficient previous (and recent) location hypotheses for the same target MS as "i" that have been generated by the same FOM that generated "i", and, the target MS location estimates provided by the location hypothesis "i" and the previous location hypotheses follow a known transportation pathway. 0 otherwise.

vel_ok(i) 1 if the velocity calculated for the $i^{th}$ currently active location hypothesis (assuming adequate corresponding path information) is typical for the area (and the current environmental characteristics) of this location hypothesis' target MS location estimate;

0.2 if the velocity calculated for the $i^{th}$ currently active location hypothesis is near a maximum for the area (and the current environmental characteristics) of this location hypothesis' target MS location estimate;

0 if the velocity calculated is above the maximum.

acc_ok(i) 1 if the acceleration calculated for the $i^{th}$ currently active location hypothesis (assuming adequate corresponding path information) is typical for the area (and the current environmental characteristics) of this location hypothesis' target MS location estimate;

0.2 if the acceleration calculated for the $i^{th}$ currently active location hypothesis is near a maximum for the area (and the current environmental characteristics) of this location hypothesis' target MS location estimate;

0 if the acceleration calculated is above the maximum.

similar_path(i) 1 if the location hypothesis "i" satisfies (38.1) for the target MS path data attribute; 0 otherwise.

velocity_similar(i) 1 if the location hypothesis "i" satisfies (38.1) for the target MS velocity attribute; 0 otherwise.

acceleration_similar(i) 1 if the location hypothesis "i" satisfies (38.1) for the target MS acceleration attribute; 0 otherwise.

extrapolation_chk(i) 1 if the location hypothesis "i" is "near" a previously predicted MS location for the target MS; 0 otherwise.

Additionally, for each of the above confidence adjustments, there is a corresponding location engine 139 system setable parameter whose value may be determined by repeated activation of the adaptation engine 1382. Accordingly, for each of the confidence adjustment types, T, above, there is a corresponding system setable parameter, "alpha_T", that is tunable by the adaptation engine 1382. Accordingly, the following high level program segment illustrates the aggregate confidence adjustment value computed by the Analytical Reasoner Controller.

```
target_MS_loc_hyps ← get all currently active location hypothesis,
H, identifying the present target;
for each currently active location hypothesis, hyp(i), from
target_MS_loc_hyps do
{
    for each of the confidence adjustment submodules, CA, do
        activate CA with hyp(i) as input;
    /* now compute the aggregate confidence adjustment using the
        output from the confidence adjustment submodules. */
    aggregate_adjustment(i) ← alpha_path match * path_match(i)
                + alpha_velocity * vel_ok(i)
                + alpha_path_similar * path_similar(i)
                + alpha_velocity_similar * velocity_similar(i)
                + alpha_acceleration_similar*
                  acceleration_similar(i)
                + alpha_extrapolation * extrapolation_chk(i);
    hyp(i).confidence ← hyp(i).confidence + aggregate_adjustment(i);
}
```

(K.5.2) Historical Location Reasoner

The historical location reasoner module 1424 (FIG. 7) may be, for example, a daemon or expert system rule base. The module adjusts the confidences of currently active location hypotheses by using (from location signature data base 1320) historical signal data correlated with: (a) verified MS locations (e.g. locations verified when emergency personnel co-locate with a target MS location), and (b) various environmental factors to evaluate how consistent the location signature cluster for an input location hypothesis agrees with such historical signal data.

This reasoner will increase/decrease the confidence of a currently active location hypothesis depending on how well its associated loc sigs correlate with the loc sigs obtained from data in the location signature data base.

Note that the embodiment hereinbelow is but one of many embodiments that may adjust the confidence of currently active location hypotheses appropriately. Accordingly, it is important to note other embodiments of the historical location reasoner functionality are within the scope of the present disclosure as one skilled in the art will appreciate upon examining the techniques utilized within this specification. For example, calculations of a confidence adjustment factor may be determined using Monte Carlo techniques as in the context adjuster 1326. Each such embodiment generates a measurement of at least one of the similarity and the discrepancy between the signal characteristics of the verified location signature clusters in the location signature data base and the location signature cluster for an input currently active location hypothesis, "loc_hyp".

The embodiment hereinbelow provides one example of the functionality that can be provided by the historical location reasoner 1424 (either by activating the following programs as a daemon or by transforming various program segments into the consequents of expert system rules). The present embodiment generates such a confidence adjustment by the following steps:

(a) comparing, for each cell in a mesh covering of the most relevant MS location estimate in "loc_hyp", the location signature cluster of the "loc_hyp" with the verified location signature clusters in the cell so that the following are computed: (i) a discrepancy or error measurement is determined, and (ii) a corresponding measurement indicating a likelihood or confidence of the discrepancy measurement being relatively accurate in comparison to other such error measurements;

(b) computing an aggregate measurement of both the errors and the confidences determined in (a); and (c) using the computed aggregate measurement of (b) to adjust the confidence of "loc_hyp".

The program illustrated in APPENDIX E provides a more detailed embodiment of the steps immediately above.

(K.5.3) Location Extrapolator

The location extrapolator 1432 (FIG. 7) works on the following premise: if for a currently active location hypothesis there is sufficient previous related information regarding estimates of the target MS (e.g., from the same FOM or from using a "most likely" previous target MS estimate output by the location engine 139), then an extrapolation may be performed for predicting future target MS locations that can be compared with new location hypotheses provided to the blackboard. Note that interpolation routines (e.g., conventional algorithms such as Lagrange or Newton polynomials) may be used to determine an equation that approximates a target MS path corresponding to a currently active location hypothesis.

Subsequently, such an extrapolation equation may be used to compute a future target MS location. For further information regarding such interpolation schemes, the following reference is incorporated herein by reference: Mathews, 1992, Numerical methods for mathematics, science, and engineering. Englewood Cliffs, N.J.: Prentice Hall.

Accordingly, if a new currently active location hypothesis (e.g., supplied by the context adjuster) is received by the blackboard, then the target MS location estimate of the new location hypothesis may be compared with the predicted location. Consequently, a confidence adjustment value can be determined according to how well the new location hypothesis "i" fits with the predicted location. That is, this confidence adjustment value will be larger as the new MS estimate and the predicted estimate become closer together. Note that in one embodiment of the present disclosure, such predictions are based solely on previous target MS location estimates output by location engine 139. Thus, in such an embodiment, substantially every currently active location hypothesis can be provided with a confidence adjustment value by this module once a sufficient number of previous target MS location estimates have been output. Accordingly, a value, extrapolation_chk(i), that represents how accurately the new currently active location hypothesis (identified here by "i") matches the predicted location is determined.

(K.5.4) Hypothesis Generating Module

The hypothesis generating module 1428 (FIG. 7) is used for generating additional location hypotheses according to, for example, MS location information not adequately utilized or modeled. Note, location hypotheses may also be decomposed here if, for example it is determined that a location hypothesis includes an MS area estimate that has subareas with radically different characteristics such as an area that includes an uninhabited area and a densely populated area. Additionally, the hypothesis generating module 1428 may generate "poor reception" location hypotheses that specify MS location areas of known poor reception that are "near" or intersect currently active location hypotheses. Note, that these poor reception location hypotheses may be specially tagged (e.g., with a distinctive FOM_ID value or specific tag field) so that regardless of substantially any other location hypothesis confidence value overlapping such a poor reception area, such an area will maintain a confidence value of "unknown" (i.e., zero). Note that substantially the only exception to this constraint is location hypotheses generated from mobile base stations 148.

(L) Mobile Base Station Location Subsystem Description (L.1) Mobile Base Station Subsystem Introduction Any collection of mobile electronics (denoted mobile location unit) that is able to both estimate a location of a target MS 140 and communicate with the base station network may be utilized by an embodiment of the present disclosure to more accurately locate the target MS. Such mobile location units may provide greater target MS location accuracy by, for example, homing in on the target MS and by transmitting additional MS location information to the location center 142. There are a number of embodiments for such a mobile location unit contemplated by the present disclosure. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the present disclosure contemplates their use. However, in cases where direct communication with the target MS is desired without constant contact with the base station infrastructure, an embodiment of the present disclosure includes a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, airplanes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of LBSs 152) and therefore although these BS's may be more reliable in their in their ability to communicate information related to the location of a target MS with the location center, accuracy can be problematic in poor reception areas. Thus, MBS's may be used in areas (such as wilderness areas) where there may be no other means for reliably and cost effectively locating a target MS 140 (i.e., there may be insufficient fixed location BS's coverage in an area).

Figure 11:
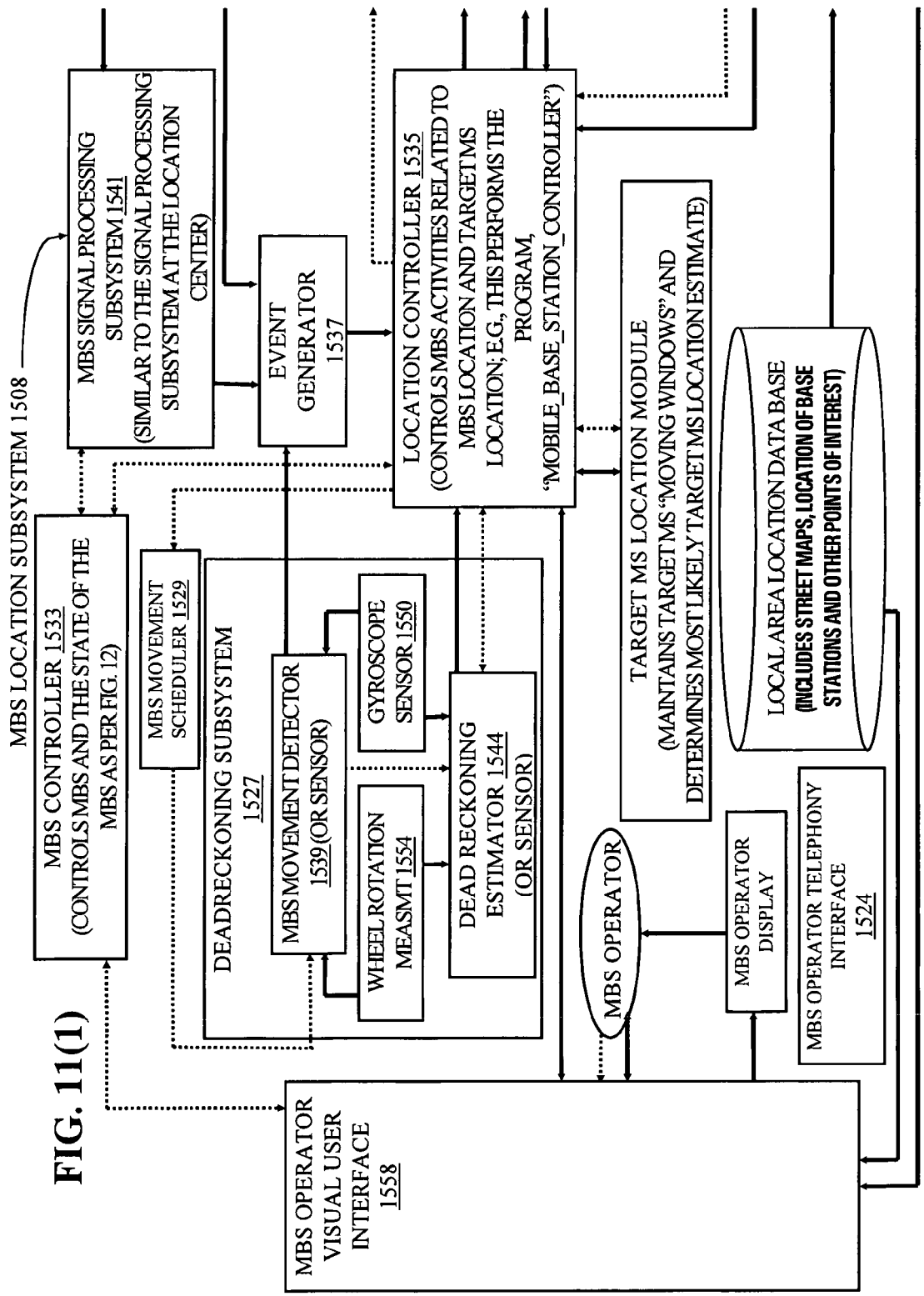
FIG. 11 is a high level block diagram of the mobile base station (MBS).
Figure 11:
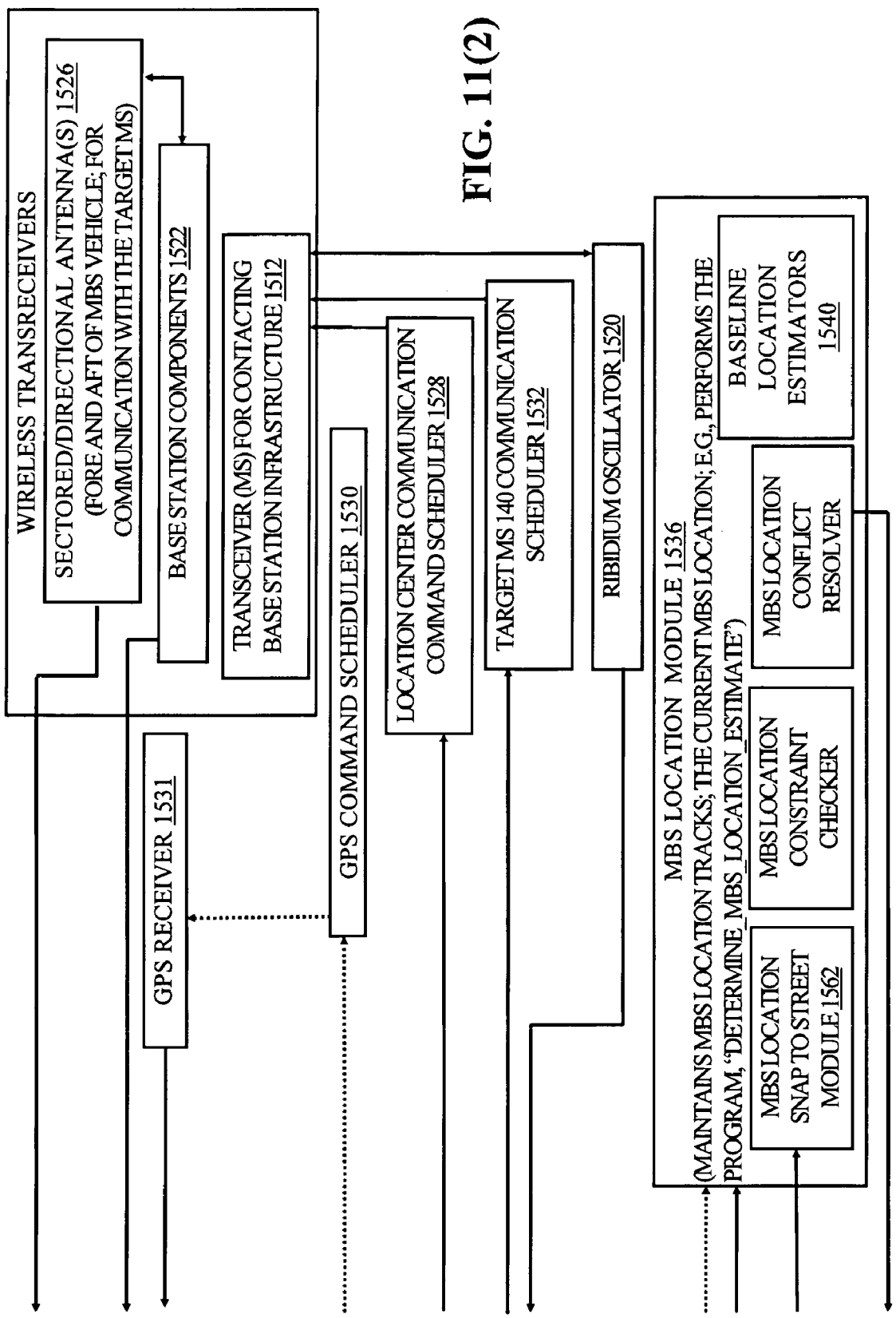

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:
  (a) raise/lower its pilot channel signal strength,
  (b) be in a state of soft hand-off with an MS 140, and/or
  (c) be the primary BS 122 for an MS 140, and consequently be in voice communication with the target MS (via the MBS operator telephony interface 1524) if the MS supports voice communication.

Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one of more directional antennas 1526 on-board the MBS 148.

Figure 12:
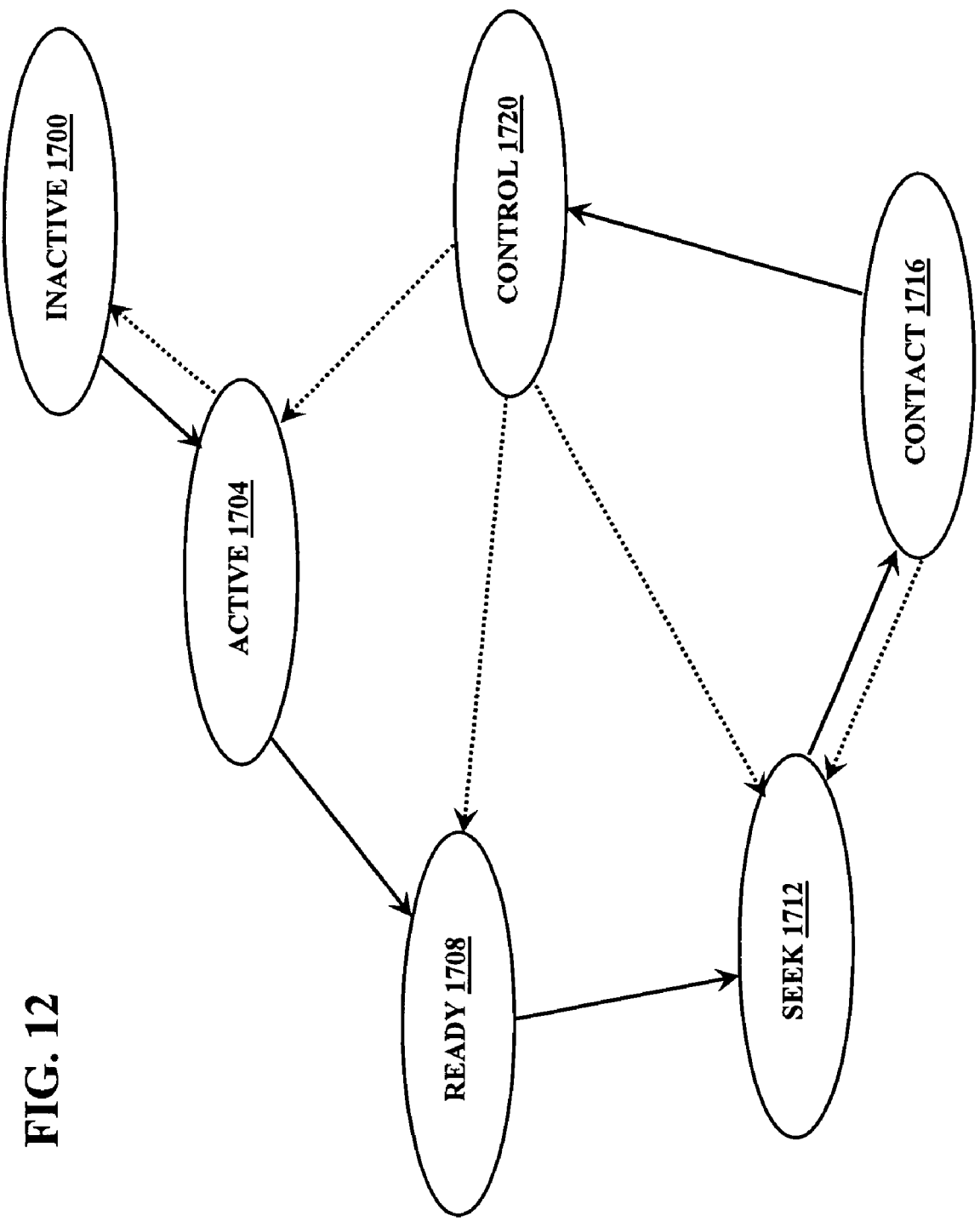
FIG. 12 is a high level state transition diagram describing computational states the Mobile Base station enters during operation.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:
  (1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.
  (1b) Establishing the location of the MBS 148. In one embodiment, this may be accomplished by, for example, an MBS operator identifying the predetermined or well known location at which the MBS 148 is located.
  (1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142 location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the MBS (via the base station infrastructure) from the 911 emergency center or the location center, then the MBS may transition to a seek state 1712 by performing the following steps:

(2a) Communicating with, for example, the 911 emergency response center via the fixed location base station network to receive the PN code for the target MS to be located (wherein this communication is performed using the MS-like transceiver 1512 and/or the MBS operator telephony interface 1524).

(2b) Obtaining a most recent target MS location estimate from either the 911 emergency center or the location center 142.

(2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

(3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base station infrastructure network.

(4c) Since the MBS 148 is at least in soft hand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

(L.2) MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, the MBS controller 1533 initiates and controls the MBS state changes as described in FIG. 12 above. Additionally, the MBS controller 1533 also communicates with the location controller 1535, wherein this latter controller controls MBS activities related to MBS location and target MS location; e.g., this performs the program, "mobile_base_station_controller" described in APPENDIX A hereinbelow. The location controller 1535 receives data input from an event generator 1537 for generating event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. Moreover, also note that there may be multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS deadreckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS. Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540*a* (not individually shown) for computing an MBS location estimate using GPS signals, (b) a location center location estimator 1540*b* (not individually shown) for buffering and/or translating an MBS estimate received from the location center 142, (c) an MBS operator location estimator 1540*c* (not individually shown) for buffering and/or translating manual MBS location entries received from an MBS location operator, and (d) in some MBS embodiments, an LBS location estimator 1540*d* (not individually shown) for the activating and deactivating of LBS's 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of the present disclosure that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the distance FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center;

(b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of the present disclosure, it is an aspect of the present disclosure that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of the present disclosure, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estimates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with deadreckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level, the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of the present disclosure that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks.

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location, particularly, if an MBS 148 is moving at typical rates of speed and acceleration, and without abrupt changes in direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

(L.3) MBS Data Structure Remarks

Figure 13:
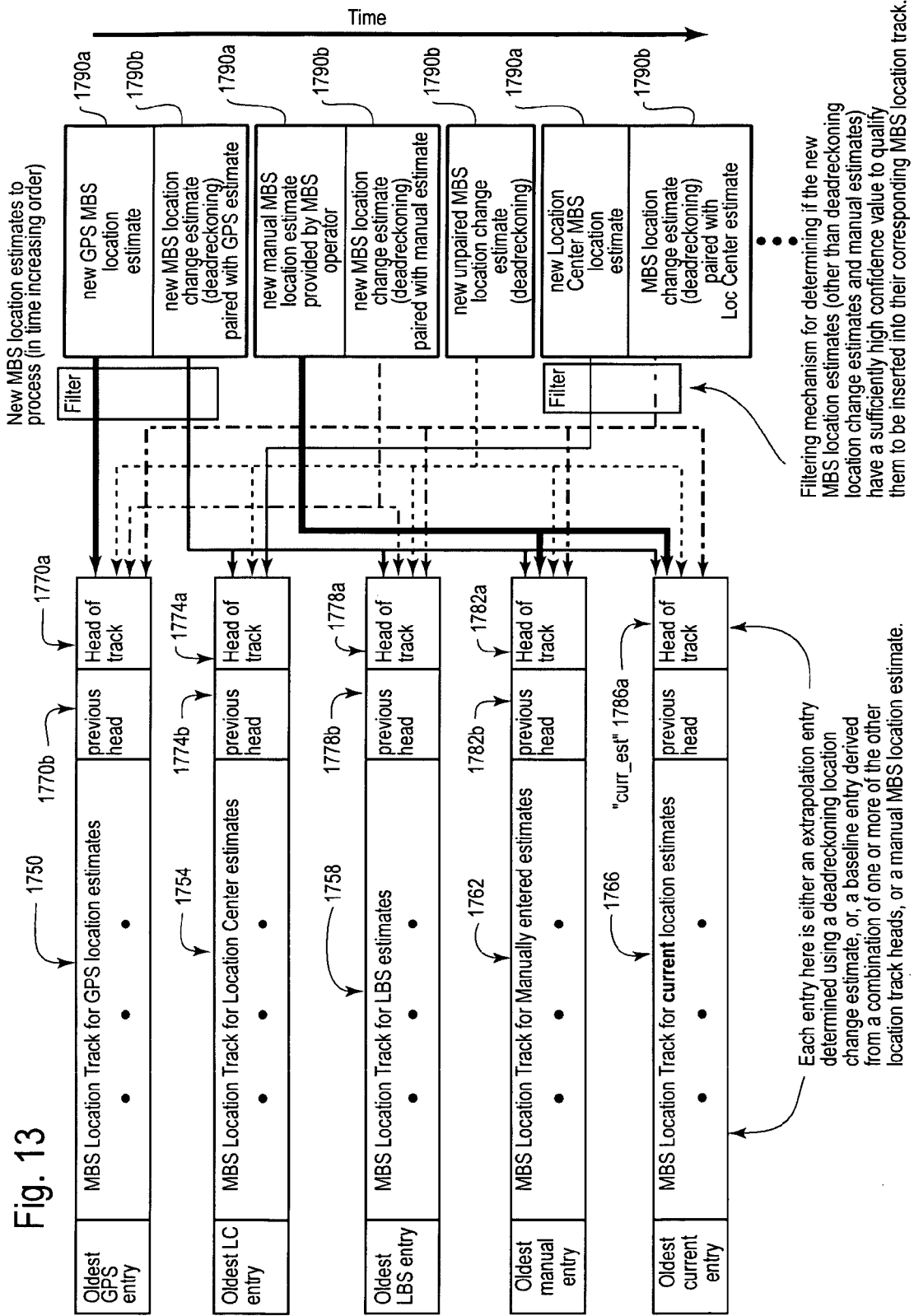
FIG. 13 is a high level diagram illustrating the data structural organization of the Mobile Base station capability for autonomously determining a most likely MBS location from a plurality of potentially conflicting MBS location estimating sources.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein. Additionally, it is assumed that such "most likely areas" are not grossly oblong; i.e., area cross sectioning lines through the centroid of the area do not have large differences in their lengths. For example, for any such "most likely area", A, no two such cross sectioning lines of A may have lengths that vary by more than a factor of two.

Each MBS location estimate also has a confidence associated therewith providing a measurement of the perceived accuracy of the MBS being in the "most likely area" of the location estimate.

A (MBS) "location track" is a data structure (or object) having a queue of a predetermined length for maintaining a temporal (timestamp) ordering of "location track entries" such as the location track entries 1770*a*, 1770*b*, 1774*a*, 1774*b*, 1778*a*, 1778*b*, 1782*a*, 1782*b*, and 1786*a* (FIG. 13), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track. The location track head is the most recent (and presumably the most accurate) MBS location estimate residing in the location track. Thus, the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:

(i) In certain circumstances (described hereinbelow), the location track entries are removed from the head of the location track queues so that location adjustments may be made. In such a case, it may be advantageous for the length of such queues to be greater than the number of entries that are expected to be removed;

(ii) In determining an MBS location estimate, it may be desirable in some embodiments to provide new location estimates based on paths associated with previous MBS location estimates provided in the corresponding location track queue.

Also note that it is within the scope of the present disclosure that the location track queue lengths may be a length of one.

Regarding location track entries, each location track entry includes:

(a) a "derived location estimate" for the MBS that is derived using at least one of:
  (i) at least a most recent previous output from an MBS baseline location estimator 1540 (i.e., the output being an MBS location estimate);
  (ii) deadreckoning output information from the deadreckoning subsystem 1527.
  Further note that each output from an MBS location estimator has a "type" field that is used for identifying the MBS location estimator of the output.

(b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.

(c) a "latest timestamp" providing the time/date when the latest MBS location information upon which the derived location estimate for the MBS depends. Note that earliest timestamp=latest timestamp only for so called "baseline entries" as defined hereinbelow. Further note that this attribute is the one used for maintaining the "temporal (timestamp) ordering" of location track entries.

(d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:

(a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);

(b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.

(c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself, then T=B. Accordingly, note that for each extrapolation entry that is the head of a location track, there is a most recent baseline entry associated with the extrapolation entry.

Further, there are two categories of location tracks:

(a) "baseline location tracks," each having baseline entries exclusively from a single predetermined MBS baseline location estimator; and (b) a "current" MBS location track having entries that are computed or determined as "most likely" MBS location estimates from entries in the other MBS location tracks.

(L.4) MBS Location Estimating Strategy

In order to be able to properly compare the track heads to determine the most likely MBS location estimate it is an aspect of the present invention that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790b portion, and in some cases also having a 1790a portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, an embodiment of the present disclosure also substantially simultaneously queries the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same "latest timestamp", E and C will be hereinafter referred as "paired."

High level descriptions of an embodiment of the location functions performed by an MBS 148 are provided in APPENDIX A hereinbelow.

APPENDIX A: MBS FUNCTION EMBODIMENTS

Mobile Base Station Controller Program
mobile_base_station_controller( )
{
wait_for_input_of_first_MBS_location(event); /* "event" is a record (object) with MBS location data */
WHILE (no MBS operator input to exit) DO
  CASE OF (event): /* determine the type of "event" and process it. */
    MBS LOCATION DATA RECEIVED FROM GPS:
    MBS LOCATION DATA RECEIVED FROM LBS:
    MBS LOCATION DATA RECEIVED FROM ANY OTHER HIGHLY RELIABLE MBS
    LOCATION SOURCES (EXCEPT LOCATION CENTER):
    {
      MBS_new_est←get_new_MBS_location_using_estimate(event);
      /* Note, whenever a new MBS location estimate is entered as a baseline estimate into one of the location tracks, the other location tracks must be immediately updated with any deadreckoning location change estimates so that all location tracks are substantially updated at the same time. */

```
deadreck_est←get_deadreckoning_location_
    change_estimate(event);
MBS_curr_est←DETERMINE_MBS_
    LOCATION_ESTIMATE(MBS_new_est,
    deadreck_est);
if (MBS_curr_est.confidence>a predetermined high
    confidence threshold) then
    reset_deadreckoning_MBS_location_estimator
        (event);
        /* deadreckoning starts over from here. */
/*Send MBS location information to the Location
    Center. */
if (MBS has not moved since the last MBS location
    estimate of this type and is not now moving) then
{
    configure the MBS on-board transceiver (e.g.,
        MBS-MS) to immediately transmit location sig-
        nals to the fixed location BS network as if the
        MBS were an ordinary location device (MS);
        communicate with the Location Center via the
        fixed location BS infrastructure the following:
        (a) a "locate me" signal,
        (b) MBS_curr_est,
        (c) MBS_new_est and
        (d) the timestamp for the present event.
        Additionally, any location signal information
        between the MBS and the present target MS may
        be transmitted to the Location Center so that this
        information may also be used by the Location
        Center to provide better estimates of where the
        MBS is. Further, if the MBS determines that it is
        immediately adjacent to the target MS and also
        that its own location estimate is highly reliable
        (e.g., a GPS estimate), then the MBS may also
        communicate this information to the Location
        Center so that the Location Center can: (a) asso-
        ciate any target MS location signature cluster
        data with the fixed base station infrastructure
        with the location provided by the MBS, and (b)
        insert this associated data into the location sig-
        nature data base of the Location Center as a
        verified cluster of "random loc sigs";
    /* note, this transmission preferably continues (i.e.,
        repeats) for at least a predetermined length of
        time of sufficient length for the Signal Process-
        ing Subsystem to collect a sufficient signal char-
        acteristic sample size. */
}
else SCHEDULE an event (if none scheduled) to
    transmit to the Location Center the following: (a)
    MBS_curr_est, and (b) the GPS location of the
    MBS and the time of the GPS location estimate;
    /* Now update MBS display with new MBS
        location; note, MBS operator must request MBS
        locations on the MBS display; if not requested,
        then the following call does not do an update. */
    update_MBSoperator_display_with_MBS_est(MB-
        S_curr_est);
}
SINCE LAST MBS LOCATION UPDATE MBS HAS
    MOVED A THRESHOLD DISTANCE: {
    deadreck_est←get_deadreckoning_location_
        change_estimate(event);
    /* Obtain from MBS Dead Reckoning Location
        Estimator a new dead reckoning MBS location
        estimate having an estimate as to the MBS loca-
        tion change from the location of the last MBS
        location provided to the MBS. */
    MBS_curr_est←DETERMINE_MBS_LOCA-
        TION_ESTIMATE(NULL, deadreck_est);
        /* this new MBS estimate will be used in new target
            MS estimates*/
    update_MBS_display_with_updated_MBS_location
        (MBS_curr_est);
    SCHEDULE an event (if none scheduled) to request
        new GPS location data for MBS;
    SCHEDULE an event (if none scheduled) to request
        communication with Location Center (LC) related
        to new MBS location data;
    SCHEDULE an event (if none scheduled) to request
        new LBS location communication between the
        MBS and any LBS's that can detect the MBS;
        /* Note, in some embodiments the processing of
            MBS location data from LBS's may be per-
            formed automatically by the Location Center,
            wherein the Location Center uses signal charac-
            teristic data from the LBS's in determining an
            estimated location of the MBS. */
    SCHEDULE an event (if none scheduled) to obtain
        new target MS signal characteristics from MS; /*
        i.e., may get a better target MS location estimate
        now. */
}
TIMER HAS EXPIRED SINCE LAST RELIABLE
    TARGET MS LOCATION INFORMATION
    OBTAINED: {
SCHEDULE an event (if none scheduled) to request
    location communication with the target MS, the event
    is at a very high priority;
    RESET timer for target MS location communication;
        /* Try to get target MS location communication
            again within a predetermined time. Note, timer
            may dynamically determined according to the per-
            ceived velocity of the target MS. */
}
LOCATION COMMUNICATION FROM TARGET
    MS RECEIVED: {
    MS_raw_signal_data←get_MS_signal_characteris-
        tic_raw_data(event);
        /* Note, "MS_raw_signal_data" is an object having
            substantially the unfiltered signal characteristic
            values for communications between the MBS
            and the target MS as well as timestamp informa-
            tion. */
    Construct a message for sending to the Location Cen-
        ter, wherein the message includes at least
        "MS_raw_signal_data" and "MBS_curr_est" so
        that the Location Center can also compute an esti-
        mated location for the target MS;
    SCHEDULE an event (if none scheduled) to request
        communication with Location Center (LC) for
        sending the constructed message;
    /* Note, this data does not overwrite any previous data
        waiting to be sent to the LC. */
    MS_signal_data←get_MS_signal_characteristic_data
        (event);
    /* Note, the MS signal data obtained above is, in one
        embodiment, "raw" signal data. However, in a sec-
        ond embodiment, this data is filtered substantially
        as in the Location Center by the Signal Processing
        Subsystem. For simplicity of discussion here, it is
        assumed that each MBS includes at least a scaled
        down version of the Signal Processing Subsystem
        (see FIG. 11). */
```

```
MS_new_est←DETERMINE MS MOST RECENT
   ESTIMATE(MBS_curr_est, MS_curr_est, MS_sig-
   nal_data);
   /* May use forward and reverse TOA, TDOA, signal
      power, signal strength, and signal quality indica-
      tors. Note, "MS_curr_est" includes a timestamp of
      when the target MS signals were received. */
if (MS_new_est.confidence>min_MS_confidence) then
{
   mark_MS_est_as_temporary(MS_new_est);
      /* Note, it is assumed that this MS location estimate
         is "temporary" in the sense that it will be
         replaced by a corresponding MS location esti-
         mate received from the Location Center that is
         based on the same target MS raw signal data.
         That is, if the Location Center responds with a
         corresponding target MS location estimate, E,
         while "MS_new_est" is a value in a "moving
         window" of target MS location estimates (as
         described hereinbelow), then E will replace the
         value of "MS_new_est". Note, the moving win-
         dow may dynamically vary in size according to,
         for example, a perceived velocity of the target
         MS and/or the MBS. */
   MS_moving_window←get_MS_moving_window
      (event);
      /* get moving window of location estimates for this
         target MS. */
   add_MS_estimate_to_MS_location_window
      (MS_new_est, MS_moving_window);
      /* Since any given single collection of measure-
         ments related to locating the target MS may be
         potentially misleading, a "moving window" of
         location estimates are used to form a "composite
         location estimate" of the target MS. This com-
         posite location estimate is based on some num-
         ber of the most recent location estimates deter-
         mined. Such a composite location estimate may
         be, for example, analogous to a moving average
         or some other weighting of target MS location
         estimates. Thus, for example, for each location
         estimate (i.e., at least one MS location area, a
         most likely single location, and, a confidence
         estimate) a centroid type calculation may be per-
         formed to provide the composite location esti-
         mate.*/
   MS_curr_est←DETERMINE_MS_LOCATION_
      ESTIMATE(MS_moving_window);
      /* DETERMINE new target MS location estimate.
         Note this may an average location or a weighted
         average location. */
   remove_scheduled_events("TARGET_MS_S-
      CHEDULE",event.MS_ID);
      /* REMOVE ANY OTHER EVENTS SCHED-
         ULED FOR REQUESTING LOCATION
         COMMUNICATION FROM TARGET MS */
}
else /* target MS location data received but it is not
   deemed to be reliable (e.g., too much multipath and/or
   inconsistent measurements, so SCHEDULE an event
   (if none scheduled) to request new location commu-
   nication with the target MS, the event is at a high
   priority*/
   add_to_scheduled_events("TARGET_MS_SCHED-
      ULE",event.MS_ID);
update_MBS_operator_display_with_MS_est
   (MS_curr_est);
   /* The MBS display may use various colors to repre-
      sent nested location areas overlayed on an area map
      wherein, for example, 3 nested areas may be dis-
      played on the map overlay: (a) a largest area having
      a relatively high probability that the target MS is in
      the area (e.g., >95%); (b) a smaller nested area
      having a lower probability that the target MS is in
      this area (e.g., >80%); and (c) a smallest area hav-
      ing the lowest probability that the target MS is in
      this area (e.g., >70%). Further, a relatively precise
      specific location is provided in the smallest area as
      the most likely single location of the target MS.
      Note that in one embodiment, the colors for each
      region may dynamically change to provide an indi-
      cation as to how high their reliability is; e.g., no
      colored areas shown for reliabilities below, say,
      40%; 40-50% is purple; 50-60% is blue; 60-70% is
      green; 70-80% is amber; 80-90% is white; and red
      denotes the most likely single location of the target
      MS. Further note the three nested areas may col-
      lapse into one or two as the MBS gets closer to the
      target MS. Moreover, note that the collapsing of
      these different areas may provide operators in the
      MBS with additional visual reassurance that the
      location of the target MS is being determined with
      better accuracy. */
   /* Now RESET timer for target MS location communi-
      cation to try to get target MS location communication
      again within a predetermined time. */
   reset_timer("TARGET_MS_SCHEDULE", event.M-
      S_ID);
}
COMMUNICATION OF LOCATION DATA TO MBS
   FROM LOCATION CENTER: {
   /* Note, target MS location data may be received from
      the Location Center in the seek state, contact state and
      the control state. Such data may be received in
      response to the MBS sending target MS location sig-
      nal data to the Location Center (as may be the case in
      the contact and control states), or such data may be
      received from the Location Center regardless of any
      previously received target MS location sent by the
      MBS (as may be the case in the seek, contact and
      control states). */
   if ((the timestamp of the latest MBS location data sent to
      the Location Center)<=(the timestamp returned by
      this Location Center communication identifying the
      MBS location data used by the Location Center for
      generating the MBS location data of the present
      event))
      then /* use the LC location data since it is more recent
         than what is currently being used. */
   {
      MBS_new_est←get_Location_Center_MBS_est
         (event);
      deadreck_est←get_deadreckoning_location_
         change_estimate(event);
      MBS_curr_est←DETERMINE_MBS_
         LOCATION_ESTIMATE(MBS_new_est,
         deadreck_est);
      if (MBS_curr_est.confidence>a predetermined high
         confidence threshold) then reset_deadreckoning_
         MBS_location_estimator(event);
      update_MBS_operator_display_with_MBS_est
         (MBS_curr_est);
   }
   if ((the timestamp of the latest target MS location data
      sent to the Location Center)<=(the timestamp
``` returned by this Location Center communication identifying the MS location data used by the Location Center for generating the target MS location estimate of the present event))
  then /* use the MS location estimate from the LC since it is more recent than what is currently being used. */
{
  MS_new_est←get_Location_Center_MS_est (event);
    /* This information includes error or reliability estimates that may be used in subsequent attempts to determine an MS location estimate when there is no communication with the LC and no exact (GPS) location can be obtained. That is, if the reliability of the target MS's location is deemed highly reliable, then subsequent less reliable location estimates should be used only to the degree that more highly reliable estimates become less relevant due to the MS moving to other locations. */
  MS_moving_window←get_MS_moving_window (event);
    /* get moving window of location estimates for this target MS. */
  if((the Location Center target MS estimate utilized the MS location signature data supplied by the MBS) then
    if (a corresponding target MS location estimate marked as "temporary" is still in the moving window)
      then /* It is assumed that this new target MS location data is still timely (note the target MS may be moving); so replace the temporary estimate with the Location Center estimate. */
      replace the temporary target MS location estimate in the moving window with "MS_new_est";
    else /* there is no corresponding "temporary" target MS location in the moving window; so this MS estimate must be too old; so don't use it. */
  else /* the Location Center did not use the MS location data from the MBS even though the timestamp of the latest MS location data sent to the Location Center is older that the MS location data used by the Location Center to generate the present target MS location estimate. Use the new MS location data anyway. Note there isn't a corresponding "temporary" target MS location in the moving window. */
    add_MS_estimate_to_MS_location_window (MS_new_est);
}
else /* the MS location estimate from the LC is not more recent than the latest MS location data sent to the LC from the MBS. */
  if (a corresponding target MS location estimate marked as "temporary" is still in the moving window)
    then /* It is assumed that this new target MS location data is still timely (note the target MS may be moving); so replace the temporary estimate with the Location Center estimate. */
    replace the temporary target MS location estimate in the moving window with "MS_new_est";
  else /* there is no corresponding "temporary" target MS location in the moving window; so this MS estimate must be too old; so don't use it. */
  MS_curr_est←DETERMINE_MS_LOCATION_ESTIMATE(MS_moving_window);
  update_MBS_operator_display_with_MS_est (MS_curr_est);
  reset_timer("LC_COMMUNICATION", event.MS_ID);
}
NO COMMUNICATION FROM LC: {
  /* i.e., too long a time has elapsed since last communication from LC. */
  SCHEDULE an event (if none scheduled) to request location data (MBS and/or target MS) from the Location Center, the event is at a high priority;
  reset_timer("LC_COMMUNICATION", event.MS_ID);
}
REQUEST TO NO LONGER CONTINUE LOCATING THE PRESENT TARGET MS: {
  if (event not from operator) then
    request MBS operator verification;
  else {
    REMOVE the current target MS from the list of MSs currently being located and/or tracked;
    SCHEDULE an event (if none scheduled) to send communication to the Location Center that the current target MS is no longer being tracked;
    PURGE MBS of all data related to current target MS except any exact location data for the target MS that has not been sent to the Location Center for archival purposes;
  }
}
REQUEST FROM LOCATION CENTER TO ADD ANOTHER TARGET MS TO THE LIST OF MSs BEING TRACKED: {
  /* assuming the Location Center sends MBS location data for a new target MS to locate and/or track (e.g., at least a new MS ID and an initial MS location estimate), add this new target MS to the list of MSs to track. Note the MBS will typically be or transitioning to in the seek state.*/
  if (event not from operator) then
    request MBS operator verification;
  else {
    INITIALIZE MBS with data received from the Location Center related to the estimated location of the new target MS; /* e.g., initialize a new moving window for this new target MS; initialize MBS operator interface by graphically indicating where the new target MS is estimated to be. */
    CONFIGURE MBS to respond to any signals received from the new target MS by requesting location data from the new target MS;
    INITIALIZE timer for communication from LC; /* A timer may be set per target MS on list. */
  }
}
REQUEST TO MANUALLY ENTER A LOCATION ESTIMATE FOR MBS (FROM AN MBS OPERATOR): {
  /* Note, MBS could be moving or stationary. If stationary, then the estimate for the location of the MBS is given high reliability and a small range (e.g., 20 feet). If the MBS is moving, then the estimate for the location of the MBS is given high reliability but a wider range that may be dependent on the speed of the MBS. In both cases, if the MBS operator indicates a low confidence in the estimate, then the range is widened, or the operator can manually enter a range.*/
MBS_new_est←get_new_MBS_Location_est_from_operator(event); /* The estimate may be obtained, for example, using a light pen on a displayed map */
if(operator supplies a confidence indication for the input MBS location estimate) then
   MBS_new_est.confidence←get_MBS_operator_confidence_of_estimate(event);
else MBS_new_est.confidence←1; /* This is the highest value for a confidence. */
deadreck_est←get_dead_reckoning_location_change_estimate(event);
MBS_curr_est←DETERMINE_MBS_LOCATION_ESTIMATE(MBS_new_est, deadreck_est);
if (MBS_curr_est.confidence>a predetermined high confidence threshold) then
   reset_deadreckoning_MBS_location_estimator (event);
update_MBS_operator_display_with_MBS_est(MBS_curr_est);
/* Note, one reason an MBS operator might provide a manual MBS input is that the MBS might be too inaccurate in its location. Moreover, such inaccuracies in the MBS location estimates can cause the target MS to be estimated inaccurately, since target MS signal characteristic values may be utilized by the MBS to estimate the location of the target MS as an offset from where the MBS is. Thus, if there are target MS estimates in the moving window of target MS location estimates that are relatively close to the location represented by "MBS_curr_est", then these select few MS location estimates may be updated to reflect a more accurate MBS location estimate. */
MS_moving_window←get_MS_moving_window (event);
if (MBS has not moved much since the receipt of some previous target MS location that is still being used to location the target MS)
then
{
   UPDATE those target MS location estimates in the moving window according to the new MBS location estimate here;
   MS_curr_est←DETERMINE_MS_LOCATION_ESTIMATE(MS_moving_window);
   update_MBS_operator_display_with_MS_est (MS_curr_est);
}
}
} /* end case statement */
Lower Level MBS Function Descriptions
/* PROCEDURE:
DETERMINE_MBS_LOCATION_ESTIMATE
REMARKS:
It is assumed that with increasing continuous dead reckoning without additional MBS location verification, the potential error in the MBS location increases.
It is assumed that each MBS location estimate includes: (a) a most likely area estimate surrounding a central location and (b) a confidence value of the MBS being in the location estimate.
The confidence value for each MBS location estimate is a measurement of the likelihood of the MBS location estimate being correct. More precisely, a confidence value for a new MBS location estimate is a measurement that is adjusted according to the following criteria:
  (a) the confidence value increases with the perceived accuracy of the new MBS location estimate (independent of any current MBS location estimate used by the MBS),
  (b) the confidence value decreases as the location discrepancy with the current MBS location increases,
  (c) the confidence value for the current MBS location increases when the new location estimate is contained in the current location estimate,
  (d) the confidence value for the current MBS location decreases when the new location estimate is not contained in the current location estimate, and
Therefore, the confidence value is an MBS location likelihood measurement which takes into account the history of previous MBS location estimates.
It is assumed that with each MBS location estimate supplied by the Location Center there is a default confidence value supplied which the MBS may change.
*/
DETERMINE_MBS_LOCATION_ESTIMATE(MBS_new_est, deadreek_est)
/* Add the pair, "MBS_new_est" and "deadreck_est" to the location tracks and determine a new current MBS location estimate.
Input: MBS_new_est A new MBS baseline location estimate to use in determining the location of the MBS, but not a (deadreckoning) location change estimate
deadreck_est The deadreckoning location change estimate paired with "MBS_new_est". */
{
  if (MBS_new_est is not NULL) then /* the "deadreck_est" is paired with "MBS_new_est" */
  {
    if (all MBS location tracks are empty) then
    {
      insert "MBS_new_est" as the head of the location track of type, "MBS_new_est.type";
      insert "MBS_new_est" as the head of the current track; /* so now there is a "MBS_curr_est" MBS location estimate to use */
      MBS_curr_est←get_curr_est(MBS_new_est.MS_ID); /* from current location track */
    }
    else /* there is at least one non-empty location track in addition to the current location track being non-empty*/
    {
      if (MBS_new_est is of type MANUAL_ENTRY) then
      { /* MBS operator entered an MBS location estimate for the MBS; so must use it */
      MBS_curr_est←add_location_entry(MBS_new_est, deadreck_est);
      }
      else /* "MBS_new_est" is not of type MANUAL_ENTRY */
      if (the MBS location track of type, "MBS_new_est.type", is empty) then
      { /* some other location track is non-empty */
      MBS_curr_est←add_location_entry(MBS_new_est, deadreck_est);
      }
      else /* "MBS_new_est.type" location track is non-empty and "MBS_new_est" is not of type MANUAL_ENTRY */

{ /* In the next statement determine if "MBS_new_est" is of at least minimal useful quality in comparison to any previous estimates of the same type; see program def'n below */
continue_to_process_new_est←FILTER(MBS_new_est);
if (continue_to_process_new_est) then /* "MBS_new_est" is of sufficient quality to continue processing. */
{
MBS_curr_est←add_location_entry(MBS_new_est, deadreck_est);
} /* end "MBS_new_est" not filtered out */
else /* "MBS_new_est" is filtered out; do nothing */;
/* end else */
} /*end else at least one non-empty location track */
}
else/* MBS_new_est is NULL; thus only a deadreckoning output is to be added to location tracks */
{
extrapolation_entry←create_an_extrapolation_entry_from(deadreck_est);
insert_into_every_location_track(extrapolation_entry);
/* including the "current location track" */
MBS_curr_est←get_curr_est(MBS_new_est.MS_ID);
/* from current location track */
}
RETURN(MBS_curr_est);
} END /* DETERMINE_MBS_LOCATION_ESTIMATE */
add_location_entry(MBS_new_est, deadreck_est);
/* This function adds the baseline entry, "MBS_new_est" and its paired deadreckoning location change estimate, "deadreck_est" to the location tracks, including the "current location track". Note, however, that this function will roll back and rearrange location entries, if necessary, so that the entries are in latest timestamp order.
Returns: MBS_curr_est */
{
if (there is a time series of one or more dead reckoning extrapolation entries in the location track of type "MBS_new_est.type" wherein the extrapolation entries have a "latest timestamp" more recent than the timestamp of "MBS_new_est") then
{ /* Note, this condition may occur in a number of ways; e.g., (a) an MBS location estimate received from the Location Center could be delayed long enough (e.g., 1-4 sec) because of transmission and processing time; (b) the estimation records output from the MBS baseline location estimators are not guaranteed to be always presented to the location tracks in the temporal order they are created. */
roll back all (any) entries on all location tracks, including the "current" track, in "latest timestamp" descending order, until a baseline entry, B, is at the head of a location track wherein B is a most recent entry having a "latest timestamp" prior to "MBS_new_est"; let "stack" be the stack of a location track entries rolled off the location tracks, wherein an entry in the stack is either a baseline location entry and a paired deadreckoning location change estimate, or, an unpaired deadreckoning location change estimate associated with a NULL for the baseline location entry;
insert "MBS_new_est" at the head of the location track of type "MBS_new_est.type" as a new baseline entry;
insert the extrapolation entry derived from "deadreck_est" in each of the other baseline location tracks except the current track;
/* It is important to note that "deadreck_est" includes the values for the change in the MBS location substantially for the time period between the timestamp, T, of "MS_new_est" and the timestamp of the closest deadreckoning output just before T. Further note that if there are any extrapolation entries that were rolled back above, then there is an extrapolation entry, E, previously in the location tracks and wherein E has an earliest timestamp equal to the latest timestamp of B above. Thus, all the previous extrapolation entries removed can be put back if E is modified as follows: the MBS location change vector of E (denoted herein as E.delta) becomes E.delta—[location change vector of "deadreck_est"]. */
MBS_curr_est←UPDATE_CURR_EST(MBS_new_est, deadreck_est);
if (the extrapolation entry E exists) then /* i.e., "stack" is not empty */
{
modify the extrapolation entry E as per the comment above;
/* now fix things up by putting all the rolled off location entries back, including the "current location track" */
do until "stack" is empty
{
stack_top←pop_stack(stack);
/* "stack_top" is either a baseline location entry and a paired deadreckoning location change estimate, or, an unpaired deadreckoning location change estimate associated with a NULL for the baseline location entry */
MBS_nxtest←get_baseline_entry(stack_top);
deadreck_est   get_deadreckoning_entry(stack_top);
MBS_curr_est   DETERMINE_MBS_LOCATION_ESTIMATE(MBS_nxt_est, deadreck_est);
}
}
}
else /* there is no deadreckoning extrapolation entries in the location track of type "MBS_new_est.type" wherein the extrapolation entries have a "latest timestamp" more recent than the timestamp of "MBS_new_est". So just insert "MBS_new_est" and "deadreck_est".*/
{
insert "MBS_new_est" at the head of the location track of type "MBS_new_est.type" as a new baseline entry;
insert the extrapolation entry derived from "deadreck_est" in each of the other location tracks except the current track;
MBS_curr_est UPDATE_CURR_EST(MBS_new_est, deadreck_est); /* see prog def'n below */
}
RETURN(MBS_curr_est);
} /* end add_location_entry */
FILTER(MBS_new est)
/* This function determines whether "MBS_new_est" is of sufficient quality to insert into it's corresponding MBS location track. It is assumed that the location track of "MBS_new_est.type" is non-empty.
Input: MBS_new_est A new MBS location estimate to use in determining the location of the MBS.

Returns: FALSE if "MBS_new_est" was processed here (i.e., filtered out),
TRUE if processing with "MBS_new_est" may be continued. */
{
continue_to_process_new_est←TRUE;    /* assume "MBS_new_est" will be good enough to use as an MBS location estimate */
/* see if "MBS_new_est" can be filtered out. */
if (the confidence in MBS_new_est<a predetermined function of the confidence(s) of previous MBS location estimates of type "MBS_new_est.type")
    /* e.g., the predetermined function here could be any of a number of functions that provide a minimum threshold on what constitutes an acceptable confidence value for continued processing of "MBS_new_est". The following is an example of one such predetermined function: K*(confidence of "MBS_new_est.type" location track head) for some K, 0 <K <=1.0, wherein K varies with a relative frequency of estimates of type "MBS_new_est. type" not filtered; e.g., for a given window of previous MBS location estimates of this type, K=(number of MBS location estimates of "MBS_new_est.type" not filtered)/(the total number of estimates of this type in the window). Note, such filtering here may be important for known areas where, for example, GPS signals may be potentially reflected from an object (i.e., multipath), or, the Location Center provides an MBS location estimate of very low confidence. For simplicity, the embodiment here discards any filtered location estimates. However, in an alternative embodiment, any such discarded location estimates may be stored separately so that, for example, if no additional better MBS location estimates are received, then the filtered or discarded location estimates may be reexamined for possible use in providing a better subsequent MBS location estimate.*/
    then continue_to_processnew_est←FALSE;
else if (an area for "MBS_new_est" >a predetermined function of the corresponding area(s) of entries in the location track of type "MBS_new_est.type")
    /* e.g., the predetermined function here could be any of a number of functions that provide a maximum threshold on what constitutes an acceptable area size for continued processing of "MBS_new_est". The following are examples of such predetermined functions: (a) the identity function on the area of the head of the location track of type "MBS_new_est.type"; or, (b) K*(the area of the head of the location track of type "MBS_new_est. type"), for some K, K>=1.0, wherein for a given window of previous MBS location estimates of this type, K=(the total number of estimates in the window)/ (number of these location estimates not filtered); note, each extrapolation entry increases the area of the head; so areas of entries at the head of each location track type grow in area as extrapolation entries are applied. */
    then continue_to_processnew_est←FALSE;
RETURN(continue_to_processnew_est)
}
UPDATE_CURR_EST(MBS_new_est, deadreck_est)
    /* This function updates the head of the "current" MBS location track whenever "MBS_new_est" is perceived as being a more accurate estimate of the location of the MBS.
    Input: MBS_new_est A new MBS location estimate to use in determining the location of the MBS
        deadreck_est The deadreckoning MBS location change estimate paired with "MBS new est".

Returns a potentially updated "MBS_curr_est" */
{
if (MBS_new_est is of type MANUAL_ENTRY) then
{ /* MBS operator entered an MBS location estimate for the MBS; so must use it */
    insert "MBS_new_est" as the head of the "current MBS location track" which is the location track indicating the best current approximation of the location of the MBS;
}
else /* "MBS_new_est" is not a manual entry */
{
    MBS_curr_est←get_curr_est(MBS_new_est.MS_ID);
        /* get the head of the "current location track" */
    adjusted_curr_est←apply_deadreckoning_to(MBS_curr_est, deadreck_est);
        ./* The above function returns an object of the same type as "MBS_curr_est", but with the most likely MBS point and area locations adjusted by "deadreck_est". Accordingly, this function performs the following computations:
            (a) selects, $A_{MBS}$, the MBS location area estimate of "MBS_curr_est" (e.g., one of the "most likely" nested area(s) provided by "MBS_curr_est" in one embodiment of the present disclosure);
            (b) applies the deadreckoning translation corresponding to "deadreck_est" to $A_{MBS}$ to thereby translate it (and expand it to at least account for deadreckoning inaccuracies). */
    if (reasonably_close(MBS_new_est, adjusted_curr_est, MBS_curr_est))
        /* In one embodiment, the function "reasonably_close" here determines whether a most likely MBS point location (i.e., centroid) of "MBS_new_est" is contained in the MBS estimated area of "adjusted_curr_est"
        Note that the reasoning for this constraint is that if "MBS_curr_est" was accurate, then any "most likely MBS point location" of a new MBS baseline estimate that is also accurate ought to be in the MBS estimated area of "adjusted_curr_est".
        In a second embodiment, the function "reasonably_ close" determines whether the centroid (or most likely MBS point location) of "MBS_new_est" is close enough to "MBS_curr_est" so that no MBS movement constraints are (grossly) violated between the most likely point locations of "MBS_new_est" and "MBS_curr_est"; i.e., constraints on (de)acceleration, abruptness of direction change, velocity change, max velocity for the terrain. Note, such constraints are discussed in more detail in the section herein describing the "Analytical Reasoner". Accordingly, it is an aspect of the present disclosure to provide similar capabilities to that of the Analytical Reasoner as part of the MBS, and in particular, as the functionality of the "MBS LOCATION CONSTRAINT CHECKER" illustrated in FIG. 11. It is assumed hereinafter that the embodiment of the function, "reasonably_close", performed here is a combination of both the first and second embodiments, wherein the constraints of both the first and second embodiments must be satisfied for the function to return TRUE. */ then
if (the confidence in MBS_new_est>=the confidence in MBS_curr_est) then
{
  if (the most likely MBS area of MBS_new_est contains the most likely MBS area of "adjusted_curr_est" as computed above) then
    shrink MBS_new_est uniformly about its centroid (i.e., "most likely MBS point location") until it is as small as possible and still contain the MBS estimated area of "adjusted_curr_est".
  insert into location track("current", MBS_new_est);
  /* The program invoked here inserts a location track entry corresponding to the second parameter into the location track identified by the first parameter (e.g., "current"). It is important to note that the second parameter for this program may be either of the following data structures: a "location track entry", or an "MBS location estimate" and the appropriate location track entry or entries will be put on the location track corresponding to the first parameter. The insertion is performed so that a "latest timestamp" order is maintained; i.e.,
  (a) any extrapolation entries in the location track, wherein these entries have a more recent "latest timestamp" than the ("earliest" or only) timestamp (depending on the data structure) of the second parameter are removed, and
  (b) conceptually at least, the location change estimates output from the deadreckoning MBS location estimator that correspond with the removed extrapolation entries are then reapplied in timestamp order to the head of the target location track. */
}
else /* the centroid of "MBS_new_est", is contained in an area of "MBS_curr_est", but the confidence in "MBS_new_est" <confidence in "MBS_curr_est" */
{
  most likely est←determine a "most likely MBS location estimate" using the set S={the MBS location estimate centroid(s) of any MBS location track heads contained in the MBS estimated area of "adjusted_curr_est", plus, the centroid of "MBS_new_est"};
  /* Note, in the above statement, the "most likely MBS location estimate" may be determined using a number of different techniques depending on what function(s) is used to embody the meaning of "most likely". In one embodiment, such a "most likely" function is a function of the confidence values of a predetermined population of measurements (e.g., the selected location track heads in this case) from which a "most likely" measurement is determined (e.g., computed or selected). For example, in one embodiment, a "most likely" function may include selecting a measurement having the maximum confidence value from among the population of measurements. In a second embodiment, a "most likely" function may include a weighting of measurements (e.g., location track heads) according to corresponding confidence values of the measurements. For example, in the present context (of MBS location track heads) the following steps provide an embodiment of a "most likely" function:
  (a) determine a centroid of area for each of the selected track heads (i.e., the location track heads having a point location estimate contained in the MBS estimated area of "adjusted_curr_est");
  (b) determine the "most likely location MBS position" P as a weighted centroid of the centroids from step (a), wherein the weighting of each of the centroids from (a) is provided by their corresponding confidence values;
  (c) output an area, $A_1$, as the "most likely MBS location area", wherein the centroid of $A_l$ is P and $A_l$ is the largest area within the MBS estimated area of "adjusted_curr_est" satisfying this condition; and
  (d) set a confidence value for $A_l$ as the average confidence value of "MBS_new_est", "MBS_curr_est" and the selected location track head used. */
  insert_into_location_track("current", most_likely_est);
}
else /* "MBS_new_est" is not reasonably close to "adjusted_curr_est" (i.e., "MBS_curr_est" with "deadreck_est" applied to it), so a conflict exists here; e.g., (i) "MBS_new_est" is not a manual entry, and (ii) "MBS_new_est" does not have its centroid contained in the MBS estimated area of "adjusted_curr_est", or, there has been a movement constraint violation. Note that it is not advisable to just replace "MBS_curr_est" with "new_est_head" because:
  (a) "MBS_new_est" may be the MBS location estimate that is least accurate, while the previous entries of the current location track have been accurate;
  (b) the "MBS_curr_est" may be based on a recent MBS operator manual entry which should not be overridden. */
{
  MBS_curr_est←resolve_conflicts(MBS_new_est, adjusted_curr_est, MBS_curr_est);
}
} /* end else "MBS_new_est" not a manual entry */
if(MBS is a vehicle) and (not off road) then
  /* it is assumed that a vehicular MBS is on-road unless explicitly indicated otherwise by MBS operator. */
  MBS_curr_est←snap_to_best_fit_street(MBS_curr_est);
  /* snap to best street location according to location estimate, velocity, and/or direction of travel. Note, this is a translation of "MBS_curr_est". */
RETURN(MBS_curr_est)
} /* END UPDATE(MBS_CURR_EST) */
resolve_conflicts(MBS_new_est, adjusted_curr_est, MBS_curr_est)
/* There is a basic conflict here,
  (i) "MBS_new_est" is not a manual entry, and
  (ii) one of the following is true: "MBS_new_est" does not have its centroid contained in the area "adjusted_curr_est", or, using "MBS_new_est" implies an MBS movement constraint violation.
Input: MBS_new_est The new_est MBS location estimate record.
  adjusted_curr_est The version of "MBS_curr_est" adjusted by the deadreckoning location change estimate paired with "MBS_new_est".
  MBS_curr_est The location track entry that is the head of the "current" location track. Note that "MBS new est.confidence">"MBS_curr_est.confidence".
Output: An updated "MBS_curr_est". */
{ mark that a conflict has arisen between "MBS_curr_est" and "MBS_new_est";
if (the MBS operator desires notification of MBS location estimate conflicts) then notify the MBS operator of an MBS location estimate conflict;
if (the MBS operator has configured the MBS location system to ignore new estimates that are not "reasonably close" to adjusted_curr_est) or
  (MBS_curr_est is based on a manual MBS operator location estimate, and the MBS has moved less than a predetermined distance (wheel turns) from where the manual estimate was provided) then RETURN(adjusted_curr_est);
else /* not required to ignore "MBS_new_est", and there has been no recent manual estimate input*/
{/* try to use "MBS_new_est" */
  if ((MBS_new_est.confidence−adjusted_curr_est.confidence)>a large predetermined threshold) then
    /* Note, the confidence discrepancy is great enough so that "MBS_new_est" should be the most recent baseline estimate on current MBS location track. Note that the threshold here may be approximately 0.3, wherein confidences are in the range [0, 1].*/
    insert into location track("current", MBS_new_est);
      /* insert "MBS_new_est" into "current" location track (as a baseline entry) in "latest timestamp" order; i.e., remove any extrapolation entries with a more recent "latest timestamp" in this track, and reapply, in timestamp order, the location change estimates output from the deadreckoning MBS location estimator that correspond with the removed extrapolation entries removed; */
  else /* "MBS new est.confidence" is not substantially bigger than "adjusted_curr_est.confidence"; so check to see if there are potentially MBS location system instabilities */
  { /*check for instabilities */
    if [ (there has been more than a determined fraction of conflicts between the "MBS_curr_est" and "MBS_new_est" within a predetermined number of most recent "MBS_new_est" instantiations) or
      (the path corresponding to the entries of the "current location track" of the MBS has recently violated MBS movement constraints more than a predetermined fraction of the number of times there has been new instantiation of "MBS_curr_est", wherein such movement constraints may be (de)acceleration constraints, abrupt change in direction constraints, constraints relating to too high a velocity for a terrain) or
      (there has been an MBS operator indication of lack of confidence in the recently displayed MBS location estimates)]
      then /* the MBS location system is likely unstable and/or inaccurate; check to see if this condition has been addressed in the recent past. */
      { /* fix instability */
        if (fix_instability_counter equal to 0) then /* no instabilities have been addressed here within the recent past; i.e., "fix_instability_counter" has the following semantics: if it is 0, then no instabilities have been addressed here within the recent past; else if not 0, then a recent instability has been attempted to be fixed here. Note, "fix_instability_counter" is decremented, if not zero, each time a new baseline location entry is inserted into its corresponding baseline location track. Thus, this counter provides a "wait and see" strategy to determine if a previous performance of the statements below mitigated the (any) MBS location system instability. */
        {
          most_likely_est←determine a new "most likely MBS location estimate"; [30.1]
          /* Note, a number of MBS location estimates may be generated and compared here for determining the "most_likely_est". For example, various weighted centroid MBS location estimates may be determined by a clustering of location track head entries in various ways.
          In a first embodiment for determining a value (object) for "most_likely_est", a "most likely" function may be performed, wherein a weighting of location track heads according to their corresponding confidence values is performed. For example, the following steps provide an embodiment of a "most likely" function:
          (a) obtain a set S having: (i) a centroid of area for each of the track heads having a corresponding area contained in a determined area surrounding the point location of "adjusted_curr_est" (e.g., the MBS estimated area of "adjusted_curr_est"), plus (ii) the centroid of "MBS_new_est";
          (b) determine the "most likely location MBS position" P as a weighted centroid of the centroids of the set S from step (a), wherein the weighting of each of the centroids from (a) is provided by their corresponding confidence values;
          (c) output an area, A, as the "most likely MBS location area" wherein A has P as a centroid and A is a "small" area (e.g., a convex hull) containing the corresponding the centroids of the set S; and
          (d) set a confidence value for A as the average confidence value of the centroids of the set S.
          In a second embodiment, "most_likely_est" may be determined by expanding (e.g., substantially uniformly in all directions) the MBS location estimate area of "MBS_new_est" until the resulting expanded area contains at least the most likely point location of "adjusted_curr_est" as its most likely MBS location area. */
          insert_into_location_track("current", most_likely_est);
          fix_instability_counter←a predetermined number, C, corresponding to a number of baseline entries to be put on the baseline location tracks until MBS location system instabilities are to be addressed again here; /* when this counter goes to zero and the MBS location system is unstable, then the above statements above will be performed again. Note, this counter must be reset to C (or higher) if a manual MBS estimate is entered. */
        }
      } /* fix instability */
    else /* The MBS location system has been reasonably stable, and "MBS_curr_est.confidence" is not substantially bigger than "adjusted_new_est.confidence". */
    {
      most_likely_est←determine a most likely MBS location estimate;

/* The determination in the statement above may be similar or substantially the same as the computation discussed in relation to statement [30.1] above. However, since there is both more stability in this case than in [30.1] and less confidence in "MBS_new_est", certain MBS movement constraints may be more applicable here than in [30.1].

Accordingly, note that in any embodiment for determining "most_likely_est" here, reasonable movement constraints may also be used such as: (a) unless indicated otherwise, an MBS vehicle will be assumed to be on a road, (b) a new MBS location estimate should not imply that the MBS had to travel faster than, for example, 120 mph or change direction too abruptly or change velocity too abruptly or traverse a roadless region (e.g., corn field or river) at an inappropriate rate of speed.

Thus, once a tentative MBS location estimate (e.g., such as in the steps of the first embodiment of [30.1]) for "most_likely_est" has been determined, such constraints may be applied to the tentative estimate for determining whether it should be pulled back toward the centroid of the "MBS_curr_est" in order to satisfy the movement constraints*/
insert_into_location_track("current", most_likely_est); /* note, the second parameter for this function may be either of the following data structures: a "location track entry", or a "MBS location estimate" and the appropriate location track entry or entries will be put on the location track corresponding to the first parameter. */
}
} /* check for instabilities */
MBS_curr_est←get_curr_est(MBS_new_est.MS_ID);
/* from current location track */
} /* try to use "MBS_new_est" */
RETURN(MBS_curr_est)
} /* END resolve_conflicts */

APPENDIX B: PSEUDO CODE FOR A GENETIC ALGORITHM

Pseudo code for a genetic algorithm
Genetic_Algorithm (*decode, *fitness_function, parms)
/* This program implements a genetic algorithm for determining efficient values of parameters for a search problem. The current best values of the parameters are received by the genetic algorithm in a data structure such as an array. If no such information is available, then the genetic algorithm receives random guesses of the parameter values. This program also receives as input a pointer to a decode function that provides the genetic algorithm with information about how the parameters are represented by bit strings (see genetic algorithm references). The program also receives a pointer to a fitness function, "fitness_functions", that provides the genetic algorithm with information about how the quality of potential solutions should be determined. The program computes new, improved values of parameters and replaces the old values in the array "parms."
*/
assume that each particular application will have a specific fitness function and decoding
// scheme; otherwise, the procedure is the same every time
//generate the initial population
// generate a random population of binary strings containing popsize strings
for i=1 to popsize
    for j=1 to string_length
        string(i,j)=random(0,1)
    end loop on j
end loop on i
//keep generating new populations until finished
do until finished
    for i=1 to popsize
        //transform the binary strings into parametersfrom the problem at hand; requires problem
        //specific function
        decode (string(i))
        //evaluate each string
        evaluate (string(i))
    end loop on i
    //perform reproduction
    reproduce (population_of_strings)
    //perform crossover
    crossover (population_of_strings)
    //perform mutation
    mutate (population_of_strings)
    // evaluate the new population
    for i =1 to popsize
        //transform the binary strings into parameters
        //from the problem at hand; requires problem
        //specific function
        decode (string(i))
        //evaluate the fitness of each string
        evaluate (string(i,j))
    end loop on i
    if finished then report new results to the calling routine
    else go back to tip of do-until loop

APPENDIX C: LOCATION DATABASE MAINTENANCE PROGRAMS

DATA BASE PROGRAMS FOR MAINTAINING THE LOCATION SIGNATURE DATA BASE

Figure 17A:
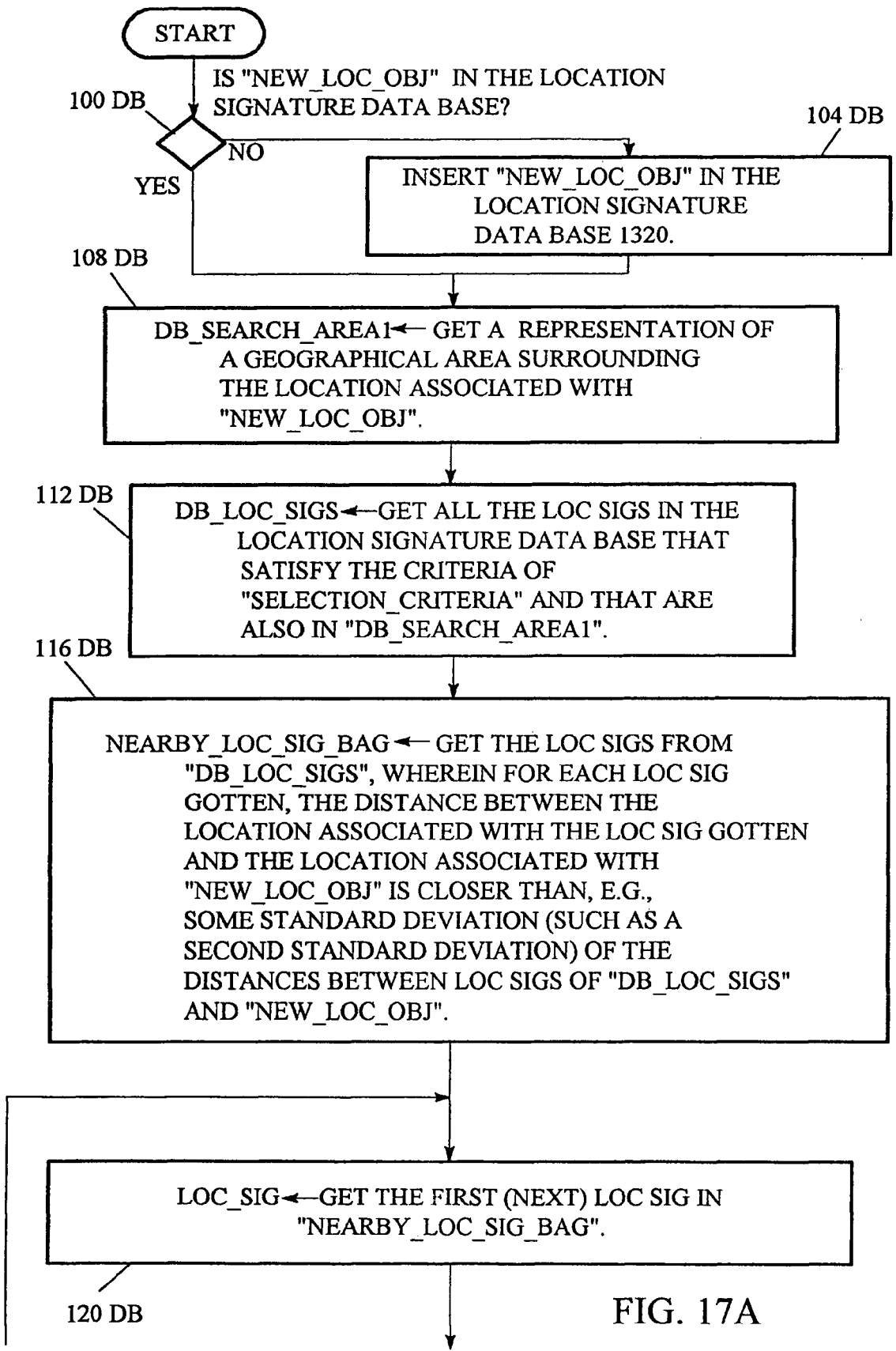
FIGS. 17a through 17c present a high level flowchart of the steps performed by function, "UPDATE_LOC_SIG_DB," for updating location signatures in the location signature data base 1320; note, this flowchart corresponds to the description of this function in APPENDIX C.
Figure 17B:
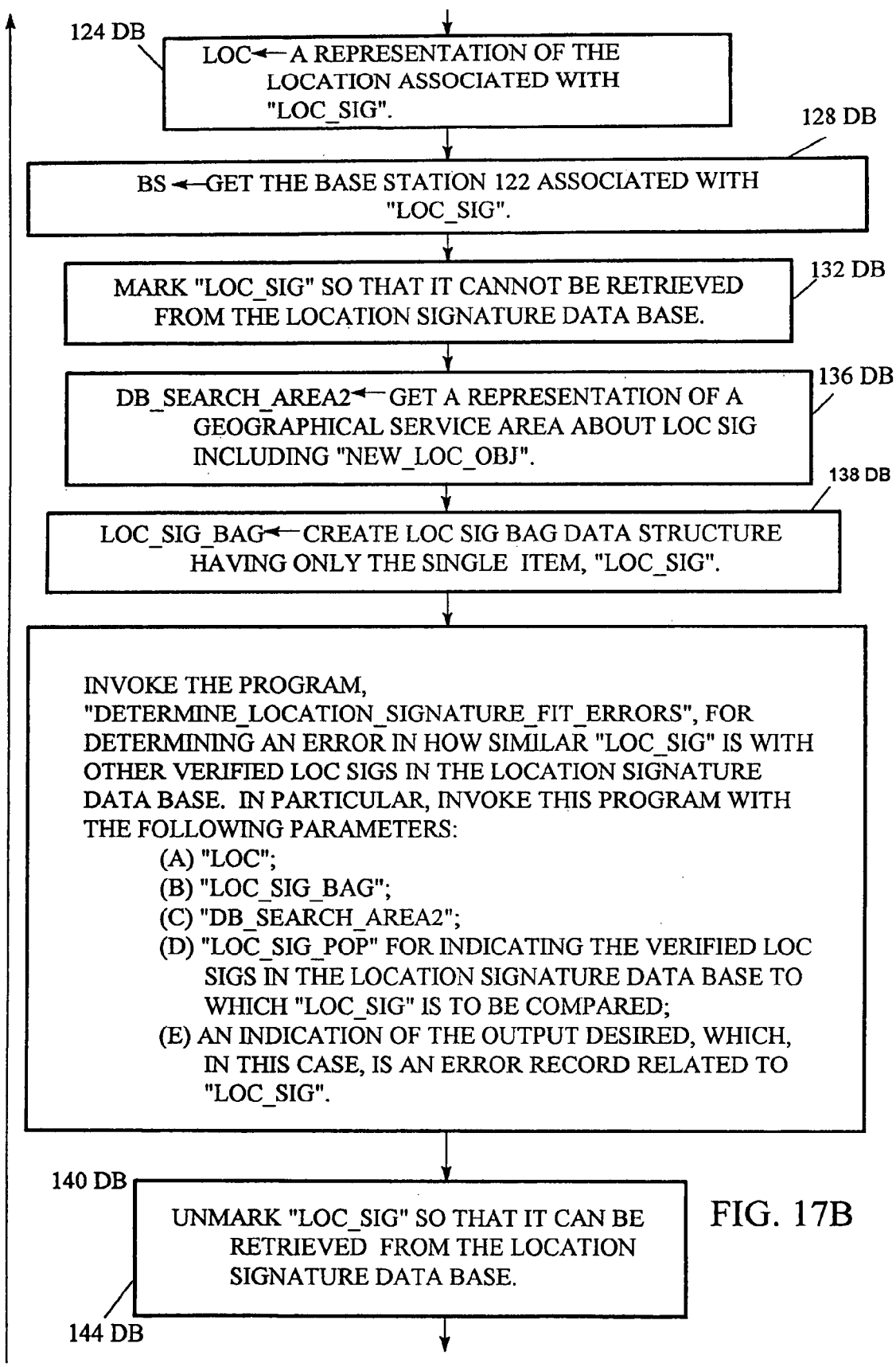
Figure 17C:
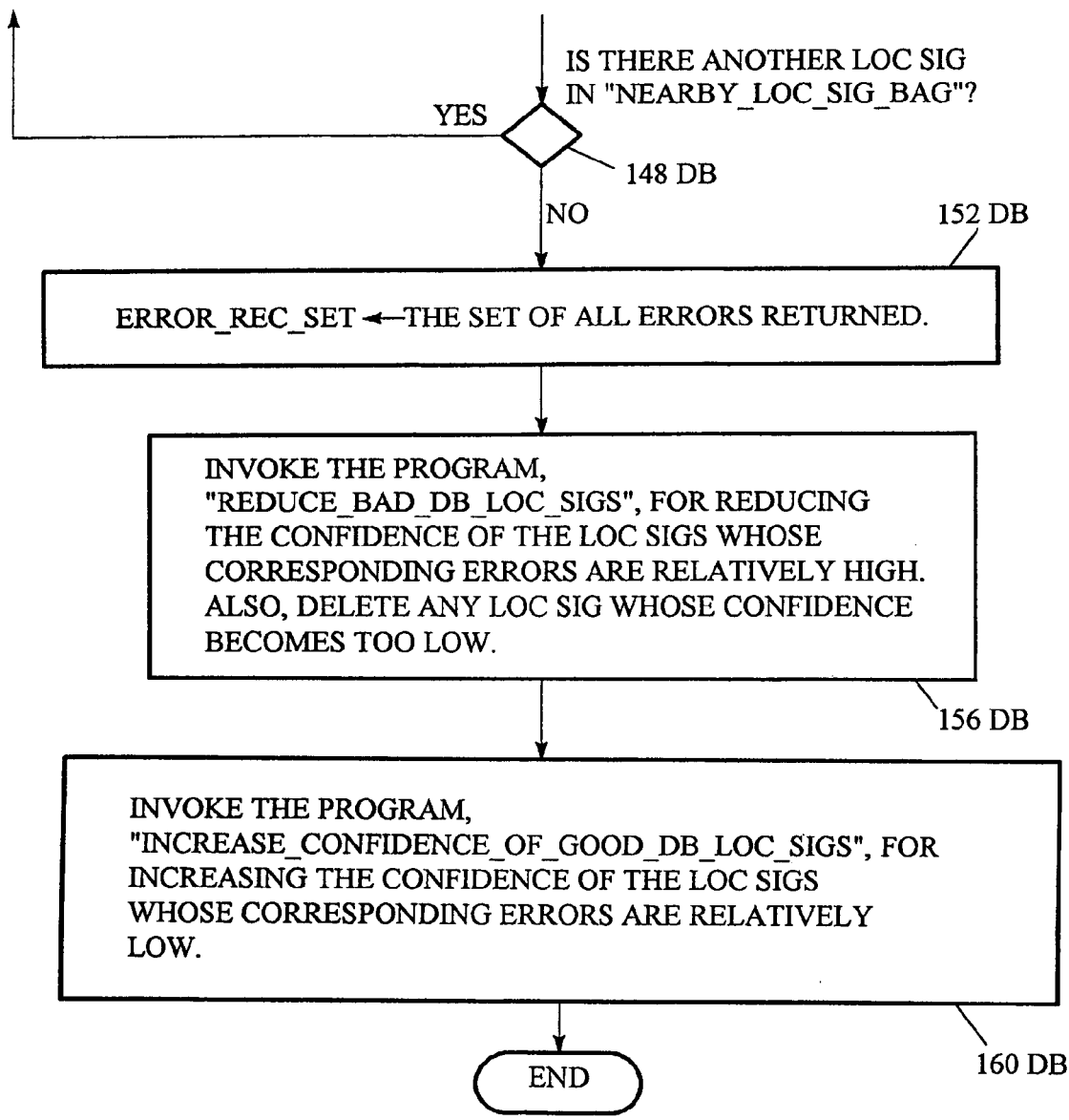

In the algorithms below, external parameter values needed are underlined. Note that in one embodiment of the present disclosure, such parameters may be adaptively tuned using, for example, a genetic algorithm.
EXTERNALLY IN VO CABLE PROGRAMS:
Update_Loc_Sig_DB(new_loc_obj, selection_criteria, loc_sig_pop)
    /* This program updates loc sigs in the Location Signature data base. That is, this program updates, for example, at least the location information for verified random loc sigs residing in this data base. Note that the steps herein are also provided in flowchart form in FIG. 17a through FIG. 17C.
Introductory Information Related to the Function, "Update_Loc_Sig_DB"
    The general strategy here is to use information (i.e., "new_loc_obj") received from a newly verified location (that may not yet be entered into the Location Signature data base) to assist in determining if the previously stored random verified loc sigs are still reasonably valid to use for:
        (29.1) estimating a location for a given collection (i.e., "bag") of wireless (e.g., CDMA) location related signal characteristics received from an MS,
        (29.2) training (for example) adaptive location estimators (and location hypothesizing models), and (29.3) comparing with wireless signal characteristics used in generating an MS location hypothesis by one of the MS location hypothesizing models (denoted First Order Models, or, FOMs).

More precisely, since it is assumed that it is more likely that the newest location information obtained is more indicative of the wireless (CDMA) signal characteristics within some area surrounding a newly verified location than the verified loc sigs (location signatures) previously entered into the Location Signature DB, such verified loc sigs are compared for signal characteristic consistency with the newly verified location information (object) input here for determining whether some of these "older" data base verified loc sigs still appropriately characterize their associated location.

In particular, comparisons are iteratively made here between each (target) loc sig "near" "new_loc_obj" and a population of loc sigs in the location signature data base (such population typically including the loc sig for "new_loc_obj") for:

(29.4) adjusting a confidence factor of the target loc sig. Note that each such confidence factor is in the range [0, 1] with 0 being the lowest and 1 being the highest. Further note that a confidence factor here can be raised as well as lowered depending on how well the target loc sig matches or is consistent with the population of loc sigs to which it is compared. Thus, the confidence in any particular verified loc sig, LS, can fluctuate with successive invocations of this program if the input to the successive invocations are with location information geographically "near" LS.

(29.5) remove older verified loc sigs from use whose confidence value is below a predetermined threshold. Note, it is intended that such predetermined thresholds be substantially automatically adjustable by periodically testing various confidence factor thresholds in a specified geographic area to determine how well the eligible data base loc sigs (for different thresholds) perform in agreeing with a number of verified loc sigs in a "loc sig test-bed", wherein the test bed may be composed of, for example, repeatable loc sigs and recent random verified loc sigs.

Note that this program may be invoked with a (verified/known) random and/or repeatable loc sig as input. Furthermore, the target loc sigs to be updated may be selected from a particular group of loc sigs such as the random loc sigs or the repeatable loc sigs, such selection being determined according to the input parameter, "selection_criteria" while the comparison population may be designated with the input parameter, "loc_sig_pop". For example, to update confidence factors of certain random loc sigs near "new_loc_obj", "selection_criteria" may be given a value indicating, "USE_RANDOM_LOC_SIGS", and "loc_sig_pop" may be given a value indicating, "USE_REPEATABLE_LOC_SIGS". Thus, if in a given geographic area, the repeatable loc sigs (from, e.g., stationary transceivers) in the area have recently been updated, then by successively providing "new_loc_obj" with a loc sig for each of these repeatable loc sigs, the stored random loc sigs can have their confidences adjusted.

Alternatively, in one embodiment of the present disclosure, the present function may be used for determining when it is desirable to update repeatable loc sigs in a particular area (instead of automatically and periodically updating such repeatable loc sigs). For example, by adjusting the confidence factors on repeatable loc sigs here provides a method for determining when repeatable loc sigs for a given area should be updated. That is, for example, when the area's average confidence factor for the repeatable loc sigs drops below a given (potentially high) threshold, then the MSs that provide the repeatable loc sigs can be requested to respond with new loc sigs for updating the DB. Note, however, that the approach presented in this function assumes that the repeatable location information in the DB is maintained with high confidence by, for example, frequent DB updating. Thus, the random verified DB location information may be effectively compared against the repeatable loc sigs in an area.

INPUT:
new_loc_obj: a data representation at least including a loc sig for an associated location about which Location Signature loc sigs are to have their confidences updated.
selection_criteria: a data representation designating the loc sigs to be selected to have their confidences updated (may be defaulted). The following groups of loc sigs may be selected:
"USE_RANDOM_LOC_SIGS" (this is the default), USE_REPEATABLE_LOC_SIGS",
"USE_ALL_LOC_SIGS". Note that each of these selections has values for the following values associated with it (although the values may be defaulted):
(a) a confidence reduction factor for reducing loc sig confidences,
(b) a big error threshold for determining the errors above which are considered too big to ignore,
(c) a confidence increase factor for increasing loc sig confidences,
(d) a small error threshold for determining the errors below which are considered too small (i.e., good) to ignore.
(e) a recent time for specifying a time period for indicating the loc sigs here considered to be "recent".
loc_sig_pop: a data representation of the type of loc sig population to which the loc sigs to be updated are compared. The following values may be provided:
(a) "USE ALL LOC SIGS IN DB",
(b) "USE ONLY REPEATABLE LOC SIGS" (this is the default),
(c) "USE ONLY LOC SIGS WITH SIMILAR TIME OF DAY"
However, environmental characteristics such as: weather, traffic, season are also contemplated. */
/*Make sure "new_loc_obj" is in Location DB. */
if(NOT new_loc_obj.in_DB) then /* this location object is not in the Location Signature DB; note this can be determined by comparing the location and times/datestamp with DB entries */
DB_insert_new_loc_sig_entries(new_loc_obj);// stores loc sigs in Location Signature DB
/* Determine a geographical area surrounding the location associated with "new_loc_obj" for adjusting the confidence factors of loc sigs having associated locations in this area. */
DB_search_area1←get_confidence_adjust_search_area_for_DB_random_loc_sigs(new_loc_obj.location);
/* get the loc sigs to have their confidence factors adjusted. */
DB_loc_sigs←get_all_DB_loc_sigs_for(DB_search_area1, selection_criteria);
nearby_loc_sig_bag←get loc sigs from "DB_loc_sigs" wherein for each loc sig the distance between the location associated with "new_loc_obj.location" and the verified location for the loc sig is closer than, for example, some standard deviation (such as the second standard deviation) of these distances for all loc sigs in "DB_loc_sigs";

```
/* For each "loc sig" having its confidence factor adjusted do
    */ for each loc_sig[i] in nearby_loc_sig_bag do // deter-
    mine a confidence for these random loc sigs
    {
        /* Determine a search area surrounding the location
            associated with "loc sig" */
        loc←get_verified_location(loc_sig[i]);
        /* Determine the error corresponding to how well "loc
            sig" fits with the portion of the inputted type of loc sig
            population that is also in the search area. */
        BS←get_BS(loc_sig[i]);
        mark_as_unaccessable(loc_sig[i]); /* mark "loc_sig[i]"
            in the Location Signature DB so that it isn't retrieved.
            */
        DB_search_area2←get_confidence_adjust_search_area_
            for_DB_loc_sigs(loc.location);
        /* Get search area about "rand loc". Typically, the
            "new_loc_obj" would be in this search area */
        loc_sig_bag←create_loc_sig_bag(loc_sig[i]); /* create
            a loc sig bag having a single loc sig, "loc_sig[i]"*/
        output_criteria←get criteria to input to "Determine_Lo-
            cation_Signature_Fit_Errors" indicating that the
            function should generate error records in the returned
            "error_rec_bag" only for the single loc sig in "loc_
            sig_bag". That is, the output criteria is: "OUTPUT
            ERROR RECS FOR INPUT LOC SIGS ONLY".
        error_rec_bag[i]←Determine_Location_Signature_
            Fit_Errors(loc.location,        loc_sig_bag,
            DB_search_area2, loc_sig_pop, output criteria);
        unmarkmaking_accessable(loc_sig[i]); /* unmark "loc_
            sig[i]" in the Location Signature DB so that it can now
            be retrieved. */
    }
/*Reduce confidence factors of loc sigs: (a) that are nearby to
    the location associated with "new_loc_obj", (b) that have
    big errors, and (c) that have not been recently updated/
    acquired. */
error_rec_set←make_set_union_of(error_rec_bag[i] for all
    i);
    /* Now modify confidences of loc sigs in DB and delete loc
        sigs with very low confidences */
reduce_bad_DB_loc_sigs(nearby_loc_sig_bag, error_rec_
    set, selection_criteria.big_error_threshold,
    selection_criteria.confidence_reductionfactor,
    selection criteria.recent time);
/* Increase confidence factors of loc sigs: (a) that are nearby
    to the location associated with "new_loc_obj", (b) that
    have small errors, and (c) that have not been recently
    updated/acquired. */
increase_confidence_of_good_DB_loc_sigs(nearby_loc_
    sig_bag, error_rec_set,
    selection_criteria.smallerrorthreshold,
    selection_criteria.confidence_increasefactor,
    selection criteria.recent time);
END OF Update_Loc_Sig_DB
DB_Loc_Sig_Error_Fit(MS_loc_est,  DB_search_area,
    measured_loc_sig_bag, search_criteria)
/* This function determines how well the collection of loc sigs
    in "measured_loc_sig_bag" fit with the loc sigs in the
    location signature data base wherein the data base loc sigs
    must satisfy the criteria of the input parameter "search_cri-
    teria" and are relatively close to the MS location estimate
    of the location hypothesis, "hypothesis". Thus, in one
    embodiment of the present disclosure, the present function
    may be invoked by, for example, the confidence adjuster
    module to adjust the confidence of a location hypothesis.
Input: hypothesis: MS location hypothesis;
    measured_loc_sig_bag: A collection of measured loca-
        tion signatures ("loc sigs" for short) obtained from the
        MS (the data structure here is an aggregation such as
        an array or list). Note, it is assumed that there is at
        most one loc sig here per Base Station in this collec-
        tion. Additionally, note that the input data structure
        here may be a location signature cluster such as the
        "loc_sig_cluster" field of a location hypothesis (cf.
        FIGS. 9A and 9B). Note that variations in input data
        structures may be accepted here by utilization of flag
        or tag bits as one skilled in the art will appreciate;
    search_criteria: The criteria for searching the verified
        location signature data base for various categories of
        loc sigs. The only limitation on the types of categories
        that may be provided here is that, to be useful, each
        category should have meaningful number of loc sigs
        in the location signature data base. The following
        categories included here are illustrative, but others are
        contemplated:
        (a) "USE ALL LOC SIGS IN DB" (the default),
        (b) "USE ONLY REPEATABLE LOC SIGS",
        (c) "USE ONLY LOC SIGS WITH SIMILAR TIME
            OF DAY".
        Further categories of loc sigs close to the MS estimate
            of "hypothesis" contemplated are: all loc sigs for the
            same season and same time of day, all loc sigs during
            a specific weather condition (e.g., snowing) and at the
            same time of day, as well as other limitations for other
            environmental conditions such as traffic patterns.
            Note, if this parameter is NIL, then (a) is assumed.
    Returns: An error object (data type: "error_object") hav-
        ing: (a) an "error" field with a measurement of the error
        in the fit of the location signatures from the MS with
        verified location signatures in the Location Signature
        data base; and (b) a "confidence" field with a value
        indicating the perceived confidence that is to be given to
        the "error" value. */
if ("search_criteria" is NIL) then
    search_criteria←"USE ALL LOC SIGS IN DB";
/* determine a collection of error records wherein there is an
    error record for each BS that is associated with a loc sig in
    "measure_loc_sig_bag" and for each BS associated with a
    loc sig in a geographical area surrounding the hypothesis's
    location. */
output_criteria←"OUTPUT ALL POSSIBLE ERROR-
    RECS";
    /* The program invoked in the following statement is
        described in the location signature data base section.
        */
error_rec_bag←Determine_Location_Signature_Fit_Errors
    (MS_loc_est, measured_loc_sig_bag,
    DB_search_area, search criteria,
    output_criteria);
    /* Note, "error rec bag" has "error rec's" for each BS
        having a loc sig in "DB_search_area" as well as each BS
        having a loc sig in "measured_loc_sig_bag". */
/*determine which error records to ignore */
BS_errors_to_ignore_bag←get_BS_error_recs_to_ignore
    (DB_search_area, error_rec_bag,);
    /* Our general strategy is that with enough BSs having: (a)
        loc sigs with the target MS, and (b) also having verified
        locations within an area about the MS location "MS_lo-
        c_est", some relatively large errors can be tolerated or
        ignored. For example, if the MS location estimate,
        "MS_loc_est", here is indeed an accurate estimate of the
        MS's location and if an area surrounding "MS_loc_est"
        has relatively homogeneous environmental characteris-
``` tics and the area has an adequate number of verified location signature clusters in the location signature data base, then there will be presumably enough comparisons between the measured MS loc sigs of "measured_loc_sig_bag" and the estimated loc sigs, based on verified MS locations in the DB (as determined in "Determine_Location_Signature_Fit_Errors"), for providing "error_rec_bag" with enough small errors that these small errors provide adequate evidence for "MS_loc_est" being accurate. Accordingly, it is believed that, in most implementations of the present disclosure, only a relatively small number of loc_sig comparisons need have small errors for there to be consistency between the loc sigs of "measured_loc_sig_bag" and the verified loc sigs in the location signature data base. That is, a few large errors are assumed, in general, to be less indicative of the MS location hypothesis being incorrect than small errors are indicative of accurate MS locations. Thus, if there were ten measured and estimated loc sig pairs, each associated with a different BS, then if four pairs have small errors, then that might be enough to have high confidence in the MS location hypothesis. However, note that this determination could depend on the types of base stations; e.g., if five full-service base stations had measured and verified loc sigs that match reasonably well but five location BSs in the search area are not detected by the MS (i.e., the measured_loc_sig_bag has no loc sigs for these location BSs), then the confidence is lowered by the mismatches.

Thus, for example, the largest x % of the errors in "error_rec_bag" may be ignored. Note, that "x" may be: (a) a system parameter that is tunable using, for example, a genetic algorithm; and (b) "x" may be tuned separately for each different set of environmental characteristics that appear most important to accurately accessing discrepancies or errors between loc sigs. Thus, for a first set of environmental characteristics corresponding to: rural, flat terrain, summer, 8 PM and clear weather, it may be the case that no loc sig errors are ignored. Whereas, for a second set of environmental characteristics corresponding to: dense urban, hilly, fall, 8 PM, heavy traffic, and snowing, all but the three smallest errors may be ignored. */

Figure 18A:
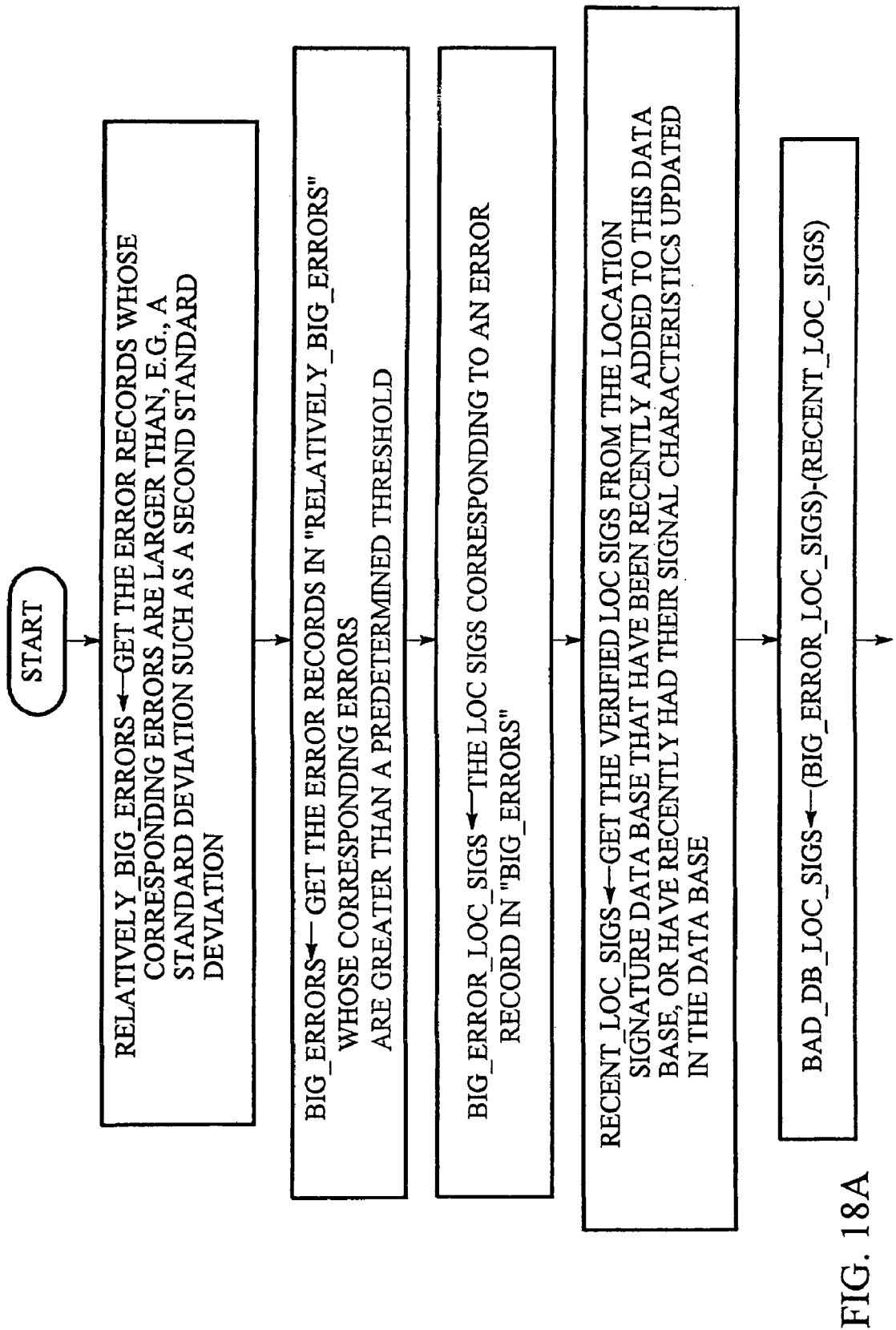
FIGS. 18a through 18b present a high level flowchart of the steps performed by function, "REDUCE_BAD_DB_LOC_SIGS," for updating location signatures in the location signature data base 1320; note, this flowchart corresponds to the description of this function in APPENDIX C.
Figure 18B:
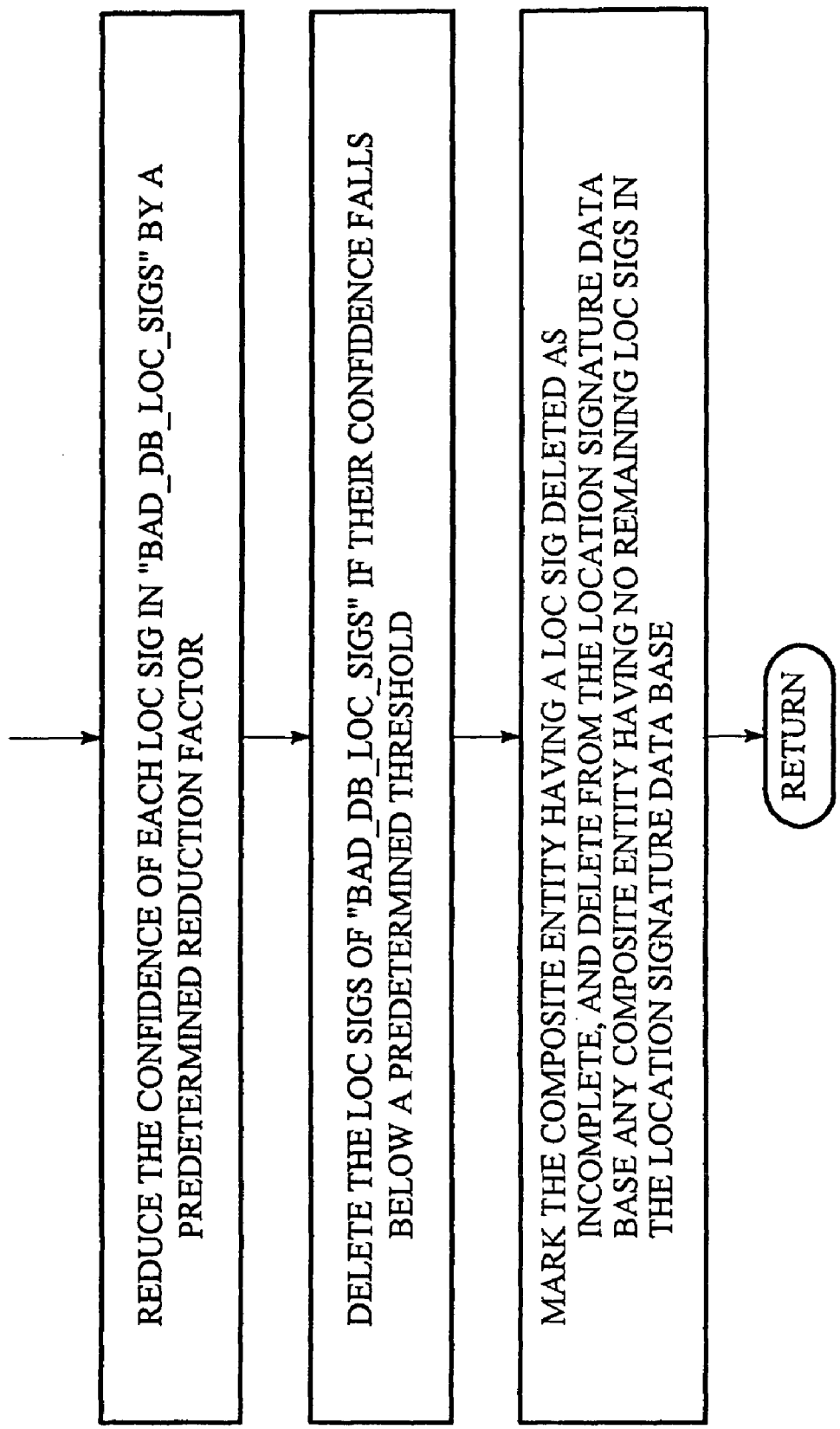

/*determine (and return) error object based on the remaining error records */
error_obj.measmt←0; // initializations
error_obj.confidence←0;
for each error_rec[i] in (error_rec_bag−BS_errors_to_ignore_bag) do
{
  error_obj.measmt←error_obj.measmt +(error rec[i].error);
  error_obj.confidence←error_obj.confidence +(error_rec[i].confidence);
}
error_obj.measmt←error_obj.measmt/SIZEOF(error_rec_bag−BS_errors_to_ignore_bag);
error_obj.confidence←error_obj.confidence/SIZEOF(error_rec_bag−BS_errors_to_ignore_bag);
RETURN(error_obj);
ENDOF DB_Loc_Sig_Error_Fit
INTERNAL PROGRAMS:
reduce_bad_DB_loc_sigs(loc_sig_bag, error_rec_set, big_error_threshold confidence_reduction_factor, recent_time)
/* This program reduces the confidence of verified DB loc sigs that are (seemingly) no longer accurate (i.e., in agreement with comparable loc sigs in the DB). If the confidence is reduced low enough, then such loc sigs are removed from the DB. Further, if for a DB verified location entity (referencing a collection of loc sigs for the same location and time), this entity no longer references any valid loc sigs, then it is also removed from the location signature data base 1320. Note that the steps herein are also provided in flowchart form in FIGS. 18*a* through 18*b*.
Inputs:
  loc_sig_bag: The loc sigs to be tested for determining if their confidences should be lowered and/or these loc sigs removed.
  error_rec_set: The set of "error_recs" providing information as to how much each loc sig in "loc_sig_bag" disagrees with comparable loc sigs in the DB. That is, there is an "error rec" here for each loc sig in "loc sig bag".
  big_error_threshold: The error threshold above which the errors are considered too big to ignore.
  confidence_reduction_factor: The factor by which to reduce the confidence of loc sigs.
  recent_time: Time period beyond which loc sigs are no longer considered recent.
{ /* get loc sigs from the Location DB having both big absolute and relative errors (in comparison to other DB nearby loc sigs) */
relatively_big_errors_bag←get "error_recs" in "error_rec_set" wherein each "error_rec.error" has a size larger than, for example, the second standard deviation from the mean (average) of such errors;
big_errors_bag←get "error_recs" in "relatively_big_errors_bag" wherein each "error rec.error" has a value larger than "big_error_threshold";
DB_loc_sigs_w_big_errors←get the loc sigs for "error_recs" in "big_errors_bag" wherein each loc sig gotten here is identified by "error_rec.loc_sig_id";
/* get loc sigs from the Location DB that have been recently added or updated */
recent_loc_sigs←get_recent_loc_sigs(loc_sig_bag, recent_time); /* Note, the function, "get_recent_loc_sigs" can have various embodiments, including determining the recent location signatures by comparing their time stamps (or other time related measurements) with one or more threshold values for classifying location signatures into a "recent" category returned here and an a category for "old" or updatable location signatures. Note that these categories can be determined by a (tunable) system time threshold parameter(s) for determining a value for the variable, "recent_time", and/or, by data driving this categorization by, e.g., classifying the location signatures according to a standard deviation, such as defining the "recent" category as those location signatures more recent than a second standard deviation of the timestamps of the location signatures in "loc_sig_bag". */
/*subtract the recent loc sigs from the loc sigs with big errors to get the bad ones */
bad_DB_loc_sigs←(big_error_DB_loc_sigs)−(recent_loc_sigs);
/* lower the confidence of the bad loc sigs */
for each loc_sig[i] in bad_DB_loc_sigs do
  loc_sig[i].confidence←(loc_sig[i].confidence)*(confidence_reduction_factor);
/* for each bad loc sig, update it in the DB or remove it from use if its confidence is too low */
/*Now delete any loc sigs from the DB whose confidences have become too low. */
for each loc_sig[i] in bad_DB_loc_sigs do
  if (loc_sig[i].confidence<min_loc_sig_confidence) then

Figure 19A:
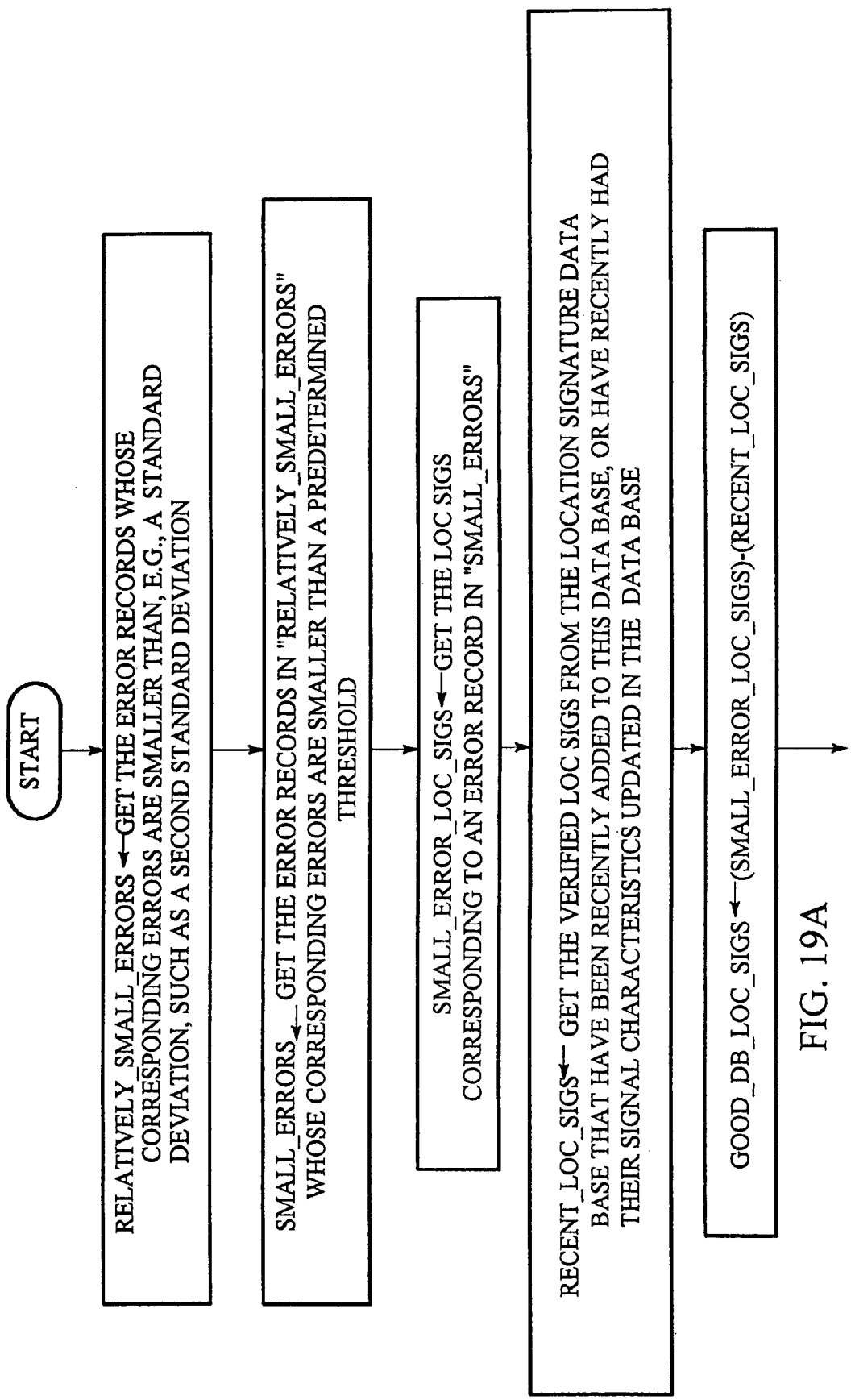
FIGS. 19a through 19b present a high level flowchart of the steps performed by function, "INCREASE_CONFIDENCE_OF_GOOD_DB_LOC_SIGS," for updating location signatures in the location signature data base 1320; note, this flowchart corresponds to the description of this function in APPENDIX C.
Figure 19B:
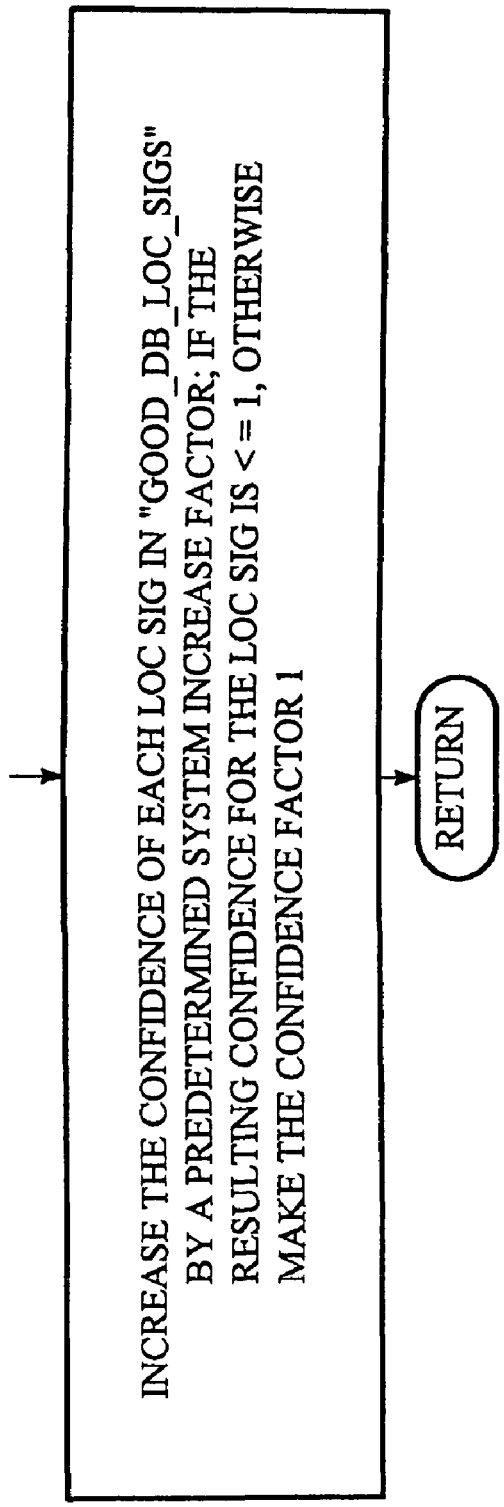
Figure 20A:
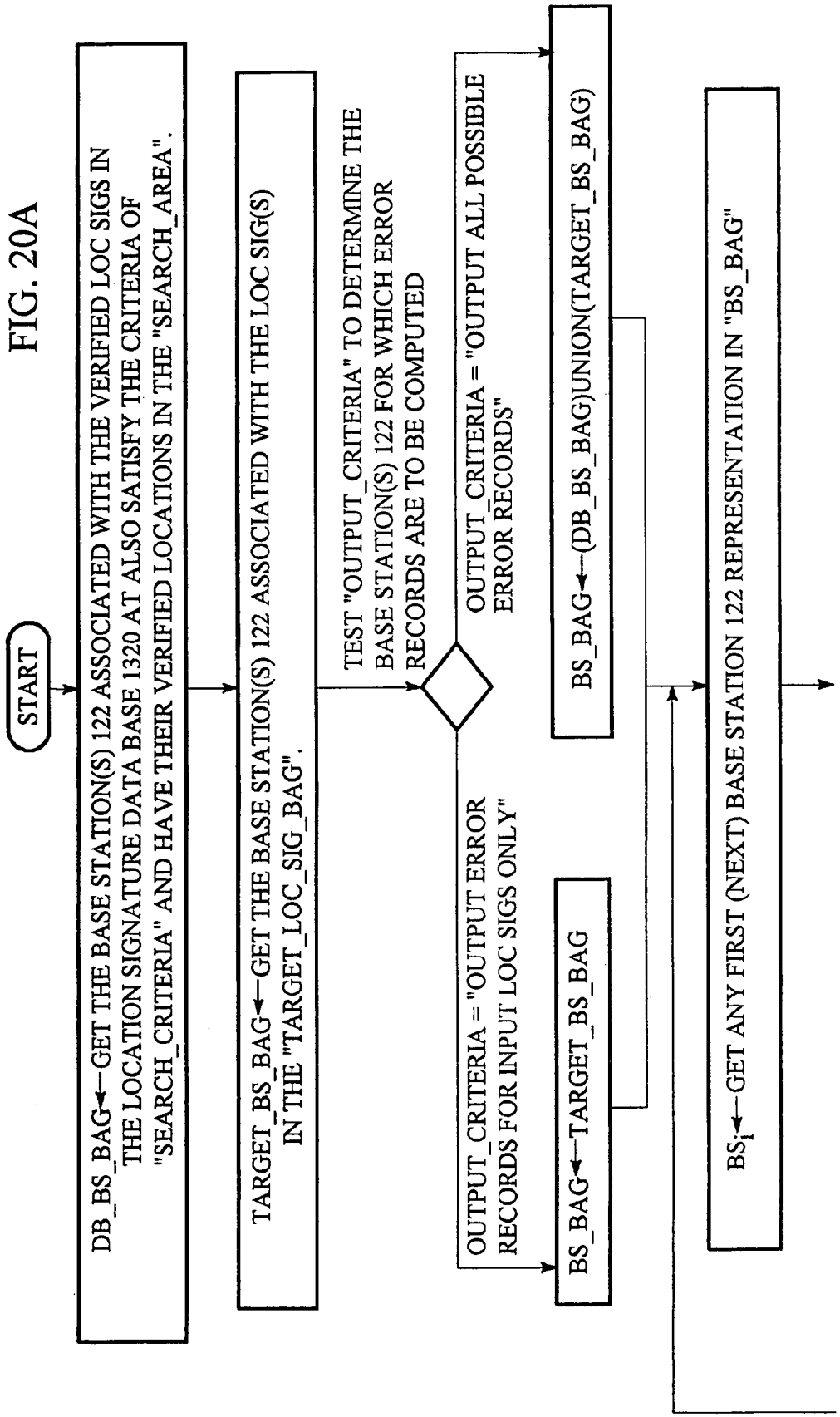
FIGS. 20a through 20d present a high level flowchart of the steps performed by function, "DETERMINE_LOCATION_SIGNATURE_FIT_ERRORS," for updating location signatures in the location signature data base 1320; note, this flowchart corresponds to the description of this function in APPENDIX C.
Figure 20B:
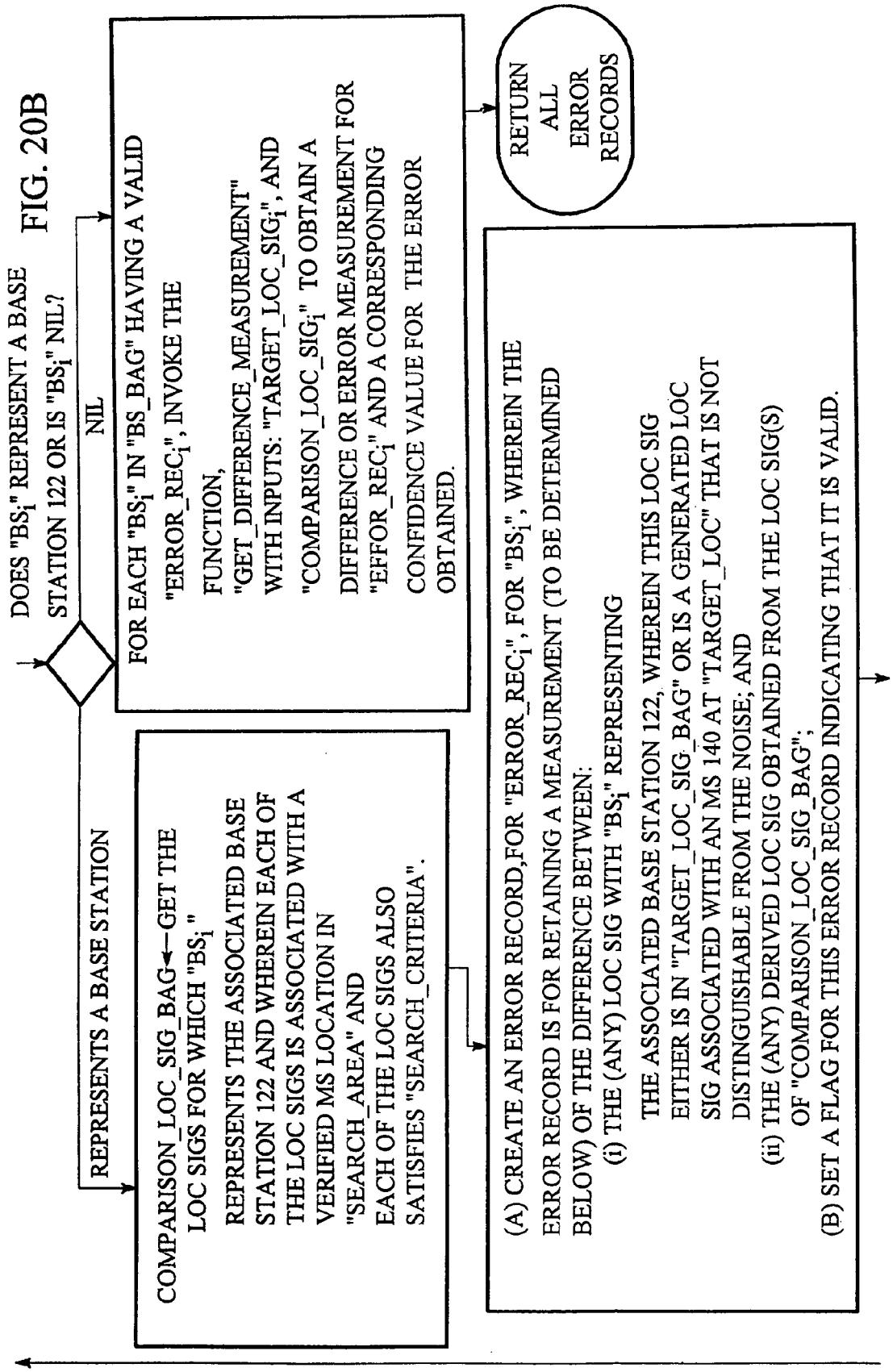
Figure 20C:
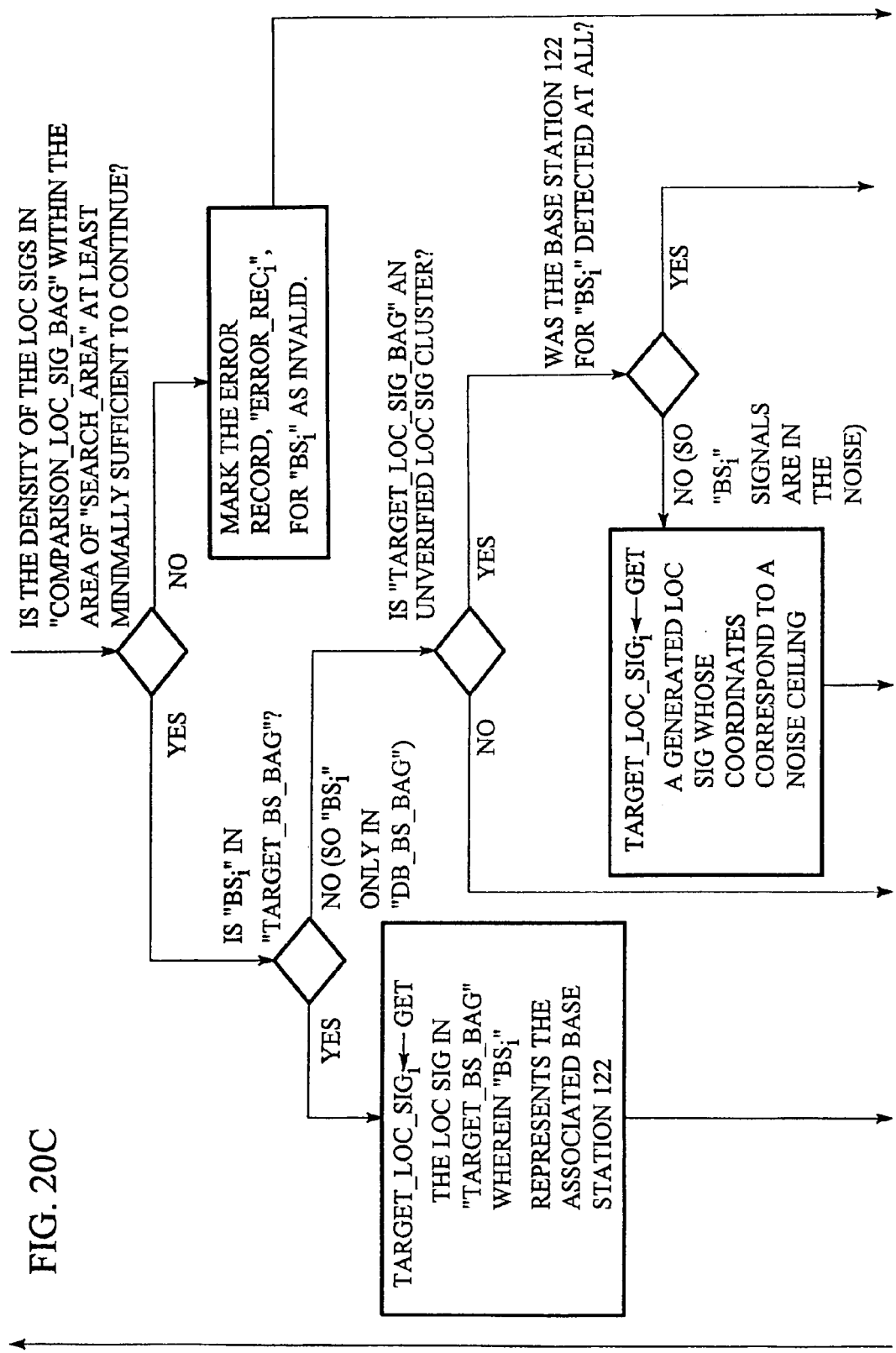
Figure 20D:
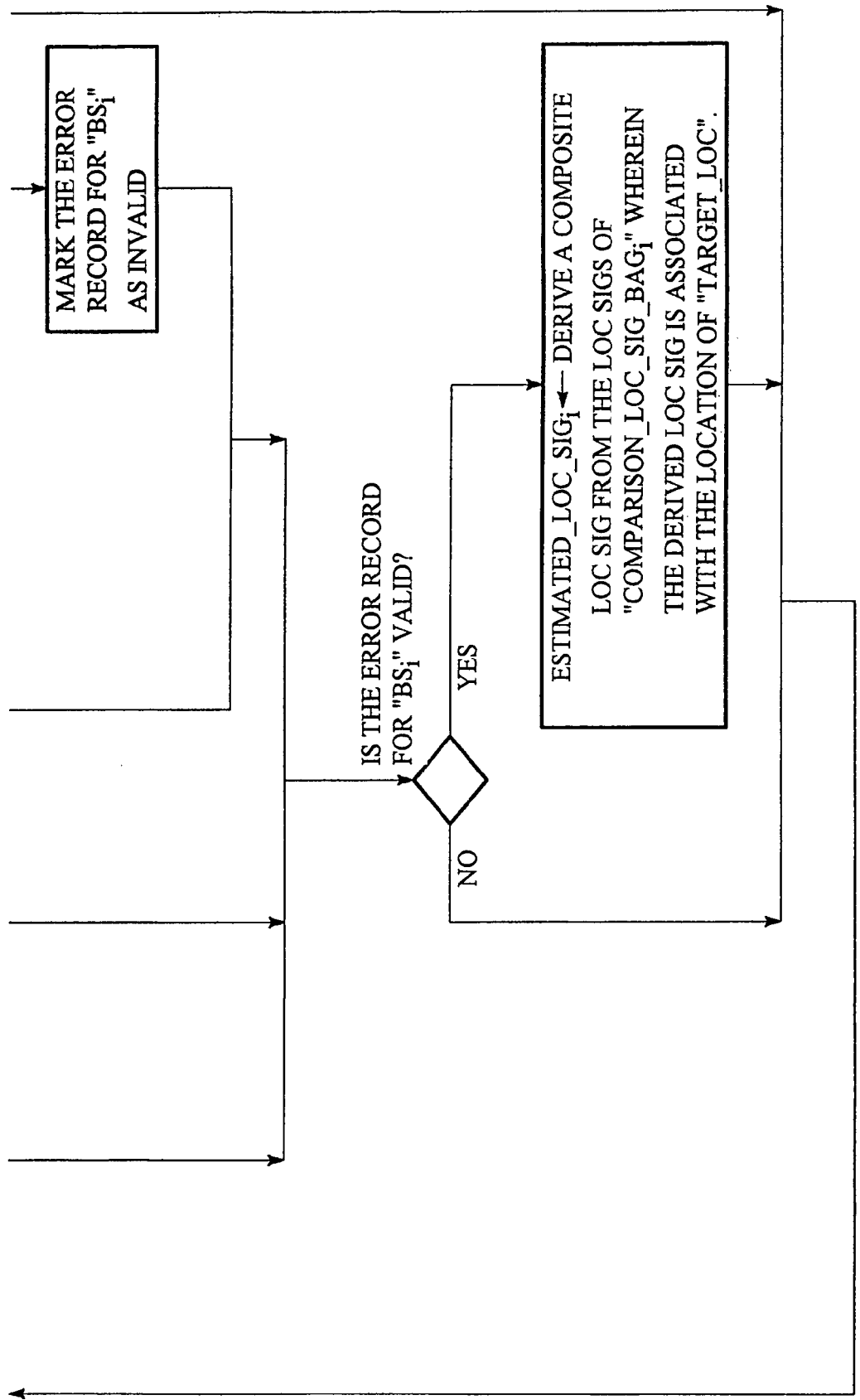

```
{
    REMOVE FROM USE(loc_sig[i]);
    /* update composite location objects to reflect a removal
       of a referenced loc sig */
    verified_loc_entity←retrieve_composite_location_
        entity_having(loc_sig[i]);
        /* This gets all other (if any) loc sigs for the composite
           location object that were verified at the same time
           as "loc_sig[i]". Note, these other loc sigs may not
           need to be deleted (i.e., their signal characteristics
           may have a high confidence); however, it must be
           noted in the DB, that for the DB composite location
           entity having "loc_sig[i]", this entity is no longer
           complete. Thus, this entity may not be useful as,
           e.g., neural net training data. */
        mark "verified_loc_entity" as incomplete but keep track
           that a loc sig did exist for the BS associated with
           "loc_sig[i]";
        if ("verified_loc_entity" now references no loc sigs)
           then REMOVE_FROM_USE (verified_loc_entity);
}
else DB_update_entry (loc_sig[i]); // with its new confi-
    dence
} ENDOF reduce_bad_DB_loc_sigs
increase_confidence_of_good_DB_loc_sigs (nearby_loc_
    sig_bag, error_rec_set, small_error_threshold, confiden-
    ce_increase_factor, recent_time);
/* This program increases the confidence of verified DB loc
   sigs that are (seemingly) of higher accuracy (i.e., in agree-
   ment with comparable loc sigs in the DB). Note that the
   steps herein are also provided in flowchart form in FIGS.
   19a through 19b.
   Inputs:
   loc_sig_bag: The loc sigs to be tested for determining if
      their confidences should be increased.
   error_rec_set: The set of "error recs" providing informa-
      tion as to how much each loc sig in "loc_sig_bag" dis-
      agrees with comparable loc sigs in the DB. That is, there
      is an "error rec" here for each loc sig in "loc sig bag".
   small_error_threshold: The error threshold below which
      the errors are considered too small to ignore.
   confidence_increase_factor: The factor by which to
      increase the confidence of loc sigs.
   recent_time: Time period beyond which loc sigs are no
      longer considered recent.
/* get loc sigs from the Location DB having both small
   absolute and relative errors (in comparison to other DB
   nearby loc sigs) */
relatively_small_errorsbag←get "error_recs" in "error_rec_
   set" wherein each "error_rec.error" has a size smaller than,
   for example, the second standard deviation from the mean
   (average) of such errors;
small_errors_bag←get "error_recs" in "relatively_small_er-
   rors_bag" wherein each "error_rec.error" has a size
   smaller than "small_error_threshold";
DB_loc_sigs_w_small_errors←get the loc sigs for "error_
   recs" in "small_errors_bag" wherein each loc sig gotten
   here is identified by "error_rec.loc_sig_id";
/* get loc sigs from the Location DB that have been recently
   added or updated */
recent_loc_sigs←get_recent_loc_sigs(loc_sig_bag, recent_
   time);
/* subtract the recent loc sigs from the loc sigs with small
   errors to get the good ones */
good_DB_loc_sigs←(small_error_DB_loc_sigs)−(recent_
   loc_sigs);
/* for each good loc sig, update its confidence */
for each loc_sig[i] in good_DB_loc_sigs do
{
    loc_sig[i].confidence←(loc_sig[i].confidence)*(confi-
       dence_increase_factor);
    if (loc_sig[i].confidence >1.0) then loc_sig[i]←1.0;
}
ENDOF increase_good_DB_loc_sigs
Data Base Programs for Determining The Consistency of
Location Hypotheses with Verified Location Information in
the Location Signature Data Base
Low Level Data Base Programs for Location Signature Data
Base
/* The following program compares: (a1) loc sigs that are
   contained in (or derived from) the loc sigs in "target_loc_
   sig_bag" with (b1) loc sigs computed from verified loc sigs
   in the location signature data base. That is, each loc sig
   from (a1) is compared with a corresponding loc sig from
   (b1) to obtain a measurement of the discrepancy between
   the two loc sigs. In particular, assuming each of the loc sigs
   for "target_loc_sig_bag" correspond to the same target MS
   location, wherein this location is "target_loc", this pro-
   gram determines how well the loc sigs in "target_loc_sig_
   bag" fit with a computed or estimated loc sig for the loca-
   tion, "target_loc" that is derived from the verified loc sigs
   in the location signature data base. Thus, this program may
   be used: (a2) for determining how well the loc sigs in the
   location signature cluster for a target MS ("target_loc_sig_
   bag") compares with loc sigs derived from verified location
   signatures in the location signature data base, and (b2) for
   determining how consistent a given collection of loc sigs
   ("target_loc_sig_bag") from the location signature data
   base is with other loc sigs in the location signature data
   base. Note that in (b2) each of the one or more loc sigs in
   "target_loc_sig_bag" have an error computed here that can
   be used in determining if the loc sig is becoming inappli-
   cable for predicting target MS locations Note that the steps
   herein are also provided in flowchart form in FIGS. 20a
   through 20d. */
Determine_Location_Signature_Fit_Errors(target_loc, tar-
   get_loc_sig_bag, search_area, search_criteria, output_cri-
   teria)
   /* Input: target_loc: An MS location or a location hypoth-
      esis for a particular MS. Note, this can be any of the
      following:
      (a) An MS location hypothesis, in which case, the loc
         sigs in "target_loc_sig_bag" are included in a location
         signature cluster from which this location hypothesis
         was derived. Note that if this location is inaccurate,
         then "target_loc_sig_bag" is unlikely to be similar to
         the comparable loc sigs derived from the loc sigs of
         the location signature data base close "target_loc"; or
      (b) A previously verified MS location, in which case, the
         loc sigs of "target_loc_sig_bag" are previously veri-
         fied loc sigs. However, these loc sigs may or may not
         be accurate now.
   target_loc_sig_bag: Measured location signatures ("loc
      sigs" for short) obtained from the particular MS (the data
      structure here, bag, is an aggregation such as array or
      list). The location signatures here may be verified or
      unverified. However, it is assumed that there is at least
      one loc sig in the bag. Further, it is assumed that there is
      at most one loc sig per Base Station. It is also assumed
      that the present parameter includes a "type" field indi-
      cating whether the loc sigs here have been individually
      selected, or whether this parameter references an entire
      (verified) loc sig cluster; i.e., the type field may have a
      value of: "UNVERIFIED LOC SIG CLUSTER" or
      "VERIFIED LOC SIG CLUSTER";
``` search_area: The representation of the geographic area surrounding "target_loc". This parameter is used for searching the Location Signature data base for verified loc sigs that correspond geographically to the location of an MS in "search_area";

search_criteria: The criteria used in searching the location signature data base. The criteria may include the following:
(a) "USE ALL LOC SIGS IN DB",
(b) "USE ONLY REPEATABLE LOC SIGS",
(c) "USE ONLY LOC SIGS WITH SIMILAR TIME OF DAY".
However, environmental characteristics such as: weather, traffic, season are also contemplated.

output_criteria: The criteria used in determining the error records to output in "error_rec". The criteria here may include one of:
(a) "OUTPUT ALL POSSIBLE ERRORRECS";
(b) "OUTPUT ERROR RECS FOR INPUT LOC SIGS ONLY".

Returns: error_rec: A bag of error records or objects providing an indication of the similarity between each loc sig in "target_loc_sig_bag" and an estimated loc sig computed for "target_loc" from stored loc sigs in a surrounding area of "target_loc". Thus, each error record/object in "error_rec" provides a measurement of how well a loc sig (i.e., wireless signal characteristics) in "target_loc_sig_bag" (for an associated BS and the MS at "target_loc") correlates with an estimated loc sig between this BS and MS. Note that the estimated loc sigs are determined using verified location signatures in the Location Signature DB. Note, each error record in "error_rec" includes: (a) a BS ID indicating the base station to which the error record corresponds; and (b) an error measurement (>=0), and (c) a confidence value (in [0, 1]) indicating the confidence to be placed in the error measurement. Also note that since "error_rec" is an aggregate data type (which for many aggregate identifiers in this specification are denoted by the suffix "_bag" on the identifier), it can be any one of a number data types even though it's members are accessed hereinbelow using array notation. */

Figure 21:
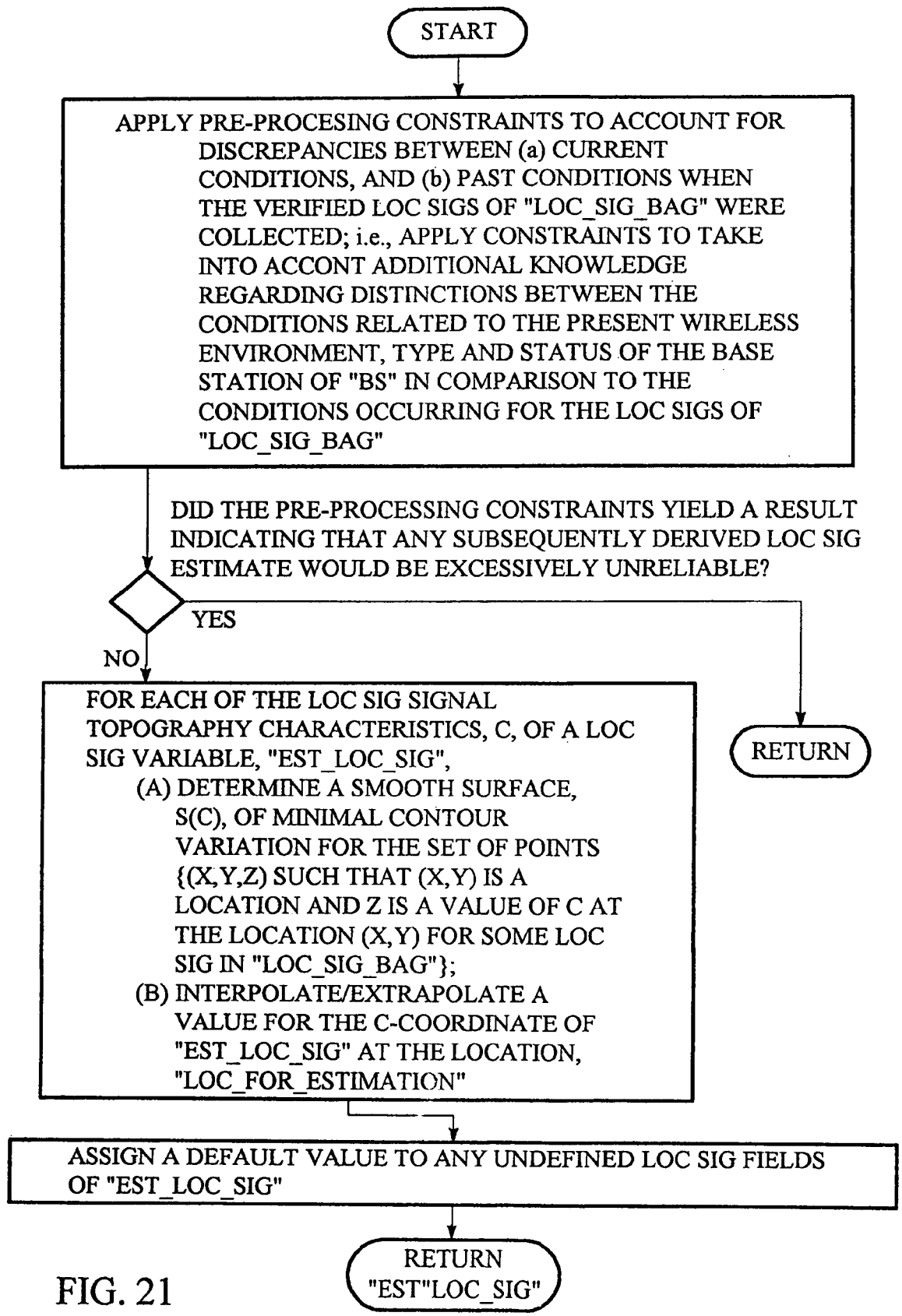
FIG. 21 presents a high level flowchart of the steps performed by function, "ESTIMATE_LOC_SIG_FROM_DB,"

/* get BS's associated with DB loc sigs in "search_area" that satisfy "search_criteria" */
DB_loc_sig_bag←retrieve_verified_loc_sigs(search_area, search_criteria);
// get all verified appropriate location signatures residing in the Location Signature data base.
// Note, some loc sigs may be blocked from being retrieved.
DB_BS_bag←get_BSs(DB_loc_sig_bag); // get all base stations associated with at least one location
// signature in DB_loc_sig_bag. Note, some of these BSs may be low power "location // BSs".
/* get BS's associated with loc sigs in "target_loc_sig_bag" */
target_BS_bag←get_BSs(target_loc_sig_bag); // get all base stations associated with at least one
// location signature in "target_loc_sig_bag".
/* determine the BS's for which error records are to be computed */
case of "output criteria" including:
    "OUTPUT ALL POSSIBLE ERROR_RECS": /* In this case, it is desired to determine a collection or error records wherein there is an error record for each BS that is associated with a loc sig in "target_loc_sig_bag" and for each BS associated with a loc in the "search_area" satisfying "search_criteria". */
    BS_bag←(DB_BS_bag) union (target_BS_bag);
    "OUTPUT ERROR RECS FOR INPUT LOC SIGS ONLY":
    BS_bag←target_BS_bag;
endcase;
/* for each BS to have an error record computed, make sure there are two loc sigs to compare: one loc sig derived from the "BS_bag" loc sig data, and one from derived from the loc sigs in the Location Signature DB, wherein both loc sigs are associated with the location, "target_loc". */
for each BS[i] in "BS_bag" do
{ /* determine two (estimated) loc sigs at "target_loc", one derived from "target_loc_sig_bag" (if possible) and one derived from Location Signature DB loc sigs (if possible) */
comparison_loc_sig_bag[i]←retrieve_verified_loc_sigs_for(BS[i], search_area, search_criteria);
    /* get all loc sigs for which BS[i] is associated and wherein the verified MS location is in "search_area" (which surrounds the location "target_loc") and wherein the loc sigs satisfy "search_criteria". */
/* now determine if there are enough loc sigs in the "comparison_loc_sig_bag" to make it worthwhile to try to do a comparison. */
if    ((SIZEOF(comparison_loc_sig_bag[i])/(SIZEOF (search_area))))<
    min_threshold_ratio(area_type(search_area))) then
    /* it is believed that there is not a dense enough number of verified loc sigs to compute a composite loc sig associated with a hypothetical MS at "target loc". */
    error_rec[i].error←invalid;
else /* there are enough loc sigs in "comparison_loc_sig_bag" to continue, and in particular, an estimated loc sig can be derived from the loc sigs in "comparison_loc_sig_bag"; however, first see id a target loc sig can be determined; if so, then make the estimated loc sig (denoted "estimated_loc_sig[i]"). */
{
    if (BS[i] is in target_BS_bag) then
        /* get a loc sig in "target_BS_bag" for BS[i]; assume at most one loc sig per BS in "target_loc_sig_bag" */
        target_loc_sig[i]←get_loc_sig(BS[i], target_loc_sig_bag);
    else /* BS[i] is not in "target_BS_bag", accordingly this implies that we are in the process of attempting to output all possible error records for all BS's: (a) that have previously been detected in the area of "search_area" (satisfying "search_criteria"), union, (b) that are associated with a loc sig in "target_loc_sig_bag". Note, the path here is performed when the MS at the location for "target_loc" did not detect the BS[i], but BS[i] has previously been detected in this area. */
        if (target_loc_sig_bag.type="UNVERIFIED LOC SIG CLUSTER") then
            /* can at least determine if the MS for the cluster detected the BS[i]; i.e., whether BS[i] was in the set of BS's detected by the MS even though no loc sig was obtained for BS[i]. */
            if (BS_only_detected(target_loc_sig_bag, BS[i])) then /* detected but no loc sig */ error_rec[i].error←invalid; /* can't determine an error if this is all the information we have */
            else /* BS[i] was not detected by the MS at "target_loc.location", so the pilot channel for BS[i] was in the noise; make an artificial loc sig at the noise ceiling (alternatively, e.g., a mean noise value) for the MS location at "target_loc" */
  target_loc_sig[i]←get_noise_ceiling_loc_sig(target_loc);
else; /* do nothing; there are no other types for "target_loc_sig_bag.type" that are currently used when outputting all possible error records for BS's */
if (error_rec[i].error NOT invalid) then
  /* we have a "target_loc_sig" for comparing, so get the derived loc sig estimate obtained from the verified loc sigs in the location signature data base. */
  estimated_loc_sig[i]←estimate_loc_sig_from_DB
    (target_loc.location,
    comparison_loc_sig_bag[i]);
  /* The above call function provides an estimated loc sig for the location of "target_loc" and BS[i] using the verified loc sigs of "comparison_loc_sig_bag [i]" */
}
/*for each BS whose error record has not been marked "invalid", both "target_loc_sig" and "estimated_loc_sig" are now well-defined; so compute an error record related to the difference between "target_loc_sig" and "estimated_loc_sig". */
for each BS[i] in "BS_bag" with error_rec[i].error not invalid
  do /* determine the error records for these base stations */
{
  /* Note, the "target_loc_sig" here is for an MS at or near the location for the center of area for "target_loc". */
  error_rec[i]←get_difference_measurement(target_loc_sig[i], estimated_loc_sig[i],
    comparison_loc_sig_bag[i], search_area, search_criteria);/* get a measurement of the difference between these two loc sigs. */
  error_rec.loc_sig_id←target_loc_sig[i].id; /* this is the loc sig with which this error_rec is associated */
  error_rec.comparison_loc_sig_id_bag←comparison_loc_sig_bag[i];
}
RETURN(error_rec);
ENDOF Determine_Location_Signature_Fit_Errors
estimate_loc_sig_from_DB(loc_for_estimation, loc_sig_bag)
  /* This function uses the verified loc sigs in "loc_sig_bag" to determine a single estimated (or "typical") loc sig derived from the loc sigs in the bag. Note, it is assumed that all loc sigs in the "loc_sig_bag" are associated with the same BS 122 (denoted the BS associated with the "loc_sig_bag") and that the locations associated with these loc sigs are near "loc_for_estimation". Further, note that since the loc sigs are verified, the associated base station was the primary base station when the loc sig signal measurements were sampled. Thus, the measurements are as precise as the infrastructure allows. Note that the steps herein are also provided in flowchart form in FIG. 21.
  Input: loc_for_estimation A representation of a service area location.
    loc_sig_bag A collection of verified loc sigs, each associated with the same base station and each associated with a service area location presumably relatively near to the location represented by "loc_for_estimation". */
est_loc_sig←extrapolate/interpolate a location signature for the location at "loc_for_estimation" based on loc sigs in "loc_sig_bag";

/* Note, "estloc_sig" includes a location signature and a confidence measure.
  The confidence measure (in the range: [0, 1]) is based on: (a) the number of verified loc sigs in the search area; (b) how well they surround the center location of the new loc, and (c) the confidence factors of the loc sigs in "loc_sig_bag" (e.g., use average confidence value).
  Note, for the extrapolation/interpolation computation here, there are many such extrapolation/interpolation methods available as one skilled in the art will appreciate. For example, in one embodiment of an extrapolation/interpolation method, the following steps are contemplated:
  (39.1) Apply any pre-processing constraints that may alter any subsequently computed "est_loc_sig" values derived below). For example, if the BS associated with "loc_sig_bag" is currently inactive "location BS" (i.e., "active" meaning the BS is on-line to process location information with an MS, "inactive" meaning the not on-line), then, regardless of any values that may be determined hereinbelow, a value or flag is set (for the signal topography characteristics) indicating "no signal" with a confidence value of 1 is provided. Further, additional pre-processing may be performed when the BS associated with "loc_sig_bag" is a location BS (LBS) since the constraint that a pilot channel from such an LBS is likely to be only detectable within a relatively small distance from the BS (e.g., 1000 ft). For example, if the MS location, "loc_for_estimation", does not intersect the radius (or area contour) of such a location BS, then, again, a value or flag is set (for the signal topography characteristics) indicating "outside of LBS area" with a confidence value of 1 is provided. Alternatively, if (a) a determined area, A, including the MS location, "loc_for_estimation" (which may itself be, and likely is, an area), intersects (b) the signal detectable area about the location BS, then (c) the confidence factor value may be dependent on the ratio of the area of the intersection to the minimum of the size of the area in which the LBS is detectable and the size of the area of "loc_for_estimation", as one skilled in the art will appreciate.
    Further, it is noteworthy that such pre-processing constraints as performed in this step may be provided by a constraint processing expert system, wherein system parameters used by such an expert system are tuned using the adaptation engine 1382.
  (39.2) Assuming a value of "no signal" or "outside of LBS area" was not set above (since otherwise no further steps are performed here), for each of the coordinates (records), C, of the signal topography characteristics in the loc sig data structure, generate a smooth surface, S(C), of minimal contour variation for the set of points { (x,y,z) such that (x,y) is a representation of a service area location, and z is a value of C at the location (x,y) for some loc sig in "loc_sig_bag" wherein (x,y) is a point estimate (likely centroid) of the loc sig}. Note that a least squares technique, a partial least squares technique, or averaging on "nearby" (x,y,z) points may be used with points from the above set to generate other points on the surface S(C). Additionally, note that for at least some surfaces characterizing signal energy, the generation process for such a surface may use the radio signal attenuation formulas for urban, suburban, and rural developed by M. Hata in IEEE Trans, VT-29, pgs. 317-325, Aug. 1980, "Empirical Formula For Propagation Loss In Land Mobile Radio" (herein incorporated by reference). For example, Hata's formulas may be used in:

(39.2.1) Determining portions of the surfaces S(C) where there is a low density of verified loc sigs in "loc_sig_bag". In particular, if there is a very low density of verified loc sigs in "loc_sig_bag" for the service area surrounding the location of "loc_for_estimation", then by determining the area type(s) (e.g., transmission area type as described hereinabove, assuming a correspondence between the transmission area types and the more coarse grained categorization of : urban, suburban, and rural) between this location and the base station associated with "loc_sig_bag", and applying Hata's corresponding formula(s), a signal value z may be estimated according to these type(s) and their corresponding area extents between the MS and the BS. Note, however, that this option is considered less optimal to using the verified loc sigs of "loc_sig_bag" for determining the values of a surface S(C). Accordingly, a lower confidence value may be assigned the resulting composite loc sig (i.e., "est_loc_sig") determined in this manner; and relatedly, (39.2.2) Determining a surface coordinate $(x_0, y_0, z_0)$ of S(C) when there are nearby verified loc sigs in "loc_sig_bag". For example, by using Hata's formulas, an estimated surface value $z_i$ at the location $(x_0, y_0)$ may be derived from estimating a value $z_i$ at $(x_0, y_0)$ by adapting Hata's formula's to extrapolate/interpolate the value $z_i$ from a nearby location $(x_i, y_i)$ having a verified loc sig in "loc_sig_bag". Thus, one or more estimates $z_i$ may be obtained used in deriving $z_0$ as one skilled in statistics will appreciate. Note, this technique may be used when there is a moderately low density of verified loc sigs in "loc_sig_bag" for the service area surrounding the location of "loc_for_estimation". However, since such techniques may be also considered less than optimal to using a higher density of verified loc sigs of "loc_sig_bag" for determining the values of a surface S(C) via a least squares or partial least square technique, a lower confidence value may be assigned the resulting composite loc sig (i.e., "est_loc_sig") determined in this manner. Further, recall that the values, z, for each loc sig are obtained from a composite of a plurality of signal measurements with an MS, and, that each value z is the most distinct value that stands out above the noise in measurements for this coordinate, C. So, for example in the CDMA case, for each of the coordinates C representing a finger of signal energy from or to some MS at a verified location, it is believed that S(C) will be a smooth surface without undulations that are not intrinsic to the service area near "loc_for_estimation".

(39.3) For each of the coordinates, C, of the signal topography characteristics, extrapolate/interpolate a C-coordinate value on S(C) for an estimated point location of "loc_for_estimation".

Further note that to provide more accurate estimates, it is contemplated that Hata's three geographic categories and corresponding formulas may be used in a fuzzy logic framework with adaptive mechanisms such as the adaptation engine 1382 (for adaptively determining the fuzzy logic classifications).

Additionally, it is also within the scope of the present disclosure to use the techniques of L. E. Vogler as presented in "The Attenuation of Electromagnetic Waves by Multiple Knife Edge Diffraction", US Dept of Commerce, NTIA nos, 81-86 (herein incorporated by reference) in the present context for estimating a loc sig between the base station associated with "loc_sig_bag" and the location of "loc_for_estimation". */

```
    RETURN(est_loc_sig)
ENDOF estimate_loc_sig_from_DB
get_area_to_search(loc)
/* This function determines and returns a representation of a
   geographic area about a location, "loc", wherein: (a) the
   geographic area has associated MS locations for an accept-
   able number (i.e., at least a determined minimal number) of
   verified loc sigs from the location signature data base, and
   (b) the geographical area is not too big. However, if there
   are not enough loc sigs in even a largest acceptable search
   area about "loc", then this largest search area is returned.
   Note that the steps herein are also provided in flowchart
   form in FIGS. 22a through 22b. */
{
    loc_area_type←get_area_type (loc); /*get the area type
       surrounding "loc"; note this may be a vector of fuzzy
       values associated with a central location of "loc", or,
       associated with an area having "loc". */
    search_area←get_default_area_about (loc); /* this is the
       largest area that will be used */
    saved search_area←search_area; // may need it after
       "search_area" has been changed
    search_area types←get_area_types(search_area); // e.g.,
       urban, rural, suburban, mountain, etc.
    loop until RETURN performed:
    {
        min_acceptable_nbr_loc_sigs←0; // initialization
        for each area type in "search_area types" do
        {
            area_percent←get_percent_of_area_of (area_type,
                search_area);
            /* get percentage of area having "area_type" */
            min_acceptable_nbr_loc_sigs←min_acceptable_
                nbr_loc_sigs +[get_min_acceptable_verifedloc_
                sig_density_for(area_type))*    (SIZEOF
                (search_area)*area_percentt/100)];
        }
        /* Now get all verified loc sigs from the location signa-
           ture data base whose associated MS location is in
           "search_area". */
        total_nbr_loc_sigs←get_all_verified_DB_loc_sigs
            (search_area);
        if (min_acceptable_nbr_loc_sigs>total_nbr_loc_sigs)
            then /* not enough loc sigs in "search_area"; so return
                "saved_search_area" */
            RETURN(savedsearch_area);
        else /* there is at least enough loc sigs, so see if
            "search_area" can be decreased */
        { saved_search_area←search_area;
            search_area←decrease_search_area_about(loc,
                search_area);
        }
    }
}
```

ENDOF get_area_to_search
/* For processing various types of loc sigs, particular signal processing filters may be required. Accordingly, in one embodiment of the present disclosure, a "filter_bag" object class is provided wherein various filters may be methods of this object (in object-oriented terminology) for transforming loc sig signal data so that it is comparable with other loc sig signal data from, for example, an MS of a different classification (e.g., different power classification). It is assumed here that such a "filter bag" object includes (or references) one or more filter objects that correspond to an input filter (from the Signal Filtering Subsystem 1220) so that, given a location signature data object as input to the filter bag object each such filter object can output loc sig filtered data corresponding to the filter object's filter. Note, such a filter_bag object may accept raw loc sig data and invoke a corresponding filter on the data. Further, a filter_bag object may reference filter objects having a wide range of filtering capabilities. For example, adjustments to loc sig data according to signal strength may be desired for a particular loc sig comparison operator so that the operator can properly compare MS's of different power classes against one another. Thus, a filter may be provided that utilizes, for each BS, a corresponding signal strength change topography map (automatically generated and updated from the verified loc sigs in the location signature data base 1320) yielding signal strength changes detected by the BS for verified MS location's at various distances from the BS, in the radio coverage area. Additionally, there may also be filters on raw signal loc sig data such as quality characteristics so that loc sigs having different signal quality characteristics may be compared. */
get_difference_measurement(target_loc_sig, estimated_loc_sig, comparison_loc_sig_bag, search_area, search_criteria)
/* Compare two location signatures between a BS and a particular MS location (either a verified or hypothesized location) for determining a measure of their difference relative to the variability of the verified location signatures in the "comparison_loc_sig_bag" from the location signature data base 1320. Note, it is assumed that "target_loc_sig", "estimated_loc_sig" and the loc sigs in "comparison_loc_sig_bag" are all associated with the same BS 122. Moreover, it is assumed that "target_loc_sig" and "estimated_loc_sig" are well-defined non-NIL loc sigs, and additionally, that "comparison_loc_sig_bag" is non-NIL. This function returns an error record, "error_rec", having an error or difference value and a confidence value for the error value. Note, the signal characteristics of "target_loc_sig" and those of "estimated_loc_sig" are not assumed to be normalized as described in section (26.1) prior to entering this function so that variations in signal characteristics resulting from variations in (for example) MS signal processing and generating characteristics of different types of MS's may be reduced, as described in the discussion of the loc sig data type hereinabove. It is further assumed that typically the input loc sigs satisfy the "search_criteria". Note that the steps herein are also provided in flowchart form in FIGS. 23*a* through 23*c*.
    target_loc_sig: The loc sig to which the "error_rec" determined here is to be associated. Note that this loc sig is associated with a location denoted hereinbelow as the "particular location".
    estimated_loc_sig: The loc sig to compare with the "target_loc_sig", this loc sig: (a) being for the same MS location as "target_loc_sig", and (b) derived from verified loc sigs in the location signature data base whenever possible. However, note that if this loc sig is not derived from the signal characteristics of loc sigs in the location signature data base, then this parameter provides a loc sig that corresponds to a noise level at the particular MS location.
    comparison_loc_sig_bag: The universe of loc sigs to use in determining an error measurement between "target_loc_sig" and "estimated_loc_sig". Note, the loc sigs in this aggregation include all loc sigs for the associated Base Station 122 that are in the "search_area" (which surrounds the particular MS location for "target_loc_sig") and satisfy the constraints of "search_criteria". It is assumed that there are sufficient loc sigs in this aggregation to perform at least a minimally effective variability measurement it the loc sigs here.
    search_area: A representation of the geographical area surrounding the particular MS location for all input loc sigs. This input is used for determining extra information about the search area in problematic circumstances.
    search_criteria: The criteria used in searching the location signature data base 1320. The criteria may include the following:
        (a) "USE ALL LOC SIGS IN DB",
        (b) "USE ONLY REPEATABLE LOC SIGS",
        (c) "USE ONLY LOC SIGS WITH SIMILAR TIME OF DAY
        However, environmental characteristics such as: weather, traffic, season are also contemplated. */
error←0; // initialization
/* get identifiers for the filters to be used on the input loc sigs */
filter_bag←get_filter_objects_for_difference_measurement (target_loc_sig, estimated_loc_sig, comparison_loc_sig_bag);
    /* It is assumed here that each entry in "filter_bag" identifies an input filter to be used in the context of determining a difference measurement between loc sigs. Note, if all loc sigs to be used here are of the same type, then it may be that there is no need for filtering here. Accordingly, "filter_bag" can be empty. Alternatively, there may be one or more filter objects in "filter_bag".*/
/*initializations */
/* for each filter, determine a difference measurement and confidence */
for each filter obj indicated in filter_bag do
{
    /* filter "target_loc_sig", "estimated_loc_sig" and loc sigs in "comparison_locsig_bag"; note, each filter_obj can determine when it needs to be applied since each loc sig includes: (a) a description of the type (e.g., make and model) of the loc sig's associated MS, and (b) a filterflag(s) indicating filter(s) that have been applied to the loc sig. */
    target_loc_sig←filter_obj(target_loc_sig); /* filter at least the signal topography characteristics */
    estimated_loc_sig←filter_obj(estimated_loc_sig); /* filter at least the signal topography characteristics */
    comparison_loc_sig_bag←filter_obj(comparison_loc_sig_bag); /* filter loc sigs here too */
}
/*determine a difference measurement and confidence for each signal topography characteristic coordinate */ for each signal topography characteristic coordinate, C, of the loc sig data type do
{ variability_measmt.val←get_variability_range(C, comparison_loc_sig_bag);
/* This function provides a range of the variability of the C-coordinate. In one embodiment this measurement is a range corresponding to a standard deviation. However, other variability measurement definitions are contemplated such as second, third or fourth standard deviations. */
/* make sure there are enough variability measurements to determine the variability of values for this coordinate. */
if (SIZEOF(comparison_loc_sig_bag)<expected_BS_loc_sig_threshold(search_area, search_criteria)) then /* use the data here, but reduce the confidence in the variability measurement. Note that it is expected that this branch is performed only when "comparison_loc_sig_bag" is minimally big enough to use (since this is an assumption for performing this function), but not of sufficient size to have full confidence in the values obtained. Note, a tunable system parameter may also be incorporated as a coefficient in the computation in the statement immediately below. In particular, such a tunable system parameter may be based on "search_area" or more particularly, area types intersecting "search_area".*/
{
  variability measmt conf reduction factor←SIZEOF (comparison_loc_sig_bag)/
    expected_BS_loc_sig_threshold (search_area, search_criteria);
}
else /* There is a sufficient number of loc sigs in "comparison_loc_sig_bag" so continue */
{
  variability_measmt_conf_reduction_factor←1.0; //i.e., don't reduce confidence
}
/* Now determine the C-coord difference measurement between the "target_loc_sig" and the "estimated loc _ sig" */
delta←ABS(target_loc_sig[C]−estimated_loc_sig[C]); // get absolute value of the difference if (delta>variability_measmt.val) then
{
  error←error+(delta/variability_measmt.val);
}
} /* end C-coord processing */
/*construct the error record and return it */
error_rec.error←error;
/* Get an average confidence value for the loc sigs in "comparison_loc_sig_bag" Note, we use this as the confidence of each loc sig coordinate below. */
average_confidence←AVERAGE(loc_sig.confidence for loc_sig in "comparison_loc_sig_bag");
error_rec.confidence←MIN(target_loc_sig.confidence, estimated_loc_sig.confidence, (average_confidence* variability_measmt_conf_reduction_factor)); // presently not used
RETURN(error_rec);
ENDOF get_difference_measurement

APPENDIX D: CONTEXT ADJUSTER EMBODIMENTS

A description of the high level functions in a first embodiment of the Context Adjuster
context adjuster(loc_hyp_list)
/* This function adjusts the location hypotheses on the list, "loc_hyp_list", so that the confidences of the location hypotheses are determined more by empirical data than default values from the First Order Models 1224. That is, for each input location hypothesis, its confidence (and an MS location area estimate) may be exclusively determined here if there are enough verified location signatures available within and/or surrounding the location hypothesis estimate.

This function creates a new list of location hypotheses from the input list, "loc_hyp_list", wherein the location hypotheses on the new list are modified versions of those on the input list. For each location hypothesis on the input list, one or more corresponding location hypotheses will be on the output list. Such corresponding output location hypotheses will differ from their associated input location hypothesis by one or more of the following: (a) the "image_area" field (see FIGS. 9A and 9B) may be assigned an area indicative of where the target MS is estimated to be, (b) if "image_area" is assigned, then the "confidence" field will be the confidence that the target MS is located in the area for "image_area", (c) if there are not sufficient "nearby" verified location signature clusters in the location signature data base to entirely rely on a computed confidence using such verified location signature clusters, then two location hypotheses (having reduced confidences) will be returned, one having a reduced computed confidence (for "image_area") using the verified clusters in the Location Signature DB, and one being substantially the same as the associated input location hypothesis except that the confidence (for the field "area_est") is reduced to reflect the confidence in its paired location hypothesis having a computed confidence for "image_area". Note also, in some cases, the location hypotheses on the input list, may have no change to its confidence or the area to which the confidence applies. Note that the steps herein are also provided in flowchart form in FIGS. 25a and 25b.
*/
{
  new_loc_hyp_list←create_new_empty_list( );
  for each loc_hyp[i] in loc_hyp_list do /* Note, "i" is a First Order Model 1224 indicator, indicating the model that output "hyp_loc[i]" */
  {
    remove_from_list (loc_hyp[i], loc_hyp_list);
    if (NOT loc_hyp[i].adjust) then /* no adjustments will be made to the "area_est" or the "confidence" fields since the "adjust" field indicates that there is assurance that these other fields are correct; note that such designations indicating that no adjustment are presently contemplated are only for the location hypotheses generated by the Home Base Station First Order Model, the Location Base Station First Order Model and the Mobile Base Station First Order Model. In particular, location hypotheses from the Home Base Station model will have confidences of 1.0 indicating with highest confidence that the target MS is within the area estimate for the location hypothesis. Alternatively, in the Location Base Station model, generated location hypotheses may have confidences of (substantially) +1.0 (indicating that the target MS is absolutely in the area for "area_est"), or, −1.0 (indicating that the target MS is NOT in the area estimate for the generated location hypothesis). */
    { loc_hyp[i].image_area←NULL; // no adjustment, then no "image_area"
      add_to_list(new_loc_hyp_list, loc_hyp[i]); // add "loc_hyp[i]" to the new list
    }
    else /* the location hypothesis can (and will) be modified; in particular, an "image_area" may be assigned, the "confidence" changed to reflect a confidence in the target MS being in the "image_area". Additionally, in some cases, more than one location hypothesis may be generated from "loc_hyp[i]". See the comments on FIGS. 9A and 9B and the comments for "get_adjusted_loc_hyp_list_for" for a description of the terms here. */
{
  temp_list←get_adjusted_loc_hyp_list_for(loc_hyp[i]);
  new_loc_hyp_list←combine_lists(new_loc_hyp_list, temp_list);
}
RETURN(new_loc_hyp_list);
}}ENDOF context adjuster
get_adjusted_loc_hyp_list_for(loc_hyp)
/* This function returns a list (or more generally, an aggregation object) of one or more location hypotheses related to the input location hypothesis, "loc_hyp". In particular, the returned location hypotheses on the list are "adjusted" versions of "loc_hyp" in that both their target MS 140 location estimates, and confidence placed in such estimates may be adjusted according to archival MS location information in the location signature data base 1320. Note that the steps herein are also provided in flowchart form in FIGS. 26a through 26c.
RETURNS: loc_hyp_list This is a list of one or more location hypotheses related to the
  input "loc_hyp". Each location hypothesis on "loc_hyp_list" will typically be substantially the same as the input "loc_hyp" except that there may now be a new target MS estimate in the field, "image_area", and/or the confidence value may be changed to reflect information of verified location signature clusters in the location signature data base.
Introductory Information Related to the Function, "get_adjusted_loc_hyp_list_for"
This function and functions called by this function presuppose a framework or paradigm that requires some discussion as well as the defining of some terms. Note that some of the terms defined hereinbelow are illustrated in FIG. 24.
  Define the term the "the cluster set" to be the set of all MS location point estimates (e.g., the values of the "pt_est" field of the location hypothesis data type), for the present FOM, such that these estimates are within a predetermined corresponding area (e.g., "loc_hyp.ptcovering" being this predetermined corresponding area) and these point estimates have verified location signature clusters in the location signature data base.
  Note that the predetermined corresponding area above will be denoted as the "cluster set area".
  Define the term "image cluster set" (for a given First Order Model identified by "loc_hyp.FOM_ID") to mean the set of verified location signature clusters whose MS location point estimates are in "the cluster set".
  Note that an area containing the "image cluster set" will be denoted as the "image cluster set area" or simply the "image area" in some contexts. Further note that the "image cluster set area" will be a "small" area encompassing the "image cluster set". In one embodiment, the image cluster set area will be the smallest covering of cells from the mesh for the present FOM that covers the convex hull of the image cluster set. Note that preferably, each cell of each mesh for each FOM is substantially contained within a single (transmission) area type.
  Thus, the present FOM provides the correspondences or mapping between elements of the cluster set and elements of the image cluster set. */

{
  add_to_list(loc_hyp_list, loc_hyp); /* note the fields of "loc_hyp" may be changed below, but add "loc_hyp" to the list, "loc_hyp_list here */
  mesh←get_cell_mesh_for_model(loc_hyp.FOM_ID); /* get the mesh of geographic cells for the First Order Model for this location hypothesis. */
  pt_min_area←get_min_area_surrounding_pt (loc_hyp, mesh); /* Get a minimal area about the MS location point, "pt_est" of "loc_hyp[i]" indicating a point location of the target MS. Note that either the "pt_est" field must be valid or the "area_est" field of "loc_hyp[i]" must be valid. If only the latter field is valid, then the centroid of the "area_est" field is determined and assigned to the "pt_est" field in the function called here. Note that the mesh of the model may be useful in determining an appropriately sized area. In particular, in one embodiment, if "loc_hyp.pt_est" is interior to a cell, C, of the mesh, then "pt_min_area" may correspond to C. Further note that in at least one embodiment, "pt_min_area" may be dependent on the area type within which "loc_hyp.pt_est" resides, since sparsely populated flat areas may be provided with larger values for this identifier. Further, this function may provide values according to an algorithm allowing periodic tuning or adjusting of the values output, via, e.g., a Monte Carlo simulation (more generally, a statistical simulation), a regression or a Genetic Algorithm.
  For the present discussion, assume: (i) a cell mesh per FOM 1224; (ii) each cell is contained in substantially a single (transmission) area type; and (iii) "ptmin_area" represents an area of at least one cell. */
  area←pt_min_area; // initialization
  pt_max_area←get_max_area_surrounding_pt (loc_hyp, mesh); /* Get the maximum area about "pt_est" that is deemed worthwhile for examining the behavior of the "loc_hyp.FOM_ID" First Order Model (FOM) about "pt_est". Note that in at least one embodiment, this value of this identifier may also be dependent on the area type within which "loc_hyp.pt_est" resides. Further, this function may provide values according to an algorithm allowing periodic tuning or adjusting of the values output, via, e.g., a Monte Carlo simulation (more generally, a statistical simulation or regression) or a Genetic Algorithm. In some embodiments of the present disclosure, the value determined here may be a relatively large proportion of the entire radio coverage area region. However, the tuning process may be used to shrink this value for (for example) various area types as location signature clusters for verified MS location estimates are accumulated in the location signature data base. */
  min_clusters←get_min_nbr_of_clusters(loc_hyp.FOM_ID, area); /* For the area, "area", get the minimum number ("min_clusters") of archived MS estimates, L, desired in generating a new target MS location estimate and a related confidence, wherein this minimum number is likely to provide a high probability that this new target MS location estimate and a related confidence are meaningful enough to use in subsequent Location Center processing for outputting a target MS location estimate. More precisely, this minimum number, "min_clusters," is an estimate of the archived MS location estimates, L, required to provide the above mentioned high probability wherein each L satisfies the following conditions: (a) L is in the area for "area"; (b) L is archived in the location signature data base; (c) L has a corresponding verified location signature cluster in the location signature data base; and (d) L is generated by the FOM identified by "loc_hyp.FOM_ID"). In one embodiment, "min_clusters" may be a constant; however, in another it may vary according to area type and/or area size (of "area"), in some it may also vary according to the FOM indicated by "loc_hyp.FOM_ID". */
pt_est_bag←get_pt_ests_for_image_cluster_set(loc_hyp.FOM_ID, loc_hyp.pt_est, area); /* Get the MS location point estimates for this FOM wherein for each such estimate: (a) it corresponds to a verified location signature cluster (that may or may not be near its corresponding estimate), and (b) each such MS estimate is in "pt_min_area". */
/* Now, if necessary, expand an area initially starting with "pt_min_area" until at least "min_clusters" are obtained, or, until the expanded area gets too big. */
while ((sizeof(pt_est_bag)<min_clusters) and (sizeof(area)<=pt_max_area) do
{area←increase(area);
    min_clusters←get_min_nbr_of_clusters(loc_hyp.FOM_ID, area); // update for new "area"
    pt_est_bag←get_pt_ests_for_image_cluster_set(loc_hyp.FOM_ID, loc_hyp.pt_est, area);
}
attach_to(loc_hyp.pt_covering, area); // Make "area" the "pt_covering" field
if (sizeof(pt_est_bag)==0) then /* there aren't any other FOM MS estimates having corresponding verified location signature clusters; so designate "loc_hyp" as part of the second set as described above and return. */
{
    loc_hyp.image_area←NULL; // no image area for this loc_hyp; this indicates second set
    RETURN(loc_hyp_list);
}
/* It is now assured that "pt_est_bag" is non-empty and "area" is at least the size of a mesh cell. */
/* Now determine "image_area" field for "loc_hyp" and a corresponding confidence value using the verified location signature clusters corresponding to the MS point estimates of "area" (equivalently, in "pt_est_bag"). */
/*There are various strategies that may be used in determining confidences of the "image_area" of a location hypothesis. In particular, for the MS location estimates (generated by the FOM of loc_hyp.FOM_ID) having corresponding verified location signature clusters (that may or may not be in "area"), if the number of such MS location estimates in "area" is deemed sufficiently high (i.e., >="min_clusters" for "area"), then a confidence value can be computed for the "image_area" that is predictive of the target MS being in "image_area". Accordingly, such a new confidence is used to overwrite any previous confidence value corresponding with the target MS estimate generated by the FOM. Thus, the initial estimate generated by the FOM is, in a sense, an index or pointer into the archived location data of the location signature data base for obtaining a new target MS location estimate (i.e., "image_area") based on previous verified MS locations and a new confidence value for this new estimate.
Alternatively, if the number of archived FOM MS estimates that are in "area," wherein each such MS estimate has a corresponding verified location signature clusters (in "image_area"), is deemed too small to reliably use for computing a new confidence value and consequently ignoring the original target MS location estimate and confidence generated by the FOM, then strategies such as the following may be implemented.

(a) In one embodiment, a determination may be made as to whether there is an alternative area and corresponding "image_area" that is similar to "area" and its corresponding "image_area" (e.g., in area size and type), wherein a confidence value for the "image_area" of this alternative area can be reliably computed due to there being a sufficient number of previous FOM MS estimates in the alternative area that have corresponding verified location signature clusters (in the location signature data base). Thus, in this embodiment, the confidence of the alternative "image_area" is assigned as the confidence for the "image_area" for of "area".

(b) In another embodiment, the area represented by "pt_max_area" may be made substantially identical with the MS location service region. So that in many cases, there will be, as "area" increases, eventually be enough MS location estimates in the cluster set so that at least "min_clusters" will be obtained. Note, a drawback here is that "image_area" may be in become inordinately large and thus be of little use in determining a meaningful target MS location estimate.

(c) In another embodiment, denoted herein as the two tier strategy, both the original FOM MS location estimate and confidence as well as the "image_area" MS location estimate and a confidence are used. That is, two location hypotheses are provided for the target MS location, one having the FOM MS location estimate and one having the MS location estimate for "image_area". However, the confidences of each of these location hypotheses maybe reduced to reflect the resulting ambiguity of providing two different location hypotheses derived from the same FOM MS estimate. Thus, the computations for determining the confidence of "image_area" may be performed even though there are less than the minimally required archived FOM estimates nearby to the original FOM target MS estimate. In this embodiment, a weighting(s) may be used to weight the confidence values as, for example, by a function of the size of the "image_cluster_set". For example, if an original confidence value from the FOM was 0.76 and "area" contained only two-thirds of the minimally acceptable number, "min_clusters", then if the computation for a confidence of the corresponding "image_area" yielded a new confidence of 0.43, then a confidence for the original FOM target MS estimate may be computed as [0.76*(1/3)] whereas a confidence for the corresponding "image_area" may be computed as [0.43*(2/3)]. However, it is within the scope of the present disclosure to use other computations for modifying the confidences used here. For example, tunable system coefficients may also be applied to the above computed confidences. Additionally, note that some embodiments may require at least a minimal number of relevant verified location signature clusters in the location signature data base before a location hypothesis utilizes the "image_area" as a target MS location estimate.

Although an important aspect of the present disclosure is that it provides increasingly more accurate MS location estimates as additional verified location signatures are obtained (i.e., added to the location signature data base), it may be the case that for some areas there is substantially no pertinent verified location signature clusters in the location signature data base (e.g., "image_area" may be undefined). Accordingly, instead of using the original FOM generated location hypotheses in the same manner as the location hypotheses having target MS location estimates corresponding to "image_areas" in subsequent MS location estimation processing, these two types of location hypotheses may be processed separately. Thus, a strategy is provided, wherein two sets of (one or more) MS location estimates may result:
  (i) one set having the location hypotheses with meaningful "image_areas" as their target MS location estimates and
  (ii) a second set having the location hypotheses with their confidence values corresponding to the original FOM target MS estimates.

Since the first of these sets is considered, in general, more reliable, the second set may used as a "tie breaker" for determining which of a number of possible MS location estimates determined using the first set to output by the Location Center. Note, however, if there are no location hypotheses in the first set, then the second set may be used to output a Location Center target MS location estimate. Further note that in determining confidences of this second set, the weighting of confidence values as described above is contemplated.

The steps provided hereinafter reflect a "two tier" strategy as discussed in (c) above. */
  /*The following factor is analogous to the 2/3's factor discussed in (c) above. */
  cluster_ratio_factor←min{(sizeof(pt_est_bag) / min_clusters), 1.0};
  /* Now use "area" to obtain a new target MS location estimate and confidence based on archived verified loc sigs, but first determine whether "area" is too big to ignore the original target MS location estimate and confidence generated by the FOM. */
  if (sizeof(area)>pt_max_area) then /* create a loc_hyp that is essentially a duplicate of the originally input "loc_hyp" except the confidence is lowered by "(1.0−cluster_ratio_factor)". Note that the original "loc_hyp" will have its confidence computed below. */
  { new_loc_hyp←duplicate (loc hyp); // get a copy of the "loc_hyp"
    new_loc_hyp.image_area←NULL; // no image area for this new loc_hyp
    /* Now modify the confidence of "loc_hyp"; note, in the one embodiment, a system (i.e., tunable) parameter may also be used as a coefficient in modifying the confidence here. */
    new_loc_hyp.confidence←new_loc_hyp.confidence*(1.0−cluster_ratio_factor);
    add_to_list(loc_hyp_list, new_loc_hyp);
  }
  /* Now compute the "image_area" field and a confidence that the target MS is in "image_area" */
  image_cluster_set←get_verified_loc_sig_clusters_for (pt_est_bag); /* Note, this statement gets the verified location signature clusters for which the target MS point location estimates (for the First Order Model identified by "loc_hyp.FOM_ID") in "pt_est_bag" are approximations. Note that the set of MS location point estimates represented in "pt_est_bag" is defined as a "cluster set" hereinabove.*/
  image_area←get_area_containing(image_cluster_set); /* Note, in obtaining an area here that contains these verified location signature clusters, various embodiments are contemplated. In a first embodiment, a (minimal) convex hull containing these clusters may be provided here. In a second embodiment, a minimal covering of cells from the mesh for the FOM identified by "loc_hyp.FOM_ID" may be used. In a third embodiment, a minimal covering of mesh cells may be used to cover the convex hull containing the clusters. It is assumed hereinbelow that the first embodiment is used. Note, that this area is also denoted the "image cluster set area" as is described hereinabove. */
  attach_to(loc_hyp.image_area, image_area); /* Make "image_area" the "image_area" field of "loc_hyp". */
  /* In the following step, determine a confidence value for the target MS being in the area for "image_area". */
  confidence←confidence_adjuster(loc_hyp.FOM image_area, image_cluster_set);
  /* In the following step, reduce the value of confidence if and only if the number of MS point location estimates in "pt_est_bag" is smaller than "min clusters" */
  loc_hyp.confidence←confidence*cluster_ratio_factor;
  RETURN(loc_hyp_list);
}ENDOF get_adjusted_loc_hyp_list_for
confidence adjuster(FOM ID, image area, image cluster set)
/* This function returns a confidence value indicative of the target MS 140 being in the area for "image_area". Note that the steps herein are also provided in flowchart form in FIGS. 27a and 27b.
  RETURNS: A confidence value. This is a value indicative of the target MS being located in the area represented by "image_area" (when it is assumed that for the related "loc_hyp," the "cluster set area" is the "loc_hyp.pt_covering" and "loc_hyp.FOM_ID" is "FOM_ID");
Introductory Information Related to the Function, "confidence_adjuster"
This function (and functions called by this function) presuppose a framework or paradigm that requires some discussion as well as the defining of terms.
  Define the term "mapped cluster density" to be the number of the verified location signature clusters in an "image cluster set" per unit of area in the "image cluster set area".
  It is believed that the higher the "mapped cluster density", the greater the confidence can be had that a target MS actually resides in the "image cluster set area" when an estimate for the target MS (by the present FOM) is in the corresponding "the cluster set".
  Thus, the mapped cluster density becomes an important factor in determining a confidence value for an estimated area of a target MS such as, for example, the area represented by "image_area". However, the mapped cluster density value requires modification before it can be utilized in the confidence calculation. In particular, confidence values must be in the range [−1, 1] and a mapped cluster density does not have this constraint. Thus, a "relativized mapped cluster density" for an estimated MS area is desired, wherein this relativized measurement is in the range [31 1, +1], and in particular, for positive confidences in the range [0, 1]. Accordingly, to alleviate this difficulty, for the FOM define the term "prediction mapped cluster density" as a mapped cluster density value, MCD, for the FOM and image cluster set area wherein:
  (i) MCD is sufficiently high so that it correlates (at least at a predetermined likelihood threshold level) with the actual target MS location being in the "image cluster set area" when a FOM target MS location estimate is in the corresponding "cluster set area";
That is, for a cluster set area (e.g., "loc_hyp.pt_covering") for the present FOM, if the image cluster set area: has a mapped cluster density greater than the "prediction mapped cluster density", then there is a high likelihood of the target MS being in the image cluster set area.
  It is believed that the prediction mapped cluster density will typically be dependent on one or more area types. In particular, it is assumed that for each area type, there is a likely range of prediction mapped cluster density values that is substantially uniform across the area type. Accordingly, as discussed in detail hereinbelow, to calculate a prediction mapped cluster density for a particular area type, an estimate is made of the correlation between the mapped cluster densities of image areas (from cluster set areas) and the likelihood that if a verified MS location: (a) has a corresponding FOM MS estimate in the cluster set, and (b) is also in the particular area type, then the verified MS location is also in the image area.

Thus, if an area is within a single area type, then such a "relativized mapped cluster density" measurement for the area may be obtained by dividing the mapped cluster density by the prediction mapped cluster density and taking the smaller of: the resulting ratio and 1.0 as the value for the relativized mapped cluster density.

In some (perhaps most) cases, however, an area (e.g., an image cluster set area) may have portions in a number of area types. Accordingly, a "composite prediction mapped cluster density" may be computed, wherein, a weighted sum is computed of the prediction mapped cluster densities for the portions of the area that is in each of the area types. That is, the weighting, for each of the single area type prediction mapped cluster densities, is the fraction of the total area that this area type is. Thus, a "relativized composite mapped cluster density" for the area here may also be computed by dividing the mapped cluster density by the composite prediction mapped cluster density and taking the smaller of: the resulting ratio and 1.0 as the value for the relativized composite mapped cluster density.

Accordingly, note that as such a relativized (composite) mapped cluster density for an image cluster set area increases/decreases, it is assumed that the confidence of the target MS being in the image cluster set area should increase/decrease, respectively. */
{
    prediction_mapped_cluster_density←
        get_composite_prediction_mapped_ cluster_density_
        with_high_certainty
        (FOM_ID, image_area);
    /* The function invoked above provides a "composite prediction cluster density" (i.e., clusters per unit area) that is used in determining the confidence that the target MS is in "image_area". That is, the composite prediction mapped cluster density value provided here is: high enough so that for a computed mapped cluster density greater than or equal to the composite prediction cluster density, and the target MS FOM estimate is in the "cluster set area", there is a high expectation that the actual target MS location is in the "image cluster set area". */
    max_area←get_max_area_for_high_certainty(FOM_ID, image_area); /* Get an area size value wherein it is highly likely that for an area of size, "max_area", surrounding "image_area", the actual target MS is located therein. Note, that one skilled in the art will upon contemplation be able to derive various embodiments of this function, some embodiments being similar to the steps described for embodying the function, "get_composite_prediction_mapped_cluster_ density_with_high_ certainty" invoked above; i.e., performing a Monte Carlo simulation. */
    /* Given the above two values, a positive confidence value for the area, "image_area", can be calculated based on empirical data.
There are various embodiments that may be used to determine a confidence for the "image_area". In general, such a confidence should vary monotonically with (a) and (b) below; that is, the confidence should increase (decrease) with:
    (a) an increase (decrease) in the size of the area, particularly if the area is deemed close or relevant to the location of the target MS; and
    (b) an increase (decrease) in the size of the image cluster set (i.e., the number of verified location signature clusters in the area that each have a location estimate, from the FOM identified by "FOM_ID", in the "cluster set" corresponding to the "image_cluster_set;" e.g., the "cluster set" being a "loc_hyp.pt_covering").

As one skilled in the art will understand, there are many functions for providing confidences that vary monotonically with (a) and (b) above. In particular, for the cluster set area being "loc_hyp.pt_covering", one might be inclined to use the (area) size of the image cluster area as the value for (a), and the (cardinality) size of the image cluster set as the value for (b). Then, the following term might be considered for computing the confidence:

(sizeof(image cluster set area)*(sizeof(image cluster set))
        which, in the present context, is equal to (sizeof("image_area")*(sizeof("image_cluster_set")).

However, since confidences are intended to be in the range [−1,1], a normalization is also desirable for the values corresponding to (a) and (b). Accordingly, in one embodiment, instead of using the above values for (a) and (b), ratios are used. That is, assuming for a "relevant" area, A (e.g., including an image cluster set area of "loc_hyp.pt_covering") that there is a very high confidence that the target MS is in A, the following term may be used in place of the term, sizeof ("image_area"), above:

$$\min\{[\text{sizeof("image\_area")}/\text{sizeof}(A)], 1.0\}. \quad [\text{CA1.1}]$$

Additionally, for the condition (b) above, a similar normalization may be provided. Accordingly, to provide this normalization, note that the term, $$(\text{sizeof(image\_area)}*\text{prediction\_mapped\_cluster\_density}) \quad [\text{CA1.1.1}]$$

is analogous to sizeof(A) in [CA1.1]. That is, the expression of [CA1.1.1] gives a threshold for the number of verified location signature clusters that are likely to be needed in order to have a high confidence or likelihood that the target MS is in the area represented by "image_area". Thus, the following term may be used for the condition (b):

$$\min\{(\text{sizeof(image\_cluster\_set)}/[(\text{sizeof(image\_area)} * \text{prediction\_mapped\_cluster\_density}], 1.0\} \quad [\text{CA1.2}]$$

As an aside, note that $$\text{sizeof(image\_clusterset)}/[\text{sizeof(image\_area)}*\text{prediction\_mapped\_cluster\_density}]$$

is equivalent to $$[\text{sizeof(image\_cluster\_set)}/\text{sizeof(image\_area)}]/(\text{prediction\_mapped\_cluster\_density})$$

and this latter term may be interpreted as the ratio of: (i) the mapped cluster density for "image_area" to (ii) an approximation of a cluster density providing a high expectation that the target MS is contained in "image_area".

Note that the product of [CA1.1] and [CA1.2] provide the above desired characteristics for calculating the confidence. However, there is no guarantee that the range of resulting values from such products is consistent with the interpretation that has been placed on (positive) confidence values; e.g., that a confidence of near 1.0 has a very high likelihood that the target MS is in the corresponding area. For example, it can be that this product rarely is greater than 0.8, even in the areas of highest confidence. Accordingly, a "tuning" function is contemplated which provides an additional factor for adjusting of the confidence. This factor is, for example, a function of the area types and the size of each area type in "image_area". Moreover, such a tuning function may be dependent on a "tuning coefficient" per area type. Thus, one such tuning function may be:

number of area types
$$\min(\Sigma [tc_i * sizeof(\text{area type}_i \text{ in "image\_area"})/sizeof(\text{"image\_area"})], 1.0) \; i=1$$

where $tc_i$ is a tuning coefficient (determined in background or off-line processing; e.g., by a Genetic Algorithm or Monte Carlo simulation or regression) for the area type indexed by "i".

Note that it is within the scope of the present disclosure, that other tuning functions may also be used whose values may be dependent on, for example, Monte Carlo techniques or Genetic Algorithms.

It is interesting to note that in the product of [CA1.1] and [CA1.2], the "image_area" size cancels out. This appears to conflict with the description above of a desirable confidence calculation. However, the resulting (typical) computed value:

[sizeof(image_cluster_set)]/
    [max_area*prediction_mapped_cluster_density]    [CA1.3]

is strongly dependent on "image_area" since "image_cluster_ set" is derived from "image_area" and "prediction_mapped_cluster_density" also depends on "image_area". Accordingly, it can be said that the product [CA1.3] above for the confidence does not depend on "raw" area size, but rather depends on a "relevant" area for locating the target MS.

An embodiment of the confidence computation follows:
```
*/
area_ratio←min((sizeof(image_area)/max_area), 1.0);
cluster density ratio←
    min(((sizeoffimage_cluster_set) / [sizeof(image_area)*
        (prediction_mapped_cluster_density)]), 1.0);
tunable_constant←get_confidence_tuning_constant(im-
    age_area); // as discussed in the comment above
confidence←(tunable_constant)*(area_ratio)*(cluster_
    density_ratio); //This is in the range [0, 1]
RETURN(confidence);
} ENDOF confidence_adjuster
get_composite_prediction_mapped_ cluster_density_with_
    high_certainty
(FOM_ID, image_area);
/* The present function determines a composite prediction
    mapped cluster density by determining a composite pre-
    diction mapped cluster density for the area represented
    by "image_area" and for the First Order Model identi-
    fied by "FOM_ID". The steps herein are also provided in
    flowchart form in FIG. 28.
OUTPUT: composite_mapped_density This is a record for
    the composite prediction mapped cluster density. In par-
    ticular, there are with two fields:
    (i) a "value" field giving an approximation to the predic-
        tion mapped cluster density for the First Order Model
        having id, FOM_ID;
    (ii) a "reliability" field giving an indication as to the
        reliability of the "value" field. The reliability field is in
        the range [0, 1] with 0 indicating that the "value" field
        is worthless and the larger the value the more assur-
        ance can be put in "value" with maximal assurance
        indicated when "reliability" is 1. */
{
    /* Determine a fraction of the area of "image_area" con-
        tained in each area type (if there is only one, e.g., dense
        urban or a particular transmission area type as discussed
        in the detailed description hereinabove, then there would
        be a fraction having a value of 1 for this area type and a
        value of zero for all others). */
    composite_mapped_density←0; // initialization
    for each area_type intersecting "image_area" do //
        "area_type" may be taken from a list of area types.
    { /* determine a weighting for "area type" as a fraction of
        its area in "image_area" */
        intersection←intersect(image_area, area_for(ar-
            ea_type));
        weighting←sizeof(intersection)/sizeof(area_image);
        /* Now compute a prediction cluster density that
            highly correlates with predicting a location of the
            target MS for this area type. Then provide this
            cluster density as a factor of a weighted sum of the
            prediction cluster densities of each of the area
            types, wherein the weight for a particular area
            type's prediction cluster density is the fraction of
            the total area of "image_area" that is designated
            this particular area type. Note that the following
            function call does not utilize information regarding
            the location of "image_area". Accordingly, this
            function may access a precomputed table giving
            predication mapped cluster densities for (FO-
            M_ID, area_type) pairs. However, in alternative
            embodiments of the present disclosure, the predic-
            tion mapped cluster densities may be computed
            specifically for the area of "image_area" intersect
            "area_type". */
        prediction_mapped_density←get_predietion_
            mapped_cluster_density_for(FOM_ID, area_type);
        composite_mapped_density←composite_mapped_
            density+
            (weighting*prediction_mapped_density);
    }
    RETURN(composite_mapped_density);
} ENDOF get_composite_prediction_mapped_ cluster_den-
    sity_with_high_certainty
get_prediction_mapped_cluster_density_for(FOM_ID,
    area_type)
/* The present function determines an approximation to a
    prediction mapped cluster density, D, for an area type such
    that if an image cluster set area has a mapped cluster
    density >=D, then there is a high expectation that the target
    MS 140 is in the image cluster set area. Note that there are
    a number of embodiments that may be utilized for this
    function. The steps herein are also provided in flowchart
    form in FIGS. 29a through 29h.
OUTPUT: prediction_mapped_cluster_density This is a
    value giving an approximation to the prediction mapped
    cluster density for the First Order Model having identity,
    "FOM_ID", and for the area type represented by
    "area_type" */
Introductory Information Related to the Function, "get_
    predication_mapped_cluster_density_for"
```

It is important to note that the computation here for the prediction mapped cluster density may be more intense than some other computations but the cluster densities computed here need not be performed in real time target MS location processing. That is, the steps of this function may be performed only periodically (e.g., once a week), for each FOM and each area type thereby precomputing the output for this function. Accordingly, the values obtained here may be stored in a table that is accessed during real time target MS location processing. However, for simplicity, only the periodically performed steps are presented here. However, one skilled in the art will understand that with sufficiently fast computational devices, some related variations of this function may be performed in real-time. In particular, instead of supplying area type as an input to this function, a particular area, A, may be provided such as the image area for a cluster set area, or, the portion of such an image area in a particular area type. Accordingly, wherever "area_type" is used in a statement of the embodiment of this function below, a comparable statement with "A" can be provided.
{
    mesh←get_mesh_for(FOM_ID); /* get the mesh for this First Order Model; preferably each cell of "mesh" is substantially in a single area type. */
    max_nbr_simulations←get_Monte_Carlo_simulation_nbr(FOM_ID, area_type); /* This function outputs a value of the maximum number of simulations to perform for estimating the prediction mapped cluster density. Note that the output here may always be the same value such as 100. */
    nbr_simulations_performed←0; // initialization
    while
        (nbr_simulations_performed<=max_nbr_simulations) do // determine a value for the "average mapped cluster density" and a likelihood of this value being predictive of an MS location. */
    {
        representative_cell_cluster_set←get_representative_cell_clusterss_for(area_type, mesh); /* Note, each activation of this function should provide a different set of cell clusters from a covering from "mesh" of an (sub)area of type, "area_type". There should ideally be at least enough substantially different sets of representative cell clusters so that there is a distinct sets of cell clusters for each simulation number, j. Further note that, in one embodiment, each of the "representative cell cluster sets" (as used here) may include at least a determined proportion of the number of cells distributed over the area type. Moreover, each cell cluster (within a representative cell cluster set) satisfies the following:
        A. The cell cluster is a minimal covering (from "mesh") of a non-empty area, A, of type "area_type" ("A" being referred to herein as the associated area for the cell cluster);
        B. The cells of the cluster form a connected area; note this is not absolutely necessary; however, it is preferred that the associated area "A" of "area type" covered by the cell cluster have a "small" boundary with other area types since the "image_areas" computed below will be less likely to include large areas of other area types than "area_type;"
        C. There is at least a predetermined minimal number (>=1) of verified location signature clusters from the location signature data base whose locations are in the associated area "A".
        D. The cell cluster has no cell in common with any other cell cluster output as an entry in "representative_cellclusterset". */
        if (representative_cell_cluster_set is NULL) then /* another representative collection of cell clusters could not be found; so cease further simulation processing here, calculate return values and return */
            break; // jump out of "simulation loop"
        else /* there is another representative collection of cell clusters to use as a simulation */
        {
            for each cell cluster, C, in "representative_cell_clusters" do /* determine an approximation to the predictiveness of the mappings between: (a) cluster set areas wherein each cluster set area is an area around a (FOM_ID) FOM estimate that has its corresponding verified location in "C," and (b) the corresponding image areas for these cluster set areas. Note, the location signature data base includes at least one (and preferably more) location signature clusters having verified locations in each cell cluster C as per the comment at (C) above. */
            {random_list←randomly_select_verified_MS_locs_in(C); /* select one or more verified MS locations from C. */
            mapped_density_sum←0; // initialization
            for each verified location, "rand_verif_loc", in "random_list" do /* Let X denote the MS 140 estimate by the present FOM of the verified location signature cluster of "rand_verif_loc"; let CS(X) denote the cluster set obtained from the cluster set area (i.e., pt_area) surrounding X; this loop determines whether the associated image area for the set CS(X)-X, (i.e., the image area for CS(X) without "rand_verif_loc") includes "rand_verif_loc"; i.e., try to predict the location area of "rand_verif_loc". */
            {loc_est←get_loc_est_for(rand_verif_loc, FOM_ID); /* get the FOM MS location estimate for an MS actually located at "rand_verif_loc". */
            cluster_set←get_loc_ests_surrounding(loc_est, mesh); /* expand about "loc_est" until a minimal number of other location estimates from this FOM are obtained that are different from "loc_est", or until a maximum area is reached. Note, "cluster_set" could be empty, but hopefully not. Also note that in one embodiment of the function here, the following functions may be invoked: "get_min_area_surrounding," "get_max_area_surrounding" and "get_min_nbr_of_clusters" (as in "get_adjusted_loc_hyp_list_for", the second function of Appendix D): */
            image_set←get_image_of(cluster_set); /* "image_set" could be empty, but hopefully not */
            image_area←get_image_area(image_est); /* get convex hull of "image_set". Note, "image_area" could be an empty area, but hopefully not. */
            if (rand_verif_loc is in image_area)
                then /* this is one indication that the mapped cluster density: (sizeof[image_set]/image_area) is sufficiently high to be predictive */
                predictions←predictions+1;
            if (image_set is not empty) then
            {
                density←sizeof(image_set)/sizeof(image_area); /* Get an approximation to the mapped cluster density that results from "image_set" and "image_area." Note, that there is no guarantee that "image_area" is entirely within the area type of "area_type." Also note, it is assumed that as this mapped cluster density increases, it is more likely that "rndm verif loc" is in "image_area". */
                mapped_density_sum←mapped_density_sum+density;
            }
        } /* end loop for predicting location of a random MS verified location in cell cluster C. */
        total_possible_predictions←sizeof(random_list); // One prediction per element on list.

```
/* Now get average mapped density for the cell cluster
    C. */
avg_mapped_density[C]←mapped_density_sum/to-
    tal_possible_predictions;
/* Now get the prediction probability for the cell
    cluster C. */
prediction_probability[C]←predictions/total_possi-
    ble_predictions;
} /* end loop over cell clusters C in "representative_
    cell_clusters" */
nbr_simulations_performed←nbr_simulations_ per-
    formed+1;
} // end else
/* It would be nice to use the set of pairs (avg_mapped_
    density[C], prediction_probability[C]) for extrapolating
    a mapped density value for the area type that gives a very
    high prediction probability. However, due to the poten-
    tially small number of verified MS locations in many
    cells (and cell clusters), the prediction probabilities may
    provide a very small number of distinct values such as: 0,
    1/2, and 1. Thus, by averaging these pairs over the cell
    clusters of "representative_cell_clusters", the coarse-
    ness of the prediction probabilities may be accounted
    for. */
avg_mapped_cluster_density[nbr_simulations_per-
    formed]←
    avg_of_cell_mapped_densiaes(avg_mapped_density);
avg_prediction_probability[nbr_simulations_per-
    formed]←
    avg_of_ cell_prediction_probabilities(prediction_prob-
        ability);
} /* end simulation loop */
/* Now determine a measure as to how reliable the simu-
    lation was. Note that "reliability" computed in the next
    statement is in the range [0, 1]. */
reliability←nbr_simulations_performed/max_nbr_simu-
    lations;
if (reliability<system_defined_epsilon) then /* simulation
    too unreliable; so use a default high value for "predic-
    tion_mapped_cluster_density" */
    prediction_mapped_cluster_density←get_default_
        high_density_value_for(area_type);
else /* simulation appears to be sufficiently reliable to use
    the entries of "avg_mapped_cluster_density" and "avg_
    prediction_probability" */
{
    /* A more easily discernible pattern between mapped
        cluster density and prediction probability may be pro-
        vided by the set of pairs:
        S={(avg_mapped_cluster_density[j],  avg_predic-
            tion_probability[j])}, so that a mapped cluster den-
            sity value having a high prediction probability
            (e.g., 0.95) may be extrapolated in the next state-
            ment. However, if it is determined (in the function)
            that the set S does not extrapolate well (due to for
            example all ordered pairs of S being clustered in a
            relatively small region), then a "NULL" value is
            returned. */
    prediction_mapped_cluster_density←mapped_ clus-
        ter_density_extrapolation(avg_mapped_cluster_
        density, avg_prediction_probability, 0.95);
    if ((prediction_mapped_cluster_density==NULL) then
        /* set this value to a default "high" value for the
            present area type*/
        prediction_mapped_cluster_density←get_default_
            high_density_value_for(area_type);
    else // So both "prediction_mapped_cluster_density"
        and it's reliability are minimally OK.
        /* Now take the "reliability" of the "predic-
            tion_mapped_cluster_density" into account.
            Accordingly, as the reliability decreases then the
            prediction mapped cluster density should be
            increased. However, there is a system defined upper
            limit on the value to which the prediction mapped
            cluster density may be increased. The next state-
            ment is one embodiment that takes all this into
            account. Of course other embodiments are also
            possible. */
        prediction_mapped_cluster_density←
            min {(prediction_mapped_cluster_density/reli-
                ability),
                get_default_high_density_value_for(ar-
                    ea_type)};
} // end else for simulation appearing reliable
RETURN(predictionmapped_clusterdensity);
} ENDOF get_prediction_mapped_cluster_density_for
```

A Second Embodiment Of The Context Adjuster

Note that in this second embodiment of the Context Adjuster, it uses various heuristics to increment/decrement the confidence value of the location hypotheses coming from the First Order Models. These heuristics are implemented using fuzzy mathematics, wherein linguistic, fuzzy "if-then" rules embody the heuristics. That is, each fuzzy rule includes terms in both the "if" and the "then" portions that are substantially described using natural language—like terms to denote various parameter value classifications related to, but not equivalent to, probability density functions. Further note that the Context Adjuster and/or the FOM's may be calibrated using the location information from LBSs (i.e., fixed location BS transceivers), via the Location Base Station Model since such LBS's have well known and accurate predetermined locations.

Regarding the heuristics of the present embodiment of the context adjuster, the following is an example of a fuzzy rule that might appear in this embodiment of the Context Adjuster:

If <the season is Fall>then <the confidence level of Distance Model is increased by 5%>.

In the above sample rule, "Distance Model" denotes a First Order Model utilized by an embodiment of the present disclosure. To apply this sample rule, the fuzzy system needs a concrete definition of the term "Fall." In traditional expert systems, the term Fall would be described by a particular set of months, for example, September through November, in which traditional set theory is applied. In traditional set theory, an entity, in this case a date, is either in a set or it is not in a set, e.g. its degree of membership in a set is either 0, indicating that the entity is not in a particular set, or 1, indicating that the entity is in the set. However, the traditional set theory employed in expert systems does not lend itself well to entities that fall on set boundaries. For example, a traditional expert system could take dramatically different actions for a date of August 31 than it could for a date of September 1 because August 31 might belong to the set "Summer" while the date September 1 might belong to the set "Fall." This is not a desirable behavior since it is extremely difficult if not impossible to determine such lines of demarcation so accurately. However, fuzzy mathematics allows for the possibility of an entity belonging to multiple sets with varying degrees of confidence ranging from a minimum value of 0 (indicating that the confidence the entity belongs to the particular set is minimum) to 1 (indicating that the confidence the entity belongs to the particular set is maximum). The "fuzzy boundaries" between the various sets are described by fuzzy membership functions which provide a membership function value for each value on the entire range of a variable. As a consequence of allowing entities to belong to multiple sets simultaneously, the fuzzy rule base might have more than one rule that is applicable for any situation. Thus, the actions prescribed by the individual rules are averaged via a weighting scheme where each rule is implemented in proportion to its minimum confidence. For further information regarding such fuzzy heuristics, the following references are incorporated herein by reference: (McNeil and Freiberger, 1993; Cox, 1994; Klir and Folger, 1999; Zimmerman, 1991).

Thus, the rules defined in the fuzzy rule base in conjunction with the membership functions allow the heuristics for adjusting confidence values to be represented in a linguistic form more readily understood by humans than many other heuristic representations and thereby making it easier to maintain and modify the rules. The fuzzy rule base with its membership functions can be thought of as an extension to a traditional expert system. Thus, since traditional expert systems are subsets of fuzzy systems, an alternative to a fuzzy rule base is a traditional expert system, and it is implicit that anywhere in the description of the current invention that a fuzzy rule base can be replaced with an expert system.

Also, these heuristics may evolve over time by employing adaptive mechanisms including, but not limited to, genetic algorithms to adjust or tune various system values in accordance with past experiences and past performance of the Context Adjuster for increasing the accuracy of the adjustments made to location hypothesis confidence values. For example, in the sample rule presented above:

If <the season is Fall>then <the confidence level of Distance Model is increased by 5%> an adaptive mechanism or optimization routine can be used to adjust the percent increase in the confidence level of the Distance Model. For example, by accessing the MS Status Repository, a genetic algorithm is capable of adjusting the fuzzy rules and membership functions such that the location hypotheses are consistent with a majority of the verified MS locations. In this way, the Context Adjuster is able to employ a genetic algorithm to improve its performance over time. For further information regarding such adaptive mechanisms, the following references are incorporated herein by reference: (Goldberg, 1989; Holland, 1975). For further information regarding the tuning of fuzzy systems using such adaptive mechanisms, the following references are incorporated herein by reference: (Karr, 1991a, 1991b).

In one embodiment, the Context Adjuster alters the confidence values of location hypotheses according to one or more of the following environmental factors: (1) the type of region (e.g., dense urban, urban, rural, etc.), (2) the month of the year, (3) the time of day, and (4) the operational status of base stations (e.g., on-line or off-line), as well as other environmental factors that may substantially impact the confidence placed in a location hypothesis. Note that in this embodiment, each environmental factor has an associated set of linguistic heuristics and associated membership functions that prescribe changes to be made to the confidence values of the input location hypotheses.

The context adjuster begins by receiving location hypotheses and associated confidence levels from the First Order Models. The Context Adjuster takes this information and improves and refines it based on environmental information using the modules described below.

B.1 COA Calculation Module

As mentioned above each location hypothesis provides an approximation to the MS position in the form of a geometric shape and an associated confidence value, a. The COA calculation module determines a center of area (COA) for each of the geometric shapes, if such a COA is not already provided in a location hypothesis. The COA Calculation Module receives the following information from each First Order Model: (1) a geometrical shape and (2) an associated confidence value, a. The COA calculation is made using traditional geometric computations (numerical algorithms are readily available). Thus, following this step, each location hypothesis includes a COA as a single point that is assumed to represent the most likely approximation of the location of the MS. The COA Calculation Module passes the following information to the fuzzification module: (1) a geometrical shape associated with each first order model 1224, (2) an associated confidence value, and (3) an associated COA.

B.2 Fuzzification Module

A fuzzification module receives the following information from the COA Calculation Module: (1) a geometrical shape associated with each First Order Model, (2) an associated confidence value, and (3) an associated COA. The Fuzzification Module uses this information to compute a membership function value ($\mu$) for each of the M location hypotheses received from the COA calculation module (where the individual models are identified with an i index) for each of the N environmental factors (identified with a j index). In addition to the information received from the COA Calculation Module, the Fuzzification Module receives information from the Location Center Supervisor. The fuzzification module uses current environmental information such as the current time of day, month of year, and information about the base stations on-line for communicating with the MS associated with a location hypothesis currently being processed (this information may include, but is not limited to, the number of base stations of a given type, e.g., location base stations, and regular base stations, that have a previous history of being detected in an area about the COA for a location hypothesis). The base station coverage information is used to compute a percentage of base stations reporting for each location hypothesis.

The fuzzification is achieved in the traditional fashion using fuzzy membership functions for each environmental factor as, for example, is described in the following references incorporated herein by reference: (McNeil and Freiberger, 1993; Cox, 1994; Klir and Folger, 1999; Zimmerman, 1991).

Using the geographical area types for illustration purposes here, the following procedure might be used in the Fuzzification Module. Each value of COA for a location hypothesis is used to compute membership function values ($\mu$) for each of five types of areas: (1) dense urban ($\mu_{DU}$), (2) urban ($\mu_U$), (3) suburban ($\mu_S$), (4) rural plain ($\mu_{RP}$), and (5) rural mountains ($\mu_{RM}$). These membership function values provide the mechanism for representing degrees of membership in the area types, these area types being determined from an area map that has been sectioned off. In accordance with fuzzy theory, there may be geographical locations that include, for example, both dense urban and urban areas; dense urban and rural plane areas; dense urban, urban, and rural plane areas, etc. Thus for a particular MS location area estimate (described by a COA), it may be both dense urban and urban at the same time. The resolution of any apparent conflict in applicable rules is later resolved in the Defuzzification Module using the fuzzy membership function values ($\mu$) computed in the Fuzzification Module.

Any particular value of a COA can land in more than one area type. For example, the COA may be in both dense urban and urban. Further, in some cases a location hypothesis for a particular First Order Model i may have membership functions and $\mu_{DU}{}^i, \mu_U{}^i, \mu_S{}^i, \mu_{RP}{}^i, \mu_{RM}{}^i$ wherein they all potentially have non-zero values. Additionally, each geographical area is contoured. Note that the membership function contours allow for one distinct value of membership function to be determined for each COA location (i.e., there will be distinct values of $\mu_{DU}{}^i, \mu_U{}^i, \mu_S{}^i, \mu_{RP}{}^i,$ and $\mu_{RM}{}^i$ for any single COA value associated with a particular model i). For example, the COA would have a dense urban membership function value, $\mu_{DU}{}^i$, equal to 0.5. Similar contours would be used to compute values of $\mu_U{}^i, \mu_S{}^i, \mu_{RP}{}^i,$ and $\mu_{RM}{}^i$.

Thus, for each COA, there now exists an array or series of membership function values; there are K membership function values (K=number of descriptive terms for the specified environmental factor) for each of M First Order Models. Each COA calculation has associated with it a definitive value for $\mu_{DU}{}^i, \mu_U{}^i, \mu_S{}^i, \mu_{RP}{}^i,$ and $\mu_{RM}{}^i$. Taken collectively, the M location hypotheses with membership function values for the K descriptive terms for the particular environmental factor results in a membership function value matrix. Additionally, similar membership function values are computed for each of the N environmental factors, thereby resulting in a corresponding membership function value matrix for each of the N environmental factors.

The Fuzzification Module passes the N membership function value matrices described above to the Rule Base Module along with all of the information it originally received from the COA Calculation Module.

B.3 Rule Base Module

The Rule Base Module receives from the Fuzzification Module the following information: (1) a geometrical shape associated with each First Order Model, (2) an associated confidence value, (3) an associated COA, and (4) N membership function value matrices. The Rule Base Module uses this information in a manner consistent with typical fuzzy rule bases to determine a set of active or applicable rules. Sample rules were provided in the general discussion of the Context Adjuster. Additionally, references have been supplied that describe the necessary computations. Suffice it to say that the Rule Base Modules employ the information provided by the Fuzzification Module to compute confidence value adjustments for each of the m location hypotheses. Associated with each confidence value adjustment is a minimum membership function value contained in the membership function matrices computed in the Fuzzification Module.

For each location hypothesis, a simple inference engine driving the rule base queries the performance database (FIG. 8(3)) to determine how well the location hypotheses for the First Order Model providing the current location hypothesis has performed in the past (for a geographic area surrounding the MS location estimate of the current location hypothesis) under the present environmental conditions. For example, the performance database is consulted to determine how well this particular First Order Model has performed in the past in locating an MS for the given time of day, month of year, and area type. Note that the performance value is a value between 0 and 1 wherein a value of 0 indicates that the model is a poor performer, while a value of 1 indicates that the model is always (or substantially always) accurate in determining an MS location under the conditions (and in the area) being considered. These performance values are used to compute values that are attached to the current confidence of the current location hypothesis; i.e., these performance values serve as the "then" sides of the fuzzy rules; the First Order Models that have been effective in the past have their confidence levels incremented by large amounts while First Order Models that have been ineffective in the past have their confidence levels incremented by small amounts. This information is received from the Performance Database in the form of an environmental factor, a First Order Model number, and a performance value. Accordingly, an intermediate value for the adjustment of the confidence value for the current location hypothesis is computed for each environmental condition (used by Context Adjuster) based on the performance value retrieved from the Performance Database. Each of these intermediate adjustment values are computed according to the following equation which is applicable to area information:

$$\text{adjustment}_j^i = \Delta a_j^i = \text{performance\_value}_j * \Delta a_{REGION}^{MAX}$$

where a is the confidence value of a particular location hypothesis, performance value is the value obtained from the Performance Database, $\Delta a_{REGION}^{MAX}$ is a system parameter that accounts for how important the information is being considered by the context adjuster. Furthermore, this parameter is initially provided by an operator in, for example, a system start-up configuration and a reasonable value for this parameter is believed to be in the range 0.05 to 0.1, the subscript j represents a particular environmental factor, and the superscript i represents a particular First Order Model. However, it is an important aspect of the present disclosure that this value can be repeatedly altered by an adaptive mechanism such as a genetic algorithm for improving the MS location accuracy of an embodiment of the present disclosure. In this way, and because the rules are "written" using current performance information as stored in the Performance Database, the Rule Module is dynamic and becomes more accurate with time.

The Rule Base Module passes the matrix of adjustments to the Defuzzification Module along with the membership function value matrices received from the Fuzzification Module.

B.6 Defuzzification Module

The Defuzzification Module receives the matrix of adjustments and the membership function value matrices from the Rule Base Module. The final adjustment to the First Order Model confidence values as computed by the Context Adjuster is computed according to:

$$\Delta \alpha_j^i(k) = \frac{\sum_{j=1}^{N} \mu_j^i(k) \Delta \alpha_j^i}{\sum_{j=1}^{N} \mu_j^i(k)}$$

such as, but not limited to, time of day, month of year, and base station coverage, there are a number of system start-up configuration parameters that can be adjusted in attempts to improve system performance. These adjustments are, in effect, adjustments computed depending on the previous performance values of each model under similar conditions as being currently considered. These adjustments are summed and forwarded to the blackboard. Thus, the Context Adjuster passes the following information to the blackboard: adjustments in confidence values for each of the First Order Models based on environmental factors and COA values associated with each location hypothesis.

Summary

The Context Adjuster uses environmental factor information and past performance information for each of i First Order Models to compute adjustments to the current confidence values. It retrieves information from the First Order Models, interacts with the Supervisor and the Performance Database, and computes adjustments to the confidence values. Further, the Context Adjuster employs a genetic algorithm to improve the accuracy of its calculations. The algorithm for the Context Adjuster is included in algorithm BE.B below:

Algorithm BE.B: Pseudocode for the Context Adjuster.

```
Context_Adjuster (geometries, alpha)
/* This program implements the Context Adjuster. It receives
   from the First Order Models geometric areas contained in
   a data structure called geometries, and associated confi-
   dence values contained in an array called alpha. The pro-
   gram used environmental information to compute
   improved numerical values of the confidence values. It
   places the improved values in the array called alpha,
   destroying the previous values in the process.
*/
//pseudo code for the Context Adjuster
// assume input from each of i models includes a
// geographical area described by a number of points
// and a confidence value alpha(i). alpha is such
// that if it is 0.0 then the model is absolutely
// sure that the MS is not in the prescribed area;
// if it is 1.0 then the model is absolutely
// sure that the MS is in the prescribed area.
//calculate the center of area for each of the i model areas
for i=1 to number_of_models
    calculate center of area // termed coa(i) from here on out
//extract information from the "outside world" or the environ-
    ment
find_time_of_day
find_month_of_year
find_number_of_BS_available
find_number_of_BS_reporting
//calculate percent_coverage of base stations
percent_coverage=100.0*(number_of_BS_reporting/num-
    ber_of_BS_available)
//use these j=4 environmental factors to compute adjustments
    to the i confidence values
//associated with the i models–alpha(i)
for i=1 to number_of_models // loop on the number of models
    for j=1 to number_env_factors // loop on the number of
        environmental factors
        for k=1 to number_of_fuzzy_classes // loop on the num-
            ber of classes
            // used for each of the environmental
            // factors
            //calculate mu values based on membership function
                definitions
            calculate mu(i,j,k) values
            //go to the performance database and extract current
                performance information for each of the i
                //models, in the k fuzzy classes, for the j environmen-
                    tal factors
            fetch performance(i,j,k)
            //calculate the actual values for the right hand sides of
                the fuzzy rules
            delta_alpha(i,j,k)=performance(i,j,k)*delta_alpha_max
                (j)
            // delta_alpha_max(j) is a maximum amount each envi-
                ronmental
            // factor can alter the confidence value; it is eventually
            // determined by a genetic algorithm
            //compute a weighted average; this is traditional fuzzy
                mathematics
            delta_alpha(i,j,k)=sum[mu(i,j,k)*delta_alpha(i,j,k)/
                sum[mu(i,j,k)]
        end loop on k // number of fuzzy classes
        // compute final delta_alpha values
        delta_alpha(i)=sum[delta_alpha(i,j)]
    end loop on j // number of environmental factors
    alpha(i)+=delta alpha(i)
end loop on i // number of models
//send alpha values to blackboard
send delta alpha(i) to blackboard
//see if it is time to interact with a genetic algorithm
if (in_progress)
    then continue to calculate alpha adjustments
else
    call the genetic algorithm to adjust alpha max parameters
        and mu functions
```

APPENDIX E: HISTORICAL DATA CONFIDENCE ADJUSTER PROGRAM

```
Historical data confidence adjuster(loc hyp)
/* This function adjusts the confidence of location hypothesis,
   "loc_hyp", according to how well its location signature
   cluster fits with verified location signature clusters in the
   location signature data base. */
{
    mesh←get_mesh_for(loc_hyp.FOM_ID); // each FOM
        has a mesh of the Location Center service area
    covering←get_mesh_covering_of_MS_estimate_for
        (loc_ hyp); /* get the cells of "mesh" that minimally
        cover the most pertinent target MS estimate in "loc_
        hyp". */
    total_per_unit_error←0; // initialization
    for each cell, C, of "covering" do /* determine an error
        measurement between the location signature cluster of
        "loc_hyp" and the verified location signature clusters in
        the cell */
    {
        centroid←get centroid(C);
        error_obj←DB_Loc_Sig_Error_Fit(centroid, C, loc_
            hyp.loc_sig_cluster, "USE ALL LOC SIGS IN DB");
            /* The above function call computes an error object,
            "error_obj", providing a measure of how similar
            the location signature cluster for "loc_hyp" is with
            the verified location signature clusters in the loca-
            tion signature data base, wherein the verified loca-
            tion signature clusters are in the area represented by
            the cell, C. See APPENDIX C for details of this
            function. */
        total_per_unit_error←total_per_unit_error+
            [error_obj.error*error_obj.confidence/sizeof(C)];
            /* The above statement computes an "error per unit of
            cell area" term as:
            [error_obj.error*error_obj.confidence/sizeof(C)],
                wherein   the   error   is   the   term:
                error_obj.error*error_obj.confidence. Subse-
                quently, this error per unit of cell area term accu-
                mulated in "total_relative_error" */
    }
    avg_per_unit_error←total_per_unit_error/nbr_cells_in
        (mesh);
        /* Now get a tunable constant, "tunable_constant", that
            has been determined by the Adaptation Engine 1382
            (shown in FIGS. 5, 6 and 8), wherein "tunable_con-
            stant" may have been adapted to environmental char-
            acteristics. */
    tunable_constant←get_tuneable_constant_for("Histori-
        cal_Location_Reasoner", loc_hyp);
        /* Now decrement the confidence value of "loc_hyp" by
            an error amount that is scaled by "tunable_constant"
            */
``` loc_hyp.confidence←loc_hyp.confidence−
  [avg_per_unit_error*sizeof(covering)*tunable_constant];
RETURN(loc_hyp);
}ENDOF Historical_data_confidence_adjuster

What is claimed is:

1. A method for locating, from a plurality of wireless mobile stations, one of the wireless mobile stations using measurements of wireless signals, wherein at least one of: (i) said measurements and (ii) said wireless signals are transmitted between said one wireless mobile station and at least one of a plurality of fixed location communication stations, each communication station capable of at least one of receiving wireless signals from, and transmitting wireless signals to said one wireless mobile station, comprising the following steps at A and B which are performed by computational machinery:

(A) receiving, from each of at least first and second mobile station location estimators, corresponding first and second information related to likely geographical approximations for a location of said one wireless mobile station, wherein (a) and (b) following are satisfied:
  (a) for determining a likely geographical approximation, $GA_A$, for a location, $L_A$, of a second of the wireless mobile stations at a time $T_A$, said first mobile station location estimator generates $GA_A$ without requiring a prior likely geographical location approximation generated by said second mobile station location estimator for locating the second wireless mobile station at substantially the location $L_A$ at substantially the time $T_A$, and,
  (b) for estimating a likely geographical approximation, $GA_B$, for a location, $L_B$, of a third one of the wireless mobile stations at a time $T_B$, said second mobile station location estimator generates $GA_B$ without requiring a prior likely geographical location approximation generated by said first mobile station location estimator for locating the third wireless mobile station at the location $L_B$ at substantially the time $T_B$;
(B) determining a resulting location estimate of said one wireless mobile station, wherein said step of determining includes at least one of the substeps (B1) through (B2) following:
  (B1) when said first and second information include, respectively, first and second likely geographical approximations, combining said first and second likely geographical approximations so that said resulting location estimate is dependent on each of said first and second location likely geographical approximations; and
  (B2) selecting one of said first and second information for receiving preference in determining said resulting location estimate, wherein said selecting is dependent upon location related data in at least one of said first and second information.

2. The method of claim 1, further including a step of providing display information for: (a) displaying a representation of said resulting location estimate, wherein said display information is for displaying with a map of an area having the resulting location estimate, and (b) at a same time displaying information indicative of an accuracy of the resulting location estimate.

3. The method of claim 1, wherein the first and second mobile station location estimators comprise hardware and software that perform different location determining computational techniques for locating the one wireless mobile station.

4. The method of claim 3, wherein for an unknown location L, of the one wireless mobile station M, from which location related data is obtained for locating M, wherein the location related data is obtained from values of one or more wireless signal characteristics, the values dependent upon signal transmission of wireless signals to or from the one mobile station M:

for estimating the location L from the location related data at least one of (1) and (2) hold:
  (1) a first collection of location determining computational machinery instructions is performed by an activation of the first mobile station location estimator, the first collection being an operational representation of a first location determining technique;
    wherein the first location technique: (i) is representable independently of all actual geographical locations, and (ii) identifies, for use in determining each unknown mobile station location ($U_1$) of a plurality of unknown mobile station locations, a first predetermined set of at least one of the wireless signal characteristics whose values are dependent upon signal transmission of wireless signals to or from the one unknown mobile station location $U_1$;
    wherein the performance of the first collection determines a first location estimate of L, wherein an operational representation of the first location determining technique is not performed by the second mobile station location estimator for determining a location estimation of L, or
  (2) a second collection of location determining computational machinery instructions is performed by an activation of the second mobile station location estimator, the second collection being an operational representation of a second location determining technique;
    wherein the second location determining technique: (i) is representable independently of all actual geographical locations, and (ii) identifies, for use in determining each unknown mobile station location ($U_2$) of a plurality of unknown mobile station locations, a second predetermined set of at least one of the wireless signal characteristics whose values are dependent upon signal transmission of wireless signals to or from the one unknown mobile station location $U_2$;
    wherein the performance of the second collection determines a second location estimate of L, wherein an operational representation of the second location determining technique is not performed by the first mobile station location estimator for determining a location estimation of L.

5. The method of claim 4, wherein the one or more wireless signal characteristics for locating an unknown mobile location includes at least one of: a time of arrival of a wireless signal transmitted from the unknown mobile location to one of the communication stations attached to the Earth, a time of arrival of a wireless signal transmitted to the unknown mobile location from a satellite, and a signal strength of a wireless signal transmitted from the unknown mobile location to one of the communication stations attached to the Earth.

6. The method of claim 3, wherein for locating the one wireless mobile station, M herein, the first and second mobile station location estimators perform different location determining computational techniques for locating M such that if, for each of the first and second mobile station location estimators, identical data were available for providing all input for locating M, then upon activating each of the first and second location estimators with their input for locating M obtained from the identical data, (1) a location related computation is performed by the activation of the first mobile station location estimator that is not performed by the activation of the second location estimator, or, (2) a location related computation is performed by the activation of the second mobile station location estimator that is not performed by the activation of the first location estimator.

7. The method of claim 1, wherein the first mobile station location estimator determines the first information via a computational machinery implementation of a first location determining technique such that for data, obtained from values of first predetermined wireless transmission characteristics of wireless signal communication with the one mobile station, being available as input to the first mobile station location estimator, the first mobile station location estimator outputs a likely geographical approximation of the one mobile station, the likely geographical approximation being the first likely geographical approximation when (B1) of claim 1 holds;
wherein the second mobile station location estimator determines the second information via a computational machinery implementation of a second location determining technique such that for data, obtained from values of second predetermined wireless transmission characteristics of wireless signal communication with the one mobile station, being available as input to the second mobile station location estimator, the second mobile station location estimator outputs a second likely geographical approximation of the one mobile station, the likely geographical approximation being the second likely geographical approximation when (B1) of claim 1 holds;
wherein at least one of: (1) a computational machinery implementation of the second location determining technique is not performed by the first mobile station location estimator in determining the first information, or (2) a computational machinery implementation of the first location determining technique is not performed by the second mobile station location estimator in determining the second information.

8. The method of claim 7 wherein for each wireless mobile station (N) of the wireless mobile stations, N is an instance of the one wireless mobile station.

9. The method of claim 7, wherein for each wireless mobile station (N) of a multiplicity of the wireless mobile stations, wherein N is the instance of the one wireless mobile station, the substep B1 is performed.

10. The method of claim 4, wherein for each wireless mobile station (N) of a multiplicity of the wireless mobile stations, wherein N is the instance of the one wireless mobile station, the substep B1 is performed.

11. The method of claim 3, wherein for each wireless mobile station (N) of a multiplicity of the wireless mobile stations, wherein N is the instance of the one wireless mobile station, the substep B1 is performed.

12. The method of claim 3, wherein for each wireless mobile station (M) of a multiplicity of the wireless mobile stations, wherein M is the instance of the one wireless mobile station, the substep B2 is performed.

13. The method of claim 4, wherein for each wireless mobile station (M) of a multiplicity of the wireless mobile stations, wherein M is the instance of the one wireless mobile station, the substep B2 is performed.

14. The method of claim 7, wherein for each wireless mobile station (M) of a multiplicity of the wireless mobile stations, wherein M is the instance of the one wireless mobile station, the substep B2 is performed.

15. The method of claim 1, wherein the first mobile station location estimator is a collection of one or more computational machinery modules that include, or are operationally dependent upon, a signal processing technique, provided by computational machinery, the first mobile station location estimator for estimating a location of the one wireless mobile station when computational machinery for the signal processing technique is supplied with data obtained from wireless signals (S) received by the one mobile station from one or more transmitting stations not attached to the Earth, wherein said wireless signals S provide time values, and the computational machinery for the signal processing technique uses at least one differential between a time of transmission and a time of arrival for the wireless signals S transmitted by a plurality of the transmitting stations;
wherein the first information is dependent upon an output from the signal processing technique.

16. The method of claim 15, wherein the second mobile station location estimator is dependent upon a time difference of arrival of a wireless signal between the one wireless mobile station and at least one of the communication stations.

17. The method of claim 15, wherein the second mobile station location estimator is dependent upon a pattern recognition location technique, performed by computational machinery, for estimating a location of the one wireless mobile station by recognizing a pattern of characteristics of wireless signals communicated between the one wireless mobile station and one or more of the communication stations.

18. The method of claim 17, wherein the pattern recognition location technique uses characteristics of wireless signals from at least first and second wireless transmission paths of wireless transmissions between the one wireless mobile station and at least one of the communication stations.

19. The method of claim 15, wherein the second mobile station location estimator is dependent upon a direction of arrival technique, performed by computational machinery, wherein the direction of arrival technique determines a geographic estimation for a location of the one wireless mobile station by using a direction from which wireless signals arrive at one of the communication stations from the one wireless mobile station.

20. The method of claim 15, wherein the second mobile station location estimator is dependent upon location data indicative of a coverage area of at least one of the communication stations, wherein the location data is used as a location estimate for the second information.

21. The method of claim 15, wherein when the first location information is unavailable at a location, L, for the one wireless mobile station, the location estimate for the second information is used for determining the resulting location estimate.

22. The method as claimed in claim 1, further including a step of transmitting, through a telecommunications network, the first mobile station location estimator from a source site to an activation site for generating the first information;
wherein the step of transmitting includes transmitting a representation of programmatic instructions for the first mobile station location estimator via a communications network.

23. The method as claimed in claim 1, further including, for a geographical indication, GI, of one of the first and second information, a step of obtaining data indicative of a correctness that the at least one geographical indication GI represents a location that includes the one wireless mobile station.

24. The method of claim 23, wherein the data indicative of a correctness is obtained using previously obtained geographical indications for locating one or more mobile station locations.

25. The method of claim 23, wherein in performing the step B1 of combining, the data indicative of a correctness is used in determining an importance of the one of the first and second information in the resulting location estimate.

26. The method of claim 23, wherein in performing the step of selecting, the data indicative of a correctness is used in determining an importance of the one of the first and second information in the resulting location estimate.

27. The method of claim 1, wherein the first and second mobile station location estimators use different wireless signal location related data for determining the resulting location estimate.

28. The method of claim 27, wherein for determining the resulting location estimate:
（A) the first mobile station location estimator uses data indicative of a time difference between: (1) a time of a wireless signal transmission from a transmitting station not attached to the Earth, and (2) a time of arrival of the wireless signal;
(B) the second mobile station location estimator does not use the data indicative of the time difference; and
(C) each of the first and second information includes a location estimate of the one wireless mobile station.

29. The method of claim 27, wherein for determining the resulting location estimate:
(A) the first mobile station location estimator uses data indicative of a time difference of arrival of wireless signal communications between: (1) the one wireless mobile station, and (2) a plurality of the communication stations attached to the Earth;
(B) the second mobile station location estimator does not use the data indicative of the time difference of arrival, and
(C) each of the first and second information includes a location estimate of the one wireless mobile station.

30. The method of claim 27, wherein for determining the resulting location estimate:
(A) the first mobile station location estimator uses data indicative of a time of arrival of wireless signal communications between: (1) one of the communication stations, and (2) the one wireless mobile station;
(B) the second mobile station location estimator does not use the data indicative of the time of arrival, and
(C) each of the first and second information includes a location estimate of the one wireless mobile station.

31. The method of claim 27, wherein for determining the resulting location estimate:
(A) the first mobile station location estimator uses data indicative of a signal strength of wireless signal communications between: (1) one of the communication stations, and (2) the one wireless mobile station;
(B) the second mobile station location estimator does not use the data indicative of the signal strength, and
(C) each of the first and second information includes a location estimate of the one wireless mobile station.

32. The method of claim 3, further including a step of outputting display information for, at a same time: (1) displaying a representation of a location estimate, LE, of the one first mobile station obtained from the resulting location estimate, and, (2) displaying information indicating one of: (i) an accuracy of the location estimate LE, and (ii) a confidence or reliability in the location estimate LE.

33. The method of claim 32, wherein the display information is displayed on a map of an area having the location estimate LE, and displayed at a same time therewith is the information indicative of the accuracy of the location estimate.

34. The method of claim 5, wherein said first information is selected over said second information unless there is information indicating a likelihood of the first information providing reduced performance in locating the one wireless mobile station, wherein the first information is dependent upon a signal processing technique, performed by computational machinery, for estimating a location of the one wireless mobile station when the signal processing technique is supplied with data obtained from wireless signals S received by the one wireless mobile station from one or more transmitting stations not attached to the Earth, wherein the wireless signals S provide time values, and the signal processing technique uses at least one differential between a time of transmission and a time of arrival for the wireless signals S transmitted by a plurality of the transmitting stations.

35. The method of claim 3, further including the steps:
for the first mobile station location estimator, a step of determining the first information for locating the one wireless mobile station, wherein the first information includes one or more location estimates of a geographical location L of the one wireless mobile station, and wherein for determining at least one of the location estimates, there is (A1)-(A4) following:
(A1) a non-transient data storage of a collection, C, of wireless location related data based upon: a plurality of data collections, wherein, for each geographical location, G, of a plurality of geographical locations, there is one of the data collections having (i) and (ii) following:
(i) a representation of the geographical location G, and
(ii) wireless signal transmission information for a wireless signal, WS, transmitted from one of: one of the mobile stations, M, and at least one of the communication stations and received by the other of the mobile station M or the at least one communication station, wherein the wireless signal transmission information includes effects from one or more objects along a wireless transmission path of the wireless signal WS when the objects affect the wireless signal prior to being received, and wherein the mobile station M is approximately at the geographical location G; and
(A2) for first wireless signal data indicative of a wireless communication between the one wireless mobile station and a first of the communication stations, there is an identification of the first communication station for accessing a first subcollection of the collection, C, of wireless location related data, and, for second wireless signal data indicative of a wireless communication between the one wireless mobile station and a second of the communication stations, there is an identification of the second communication station for accessing a second subcollection of the collection, C, of wireless location related data;
(A3) a first value indicative of a discrepancy between wireless signal values for the first wireless signal data and the first subcollection of wireless location related data;
(A4) a second value indicative of a discrepancy between wireless signal values for the second wireless signal data and the second subcollection of wireless location related data; and
the step of determining the first information further including determining the at least one location estimate dependent upon the first and second values.

36. The method of claim 35, further including for the at least one location estimate, a step of determining a confidence therefor, wherein the confidence is indicative of a likelihood of the one wireless mobile station having an actual location represented by the at least one location estimate.

37. The method of claim 35, further including obtaining wireless signal strengths for the one wireless mobile station wirelessly communicating with the communication stations, wherein each of the first and second values are dependent upon data for at least some of the wireless signal strengths.

38. The method of claim 35, wherein the step of determining the first information includes a step of interpolating data (D) from the first subcollection, wherein the data D is used to determine the discrepancy in obtaining the first value collection C.

39. The method of claim 35, further including a step of determining one or more intermediate location estimates of the one wireless mobile station, wherein at least one of the intermediate location estimates is adjusted according to at least one environmental characteristic.

40. The method of claim 36, wherein the resulting location estimate includes data indicative of the confidence, and further including a step of providing the resulting location estimate for presentation on a computational machine display, the display presenting a wireless coverage area, wherein colors are provided on the display such that for portions of the coverage area whose corresponding representations are displayed in different ones of the colors, each different color represents a different corresponding likelihood of the one wireless mobile station being located in the portion of the coverage area represented by the color.

41. The method of claim 35, further including a step of selecting the first communication station by the computational machinery.

42. The method of claim 35, further including a step of obtaining, from wireless signal detection equipment, wireless signal location related data from at least some of the communication stations for performing a step of calibrating of one or more wireless location models that perform location estimations of the mobile stations, the calibration performed by the computational machinery.

43. An apparatus for locating, from a plurality of wireless mobile stations, one of the wireless mobile stations using measurements of wireless signals, wherein at least one of: (i) said measurements and (ii) said wireless signals are transmitted between said one wireless mobile station and at least one of a plurality of fixed location communication stations, each communication station capable of at least one of: receiving wireless signals from, and transmitting wireless signals to, said one wireless mobile station, comprising:
first and second mobile station location estimators provided by computational machinery;
wherein the apparatus is operative to accomplish (A) and (B) following:

(A) receive, from each of at least first and second mobile station location estimators, corresponding first and second information related to likely geographical approximations for a location of said one wireless mobile station, wherein (a) and (b) following are satisfied:
(a) for determining a likely geographical approximation, $GA_A$, for a location, $L_A$, of a second of the mobile stations at a time $T_A$, said first mobile station location estimator generates $GA_A$ without requiring a prior likely geographical location approximation generated by said second mobile station location estimator for locating the second mobile station at substantially the location $L_A$ at substantially the time $T_A$, and,
(b) for estimating a likely geographical approximation, $GA_B$, for a location, $L_B$, of a third one of the mobile stations at a time $T_B$, said second mobile station location estimator generates $GA_B$ without requiring a prior likely geographical location approximation generated by said first mobile station location estimator for locating the third mobile station at the location $L_B$ at substantially the time $T_B$;
(B) determine a resulting location estimate of said one wireless mobile station, wherein said step of determining includes at least one of the substeps (B1) through (B2) following:
(B1) when said first and second information include, respectively, first and second likely geographical approximations, combining said first and second likely geographical approximations so that said resulting location estimate is dependent on each of said first and second likely geographical approximations; and
(B2) selecting one of said first and second information for receiving preference in determining said resulting location estimate, wherein said selecting is dependent upon location related data in at least one of said first and second information.

44. The apparatus of claim 43, wherein the first mobile station location estimator is a collection of one or more computational machinery modules that include, or are operationally dependent upon, a signal processing technique, provided by computational machinery, the first mobile station location estimator for estimating a location of the one wireless mobile station when computational machinery for the signal processing technique is supplied with data obtained from wireless signals (S) received by the one mobile station from one or more transmitting stations not attached to the Earth, wherein said wireless signals S provide time values, and the computational machinery for the signal processing technique uses at least one differential between a time of transmission and a time of arrival for the wireless signals S transmitted by a plurality of the transmitting stations;
wherein the first information is dependent upon an output from the signal processing technique.

* * * * *